United States Patent [19]

Inoue et al.

[11] Patent Number: 6,011,663
[45] Date of Patent: Jan. 4, 2000

[54] DIGITAL VTR INCREASING RECORDED AMOUNT OF HIGH PRIORITY DATA

[75] Inventors: Sadayuki Inoue; Junko Ishimoto; Taketoshi Hibi; Tomohiro Ueda; Ken Onishi; Satoshi Kurahashi, all of Nagaokakyo, Japan

[73] Assignee: Mitsubishi Denki Kabushiki Kaisha, Tokyo, Japan

[21] Appl. No.: 08/857,468

[22] Filed: May 16, 1997

Related U.S. Application Data

[63] Continuation of application No. 08/421,221, Apr. 11, 1995, abandoned.

[30] Foreign Application Priority Data

| Apr. 12, 1994 | [JP] | Japan | 6-99368 |
| Apr. 14, 1994 | [JP] | Japan | 6-102234 |
| May 10, 1994 | [JP] | Japan | 6-121717 |
| May 10, 1994 | [JP] | Japan | 6-121973 |
| May 10, 1994 | [JP] | Japan | 6-121974 |
| May 23, 1994 | [JP] | Japan | 6-108569 |
| Aug. 25, 1994 | [JP] | Japan | 6-201084 |

[51] Int. Cl.[7] ................................ G11B 5/09
[52] U.S. Cl. ................. 360/48; 386/68; 386/73; 386/109
[58] Field of Search ............... 360/32, 48, 10.1; 386/68, 69, 73, 108, 109, 124, 6, 111

[56] References Cited

U.S. PATENT DOCUMENTS

| 4,914,527 | 4/1990 | Asai et al. |
| 5,097,363 | 3/1992 | Takei et al. |
| 5,418,658 | 5/1995 | Kwou ................................ 360/48 |
| 5,475,498 | 12/1995 | Radice ............................... 360/32 X |
| 5,477,397 | 12/1995 | Naimpally et al. ................. 360/24 X |
| 5,479,299 | 12/1995 | Matsumi et al. .................... 360/48 X |
| 5,537,215 | 7/1996 | Niimura ............................. 386/111 |
| 5,589,993 | 12/1996 | Naimpally ......................... 360/18 X |
| 5,729,648 | 3/1998 | Boyce et al. ....................... 386/68 |
| 5,729,649 | 3/1998 | Lane et al. ......................... 386/68 |
| 5,751,889 | 5/1998 | Van Gestel et al. ................ 386/68 |
| 5,751,893 | 5/1998 | Shimoda et al. ................... 386/111 |
| 5,778,143 | 7/1998 | Boyce ................................ 386/111 |

FOREIGN PATENT DOCUMENTS

| 0546691 | 6/1993 | European Pat. Off. |
| 0551672 | 7/1993 | European Pat. Off. |
| 0627855 | 12/1994 | European Pat. Off. |
| 3146964 | 6/1982 | Germany. |
| 686217 | 3/1994 | Japan. |
| 2265046 | 9/1993 | United Kingdom. |
| 2265047 | 9/1993 | United Kingdom. |
| WO 94/17631A1 | 8/1994 | WIPO. |
| WO 95/28061A2 | 10/1995 | WIPO. |

OTHER PUBLICATIONS

"A Recording Method of ATV data on a Consumer Digital VCR" International Workshop on HDTV '93, Oct. 26 to 28 in Ottawa, Canada.

John G. Proakis, Digital Communications; 2nd Edition, 1989, pp. 76–86, McGraw–Hill Book Company.

Primary Examiner—Alan Faber

[57] ABSTRACT

The digital VTR includes an extractor, variable-length decoder, quantizer and variable-length encoder. The extractor receives digital data divided into blocks, and which is quantized and variable-length coded on a block-by-block basis. Portions of the digital data are encoded according to a first type of encodation, and other portions of the digital data are encoded according to a second type of encodation. The extractor identifies and extracts the digital data encoded according to the first type of encodation. The variable-length decoder variable-length decodes the extracted portions of the digital data, while the quantizer quantizes the decoded data output by the variable length decoder. The variable length encoder variable-length encodes the quantized decoded data to form special-playback data. Alternatively, a convertor converts the extracted portions of the digital data into variable-length coded data having different quantization steps to form the special-playback data.

25 Claims, 114 Drawing Sheets

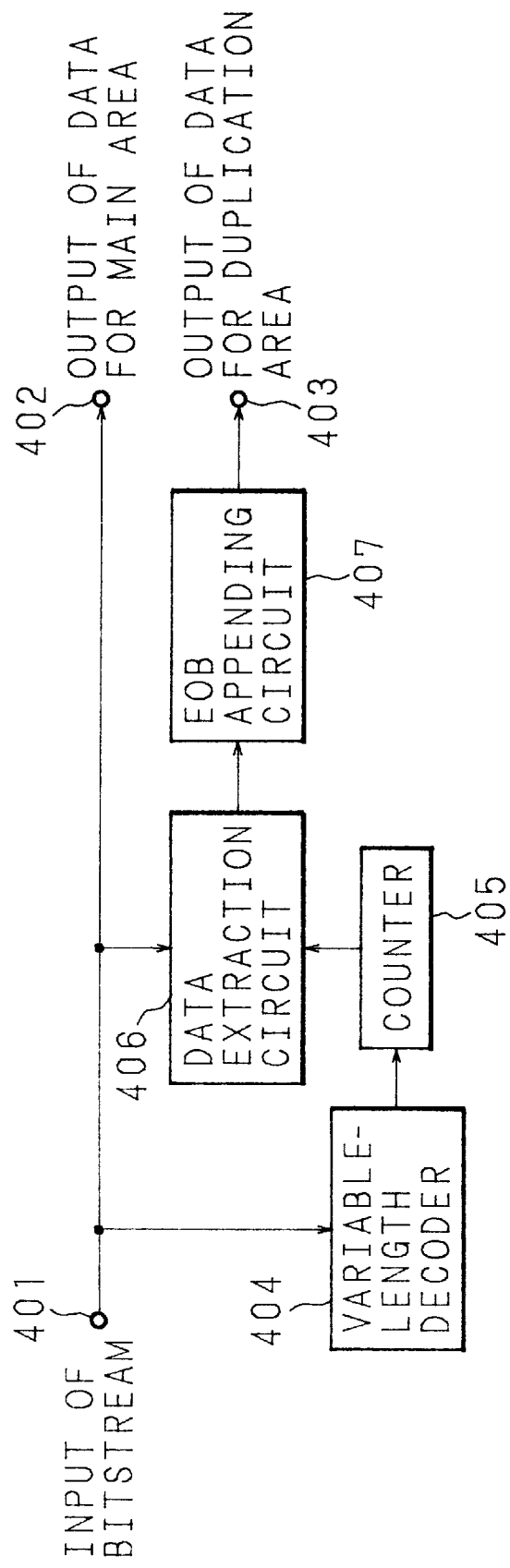

FIG. 4
PRIOR ART
(NORMAL PLAYBACK)
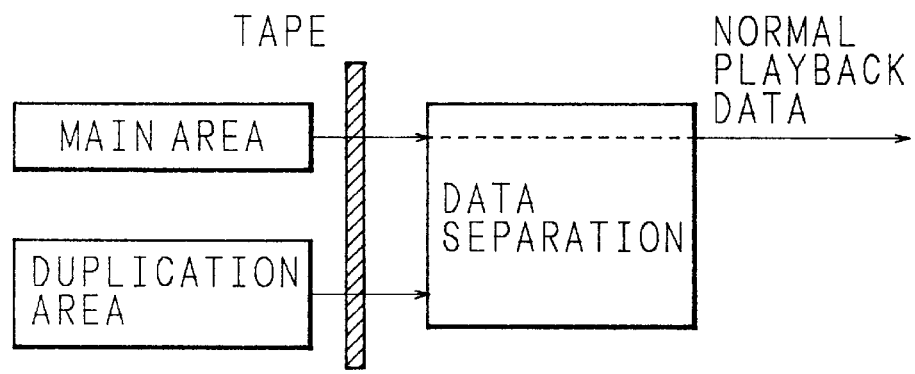
(HIGH-SPEED PLAYBACK)
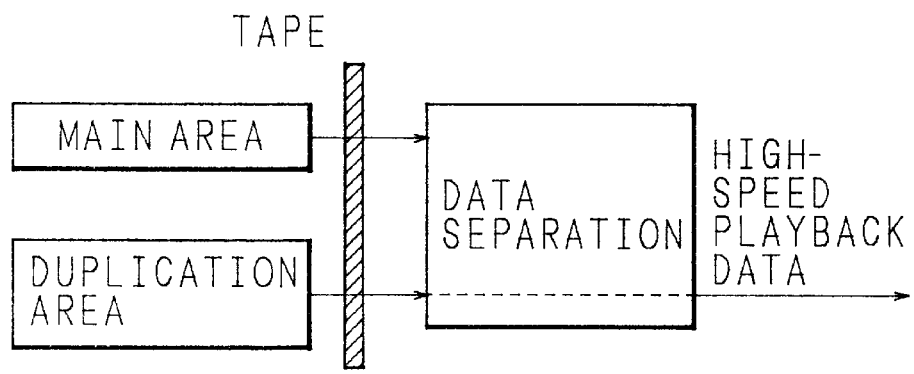

B A B A B A B A B A B A
  HEAD A      HEAD B

B A B A B A B A B A B A
  HEAD A      HEAD B

ZIGZAG SCANNING ORDER

FIG. 12
PRIOR ART

| PLOT NUMBER | NUMBER OF TRANSMITTED SEQUENCES |
|---|---|
| 0 | DC ONLY |
| 1 | DC+2 |
| 2 | DC+5 |
| 3 | DC+9 |
| 4 | DC+14 |
| 5 | DC+20 |
| 6 | DC+27 |
| 7 | DC+35 |
| 8 | EVERY SEQUENCE |

[NORMAL PLAYBACK]

[HIGH-SPEED PLAYBACK(WITHIN PREDETERMINED SPEED)]

[HIGH-SPEED PLAYBACK(BEYOND PREDETERMINED SPEED)]

[NORMAL PLAYBACK]

[HIGH-SPEED PLAYBACK(WITHIN PREDETERMINED SPEED)]

[HIGH-SPEED PLAYBACK(BEYOND PREDETERMINED SPEED)]

DATA CONSTITUTION OF
DUPLICATION AREA PER ONE TRACK

DATA CONSTITUTION OF
DUPLICATION AREA OF LOW-FREQUENCY
AREA AND HIGH-FREQUENCY AREA PER
ONE TRACK

FIG. 30

| DC | 1 | 4 | 5 |
|----|---|---|---|
|    | 2 | 3 | 0 |
|    | 0 | 0 |   |
|    | 0 |   |   |

(0,1)
(0,2)
(1,3)
(0,4)
(0,5)
EOB

FIG. 35

| (run, amp) | Length | Code (MSB)...(LSB) |
|---|---|---|
| (0, 1) | 2 + 1 | 00s |
| (0, 2) | 3 + 1 | 010s |
| EOB | 4 | 0110 |
| (1, 1) | 4 + 1 | 0111s |
| (0, 3) | | 1000s |
| (0, 4) | | 1001s |
| (2, 1) | 5 + 1 | 10100s |
| (1, 2) | | 10101s |
| (0, 5) | | 10110s |
| (0, 6) | | 10111s |
| (3, 1) | 6 + 1 | 110000s |
| (4, 1) | | 110001s |
| (0, 7) | | 110010s |
| (0, 8) | | 110011s |
| (5, 1) | 7 + 1 | 1101000s |
| (6, 1) | | 1101001s |
| (2, 2) | | 1101010s |
| (1, 3) | | 1101011s |
| (1, 4) | | 1101100s |
| (0, 9) | | 1101101s |
| (0, 10) | | 1101110s |
| (0, 11) | | 1101111s |
| (7, 1) | 8 + 1 | 11100000s |
| (8, 1) | | 11100001s |
| (9, 1) | | 11100010s |
| (10, 1) | | 11100011s |
| (3, 2) | | 11100100s |
| (4, 2) | | 11100101s |
| (2, 3) | | 11100110s |
| (1, 5) | | 11100111s |
| (1, 6) | | 11101000s |
| (1, 7) | | 11101001s |
| (0, 12) | | 11101010s |
| (0, 13) | | 11101011s |
| (0, 14) | | 11101100s |
| (0, 15) | | 11101101s |
| (0, 16) | | 11101110s |
| (0, 17) | | 11101111s | s : CODE BIT OF amp

| (run, amp) | Length | Code |
|---|---|---|
| (11, 1) | 9 + 1 | 111100000s |
| (12, 1) | | 111100001s |
| (13, 1) | | 111100010s |
| (14, 1) | | 111100011s |
| (5, 2) | | 111100100s |
| (6, 2) | | 111100101s |
| (3, 3) | | 111100110s |
| (4, 3) | | 111100111s |
| (2, 4) | | 111101000s |
| (2, 5) | | 111101001s |
| (1, 8) | | 111101010s |
| (0, 18) | | 111101011s |
| (0, 19) | | 111101100s |
| (0, 20) | | 111101101s |
| (0, 21) | | 111101110s |
| (0, 22) | | 111101111s |
| (5, 3) | 10 + 1 | 1111100000s |
| (3, 4) | | 1111100001s |
| (3, 5) | | 1111100010s |
| (2, 6) | | 1111100011s |
| (1, 9) | | 1111100100s |
| (1, 10) | | 1111100101s |
| (1, 11) | | 1111100110s |
| (0, 0) | 11 | 11111001110 |
| (1, 0) | | 11111001111 |
| (6, 3) | 11 + 1 | 111110100000s |
| (4, 4) | | 111110100001s |
| (3, 6) | | 111110100010s |
| (1, 12) | | 111110100011s |
| (1, 13) | | 111110100100s |
| (1, 14) | | 111110100101s |
| (2, 0) | 12 | 111110101100 |
| (3, 0) | | 111110101101 |
| (4, 0) | | 111110101110 |
| (5, 0) | | 111110101111 |
| (7, 2) | 12 + 1 | 1111101100000s |
| (8, 2) | | 1111101100001s |
| (9, 2) | | 1111101100010s |
| (10, 2) | | 1111101100011s |
| (7, 3) | | 1111101100100s |
| (8, 3) | | 1111101100101s |
| (4, 5) | | 1111101100110s |
| (3, 7) | | 1111101100111s |
| (2, 7) | | 1111101101000s |
| (2, 8) | | 1111101101001s |
| (2, 9) | | 1111101101010s |
| (2, 10) | | 1111101101011s |
| (2, 11) | | 1111101101100s |
| (1, 15) | | 1111101101101s |
| (1, 16) | | 1111101101110s |
| (1, 17) | | 1111101101111s |

FIG. 39

| D | X₀ | X₁ |
|---|----|----|
| ⋮ | ⋮ | ⋮ |
| −10 | −4 | −2 |
| −9 | −3 | −3 |
| −8 | −3 | −2 |
| −7 | −3 | −1 |
| −6 | −2 | −2 |
| −5 | −2 | −1 |
| −4 | −2 | 0 |
| −3 | −1 | −1 |
| −2 | −1 | 0 |
| −1 | 0 | −1 |
| 0 | 0 | 0 |
| 1 | 0 | 1 |
| 2 | 1 | 0 |
| 3 | 1 | 1 |
| 4 | 2 | 0 |
| 5 | 2 | 1 |
| 6 | 2 | 2 |
| 7 | 3 | 1 |
| 8 | 3 | 2 |
| 9 | 3 | 3 |
| 10 | 4 | 2 |
| ⋮ | ⋮ | ⋮ |

(FIRST ROM TABLE 73) (SECOND ROM TABLE 74)

FIG. 41A

| 91 | -17 | -6 | 1 | -2 | 0 | 3 | -2 |
|---|---|---|---|---|---|---|---|
| -28 | 8 | 3 | -2 | 1 | 1 | -4 | 2 |
| 14 | -3 | -1 | 1 | 0 | -3 | 3 | -1 |
| -14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | 0 |

FIG. 41B

| 31 | -6 | -2 | 0 | -1 | 0 | 1 | -1 |
|---|---|---|---|---|---|---|---|
| -10 | 3 | 1 | -1 | 0 | 0 | -2 | 1 |
| 5 | -1 | 0 | 0 | 0 | -1 | 1 | 0 |
| -5 | 2 | 0 | 0 | 0 | 0 | 0 | 1 |
| 3 | 0 | 0 | 0 | 1 | -1 | -1 | 0 |
| -2 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

FIG. 41C

| 29 | -5 | -2 | 1 | 0 | 0 | 1 | 0 |
|---|---|---|---|---|---|---|---|
| -8 | 2 | 1 | 0 | 1 | 1 | 0 | 0 |
| 4 | -1 | -1 | 1 | 0 | -1 | 1 | -1 |
| -4 | 0 | 1 | -1 | 0 | 1 | -1 | 0 |
| 3 | 1 | 0 | 1 | 0 | -1 | 0 | 0 |
| -2 | 0 | -1 | 1 | 0 | 1 | 0 | 0 |
| 0 | 0 | 1 | -1 | 1 | 0 | -1 | 0 |
| -1 | 0 | 0 | 0 | 0 | 0 | 0 | 0 |

FIG. 47

| D | X₀ | X₁ |
|---|----|----|
| ⋮ | ⋮ | ⋮ |
| −10 | −3 | −1 |
| −9 | −2 | −3 |
| −8 | −2 | −2 |
| −7 | −2 | −1 |
| −6 | −2 | 0 |
| −5 | −1 | −2 |
| −4 | −1 | −1 |
| −3 | −1 | 0 |
| −2 | 0 | −2 |
| −1 | 0 | −1 |
| 0 | 0 | 0 |
| 1 | 0 | 1 |
| 2 | 0 | 2 |
| 3 | 1 | 0 |
| 4 | 1 | 1 |
| 5 | 1 | 2 |
| 6 | 2 | 0 |
| 7 | 2 | 1 |
| 8 | 2 | 2 |
| 9 | 2 | 3 |
| 10 | 3 | 1 |
| ⋮ | ⋮ | ⋮ |

(FIRST ROM TABLE 73) (SECOND ROM TABLE 74)

5-TIMES SPEED

FIG. 77

| Z | X1 | Y1 | X | Y |
|---|---|---|---|---|
| -16 | -1 | 0 | -1 | -4 |
| -15 | -1 | 1 | -1 | 4 |
| -14 | -1 | 2 | -1 | -3 |
| -13 | -1 | 3 | -1 | 3 |
| -12 | -1 | 4 | -1 | -2 |
| -11 | -1 | 5 | -1 | 2 |
| -10 | -1 | 6 | -1 | -1 |
| -9 | -1 | 7 | -1 | 1 |
| -8 | 0 | -8 | 0 | -8 |
| -7 | 0 | -7 | 0 | -7 |
| -6 | 0 | -6 | 0 | -6 |
| -5 | 0 | -5 | 0 | -5 |
| -4 | 0 | -4 | 0 | -4 |
| -3 | 0 | -3 | 0 | -3 |
| -2 | 0 | -2 | 0 | -2 |
| -1 | 0 | -1 | 0 | -1 |
| 0 | 0 | 0 | — | 0 |
| 1 | 0 | 1 | 0 | 1 |
| 2 | 0 | 2 | 0 | 2 |
| 3 | 0 | 3 | 0 | 3 |
| 4 | 0 | 4 | 0 | 4 |
| 5 | 0 | 5 | 0 | 5 |
| 6 | 0 | 6 | 0 | 6 |
| 7 | 0 | 7 | 0 | 7 |
| 8 | 0 | 8 | 0 | 8 |
| 9 | 1 | -7 | 1 | 1 |
| 10 | 1 | -6 | 1 | -1 |
| 11 | 1 | -5 | 1 | 2 |
| 12 | 1 | -4 | 1 | -2 |
| 13 | 1 | -3 | 1 | 3 |
| 14 | 1 | -2 | 1 | -3 |
| 15 | 1 | -1 | 1 | 4 |
| 16 | 1 | 0 | 1 | -4 |
| 17 | 1 | 1 | 1 | 5 |
| 18 | 1 | 2 | 1 | -5 |
| 19 | 1 | 3 | 1 | 6 |
| 20 | 1 | 4 | 1 | -6 |

FIG. 80A

|     |     |   |   |   |   |   |   |
|-----|-----|---|---|---|---|---|---|
| DC  | -1  | 7 | 1 | 1 | . | . | . |
| 0   | 1   | 1 | 0 | . | . | . | . |
| -18 | 0   | 5 | . | . | . | . | . |
| 1   | 1   | . | . | . | . | . | . |
| 1   | .   | . | . | . | . | . | . |
| .   | .   | . | . | . | . | . | 1 |
| .   | .   | . | . | . | . | 0 | 2 | 1 |
| .   | .   | . | . | 1 | 1 | 0 | 0 |

FIG. 80B

```
1-RUN        COEFFICIENT
LENGTH DATA  DATA
 (  1  ,    0 )
 (  0  ,  -18 )
 (  1  ,    7 )
 (  2  ,    0 )
 (  3  ,    5 )
 (  0  ,    0 )
    ⋮         ⋮
 (  .  ,    0 )
 (  2  ,    2 )
 (  2  ,    0 )
 (  0  ,    0 )
 (  0  ,    1 ) ← EOB
```

FIG. 80C

```
1-RUN LENGTH    (1,0,1,2,3,0,⋯,·,2,2,0,0) → 0-RUN LENGTH
DATA SIDE                                    CODING

COEFFICIENT     (0,-18,7,0,5,0,⋯,0,2,0,0,1) → 0-RUN LENGTH
DATA SIDE                                     CODING
```

FIG. 80D

```
0-RUN        COEFFICIENT
LENGTH DATA  DATA
 (  0  ,  1 )
 (  1  ,  1 )
 (  0  ,  2 )
 (  0  ,  3 )
    ⋮        ⋮
 (  .  ,  2 )
 (  0  ,  2 )
 (  0  ,  0 ) ← EOB
```

FIG. 80E

```
0-RUN        COEFFICIENT
LENGTH DATA  DATA
 (  1  ,  -18 )
 (  0  ,    7 )
 (  1  ,    5 )
    ⋮         ⋮
 (  .  ,    2 )
 (  2  ,    1 )
```

○ INCLUDING
● NOT INCLUDING

FIG. 87 a=9

| Z | x' | y' | x | y |
|---|----|----|---|---|
| -11 | -1 | 7 | -2 | 1 |
| -10 | -1 | 8 | -2 | 0 |
| -9 | 0 | 0 | -1 | -4 |
| -8 | 0 | 1 | -1 | 4 |
| -7 | 0 | 2 | -1 | -3 |
| -6 | 0 | 3 | -1 | 3 |
| -5 | 0 | 4 | -1 | -2 |
| -4 | 0 | 5 | -1 | 2 |
| -3 | 0 | 6 | -1 | -1 |
| -2 | 0 | 7 | -1 | 1 |
| -1 | 0 | 8 | -1 | 0 |
| 0 | 0 | 0 | 0 | — |
| 1 | 0 | -8 | 1 | 0 |
| 2 | 0 | -7 | 1 | 1 |
| 3 | 0 | -6 | 1 | -1 |
| 4 | 0 | -5 | 1 | 2 |
| 5 | 0 | -4 | 1 | -2 |
| 6 | 0 | -3 | 1 | 3 |
| 7 | 0 | -2 | 1 | -3 |
| 8 | 0 | -1 | 1 | 4 |
| 9 | 0 | 0 | 1 | -4 |
| 10 | 1 | -8 | 2 | 0 |
| 11 | 1 | -7 | 2 | 1 |
| 12 | 1 | -6 | 2 | -1 |

4 TRACKS

FIG. 100

| z | x | y |
|---|---|---|
| ⋮ | ⋮ | ⋮ |
| −7 | −4 | −3 |
| −6 | −3 | −3 |
| −5 | −3 | −2 |
| −4 | −2 | −2 |
| −3 | −2 | −1 |
| −2 | −1 | −1 |
| −1 | −1 | 0 |
| 0 | 0 | 0 |
| 1 | 0 | 1 |
| 2 | 1 | 1 |
| 3 | 1 | 2 |
| 4 | 2 | 2 |
| 5 | 2 | 3 |
| 6 | 3 | 3 |
| 7 | 3 | 4 |
| 8 | 4 | 4 |
| 9 | 4 | 5 |
| 10 | 5 | 5 |
| 11 | 5 | 6 |
| ⋮ | ⋮ | ⋮ |

FIG. 101

| z | x | z x | y | z y |
|---|---|---|---|---|
| ⋮ | ⋮ | ⋮ | ⋮ | ⋮ |
| −7 | −4 | −8 | −3 | −6 |
| −6 | −3 | −6 | −3 | −6 |
| −5 | −3 | −6 | −2 | −4 |
| −4 | −2 | −4 | −2 | −4 |
| −3 | −2 | −4 | −1 | −2 |
| −2 | −1 | −2 | −1 | −2 |
| −1 | −1 | −2 | 0 | 0 |
| 0 | 0 | 0 | 0 | 0 |
| 1 | 0 | 0 | 1 | 2 |
| 2 | 1 | 2 | 1 | 2 |
| 3 | 1 | 2 | 2 | 4 |
| 4 | 2 | 4 | 2 | 4 |
| 5 | 2 | 4 | 3 | 6 |
| 6 | 3 | 6 | 3 | 6 |
| 7 | 3 | 6 | 4 | 8 |
| 8 | 4 | 8 | 4 | 8 |
| 9 | 4 | 8 | 5 | 10 |
| 10 | 5 | 10 | 5 | 10 |
| 11 | 5 | 10 | 6 | 12 |
| ⋮ | ⋮ | ⋮ | ⋮ | ⋮ |

4 TRACKS

DIGITAL VTR INCREASING RECORDED AMOUNT OF HIGH PRIORITY DATA

This application is a continuation of application Ser. No. 08/421,221 filed on Apr. 11, 1995, now abandoned.

BACKGROUND OF THE INVENTION

1. Field of the Invention

The present invention relates to a digital video tape recorder (hereinafter called a digital VTR) having a track format that records digital video and digital audio signals in respectively predetermined areas on a slant track, and more particularly to a digital VTR for recording digital video and digital audio signals inputted as a bitstream.

2. Description of Related Art

FIG. 1 shows a track format employed in a common home digital VTR. As shown, slant tracks are formed on a magnetic tape, and each track is divided into two areas, a video area for recording a digital video signal and an audio area for recording a digital audio signal.

There are two methods to record video and audio signals on such home digital VTRs. One is the so-called baseband recording method in which the video and audio signals are inputted in analog form, and recorded in digital form using video and audio high-efficiency encoders; the other is the so-called transparent recording method in which bitstreams transmitted in digital form are recorded.

For recording of the Advanced Television (ATV) signal currently under consideration in the United States, the latter method, i.e., the transparent recording method, is suitable. Major reasons are that the ATV signal is already digital-compressed and does not require high-efficiency encoders or decoders, and that there occurs no degradation in picture quality since the signal is recorded directly. On the other hand, the major drawback is inferior picture quality in special playback modes such as high-speed playback, still-motion playback, and slow motion playback. In particular, by simply recording bitstreams directly on slant, tracks, useful pictures cannot be reproduced in high-speed playback.

One digital VTR method for recording the ATV signal was proposed in a technical report "A Recording Method of ATV data on a Consumer Digital VCR" presented at "International Workshop on HI)TV '93" held from October 26 to 28 in Ottawa, Canada. This report will be used as the prior art in the following description.

According to the basic specification of a prototype home digital VTR, assuming the recording rate of the digital video signal is 25 Mbps and the field frequency is 60 Hz, one video frame is recorded in video areas on 10 tracks in standard definition (SD) mode. Here, if the data rate of the ATV signal is 17 to 18 Mbps, transparent recording of the ATV signal is possible in this SD mode.

FIGS. 2A and 2B are diagrams showing the head scan paths in normal playback and high-speed playback on a conventional digital VTR. As shown, slant tracks are recorded alternately across the tape by heads having different azimuth angles. In normal playback, the tape transport speed is the same as in recording, so that the heads precisely trace the recorded tracks as shown in FIG. 2A. In high-speed playback, on the other hand, since the tape speed is different, the heads move across several tracks, each head thus being able to play back only fragments of the same azimuth tracks. FIG. 2B shows an example in fast forward playback at the speed five times the normal speed.

In MPEG2 bitstreams (bitstreams of the ATV signal are substantially compatible with MPEG2 bitstreams), only intracoded blocks can be decoded independently without referencing other frames. If an MIPEG2 bitstream is recorded on tracks in successive order, images in high-speed playback will be reconstructed using only intra-codes since high-speed playback data is a burst. In this case, on the screen the reproduced areas will be non-continuous, and fragments of blocks will be dispersed across the screen. Furthermore, since the bitstream is variable-length encoded, there is no guarantee that the whole screen will be updated periodically, and there is a possibility that some portions may remain unupdated for long periods of time. As a result, the picture quality in high-speed playback will not be sufficient and unacceptable for a home digital VTR.

FIG. 3 is a block diagram showing the configuration of a bitstream recording apparatus in a home digital VTR of the prior art. Here, the video area on each track is divided into a main area, where the whole bitstream of the ATV signal is recorded, and a duplication area, where portions of the bitstream critical for image reconstruction in high-speed playback are recorded (such portions are hereinafter referred to as High Priority (HP) data). Since only intracoded blocks are valid in high-speed playback, intra-codeed blocks are recorded in the duplication area; to further reduce the data amount, low-frequency components are extracted from all the intra-coded blocks and recorded as HP data. In FIG. 3, reference numeral 401 is a bitstream input terminal, 402 is a bitstream output terminal, 403 is an HP data output terminal, 404 is a variable-length decoder, 405 is a counter, 406 is a data extraction circuit, and 407 is an EOB (end of block) appending circuit.

An MPEG2 bitstream is inputted via the input terminal 401 and outputted unprocessed via the output terminal 402 for recording successively in the main area. The bitstream inputted via the input terminal 401 is also fed to the variable-length decoder 404, which analyzes the syntax of the MPEG2 bitstream and detects an intra-image; in response, the counter 405 generates the timing at which the data extraction circuit. 406 extracts the low-frequency components of each block of the intra-image. Then, the EOB appending circuit 407 appends an EOB to construct. HP data which is recorded in the duplication area.

FIG. 4 is a diagram conceptually showing the playback operation of the prior art digital VTR. In normal playback, the whole bitstream recorded in the main area is reproduced and supplied to an MPEG2 decoder external to the digital VTR. The HP data is discarded. On the other hand, in high-speed playback, only the HP data recorded in the duplication area is selected and sent to the decoder, while the bit-stream from the main area is discarded.

Next, the arrangement of the main area and duplication area on each track will be described. FIG. 5 is a diagram showing an example of the head scan path in high-speed playback on the prior art digital VTR. If the tape speed is an integral multiple of the normal speed and phase-lock controlled, the head scanning is synchronized with the tracks with the same azimuth, reproducing data always from the same positions. In FIG. 5, if portions of the reproduced signal whose output levels are higher than –6 dB are played back, hatched regions will be played back by one head. FIG. 5 shows an example of high-speed playback 9 times the normal speed. At this 9-times playback speed, it is guaranteed that the signal will be read from the hatched regions. It can therefore be seen that the HP data should be recorded in these areas. However, at other fast playback speeds, there is no guarantee that the signal will be read; the regions need to t)e set so that the signal can be read at different tape speeds.

FIG. 6 shows the track regions that the head scans in high-speed playback on the prior art digital VTR. Some of the regions scanned at various tape speeds overlap. Duplication areas are selected from among these regions to guarantee HP data reading at different tape speeds. Shown in FIG. 6 are examples of fast playback 4, 9, and 17 times the normal speed. The scan areas shown are the same as those that will be selected for fast playback −2, −7, and −15 times the normal speed.

It is not possible for the head to trace exactly the same regions at different tape speeds, because the number of tracks that the head crosses is different at different tape speeds. Furthermore, it is required that the scan areas be traced from any of the same azimuth tracks. FIG. 7 shows examples of head scan paths at different tape speeds in the prior art digital VTR. In FIG. 7, regions 1, 2, and 3 are selected from among the overlapped regions between 5-times and 9-times speeds. By repeating the same HP data on nine tracks, the HP data can be read at both 5-times and 9-times speeds.

FIGS. 8A and 8B show examples of the head scan path in 5-times speed playback on the prior art digital VTR. As can be seen from the figure, by repeating the same HP data over the same number of tracks as the speed expressed as a multiple of the normal speed, the HP data can be read by the head synchronized with the same azimuth tracks. As a result, by duplicating the HP data over the same number of tracks as the maximum tape speed in high-speed playback expressed as a multiple of the normal speed, reading of the duplicate HP data can be guaranteed at different tape speeds in both forward and reverse directions.

FIG. 9 shows a track format employed in the prior art digital VTR; shown here is an example of a main and duplication area layout. In a home digital VTR, the video area on each track consists of 135 sync blocks; in the example shown, the main area consists of 97 sync blocks and the duplication area consists of 32 sync blocks. This duplication area is made Up of the overlapped areas between the 4-times, 9-times, and 17-times speeds shown in FIG. 6. In this case, the data rate of the main area is about 17.5 Mbps, arid that of the duplication area is about 340 Kbps since identical data is recorded 17 times.

FIG. 10 is a diagram for evaluating the quality of the high-speed playback image reconstructed from the HP data created by the above method. As previously noted, the HP data consists only of intra-coded blocks. In high-efficiency encoding schemes employed in MPEG2, etc., a combination of orthogonal transform, based on DCT, and two-dimensional variable-length coding is used as the intra-coding. The following description of the prior art is given, assuming that the DCT and variable-length coding are used as the intra-coding. FIG. 11 is a diagram showing the structure of a DCT block. As shown, the DCT block is obtained as a data block of 8×8 terms arranged in horizontal and vertical directions. In the DCT block, the data of sequence number 0 in the upper left corner of the block is called the DC coefficient, and the data of sequence numbers 1 to 63 are called the AC coefficients, of which those having smaller sequence numbers are called low-frequency coefficients and those having larger numbers are called high-frequency components. The coefficients in the DCT block are outputted, starting with the lowest frequency component, in increasing order of the sequence numbers shown in FIG. 11, by a scanning method called zigzag scanning. In FIG. 10, the transmitted data rate (hereinafter called the data acquisition rate) is plotted along the abscissa when the number of sequences transmitted in sequence starting with the DC coefficient is varied, the transmitted data amount being 100% when all the coefficients in the DCT block are transmitted. In FIG. 10, the S/N ratio is also shown plotted along the ordinate as a function of the number of transmitted sequences. FIG. 12 is a diagram for explaining the graph of FIG. 10, showing the number of transmitted sequences corresponding to each of the plotted points (the leftmost point in FIG. 10 is numbered 0).

From FIG. 10, it can be seen that as the number of high-frequency coefficients transmitted increases, the S/N ratio improves markedly for the amount of change in the data acquisition rate. The data shown was obtained by computer simulation performed only on the Y signal in the NTSC format, but it is expected that the same relationship between the data acquisition rate and the amount of improvement in S/N ratio substantially holds for the ATV signal.

The relationship between the data acquisition rate and the S/N ratio when the number of sequences is varied, shown in FIG. 10, will be described below using the example of the main and duplication area layout on each track shown in FIG. 9. As shown in FIG. 9, according to the basic specification of a prototype home digital VTR, the video area on each track consists of 135 sync blocks, and the data rate of the main area is 17.5 Mbps and that of the duplication area is about 340 Kbps. Suppose here that one intra-picture is transmitted per second. Then, the data rate of intra-coded data is estimated at about 1.5 Mbps, so that the data acquisition rate of the duplication area is about 23% of that of the main area (340 K/1.5M=0.23).

With this in mind, referring is made to FIG. 10, from which it can be seen that the DC coefficient and two AC coefficients can be transmitted before the data acquisition rate reaches about 23%. Therefore, the S/N ratio of the reproduced image in high-speed playback can be estimated at about 23.9 dB.

FIG. 13 is a diagram for explaining the prior art method of recording the HP data, showing a specific example of how the HP data is recorded in the duplication area on each track when the maximum tape speed in high-speed playback is 17 times the normal speed, as in the example shown in FIG. 9. In the figure, A and B indicate the tracks recorded by heads having different azimuth angles. The numbers 1, 2, 3, shown in the figure indicate the positions of the HP data on the screen. By taking the HP data positions 1, 2, and 3 on the screen as an example, reproduction of the HP data will be described below.

FIG. 14 is a diagram showing the head scan path in high-speed playback 5-times the normal speed. Shaded portions shown in the figure are the regions in the same azimuth playback areas from which high-speed playback data is obtained in high-speed playback 5-times the normal speed. As shown, head A scans the HP data regions in the same azimuth playback areas in the order of 1, 2, 3, 1, 2, 3, and so on. On the other hand, head B scans the HP data in the same azimuth playback areas in the order of 1, 2, 3, and so on. As a result, all HP data at 1, 2, and 3 are reproduced.

FIG. 15 is a diagram showing the head scan path in high-speed playback 9-times the normal speed. Shaded portions shown in the figure are the regions in the same azimuth playback areas from which high-speed playback data is obtained in high-speed playback 9-times the normal speed. As shown, head A scans the HP data regions in the same azimuth playback areas in the order of 1, 2, 3, and so on. On the other hand, head B scans the HP data in the same azimuth playback areas in the order of 1, 2, and so on. As a result, all HP data at 1, 2, and 3 are reproduced.

FIG. 16 is a diagram showing the head scan path in high-speed playback 17-times the normal speed. Shaded portions shown in the figure are the regions in the same azimuth playback areas from which high-speed playback data is obtained in high-speed playback 17-times the normal speed. As shown, head A scans the HP data regions in the same azimuth playback areas in the order of 1, 2, 3, and so on. As a result, all HP data at 1, 2, and 3 are reproduced.

According to the above data construction method that makes high-speed playback possible at three different speeds, 5 times, 9 times, and 17 times the normal speed, the HP data regions 1, 2, and 3 are respectively scanned once, as shown in FIG. 16, in 17-times speed playback, the maximum tape speed in the high-speed playback mode, thereby reproducing all data at 1, 2, and 3 from the same azimuth playback areas. On the other hand, in the 9-times speed playback shown in FIG. 15, the HP data regions 1, 2, and 3 are scanned once to reproduce all data at 1, 2, and 3 from the same azimuth playback areas, and in addition to that, the HP data regions 1 and 2 in the same azimuth playback areas from which the playback signal is obtained, are scanned once again. Similarly, in the 5-times speed playback shown in FIG. 14, the HP data regions 1, 2, and 3 are scanned once to reproduce all data at 1, 2, and 3 from the same azimuth playback areas, and in addition to that, the HP data regions, 1, 2, and 3, in the same azimuth playback areas from which the playback signal is obtained, are scanned two more times.

Some users may want to have rough picture content at a higher playback speed than the predetermined fast playback speed at some sacrifice of picture quality. In the above prior art, a constant picture quality can be provided in playback within the predetermined speed, but it is difficult to provide playback at a higher speed than the predetermined speed. In an MPEG2 bitstream, blocks are arranged in successive order, and the address indicating the block position on the screen is determined in relative manner among the blocks. Therefore, if some blocks are dropped, the remaining blocks cannot, be displayed at their correct positions on the screen. To achieve playback at a higher speed than the predetermined fast playback speed at some sacrifice of picture quality, the number of playback blocks must be increased in exchange for picture quality so that the picture content can be identified. At the same time, for playback within the predetermined fast playback speed, a certain degree of picture quality (exactly equal to or indistinguishable from that achieved in the above-described example) must be provided.

According to the configuration of the above prior art digital VTR, the HP data is recorded by extracting lower-frequency coefficients from the intra-coded blocks; however, as shown in FIG. 10, an adequate S/N ratio cannot be obtained with the low-frequency coefficients alone, but higher-frequency coefficients are needed to obtain a high-speed playback image of high quality.

The configuration of the above prior art home digital VTR has had the further problem that since data for special playback modes is duplicated many times in the duplication areas, the recording rate of the data for special playback modes is extremely low, resulting in insufficient playback picture quality especially in slow-motion or high-speed playback. For example, if the number of intraframes is two per second, the amount of the intra-coded data alone in the ATV signal will be about 3 Mbps; in the prior art, however, data can be recorded only at about 340 Kbps, resulting in significant degradation in playback picture quality.

Furthermore, in the prior art, each track is divided into the main area for normal speed playback and the duplication area for high-speed playback, and the HP data is duplicated on the same number of tracks as the predetermined maximum tape speed in high-speed playback expressed as a multiple of its normal speed, to ensure that the duplicated HP data is played back at least once during playback at several different tape speeds within the maximum playback speed (either in the forward or reverse direction). However, since the same HP data is duplicated the same number of times as the maximum tape speed in high-speed playback expresses as a multiple of its normal speed, in high-speed playback at a slower speed than the maximum tape speed the reproduction efficiency of the HP data actually obtained as the playback signal is low compared with the data amount of the playback signal that could be obtained from the same azimuth playback areas, as shown in the examples of FIGS. 14 and 15. This has presented the problem that the reproduced picture quality degrades because of the decrease in the reproduction efficiency.

In the configuration of the above prior art home digital VTR configuration, since the output level margin for each sync block in the duplication area gradually decreases with increasing playback speed, if 17-times speed playback is performed with the duplication area arrangement shown in FIG. 9, for example, a situation can occur, depending on the head or tape conditions, where the output level of the sync blocks such as the sync block Nos. 16 and 26 is not sufficient, leading to the inability to read data correctly. The problem here is that the block data recorded in the sync blocks that cannot be read out at all. There is the further problem that in order to check all the intra-data, all the bitstream headers of the ATV signal have to be analyzed for every macroblock.

SUMMARY OF THE INVENTION

One object of the invention is to provide a digital VTR capable of recording low-frequency HP data from as many video blocks as possible in a limited area.

Another object of the present invention is to provide a digital VTR that, in playback within a predetermined fast playback speed, reproduces low-frequency HP data by combining it with high-frequency HP data, and in playback at a higher speed than the predetermined fast playback speed, reproduces HP data only of low-frequency areas and discards data of other areas, thereby making it possible to obtain a high-speed playback picture of a larger area than that achieved in the prior art.

A further object of the invention is to provide a digital VTR that, in playback within a predetermined fast playback speed, reproduces low-frequency HP data by combining it with high-frequency HP data, and in playback at a higher speed than the predetermined fast playback speed, checks PHASE signals recorded in duplication areas and reproduces HP data of high-frequency areas whose PHASE signal coincides with that of low-frequency areas, in combination with the HP data of the low-frequency areas, while discarding data of other areas, thereby making it possible to obtain a high-speed playback picture of a larger area and higher quality than that achieved in the prior art.

Still another object of the invention is to provide a digital VTR capable of identifying intra-blocks in simple manner by analyzing the syntax of MPEG2 using intra-information of a picture header and thus eliminating the need to analyze the syntax down to small units such as macroblocks.

Yet another object of the invention is to provide a digital VTR capable of improving picture quality in high-speed playback without increasing the recorded amount of HP data, in an encoding system in which each track is divided into a main area for normal playback and a duplication area for high-speed playback and HP data for picture reconstruction in high-speed playback is constructed from variable-length coded bitstreams of the ATV signal.

A still further object of the invention is to provide a digital VTR capable of improving picture quality, especially in still-motion, slow-motion, and high-speed playback modes.

A yet further object of the invention is to provide a digital VTR which, when a read error occurs during high-speed playback, can prevent the error from affecting other data in the same block.

In a digital VTR of a first invention, intra-coded blocks are detected and extracted from the bitstream to be recorded, and low-frequency components are extracted from all of the intra-coded blocks to construct HP data for high-speed playback, which data are recorded in a format having a plurality of areas per track that consist of a main area for recording the bitstream only and a plurality of duplication areas for recording the HP data; the HP data are divided into low-frequency HP data and high-frequency HP data which are each appended a PHASE signal whose value varies for each duplication interval, and the plurality of duplication areas are allocated between a low-frequency area for recording the low-frequency HP data and a high-frequency area for recording the high-frequency HP data so that the respective signals are recorded in the respective areas. By dividing the HP data into the low-frequency HP data arid high-frequency HP data in this manner, the data amount per video block is reduced, allowing an increased number of video blocks to be recorded in a limited area. Since the recording area size is fixed, dividing the data for recording in the above manner increases the number of video blocks that can be recorded in the area within one track designated for recording of the low-frequency HP data.

According to the digital VTR of the first invention, intra-components are extracted from the input data, and HP data used for high-speed playback are constructed from video block data constituting the intra-components (each video block is the smallest unit to which the discrete cosine transform—DCT—is applied); the HP data are then divided into low-frequency HP data and high-frequency HP data, which are recorded in different areas (a low-frequency area and a high-frequency area) on a track. The same low-frequency HP data and the same high- frequency HP data are recorded successively on the same number of tracks as the number of tracks that the head path crosses in playback at the maximum speed within a predetermined fast playback speed. That is, though the main area data differs from one track to the next, the data recorded in the low-frequency and high-frequency areas are the same among the successive tracks the number of which is equal to the number of tracks that the head path crosses in playback at the maximum speed within the predetermined fast, playback speed. In addition, a PHASE signal, which differs from one duplication interval to the next, is recorded for each of the data recorded in the duplication areas. By dividing the HP data in his manner, a larger amount of video block data can be recorded in a limited area than by prior art.

In the digital VTR of the first invention, in normal playback, the bitstream recorded in the main area is transmitted as a playback signal to a decoder; in playback within the predetermined fast playback speed, PHASE signal matching is checked, and playback HP data is constructed from the low-frequency HP data in the low-frequency area and the high-frequency HP data in the high-frequency area having the same PHASE signal, and the thus constructed playback HP is transmitted to the decoder; and in playback at a speed higher than the predetermined fast playback speed, the low-frequency HP data in the low-frequency area is transmitted as playback HP data to the decoder regardless of PHASE signal matching. More specifically, in high-speed playback within the predetermined fast playback speed, PHASE signal matching is checked, and HP data is reconstructed as playback data from the data in the low-frequency area and high-frequency area having the same PHASE signal, whereas in playback at a speed higher than the predetermined fast playback speed, playback is performed using the data in the low-frequency area only. Accordingly, in high-speed playback within the predetermined fast playback speed, data equivalent to that reproduced in the previously given example can be reproduced with the picture quality comparable to that achieved in the previous example. In playback at a speed higher than the predetermined fast playback speed, on the other hand, only low-frequency data are reproduced, allowing the viewer to get the content of recorded pictures. Furthermore, a picture of a larger area than that achieved in the prior art can be reproduced.

In a preferred mode of the digital VTR of the first invention, in normal playback, the bitstream recorded in the main area is transmitted as a playback signal to the decoder; in playback within the predetermined fast playback speed, playback HP data is constructed from the low-frequency HP data in the low-frequency area and the high-frequency HP data in the high-frequency area having the same PHASE signal, and the thus constructed playback HP is transmitted to the decoder; and in playback at a speed higher than the predetermined fast playback speed, PHASE signal matching is checked, and if there is any high-frequency HP data in the high-frequency area whose PHASE signal matches the PHASE signal of the low-frequency HP data in the low-frequency area, playback HP data is reconstructed using the high-frequency HP data as well as the low-frequency HP data, and the thus reconstructed playback HP data is transmitted to the decoder. That is, in playback at a speed higher than the predetermined fast playback speed also, PHASE signal matching is checked, and only when the PHASE signals match, playback data is constructed by combining the data in the high-frequency area with the data in the low-frequency area having the same PHASE signal. Using the thus constructed playback data, a picture of a higher quality can be obtained than when only the low-frequency data is reproduced. Furthermore, a picture of a larger area and higher quality than that achieved in the prior art can be reproduced.

In the digital VTR of the first invention, each of the intra-coded blocks to be detected and extracted belongs to an intra-co(led frame or an intra-coded field. This simplifies the process of identifying intra-blocks to be recorded. That is, the identification process is simplified by making it possible to analyze the syntax of MPEG2 using a picture header appended to each frame and thus eliminating the need to analyze the syntax down to small units such as macro-blocks.

In a digital VTR of a second invention, when recording variable-length code d input digital data and special-playback digital data, a portion of the input digital data is variable-length decoded, and the decoded data is quantized; the quantized data is then variable-length encoded to construct the special-playback digital data. Since the data amount can be limited by limiting the amplitude of the input digital data, the HP data used for image reconstruction in high-speed playback is constructed using data up to higher-frequency coefficients, thereby achieving higher picture quality in high-speed playback.

In the digital VTR of the second invention, when applying variable-length coding to the digital data obtained by performing quantization on the variable-length decoded data, all digital data in each data unit to which the variable-length coding is to be applied are transmitted. Since the data amount can be limited by limiting the amplitude of the input, digital data, the HP data used for image reconstruction in high-speed playback is constructed using all the coefficients in each data unit to which the variable-length coding is to be applied, thereby achieving higher picture quality in high-speed playback.

In a preferred mode of the digital VTR of the second invention, when applying variable-length coding to the digital data obtained by performing quantization on the variable-length decoded data, a predetermined number of data terms are selected for transmission from the digital data in each data unit to which the variable-length coding is to be applied. Since the data amount cart be limited by limiting the amplitude of the input digital data, the HP data used for image reconstruction in high-speed playback is constructed using data up to higher-frequency coefficients in each data unit to which the variable-length coding is to be applied, thereby achieving higher picture quality in high-speed playback.

In a further preferred mode of the digital VTR of the second invention, when applying variable-length coding to the digital data obtained by performing quantization on the variable-length decoded data, the digital data are variable-length encoded until the amount of encoded data reaches a value predetermined for each data unit to which the variable-length coding is to be applied. Since the data amount can be limited by limiting the amplitude of the input digital data, the HP data used for image reconstruction in high-speed playback is constructed using data up to higher-frequency coefficients in each data unit to which the variable-length coding is to be applied, thereby achieving higher picture quality in high-speed playback.

In a digital VTR of a third invention, when recording variable-length coded input digital data and special-playback digital data, a portion of the input variable-length coded data is converted into variable-length coded data with different predetermined quantization steps. Since the data amount can be limited with simple circuitry, the HP data used for image reconstruction in high-speed playback is constructed using data Up to higher-frequency coefficients, thereby achieving higher picture quality in high-speed playback.

In the digital VTR of the third invention, when converting a portion of the input variable-length coded data into variable-length coded data with different predetermined quantization steps, the input digital data is converted from serial data to parallel data, and the converted parallel data is further converted by a conversion table to predetermined parallel data, which is then converted to serial data. Since the data amount can be limited with simple circuitry, the HP data used for image reconstruction in high-speed playback is constructed using data Up to higher-frequency coefficients, thereby achieving higher picture quality in high-speed playback.

In a digital VTR of a fourth invention, intraframe- or intrafield-coded or interframe- or interfield-coded digital video and digital audio signals are inputted in the form of a bitstream, and intraframe- or intrafield-coded data is separated from the bitstream; the separated intraframe- or intrafield-coded digital data is then divided into two or more data in accordance with a predetermined rule, and the divided data are alternately recorded a predetermined number of times in predetermined special-playback data recording areas on the tracks. When recording special-playback data in predetermined duplication areas, since the divided data are recorded alternately, the amount of data that can be recorded in the duplication areas can be increased, which contributes to improving playback picture quality, especially in still-motion playback, slow-motion playback, and slower high-speed playback (for example, two or three times the normal speed).

In the digital VTR of the fourth invention, when dividing input digital data D into n output codes $X0, X1, \ldots, Xn-1$ (where n is an integer not smaller than 2), the following data division rule is applied.

That is, the relationship between the n output codes, $X0, X1, Xn-1$, and the input digital data D is defined by $D = K0 \times X0 + K1 \times X1 + \ldots + Kn-1 \times Xn-1$ ($K0, K1, \ldots, Kn-1$ are real numbers), and the output codes $X0, X1, \ldots, Xn-1$ are converted from the input digital data D so that the input digital data D can be obtained uniquely from $X0, X1, \ldots, Xn-1$.

This achieves efficient data division, and improves playback picture quality, especially in still-motion playback, slow-motion playback, and slower high-speed playback (for example, two or three times the normal speed).

Furthermore, in the digital VTR of the fourth invention, when dividing the input digital data into two output codes $X0$ and $X1$, the relationship between the input (digital data D and the two output codes $X0$ and $X1$ is given by $D = 2 \times X0 + X1$ or $D = 3 \times X0 + X1$. Therefore, the input data can be divided efficiently into two data, so that playback picture quality is improved in still-motion playback, slow-motion playback, and slower high-speed playback (for example, two or three times the normal speed).

In the digital VTR of the fourth invention, data are recorded on a magnetic tape by azimuth recording using rotary heads having different azimuth angles, and the two data $X0$ and $X1$ are respectively recorded in the special-playback areas by the rotary heads having different azimuth angles. Therefore, the data $X0$ and $X1$ can be identified by the azimuth angles of the respective rotary heads without having to append special division information. Since there is no need to append identification information for divided data or to add an extra circuit for detecting such identification information, the circuit complexity can be reduced.

In a preferred mode of the digital VTR of the fourth invention, in special playback, such as high-speed playback, still-motion playback, or slow-motion playback, video data is synthesized using all the data reproduced out of the n divided data. Since the reproduced data can thus be used efficiently, if a portion of the divided data is not reproduced in special playback, the original data can be almost completely reconstructed by efficiently using different divided data, thus achieving the synthesis of a good special-playback picture.

In another preferred mode of the digital VTR of the fourth invention, the two data $X0$ arid $X1$ are recorded in the special-playback data recording areas provided at different positions on the same recording track. Since the two data $X0$ and $X1$ can be easily identified by the respective sync block numbers carried in the ID information reproduced during playback, there is no need to append identification information for divided data or to add an extra circuit for detecting such identification information. This serves to reduce the circuit complexity.

In a further preferred mode of the digital VTR of the fourth invention, data divided into N portions (N is an integer) are recorded in the special-playback data recording areas provided at N positions so that one portion is recorded in each of the special-playback data recording areas. This achieves the most efficient data division, and a good special-playback picture can be obtained.

In a still further preferred mode of the digital VTR of the fourth invention, data most significant for constructing image data is separated from the separated intrafield- or intraframe-coded digital data, and different data separation methods are used between the most significant data and the other data (significant data). Since the data separation can be applied that matches the characteristics of the respective data, the limited recording capacity can be used efficiently, achieving the synthesis of a good special-playback picture.

Further, in the digital VTR of the fourth invention, the most significant data is recorded in the special-playback data recording areas that are provided at the same height on the recording tracks. Therefore, a good special-playback picture can be obtained even in compatible playback in which track linearity is different.

In the digital VTR of the fourth invention, rotary head tracking is controlled so that, in special playback, the output of most significant data recorded area detecting means for detecting the areas on the tracks where the most significant data is recorded, becomes the greatest. Therefore, a good special-playback picture can be obtained since the most significant data can be reproduced without fail, even in compatible back in which track linearity is different.

In the digital VTR of the fourth invention, the two significant data, X0 and X1, are placed in the special-playback data recording areas provided at different positions on the same recording track. This eliminates the need to append code information for identifying X0 code arid X1 code or to add an extra circuit for detecting appended code information. This serves to reduce the circuit complexity.

In a digital VTR of a fifth invention, when recording variable-length coded input digital data and special-playback digital data, a portion of the input digital data is variable-length decoded, and the decoded data is separated into two main codes, Y1 and Y2, and a subcode Z by performing a predetermined arithmetic operation; the thus separated data, Y1, Y2, and Z, are each variable-length encoded, and two data pairs, one consisting of the main code Y1 and subcode Z and the other consisting of the main code Y2 and subcode Z, are synthesized, forming special-playback digital data, the data synthesis being performed so that the two data pairs are separately recorded by heads having different azimuth angles. Accordingly, the original digital data can be reconstructed almost completely from only one or the other of the main codes. When all data can be recovered, a high-speed playback picture of higher quality can be obtained than when the same data is recorded in two difference positions, since higher-coefficients in each intra-coded block can also be used to construct HP data.

In the digital VTR of the fifth invention, when recording variable-length coded input.digital data and special-playback digital data, a portion of the input digital data is variable-length decoded, and the decoded data is separated into two main codes and a subcode by performing a predetermined arithmetic operation, as described above. More specifically, the variable-length decoded digital data X is separated into the main codes, Y1 and Y2, and the subcode Z in accordance with a rule defined by $X=2^{n-1} \times (Y1+Y2)+Z$, where Y1, Y2, and Z are respectively calculated by $Y1 = INT(X/2^n)$ $Y2 = INT(X/2^{n-1}) - INT(X/2^n)$ $Z = X \bmod 2^{n-1}$ where INT(A/B) is the quotient when A is divided by B, and A mod B is the remainder when A is divided by B.

The thus separated data, Y1, Y2, and Z, are each variable-length encoded, and two data pairs, one consisting of the main code Y1 and subcode Z and the other consisting of the main code Y2 and subcode Z, are synthesized, forming special-playback digital data, the data synthesis being performed so that the two data pairs are separately recorded by heads having different azimuth angles. Accordingly, the original digital data can be reconstructed almost completely from only one or the other of the main codes. When all data can be recovered, a high-speed playback picture of higher quality can be obtained than when the same data is recorded in two difference positions, since higher-coefficients in each intra-coded block can also be used to construct HP data.

Furthermore, in the digital VTR of the fifth invention, when recording variable-length coded input digital data and special-playback digital data, a portion of the input digital data is variable-length decoded, and the decoded data is separated into two main codes and a subcode by performing a predetermined arithmetic operation, as described above. More specifically, the variable-length decoded digital data X is separated into the main codes, Y1 and Y2 (the value is the same), and the subcode Z in accordance with a rule defined by $X=2^n \times Y1$ (or Y2)+Z, where Y1 (or Y2) and Z are respectively calculated by $Y1$ (or $Y2$) $= INT(X/2^n)$ $Z = X \bmod 2^n$ where INT(A/B) is the quotient when A is divided by B, and A mod B is the remainder when A is divided by B.

The thus separated data, Y1, Y2, and Z, are each variable-length encoded, and two data pairs, one consisting of the main code Y1 and subcode Z and the other consisting of the main code Y2 and subcode Z, are synthesized, forming special-playback digital data, the data synthesis being performed so that the two data pairs are separately recorded by heads having different azimuth angles. Accordingly, the original digital data can be reconstructed almost completely from only one or the other of the main codes. When all data can be recovered, a high-speed playback picture of higher quality can be obtained than when the same data is recorded in two difference positions, since higher-coefficients in each intra-coded block can also be used to construct HP data.

In a digital VTR of a sixth invention, when recording variable-length coded input digital data and special-playback digital data, a portion of the input digital data is variable-length decoded, and each decoded DCT block data is separated into the DC coefficient and AC coefficients, while the AC coefficients are further separated into two data x and y by performing a predetermined arithmetic operation; the thus separated data, x and y, are each variable-length encoded, and two data pairs, one consisting of the DC data and the AC data x and the other consisting of the DC data and the AC data y, are synthesized, forming special-playback digital data, the data synthesis being performed so that the two data pairs are separately recorded by heads having different azimuth angles. Accordingly, the original digital data can be reconstructed almost completely from only one or the other of the main codes. When all data can be recovered, a high-speed playback picture of higher quality can be obtained than when the same data is recorded in two difference positions, since higher-coefficients in each intra-coded block can also be used to construct HP data.

In a preferred mode of the digital VTR of the sixth invention, when recording variable-length coded input digital data and special-playback digital data, a portion of the input digital data is variable-length decoded, and each decoded DCT block data is separated into the DC coefficient and AC coefficients, while the AC coefficients are further separated into a main code X arid two subcode YR and YV by performing a predetermined arithmetic operation; the thus separated data, X, YR, and YV, are each variable-length encoded, and two data pairs, one consisting of the main code X and subcode YR and the other consisting of the main code X and subcode YV, are synthesized, forming special-playback digital data, the data synthesis being performed so that the two data pairs are separately recorded by heads having different azimuth angles. Accordingly, in situations where only one of the two data pairs is reproduced, the original digital data can be reconstructed almost, completely by using one or the other of the main codes. When both of the two data pairs are reproduced and all data can therefore be recovered, a high-speed playback picture of higher quality can be obtained than when the same data is recorded in two difference positions, since higher-coefficients in each intra-coded block can also be used to construct HP data.

In the digital VTR of the sixth invention, when recording variable-length coded input digital data and special-playback digital data, a portion of the input digital data is variable-length decoded, and each decoded DCT block data is separated into the DC coefficient and AC coefficients, as described above. In one preferred mode of the sixth invention, the AC coefficient data z is further separated into data X and data Y in accordance with the following rule:

when z=0

X is not transmitted $Y=0$ when z>0

$X=[z/a+0.49*]$ $Y=z-a \times X$ when z<0

$X=[z/a-0.49*]$ $Y=z-a \times X$ (where a represents a predetermined integer not smaller than 2, symbol [t] indicates the integer part of a real number t, and 0.49* is a recurring decimal with 9 in the second decimal place recurring infinitely), and then the separated data Y is scanned one-dimensionally to encode runs of 1s by run-length coding, thereby separating the data Y into one-runlength data and coefficient data, the one-runlength data being output as YR and the coefficient data as YV; the thus separated data, X, YR, and YV, are each variable-length encoded, and two data pairs, one consisting of the main code X and subcode YR and the other consisting of the main code X and subcode YV, are synthesized, forming special-playback digital data, the data synthesis being performed so that the two data pairs are separately recorded by heads having different azimuth angles. Accordingly, when both of the two data pairs are reproduced and all data can therefore be recovered, a high-speed playback picture of higher quality can be obtained than when the same data is recorded in two difference positions, since higher-coefficients in each intra-coded block can also be used to construct HP data. On the other hand, when the coefficient z=0, if data is transmitted as X=0, the original digital data can be reconstructed almost completely by using the reproduced main code, even in situations where only one of the two data pairs is reproduced.

In the digital VTR of the sixth invention, when recording variable-length coded input digital data and special-playback digital data, a portion of the input digital data is variable-length decoded, and each decoded DCT block data is sep rated into the DC coefficient and AC coefficients, as described above. In another preferred mode of the sixth invention, the AC coefficient data z is further separated into data X and data Y in accordance with the following rule:

when z=0

$X=0$

Y is not transmitted when z>0

$X=[(z-1)/a]+1$ $Y=z-a \times X$ when z<0

$X=[(z+1)/a]-1$ $Y=z-a \times X$ (where a represents a predetermined integer not smaller than 2, and symbol [t] indicates the integer part of a real number t), and then the separated data Y is scanned one-dimensionally to encode runs of is by run-length coding, thereby separating the data Y into one-runlength data and coefficient data, the one-runlength data being calculated as YR and the coefficient data as YV; the thus separated data, X, YR, and YV, are each variable-length encoded, and two data pairs, one consisting of the main code X and subcode YR and the other consisting of the main code X and subcode YV, are synthesized, forming special-playback digital data, the data synthesis being performed so that the two data pairs are separately recorded by heads having different azimuth angles. Accordingly, when both of the two data pairs are reproduced and all data can therefore be recovered, a high-speed playback picture of higher quality can be obtained than when the same data is recorded in two difference positions, since higher-coefficients in each intra-coded block can also be used to construct HP data. On the other hand, even in situations where only one of the two data pairs is reproduced, the original digital data can be reconstructed almost completely by using the reproduced main code.

In the digital VTR of the fifth or sixth invention, data synthesis is performed so that the two data pairs are recorded separately by using heads having different azimuth angles. Accordingly, in playback, the separated data can be identified using unique azimuth information obtained from the playback signal, and special circuitry for identification need not be provided.

In a digital VTR of a seventh invention, when separating intraframe- or intrafield-coded data from an input bitstream of intraframe- or intrafield-coded or interframe- or interfield-coded digital video and digital audio signals, an d forming special-playback digital data from the separated intraframe- or intrafield coded data, for recording in duplicate in a plurality of predetermined areas on tracks, the input intraframe- or intrafield-coded data is variable-length decoded first, and then, the decoded data is separated into two data x and y by performing a predetermined arithmetic operation; the thus separated two data x and y are respectively quantized into data Qx and Qy which are variable-length encoded into data xL and yL, respectively. Then, data construction is performed so that the variable-length coded data, xL and yL, are recorded as special-playback digital data without duplicate in respectively predetermined separate areas of the plurality of areas where the special-playback digital data are to be recorded. Accordingly, in slower high-speed playback, both of the separated data, x and y, are reproduced, providing high playback picture quality; in faster high-speed playback, the original digital data can be reconstructed almost completely from only one or the other of the separated data, x or y, providing a playback picture of satisfactory quality as a high-speed playback picture.

In the digital VTR of the seventh invention, when separating intraframe- or intrafield-coded data from an input bitstream of intraframe- or intrafield-coded or interframe- or interfield-coded digital video and digital audio signals, and forming special-playback digital data from the separated intraframe- or intrafield coded data, for recording in duplicate in a plurality of predetermined areas on tracks, the input intraframe- or intrafield-coded data is variable-length decoded first, and then, the decoded data is separated into two data by performing a predetermined arithmetic operation. More specifically, the variable-length decoded digital data z is separated into data x and data y in accordance with a rule defined by z=x+y, where the data x and y are calculated in accordance with the following rule:

when $z \geq 0$ $x=(INT)(z/2)$ $y=z-x$ when $z<0$ $x=(INT)((z-1)/2)$ $y=z-x$ where (INT)(A/B) is the quotient when A is divided by B. The thus separated two data x and y are respectively quantized into data Qx and Qy which are variable-length encoded into data xL and yL, respectively. Then, data construction is performed so that the variable-length coded data, xL and yL, are recorded as special-playback digital data in respectively predetermined separate areas of the plurality of areas where the special-playback digital data are to be recorded. Accordingly, in slower high-speed playback, both of the separated data, x and y, are reproduced, providing high playback picture quality; in faster high-speed playback also, the original digital data can be reconstructed almost completely from only one or the other of the separated data, x or y, providing a playback picture of satisfactory quality as a high-speed playback picture.

In a preferred mode of the digital VTR of the seventh invention, the separated two data, x and y, are constructed as digital data for special playback that can be used for both 2-times and 4-times speed playback modes; the two data, x and y, are quantized with the quantization level being set so t at, when the quantized data are variable-length encoded, the amounts of the variable-length coded data, xL and yL, will become approximately equal to each other; and in 2-times speed playback, a playback picture is constructed using both of the data xL and yL, while in 4-times speed playback, a playback picture is constructed using only one or the other of the data, xL or yL. Accordingly, in slower high-speed playback, both of the separated data, x and y, are reproduced, providing high playback picture quality; in faster high-speed playback also, the original digital data can be reconstructed almost completely from only one or the other of the separated data, x or y, providing a playback picture of satisfactory quality as a high-speed playback picture.

In a digital VTR of an eighth invention, an intra-coded block is detected from an input bitstream, and low-frequency components are extracted from the detected intra-coded block to construct high-speed playback data, which is mixed with the input bitstream, for recording in a recording format that provides within each track a plurality of areas including a main area used exclusively for recording the bitstream and a duplication area used for recording the high-speed playback data; the thus constructed high-speed playback data is separated, on a block-by-block basis, into a first part consisting of the first p bits and a second part consisting of the remaining bits, and the separated data are rearranged into a group of first-part data and a group of second-part data. By separating and rearranging the high-speed playback data in this manner, data in one block can be arranged in different, portions of the duplication area with different priorities. With this recording format, when a read error occurs during high-speed playback, the error can be prevented from affecting other data in the same block.

In a preferred mode of the digital VTR of the eighth invention, when rearranging the separated data, parts containing low-frequency components from each block are grouped together and recorded in sync blocks in the center of the duplication area, while parts containing high-frequency components are grouped together and recorded in sync blocks at the ends of the duplication area. Accordingly, data in one block can be arranged in different portions of the duplication area with different priorities. With this recording format, when a read error occurs during high-speed playback, the error can be prevented from affecting other data in the same block.

In the digital VTR of the eighth invention, the intra-coded data from which the low-frequency components are to be extracted belongs to an intra-coded frame or an intra-coded field. Accordingly, the intra-coded data, based on which the high-speed playback data, HP data, to be recorded in the duplication area is constructed, can be easily detected from the input bitstream.

In another preferred mode of the digital VTR of the eighth invention, in playback, the bitstream recorded in the main area and the high-speed playback data recorded in the duplication area are separated from data read from a recording medium; in normal playback, the bitstream is outputted as a playback signal to a decoder, and in high-speed playback, a playback bitstream is constructed from the high-speed playback data and is outputted as a playback signal to the decoder. Accordingly, when a read error occurs during high-speed playback, the error can be prevented from affecting other data in the same block, thus ensuring good picture quality in high-speed playback.

The above and further objects and features of the invention will more fully be apparent from the following detailed description with accompanying drawings.

BRIEF DESCRIPTION OF THE DRAWINGS

FIG. 3 is a block diagram showing the configuration of a bitstream recording apparatus in the prior art digital VTR;

FIG. 4 is a diagram conceptually showing the playback operation of the prior art digital VTR;

FIG. 12 is a diagram for explaining the graph of FIG. 10;

FIG. 30 is a block diagram for explaining the operation of the second re-encoding circuit in the fifth embodiment;

FIG. 35 is a diagram showing an example of a VLC code table used in the fourth re-encoding circuit in the seventh embodiment;

FIG. 39 is a diagram showing the contents of a first ROM table and a second ROM table in FIG. 38;

FIGS. 41A, 41B, and 41C are diagrams for explaining the operation of a data division method;

FIG. 47 is a diagram showing the table contents of a first ROM table and a second ROM table in a second data-division circuit according to a ninth embodiment of the present invention;

FIG. 77 is a table diagram illustrating a specific example of data separation and conversion performed in the fourth data-separation circuit in FIG. 73;

FIGS. 80A, 80B, 80C, 80D and 80E are diagrams for explaining the data separation operation performed in the fifth data-separation circuit in FIG. 73;

FIG. 87 is a table diagram illustrating a specific example of data separation and conversion performed in the ninth data-separation circuit;

FIG. 100 is a data map diagram for explaining data separation according to the 19th embodiment;

FIG. 101 is a diagram for explaining data reconstruction according to the 19th embodiment;

DESCRIPTION OF THE PREFERRED EMBODIMENTS

The present invention will now be described in detail below with reference to the drawings illustrating the preferred embodiments thereof.

Embodiment 1

Figure 17:
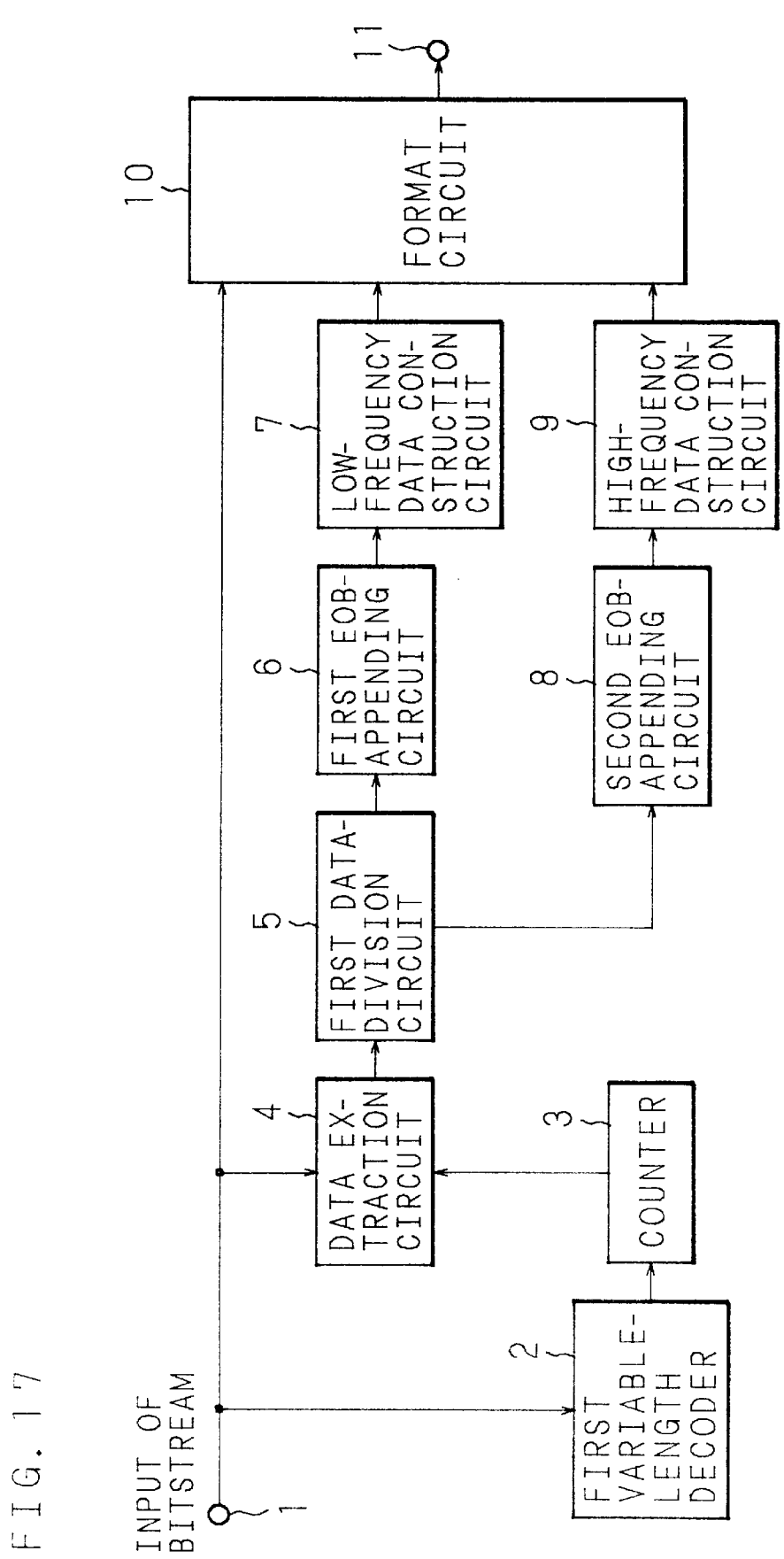
FIG. 17 is a diagram showing the configuration of first, second, and third embodiments of the present invention.

FIG. 17 is a diagram showing the configuration of one embodiment of the invention. In the figure, reference numeral 1 is a bitstream input terminal; 2 is a first variable-length decoder; 3 is a counter; 4 is a data extraction circuit; 5 is a first data-division circuit for dividing the data extracted by the data extraction circuit 4 into low-frequency HP data and high-frequency HP data; 6 is a first EOB-appending circuit for appending an EOB code to the low-frequency HP data; 7 is a low-frequency data construction circuit for gathering and combining the low-frequency HP data; 8 is a second EOB-appending circuit for appending an EOB code to the high-frequency HP data; 9 is a high-frequency data construction circuit for gathering and combining the light-frequency HP data; 10 is a format circuit for constructing one-track data by combining main area data, low-frequency area data and high-frequency area data, and for appending respective PHASE signals to the low-frequency area data and high-frequency area data; and 11 is a record signal output terminal for outputting a record signal.

Next, the operation of this embodiment will be described. An MPEG2 bitstream inputted via the input terminal 1 is directly fed to the format circuit 10. The bitstream from the input terminal 1 is also fed to the variable-length decoder 2 where its syntax is analyzed and an intra-picture is detected; in response, the counter 3 generates the timing at which the data extraction circuit 4 extracts data for a duplication area. The duplication area data thus extracted is divided by the first data-division circuit 5 into low-frequency HP data for recording in a low-frequency area and high-frequency HP data for recording in a high-frequency area. At this time, the data is divided at a boundary between VLC codes so that the ratio between the respective HP data amounts is approximately 1:2 (=low-frequency HP data amount versus high-frequency HP data amount). The low-frequency data thus obtained is fed into the first EOB-appending circuit 6 which appends an EOB code to it. Then, the low-frequency data construction circuit 7 gathers low-frequency HP data extracted from a plurality of video blocks, and constructs data for recording in a low-frequency duplication area. The data thus constructed is inputted to the format circuit 10. On the other hand, the high-frequency HP data obtained by division is fed into the second EOB-appending circuit 8 which appends an EBOB code to it. Then, the high-frequency data construction circuit 9 gathers high-frequency HP data extracted from a plurality of video blocks, and construct data for recording in a high-frequency duplication area. The thus constructed data is inputted to the format circuit 10. The format circuit 10 appends PHASE signals to the low-frequency area data and high-frequency area data, and formats these data into a signal to be recorded on one track. This signal is then outputted via the record signal output terminal 11.

Figure 1:
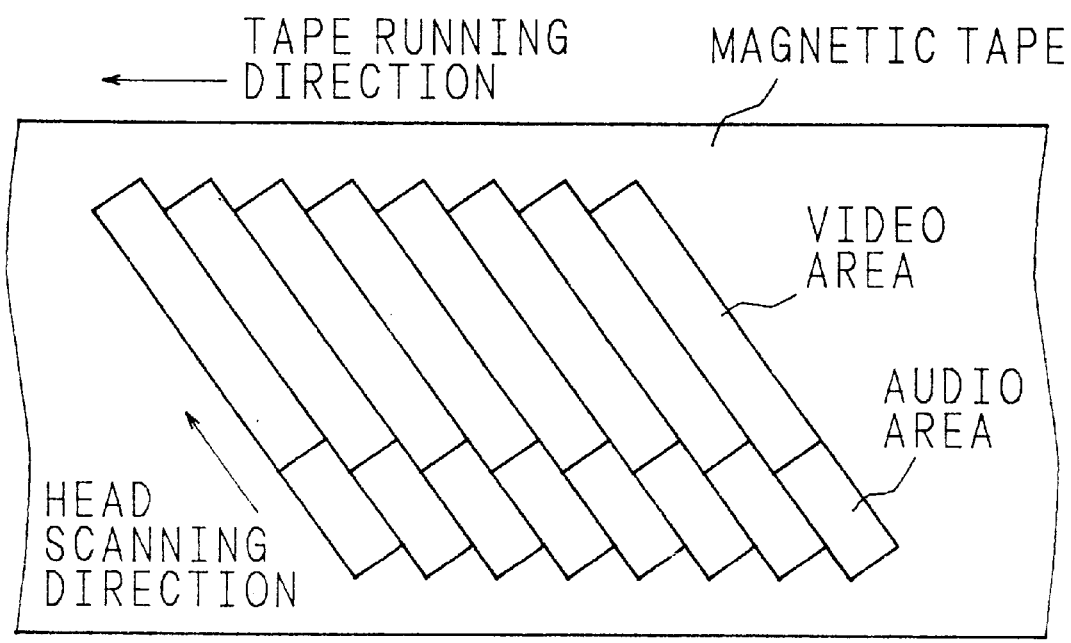
FIG. 1 is a diagram showing a track format commonly employed in a conventional home digital VTR.
Figure 2A:
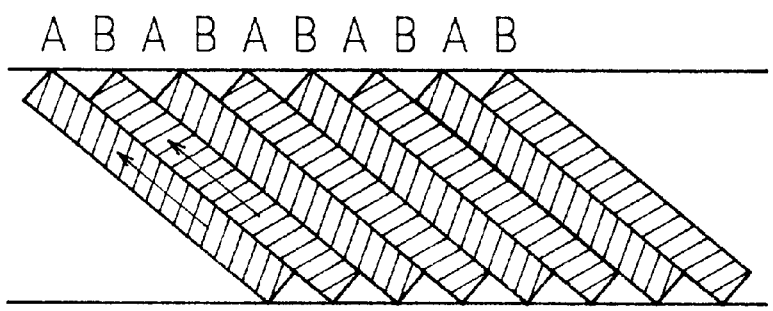
FIGS. 2A and 2B are diagrams showing head scan paths in normal playback and high-speed playback on a prior art digital VTR.
Figure 2B:
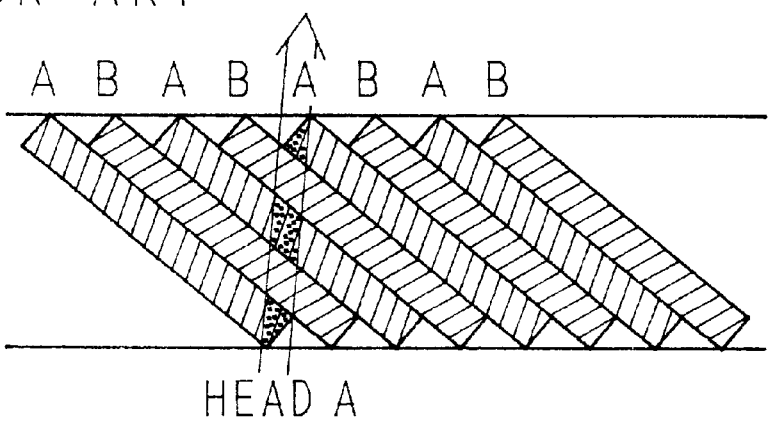
Figure 5:
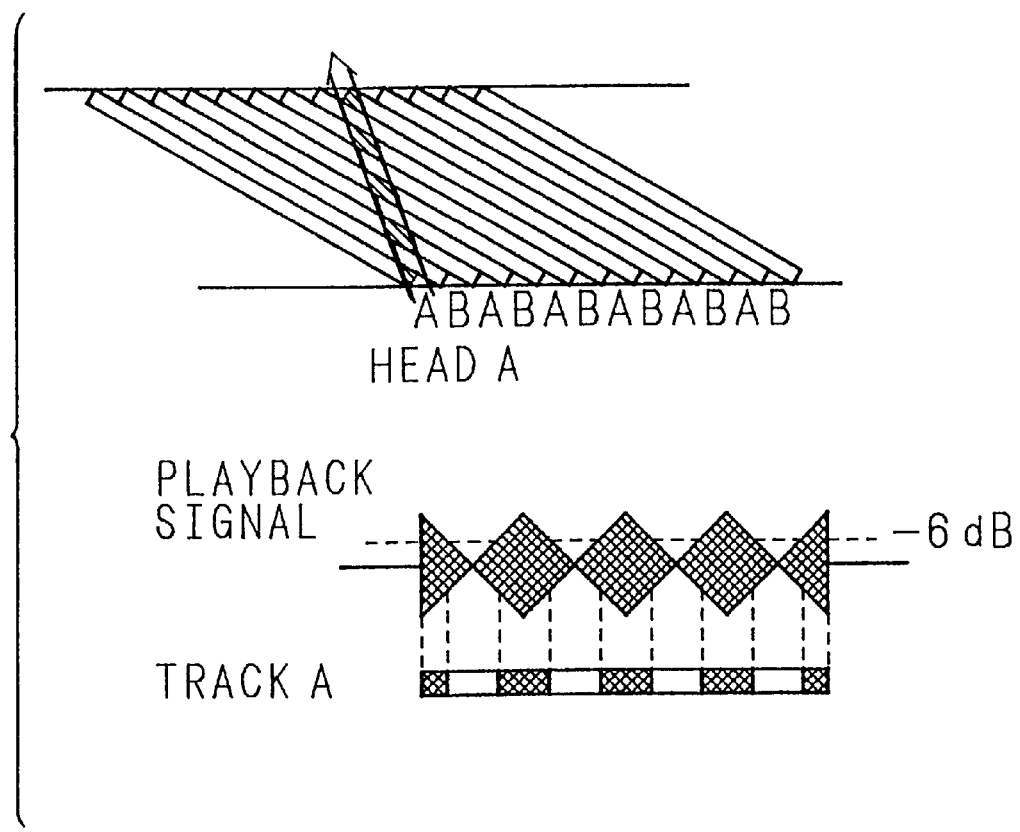
FIG. 5 is a diagram showing an example of the head scan path in high-speed playback on the prior art digital VTR.
Figure 6:
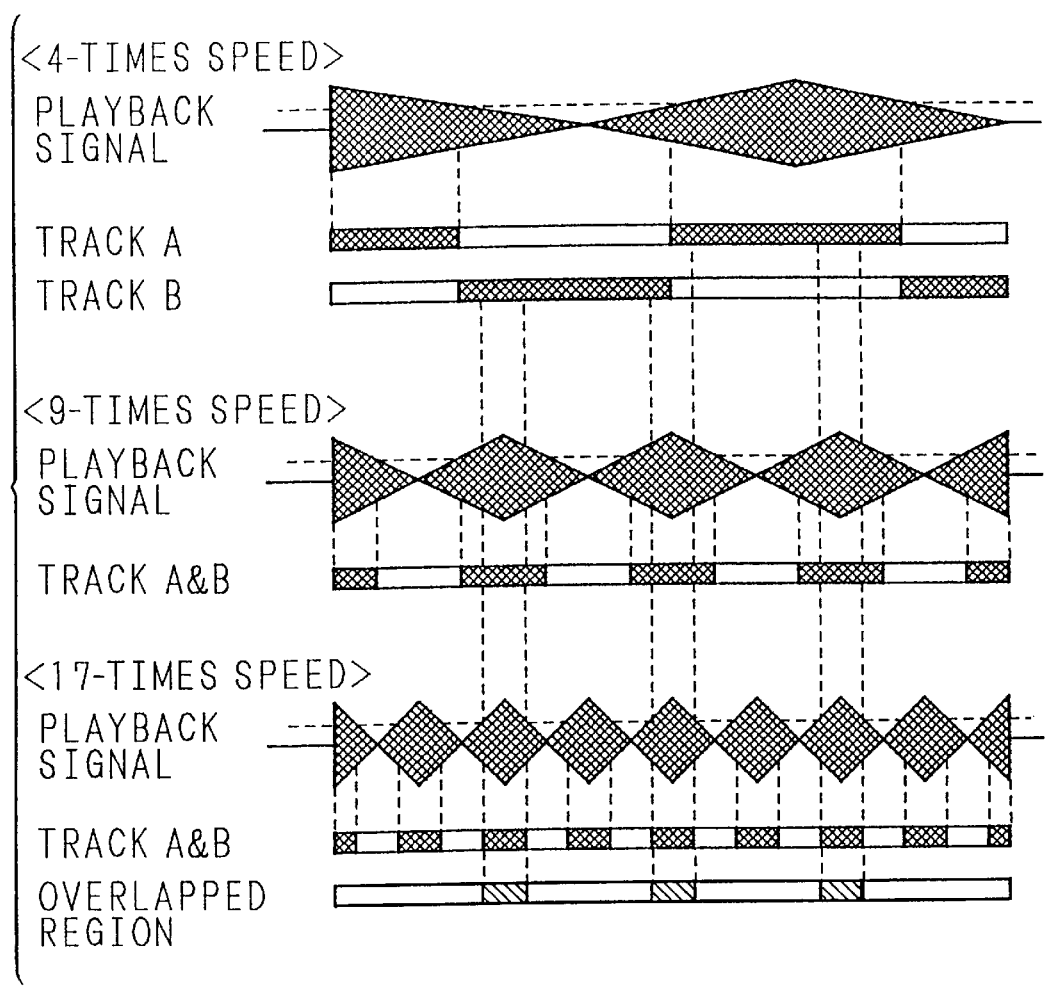
FIG. 6 is a diagram showing the track regions scanned by heads in high-speed playback on the prior art digital VTR.
Figure 7:
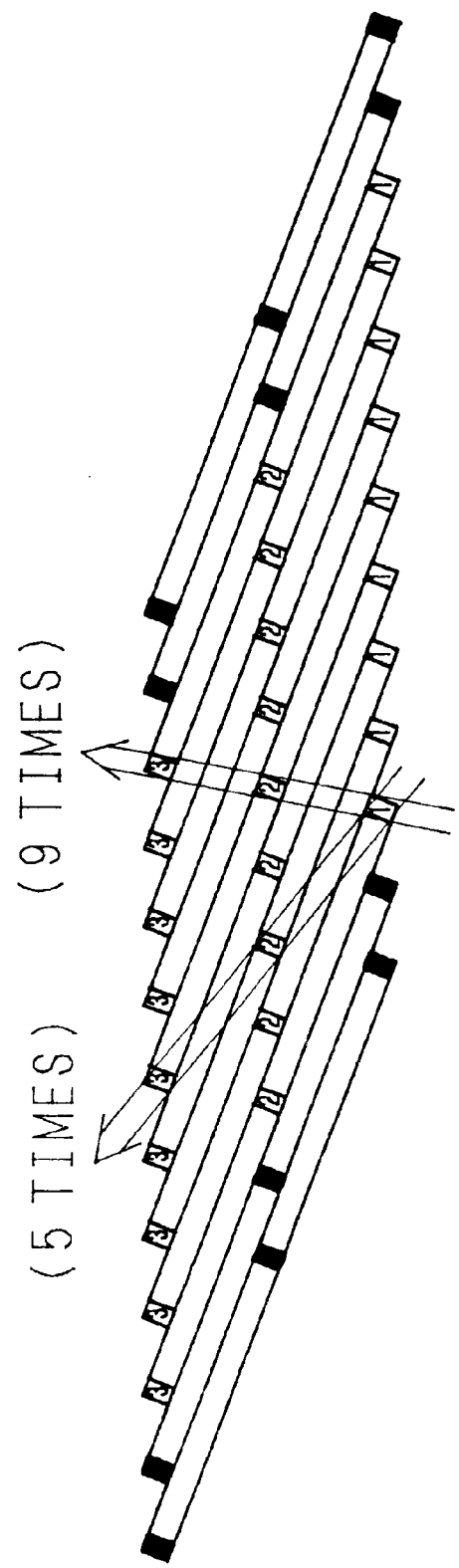
FIG. 7 is a diagram showing examples of head scan paths at different tape speeds in the prior art, digital VTR.
Figure 8A:
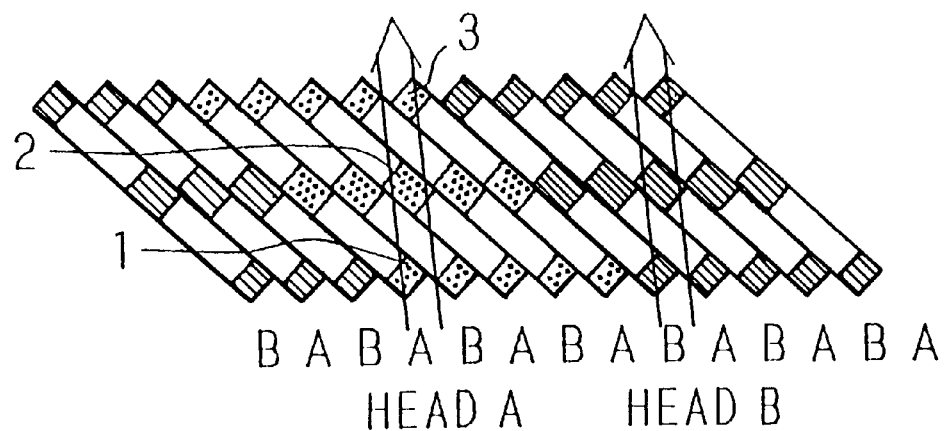
FIGS. 8A and 8B are diagrams showing examples of the head scan path in 5-times speed playback on the prior art digital VTR.
Figure 8B:
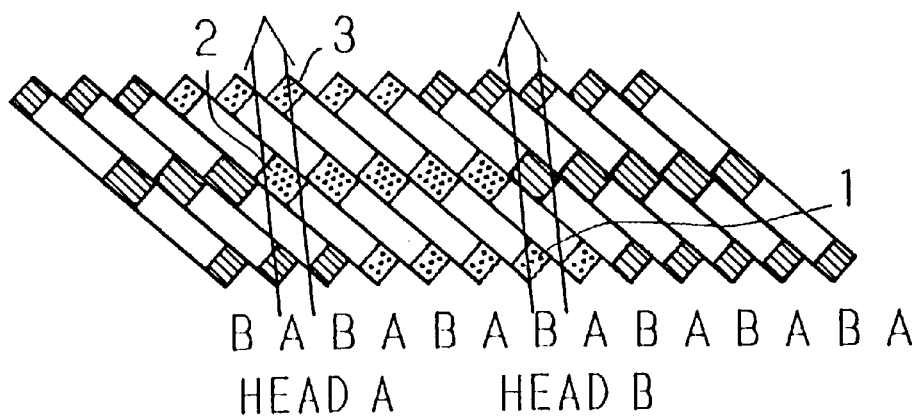
Figure 18:
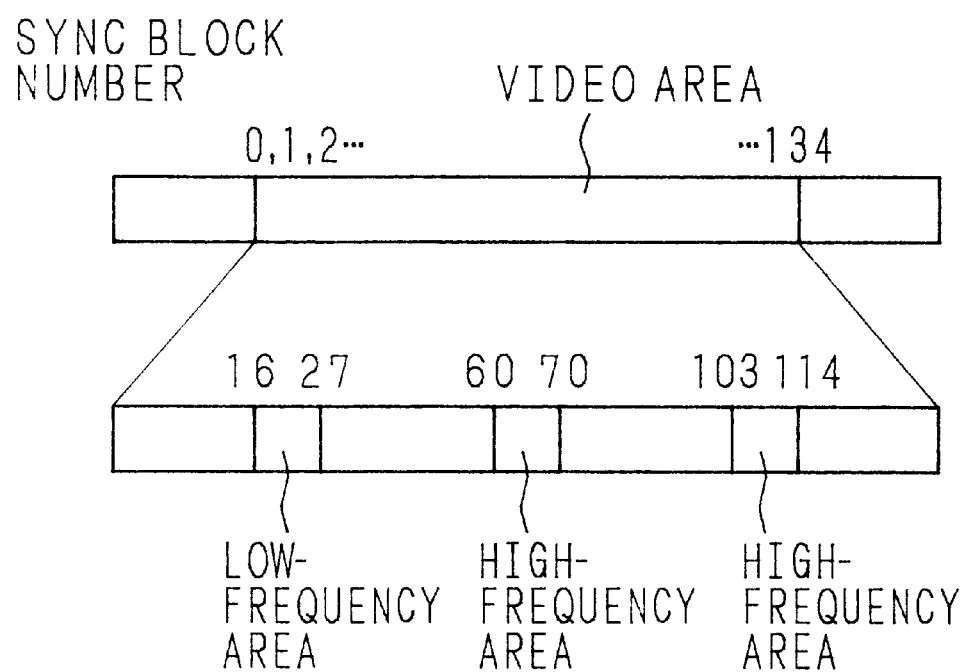
FIG. 18 is a diagram showing the arrangement of areas within a recording track according to the first, second, and third embodiments.

FIG. 18 is a diagram showing the arrangement of areas within a recording track according to the present embodiment. The arrangement is fundamentally the same as the one shown in FIG. 5, except that the duplication areas arranged at three positions in FIG. 5 are replaced by a low-frequency area and two high-frequency areas in FIG. 18. FIG. 18 shows the format in which the phase is synchronized at the end of tape; in a different format where the phase is synchronized at the center of tape, the center area may be formed as the low-frequency area and the other two areas as the high-frequency areas. In the track format shown, if the maximum playback speed within the predetermined limit is 15 times the normal speed, the same HP data is recorded on successive 15 tracks.

Figure 19A:
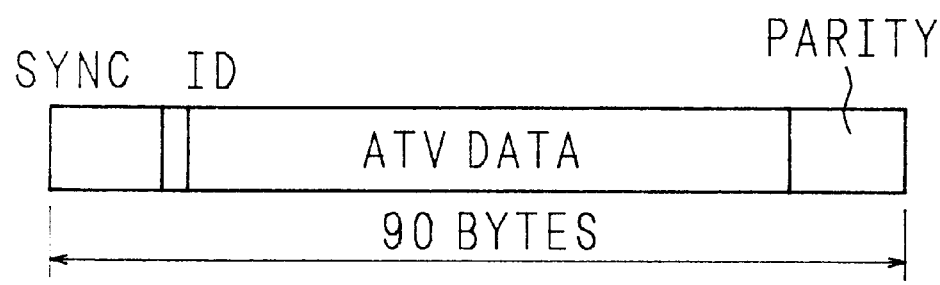
FIGS. 19A and 19B are diagrams showing the structure of sync blocks forming the recording track according to the first, second, and third embodiments.
Figure 19B:
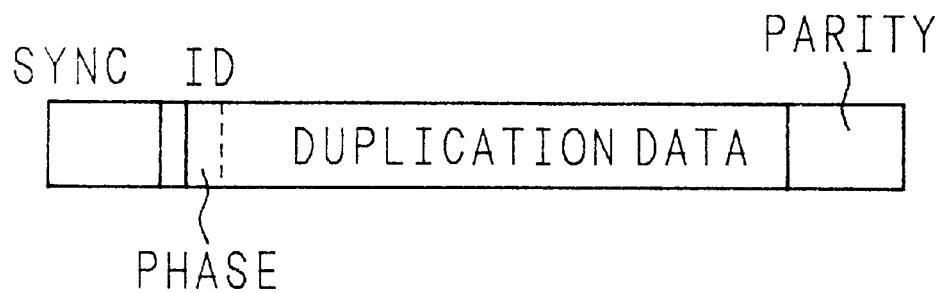

Next, a structural example of a sync block forming such a track is shown in each of FIGS. 19A arid 19B. FIG. 19A shows a sync block recorded in a main area as normal playback data; as shown, an ATV bitstream is recorded in an area other than that occupied by SYNC, ID, and parity. FIG. 19B shows a sync block recorded in a duplication area where HP data is recorded. In this block, a PHASE signal is recorded next to SYNC and ID. This PHASE signal is a closed signal within the earlier-mentioned 15 tracks, and is different between adjacent tracks. Further, the PHASE signal has the size determined by the predetermined fast playback speed and the maximum fast playback speed (greater than the predetermined fast playback speed) that the apparatus of this embodiment can support.

That is, if the predetermined fast playback speed is 15 times and the maximum speed supported is 27 times the normal speed, since the predetermined fast playback speed is 15 times the normal speed, the same lip data is recorded in the duplication areas on 15 tracks in a single duplication process (this is referred to as one duplication interval), as previously described. In this situation, when playback is performed at 27 times the normal speed, the head path crosses 27 tracks, a maximum of three duplication intervals. As a result, the low-frequency and high-frequency HP data recorded in three duplication intervals are reproduced together, and correct data cannot be reproduced. The PHASE signal is therefore provided to distinguish one area from another among the three areas. In this example, a two-bit signal should serve the purpose. For playback at a higher speed, the PHASE signal is required to have the size corresponding to the desired speed, and of course, the system should be configured to recognize it.

Figure 20:
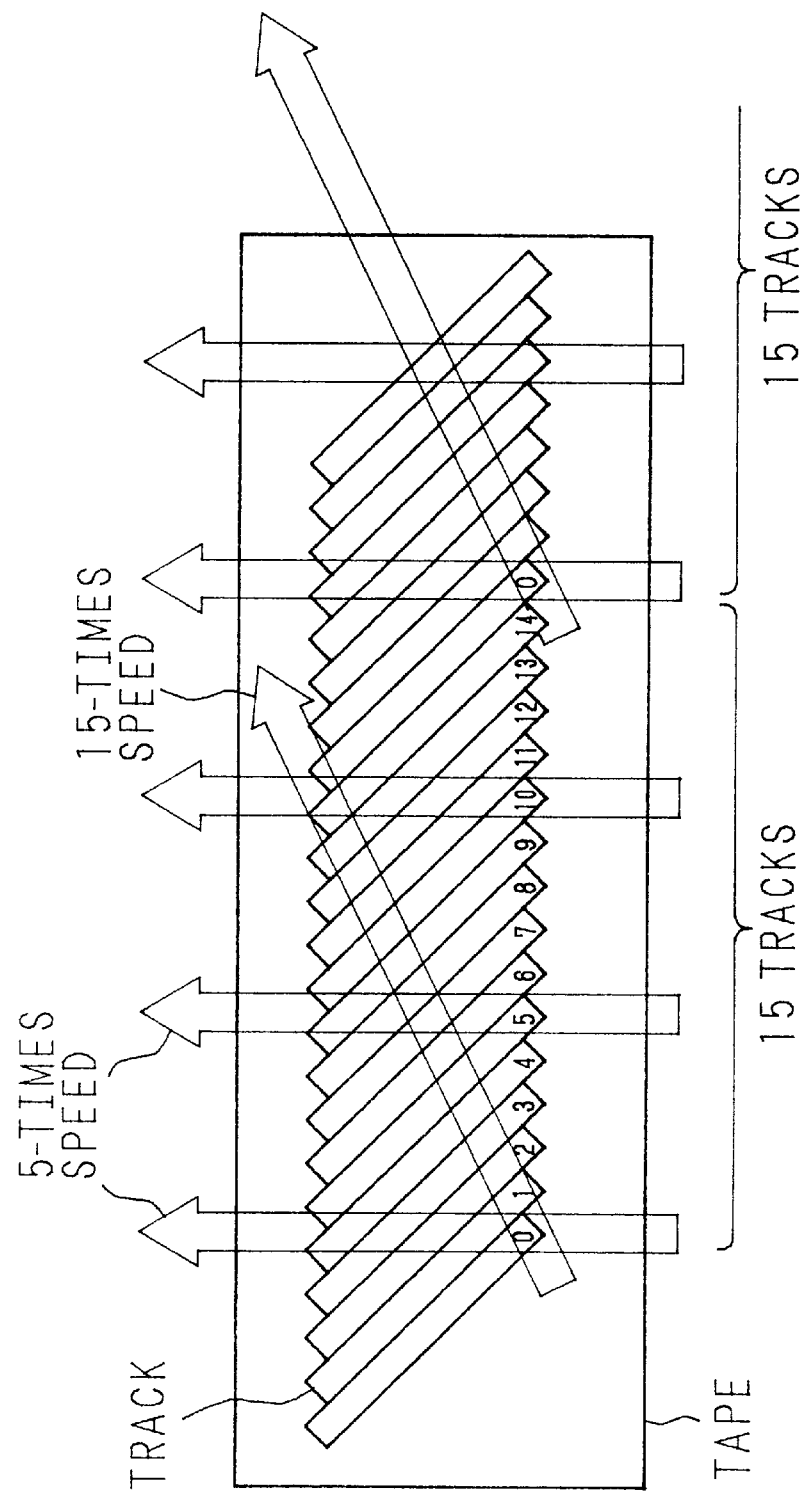
FIG. 20 is a diagram showing head scan paths in high-speed playback performed at speeds within a predetermined fast playback speed according to the first, second, and third embodiments.

Next, let us consider how the thus recorded tape will be played back. FIG. 20 is a diagram showing head scan paths during high-speed playback within the predetermined fast playback speed. The tracks with the same HP data recorded thereon are numbered from 0 to 14. FIG. 20 shows examples of playback 5 and 15 times the normal speed, the maximum fast playback speed within the predetermined fast playback speed being 15 times the normal speed. In the case of high-speed playback at a speed within the predetermined fast playback speed, the playback within the predetermined speed is performed as in the prior art example. In this case, when the PHASE signal coincides between the low-frequency area and the corresponding-frequency areas, the corresponding HP) data is reconstructed for playback. If the PHASE signal does not coincide between the low-frequency area and the high-frequency areas, the data obtained by the previous head scan should invariably contain the high-frequency areas whose PHASE signal coincides with the PHASE signal of the low-frequency area; therefore, data is reconstructed using the high-frequency HP data recovered from such high-frequency areas.

Since the areas on each track are recorded at such positions as can be scanned whether in 5-times or in 15-times speed mode, as described in the prior art, if the PHASE signals match, it is guaranteed that the low-frequency HP data and the high-frequency HP data will be played back.

Figure 21:
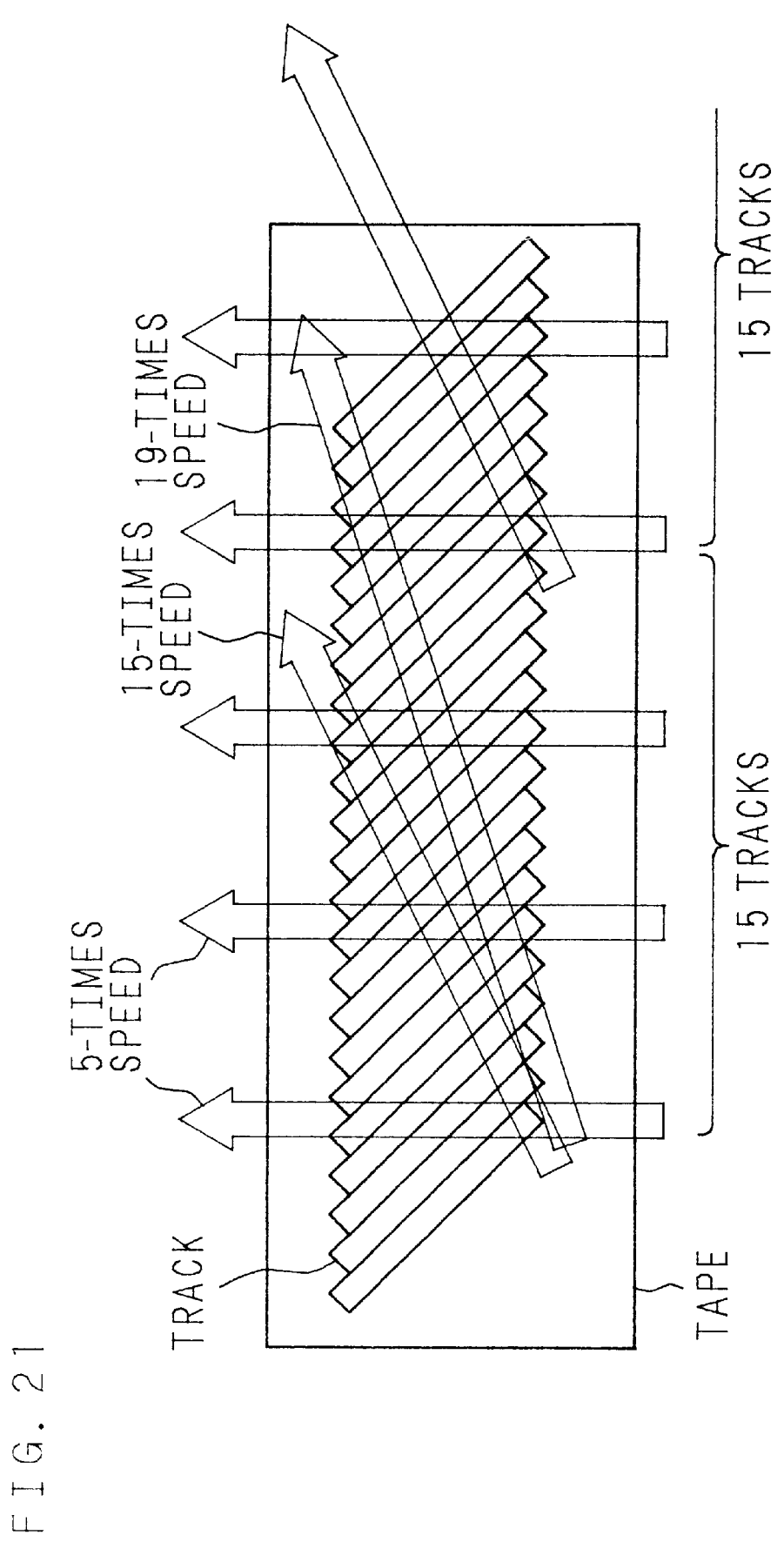
FIG. 21 is a diagram showing the head scan path when fast playback is performed at a speed exceeding the predetermined fast playback speed according to the first, second, and third embodiments.

FIG. 21 is a diagram showing the head scan path when fast playback is performed at a speed exceeding the predetermined fast playback speed. FIG. 21 shows a case where playback is performed at a speed 19 times the normal speed when the predetermined maximum fast playback speed is 15 times the normal speed. In 19-times speed mode, matching cannot be maintained between the low-frequency HP, data in the low-frequency area and the high-frequency HP data in the high-frequency areas. This cart be recognized by observing the PHASE signals; that is, it is shown that when playback is performed at a speed higher than the predetermined fast playback speed, no PHASE signals match between the low-frequency area and the high-frequency areas in the HP data obtained in a single scan. In this case, therefore, the low-frequency HP data recovered from the low-frequency area is played back. In this case, as earlier described, the low-frequency HP data should be recorded in an area where phase match is most likely to occur, i.e., near the end of the track if the phase is synchronized at the end of the track, or in the center of the track if the phase is synchronized at the center of the track.

Figure 22A:
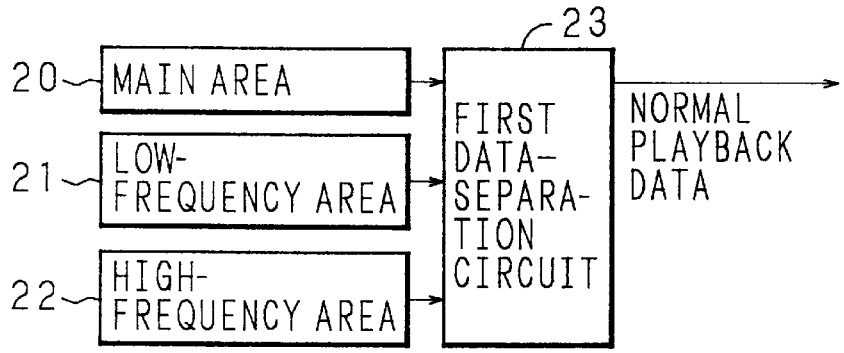
FIGS. 22A, 22B, and 22C are diagrams each showing an example of how playback is performed in the first embodiment.
Figure 22B:
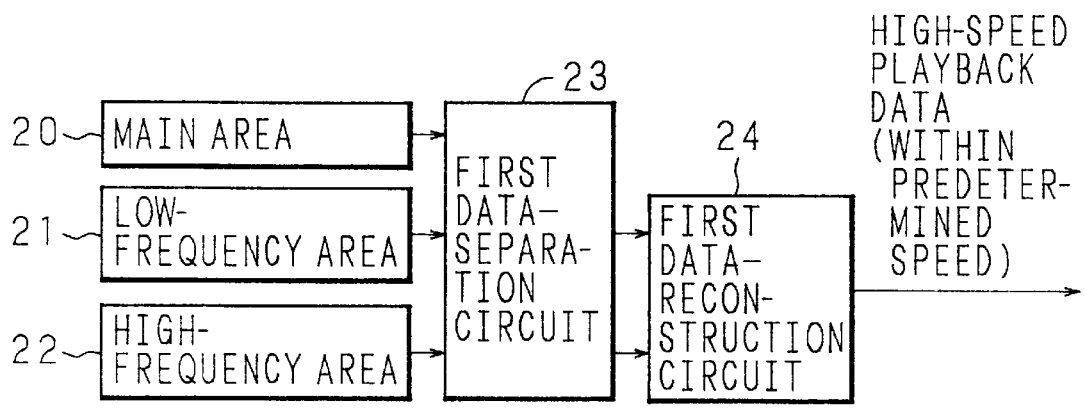
Figure 22C:
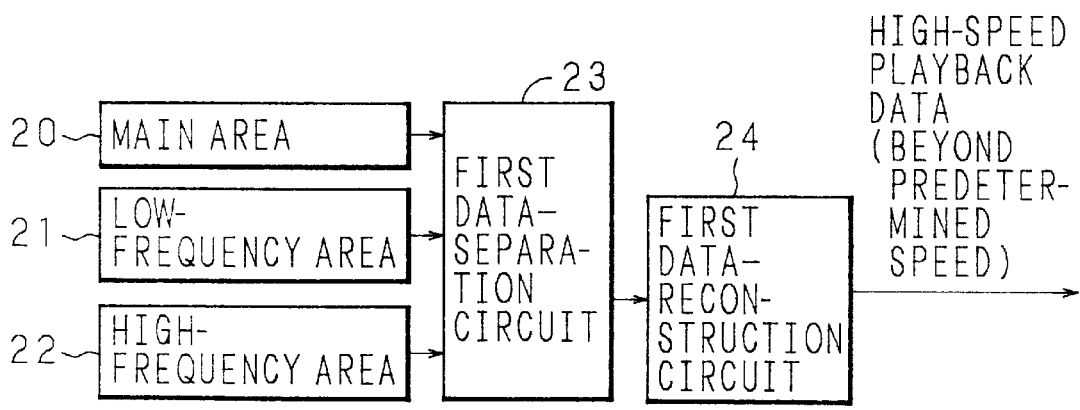

FIG. 22A, 22B, and 22C are diagrams each showing an example of how playback is performed in the present embodiment. In each figure, reference numeral 20 is a main area indicating the main area on the track; 21 is a low-frequency area indicating the low-frequency area on the track; 22 is a high-frequency area indicating the high-frequency area on the track; 23 is a first data-separation circuit for separating data recovered from the tape; and 24 is a first data-reconstruction circuit for checking the PHASE signals in the low-frequency area arid high-frequency area, and for reconstructing HP data from the low-frequency HP data and high-frequency HP data.

Normal-speed playback is performed in the same manner as in the prior art example; that is, data from the main area 20, low-frequency area 21, arid high-frequency area 22 are inputted to the first data-separation circuit 23, and playback is performed using the data from the main area 20. In high-speed playback within the predetermined fast playback speed, data from the main area 20, low-frequency area 21, and high-frequency area 22 are inputted to the first data-separation circuit. 23, which selects the data recovered from the low-frequency area 21 and high-frequency area 22 and supplies the selected data to the first, data-reconstruction circuit 24. In the first data-reconstruction circuit 24, the PHASE signals are checked, and when they match between the low-frequency area 21 and high-frequency area 22, data is reconstructed for high-speed playback. If the PHASE signals do not match, since the high-frequency HP data obtained by the immediately preceding head scan invariably contains the PHASE signal that matches the PHASE signal in the low-frequency area obtained by the current head scan, this data is used to reconstruct the HP data for playback. In the case of high-speed playback at a speed exceeding the predetermined fast playback speed, the selected data are inputted to the first data-reconstruction circuit 24, as above, and only the HP data recovered from the low-frequency area 21 is used to reconstruct the data for high-speed playback.

Embodiment 2

In the first embodiment described above, in fast playback at speeds greater than the predetermined fast playback speed, the HP data only from the low-frequency area was played back without checking the PHASE signal in the HP data from the high-frequency area. In the second embodiment hereinafter described, on the other hand, in fast playback at speeds greater than the predetermined fast playback speed, if there is any high-frequency area holding HP data whose PHASE signal matches the PHASE signal of the low-frequency area, the HP data available from the high-frequency area as well as from the low-frequency area are used to reconstruct playback HP data.

Figure 23A:
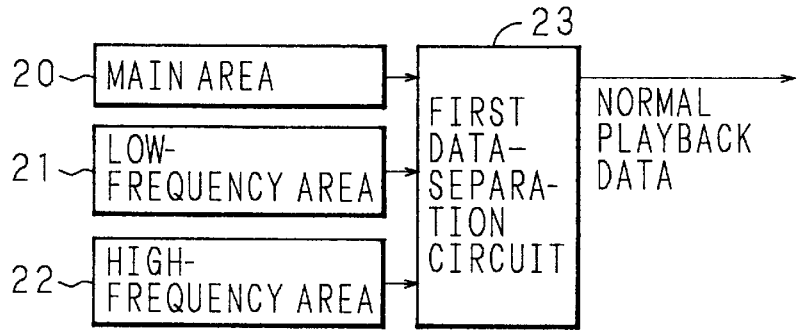
FIGS. 23A, 23B, and 23C are diagrams each showing an example of how playback is performed in the second embodiment.
Figure 23B:
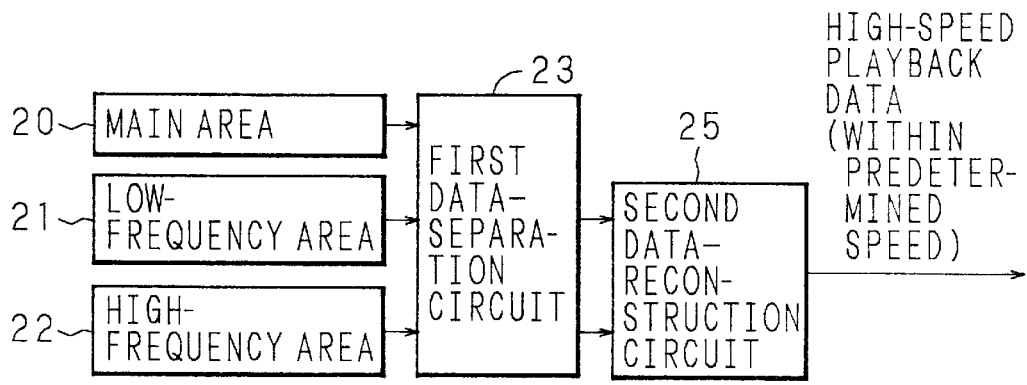
Figure 23C:
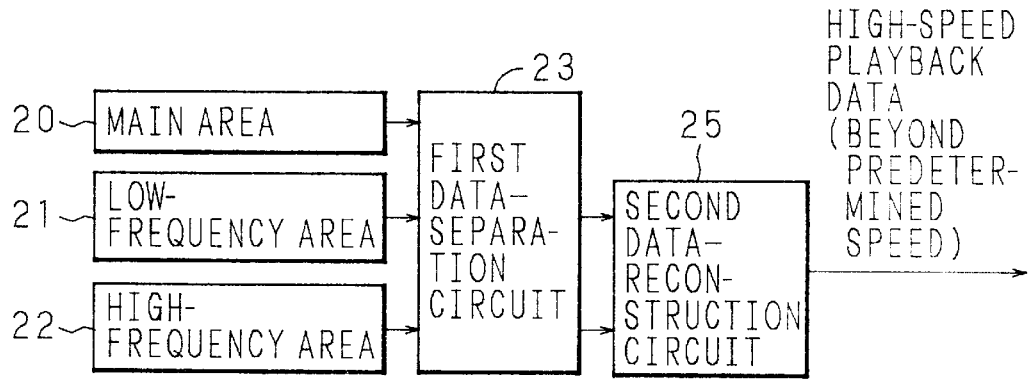

FIGS. 23A, 23B, and 23C are diagrams each showing an example of how playback is performed in the second embodiment. In the figures, reference numeral 25 indicates a second data-reconstruction circuit for checking the PHASE signals in the HP data from the low-frequency area 21 and high-frequency area 22, and for reconstructing HP data by also using the HP data from tile high-frequency area if the PHASE signals match.

Normal-speed playback is performed in the same manner as in the prior art example; that is, data from the main area 20, low-frequency area 21, and high-frequency area 22 are inputted to the first data-separation circuit 23, and playback is performed using the data from the main area 20. In high-speed playback within the predetermined fast playback speed, data from the main area 20, low-frequency area 21, and high-frequency area 22 are inputted to the first data-separation circuit 23, which selects the HP data recovered from the low-frequency area 21 and high-frequency area 22 and supplies the selected data to the second data-reconstruction circuit 25. In the second data-reconstruction circuit 25, the PHASE signals are checked, and when they match between the low-frequency area 21 and high-frequency area 22, HP data is reconstructed for high-speed playback. If the PHASE signals do not match, since the high-frequency HP data obtained by the immediately preceding head scan invariably contains the PHASE signal that matches the PHASE signal in the low-frequency area obtained by the current head scan, this data is used to reconstruct the HP data for playback. In the case of high-speed playback at a speed exceeding the predetermined fast playback speed, the selected data are inputted to the second data-reconstruction circuit 25, as above, and the HP data from the low-frequency area 21 and the HP data from the high-frequency area having the matching PHASE signal is used to reconstruct the data for high-speed playback.

Embodiment 3

In the foregoing first and second embodiments, all intra-coded blocks are used; this, however, necessitates syntax analysis ranging from the MPEG2 bitstream to macroblock headers, and since one frame is formed from a plurality of macroblocks, minute control must be performed. In a third embodiment, on the other hand, the syntax analysis for the MPEG2 bitstream is performed using intra-information of the picture header appended to each frame, and the intra-blocks for the recorded HP data are taken only from intraframe or intrafield data.

Figure 24A:
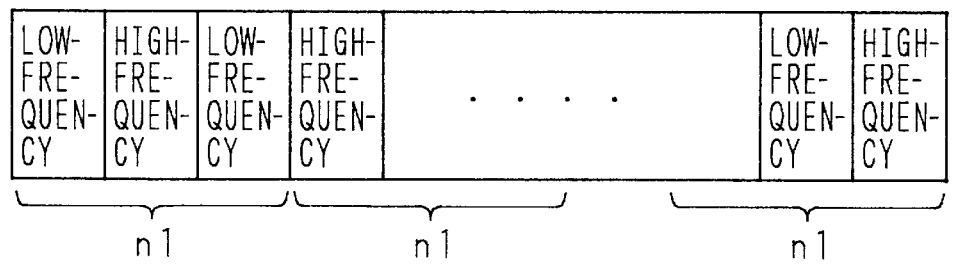
FIGS. 24A and 24B are diagrams showing the structure of HP data recorded per track.
Figure 24B:
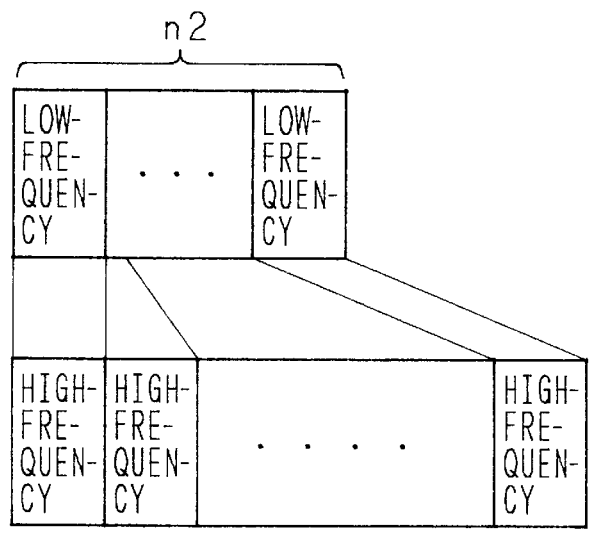

FIGS. 24A and 24B show structural examples of HP data recorded per track. In the prior art (FIG. 24A), only n1 video blocks were able to be recorded in one HP data area within a track; by contrast, in any of the first, second, and third embodiments (FIG. 24B), n2 video blocks can be recorded.

Embodiment 4

Figure 25:
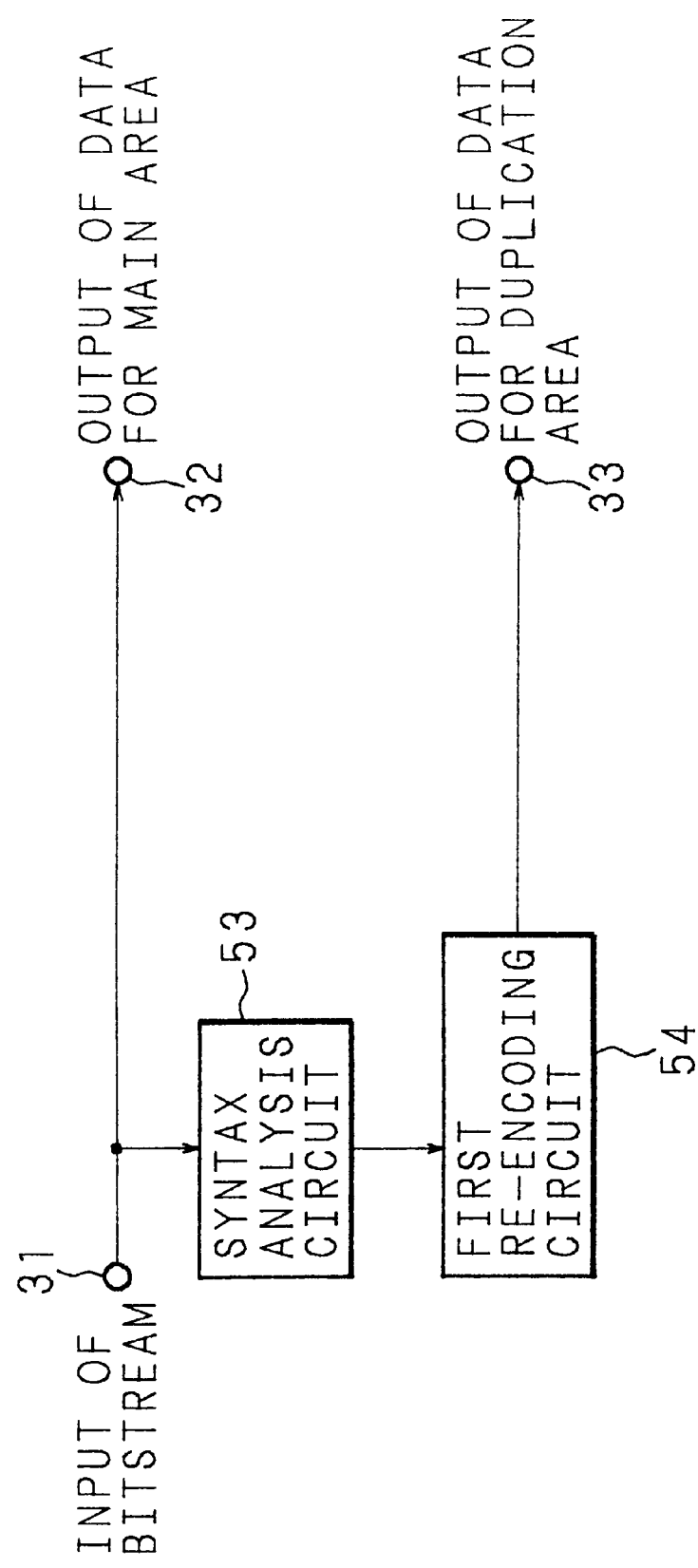
FIG. 25 is a block diagram showing the configuration of a bitstream recording apparatus in a digital VTR capable of high-speed playback according to a fourth embodiment of the present invention.

FIG. 25 is a block diagram showing the configuration of a bitstream recording apparatus in a digital VTR capable of high-speed playback according t,o a fourth embodiment of the invention. In the figure, reference numeral 31 is a bitstream input terminal; 32 is a bitstream output terminal; 33 is an HP data output terminal; 54 is a first re-encoding circuit for re-encoding variable-length coded digital data inputted to it; and 53 is a syntax analysis circuit for analyzing the syntax of an MPEG2 bitstream.

Next, the operation of the bitstream recording apparatus in the digital VTR according to the fourth embodiment will be described. An MPEG2 bitstream is inputted via the input terminal 31 and outputted unprocessed from the output terminal 32 for recording sequentially in a main area. The bitstream inputted via the input terminal 31 is also fed to the syntax analysis circuit 53, where the syntax of the MPEG2 bitstream is analyzed and an intra-picture is detected. When an intra-picture is detected, the bitstream of the intra-picture is inputted to the first re-encoding circuit 54 where it is re-encoded (details of the first re-encoding circuit 54 will be described later). The bitstream obtained by re-encoding the intra-picture is fed into an EOB appending circuit (not shown) where an EOB is appended to it to construct HP data, which is recorded in a duplication area.

Figure 26:
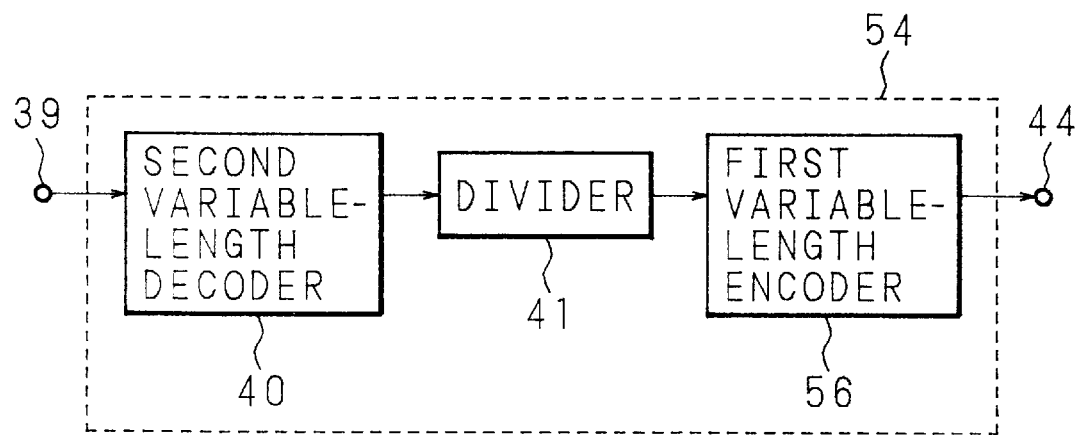
FIG. 26 is a block diagram showing the configuration of a first re-encoding circuit in the fourth embodiment.

FIG. 26 is a block diagram showing the configuration of the first re-encoding circuit 54 in the fourth embodiment. In the figure, reference numeral 39 is an input terminal; 40 is a second variable-length decoder; 41 is a divider; 56 is a first variable-length encoder; and 44 is an output terminal.

Next, the operation of the first re-encoding circuit 54 will be described. The variable-length coded digital data inputted via the input terminal 39 is subjected to variable-length decoding in the second variable-length decoder 40, which outputs the digital data of the intra-coded block in the zigzag scanning order shown in FIG. 11. The digital data outputted from the second variable-length decoder 40 in the zigzag scanning order is inputted to the divider 41 which divides the data by a predetermined value Q. The digital data divided by the predetermined value Q in the divider 41 is inputted to the first variable-length encoder 56 for variable-length coding. The bitstream variable-length encoded in the first variable-length encoder 56 is outputted from the output terminal 44.

As described, in the fourth embodiment, the input digital data is variable-length decoded first, to recover the digital data of the intra-coded block; the decoded digital data is then divided by the predetermined value to limit the amplitude of the data and hence the data amount, thus making it possible to use all the sequences within the intra-coded block to reconstruct HP data for high-speed playback.

Figure 27:
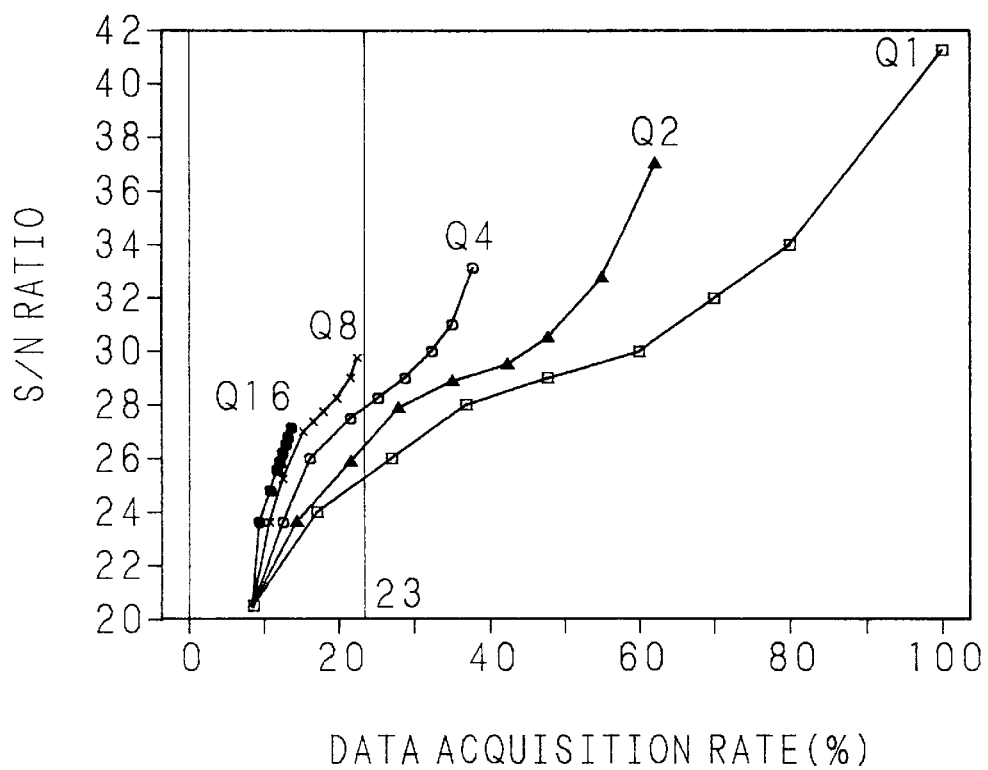
FIG. 27 is a diagram for explaining picture quality in high-speed playback when the bitstream recording apparatus of the fourth embodiment is employed in the digital VTR.

FIG. 27 is a diagram for explaining picture quality in high-speed playback when the bitstream recording apparatus of the fourth embodiment is employed in the digital VTR. More specifically, FIG. 27 shows a graph for evaluating the quality of high-speed playback pictures for various values of the divisor Q, i.e., Q=2, 4, 8, 16, set in the divider 41 in the first re-encoding circuit 54. The graph should be read in the same way as explained in connection with FIG. 10, and therefore, explanation is not repeated here. It should, however, be noted that in FIG. 27, the data acquisition rate is plotted along the abscissa, in percentage term with the amount of transmitted data plotted at 100% when all the coefficients in an intra-coded block are transmitted in FIG. 10. That is, the prior art, example shown in FIG. 10 corresponds to the case where Q in the divider 41 is set at 1 in the present embodiment. The plotted points in FIG. 27 correspond to the numbers of transmitted sequences shown in FIG. 12.

In FIG. 27, when a comparison is made between Q=1 and Q=2, for example, at the data acquisition rate of about. 50%, where the number of transmitted sequences is DC+14 sequences for Q=1 and DC+27 sequences for Q=2, it is shown that at approximately the same data acquisition rate the S/N ratio is about 29 dB when Q=1, and about 31 dB when Q=2. This means that for the same data amount, the S/N ratio is improved by about 2 dB when Q=2, compared to when Q=1. As can be seen, by applying re-encoding as described in this embodiment, coefficients including higher-frequency coefficients can be transmitted for the same data amount, which contributes to improving the S/N ratio. As in the prior art example, in this embodiment also, computer simulation was performed only on the Y signal in the NTSC format.

Figure 9:
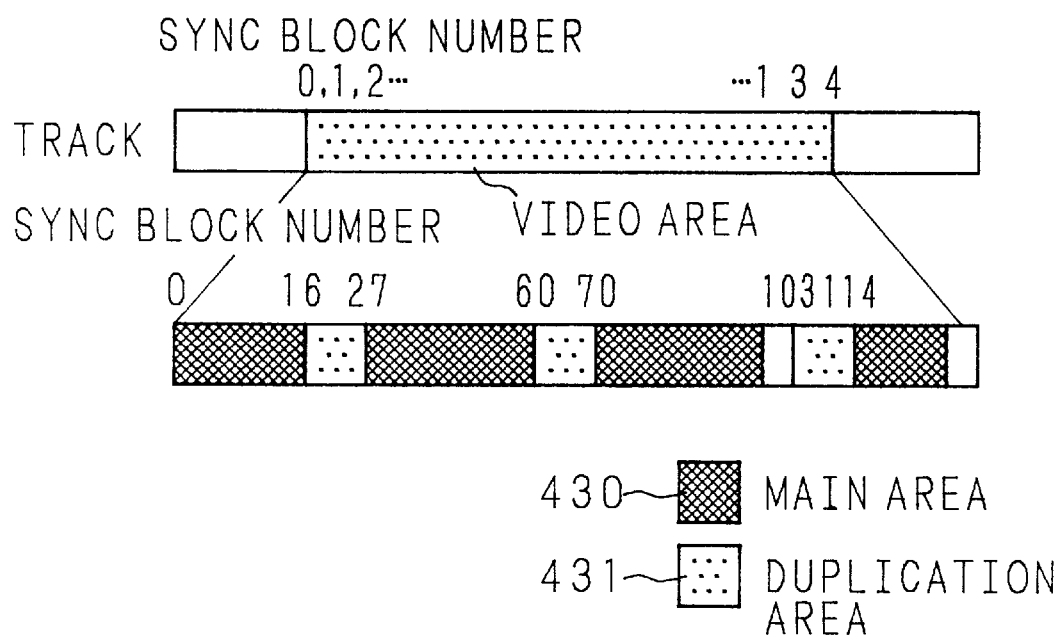
FIG. 9 is a diagram showing a track format employed in the prior art digital VTR.

Further, in FIG. 9 given in the description of the prior art, an example of the main area/duplication area layout is shown, and in the prototype home digital VTR, the video area of each track consists of 135 sync blocks. The data rate of the main area is 17.5 Mbps, while that of the duplication area is about 340 Kbps. Suppose here that the bit count when one frame picture is intra-coded is about 1.5 Mbits arid that one intra-picture is transmitted per second. Then, the intra-coded data rate is 1.5 Mbps, so that the data acquisition rate of the duplication area is about 23% of that of the main area (340/1.5M=0.23).

With this in mind, reference is made to FIG. 27, from which it can be seen that before the data acquisition rate reaches about 23%, DC+2 sequences are transmitted when Q=1, providing an S/N ratio of about 23.9 dB, while when Q=2, DC+5 sequences are transmitted, providing an S/N ratio of about 26.2 dB; similarly, when Q=4, DC+9 sequences are transmitted, providing an S/N ratio of about 27.7 dB, and when Q=8, all sequences are transmitted, providing an S/N ratio of about 30 dB.

That is, with the main area to duplication area ratio employed in the above prior art, Q is set at 1 and data up to DC+2 sequences is taken as the HP data; on the other hand, by applying re-encoding as described in this embodiment, when Q is set at 8 and data of all sequences is taken as the HP data, the S/N ratio can be improved by about 6.1 dB for approximately the same data amount.

The above embodiment has been described for the case where Q is an integer, but it will be appreciated that Q need not necessarily be an integer.

As described, according to the fourth embodiment, since an input variable-length coded digital data is first variable-length decoded and then divided by a predetermined value to limit the amplitude of the digital data and hence reduce the code amount, it becomes possible to transmit all the sequences in an intra-coded block as the HP data without increasing the HP data amount for high-speed playback. This contributes to improving picture quality in high-speed playback and achieving a significant improvement in the S/N ratio, as compared with the encoding performed by the prior art bitstream recording apparatus.

Embodiment 5

Figure 28:
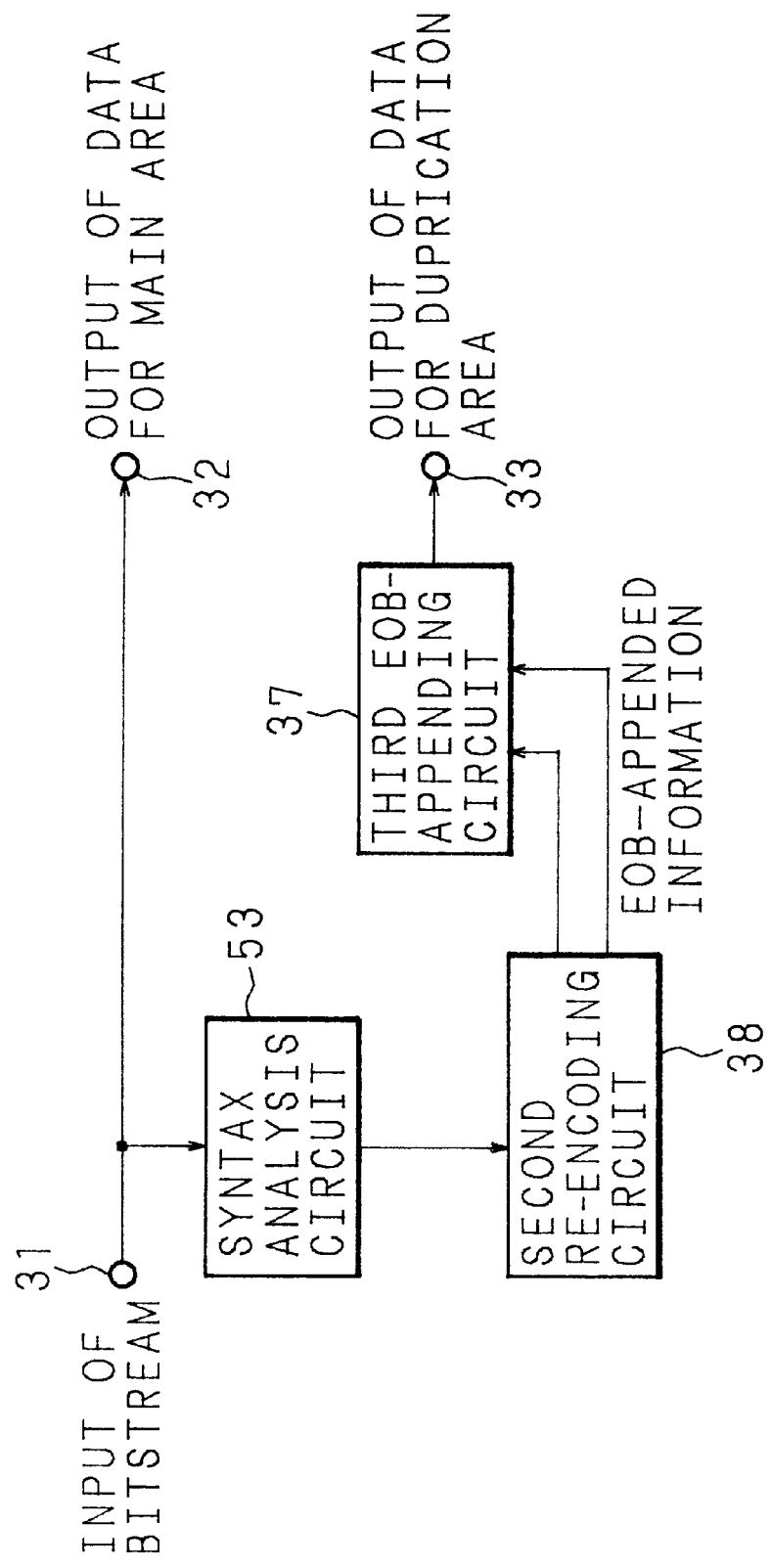
FIG. 28 is a block diagram showing the configuration of a bitstream recording apparatus in a digital VTR capable of high-speed playback according to a fifth embodiment of the present invention.

FIG. 28 is a block diagram showing the configuration of a bitstream recording apparatus in a digital VTR capable of high-speed playback according to a fifth embodiment of the invention. In the figure, the same parts as those shown in the fourth embodiment are designated by like reference numerals, and description of such parts is omitted here since they are identical in configuration and operation to the corresponding parts described in the fourth embodiment. In FIG. 28, reference numeral 37 is a third EOB-appending circuit for appending an EOB, and 38 is a second re-encoding circuit for re-encoding variable-length coded digital data inputted to it.

Next, the operation of the bitstream recording apparatus in the digital VTR according to the fifth embodiment will be described. An MPEG2 bitstream is inputted via the input terminal 31 and outputted unprocessed from the output terminal 32 for recording sequentially in a main area. The bitstream inputted via the input terminal 31 is also fed to the syntax analysis circuit 53, where the syntax of the MPEG2 bitstream is analyzed and an intra-picture is detected. When an intra-picture is detected, the bitstream of the intra-picture is inputted to the second re-encoding circuit 38 where it is re-encoded (details of the second re-encoding circuit 38 will be described later). The bitstream obtained by re-encoding the intra-picture is fed into the third EOB-appending circuit 37 where an EOB is appended to it to construct HP data, which is recorded in a duplication area. The EUB-appended information flag shown in the figure will be described later.

Figure 29:
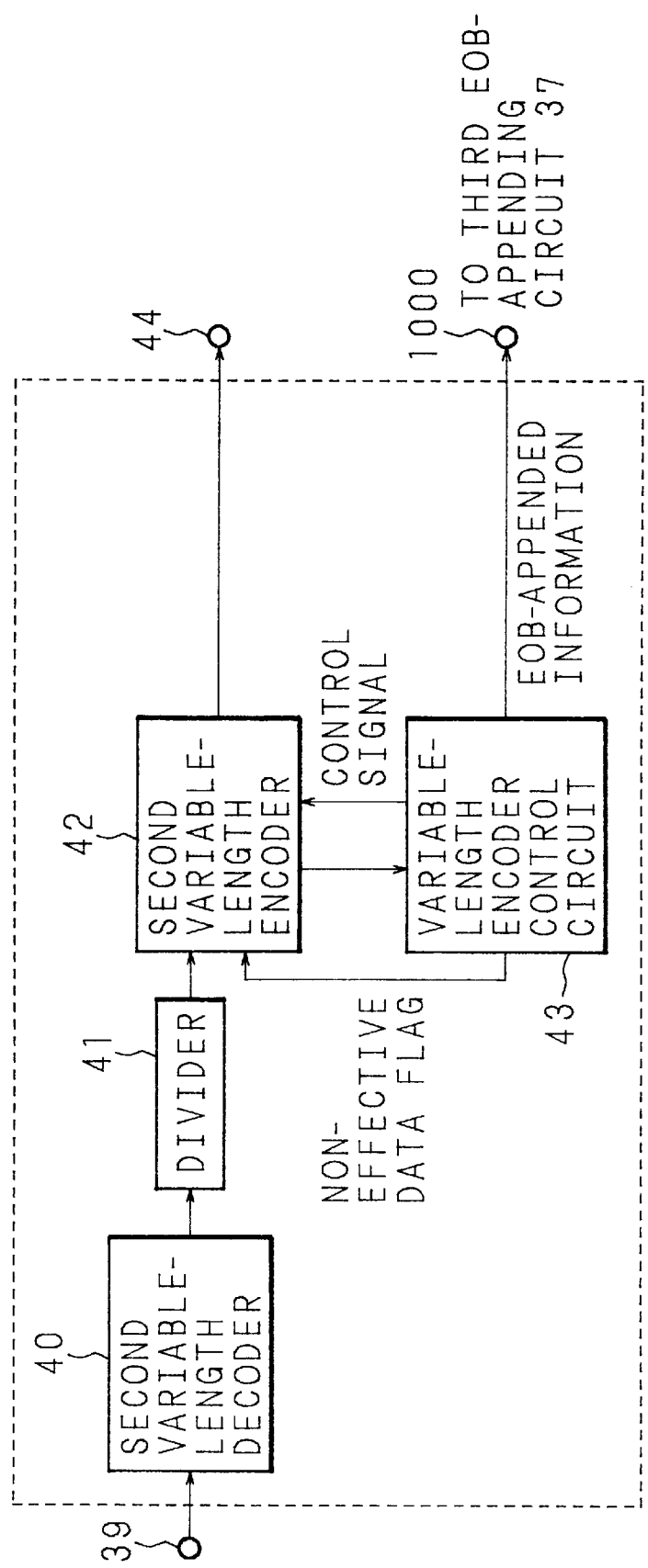
FIG. 29 is a block diagram showing the configuration of a second re-encoding circuit in the fifth embodiment.

FIG. 29 is a block diagram showing the configuration of the second re-encoding circuit 38 in the fifth embodiment. In the figure, reference numeral 39 is an input terminal; 40 is a second variable-length decoder; 41 is a divider; 42 is a second variable-length encoder; 43 is a variable-length encoder control circuit; and 44 and 1000 are output terminals.

Next, the operation of the second re-encoding circuit 38 will be described. The variable-length coded digital data inputted via the input terminal 39 is subjected to variable-length decoding in the second variable-length decoder 40, which outputs the digital data of the intra-coded block in the zigzag scanning order shown in FIG. 11. The digital data outputted from the second variable-length decoder 40 in the zigzag scanning order is inputted to the divider 41 which divides the data by a predetermined value Q. The digital data divided by the predetermined value Q in the divider 41 is inputted to the second variable-length encoder 42, where variable-length coding is applied under the control of the variable-length encoder control circuit 43. The control performed by the variable-length encoder control circuit 43 will be described below. The variable-length encoder control circuit 43 counts the number of data terms in the intra-coded block inputted in the zigzag scanning order to the second variable-length encoder 42 from the divider 41. When a predetermined number of data terms has been counted, a control signal is issued to the second variable-length encoder 42, and a noneffective data flag is appended to the data subsequently inputted from the divider 41 to invalidate the subsequently input data of the intra-coded block, thus performing control so that variable-length coding is applied to the effective data input up to that time but not applied to the subsequently input data. The bitstream variable-length encoded under the control of the variable-length encoder control circuit 43 is outputted via the output terminal 44.

Figure 30:
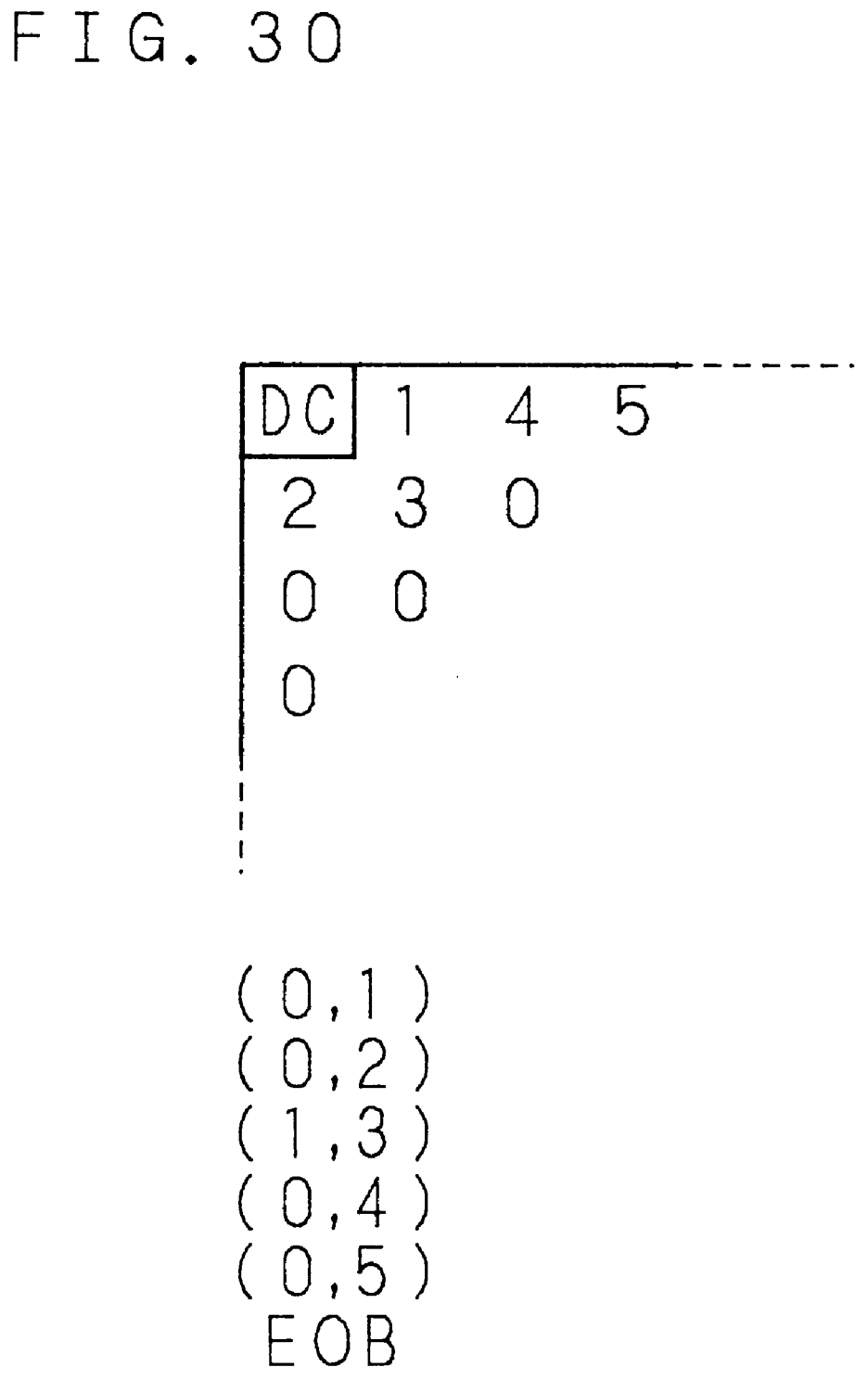

In variable-length coding, a situation may occur where an EOB occurs before the encoding of the predetermined number of data terms is complete. FIG. 30 shows a specific example of an intra-coded block. Assuming that the DC coefficient and nine AC coefficients are used to construct the HP data, if zero-run-length coding is applied to the AC coefficients in the block, (run, amp) will be (0, 1), (0, 2), (1, 3), (0, 4), (0, 5), EOB, thus generating an EOB. In such a case, to indicate that an EOB is already appended in the second variable-length encoder 42, the variable-length encoder control circuit 43 generates an EOB-appended information signal, which is sent to the third EOB-appending circuit 37. When the EOB-appended information signal is received, the third EOB-appending circuit 37 passes the bitstream for output without appending an EOB.

As described, in the fifth embodiment, the digital data inputted as high-speed playback HP data is first variable-length decoded, and then divided by the predetermined value to limit the amplitude of the data and hence the data amount, thus making it possible to use coefficients including higher-frequency coefficients to construct HP data for high-speed playback. Furthermore, when performing variable-length coding on the data whose amplitude has been limited by the division operation, the number of AC coefficients to be read out from the intra-coded block in increasing order of frequency following the DC coefficient, is determined first, and control is performed so that variable-length coding is applied to the predetermined number of coefficients; this ensures that the same number of coefficients are obtained from each block to construct the HP data for high-speed playback, so that relatively stable picture quality can be obtained in high-speed playback.

In an alternative configuration, the second re-encoding circuit 38 may be configured so that the variable-length encoder control circuit 43 does not generate an EOB-appended information signal and so that control by this signal is not performed.

As described, according to the fifth embodiment, since an input variable-length coded digital data is first variable-length decoded and then divided by a predetermined value to limit the amplitude of the digital data and hence reduce the code amount, it becomes possible to transmit higher-frequency coefficients as the HP data without increasing the HP data amount for high-speed playback. This contributes to improving picture quality in high-speed playback and achieving a significant improvement in the S/N ratio, as compared with the encoding performed by the prior art bitstream recording apparatus.

Embodiment 6

Figure 31:
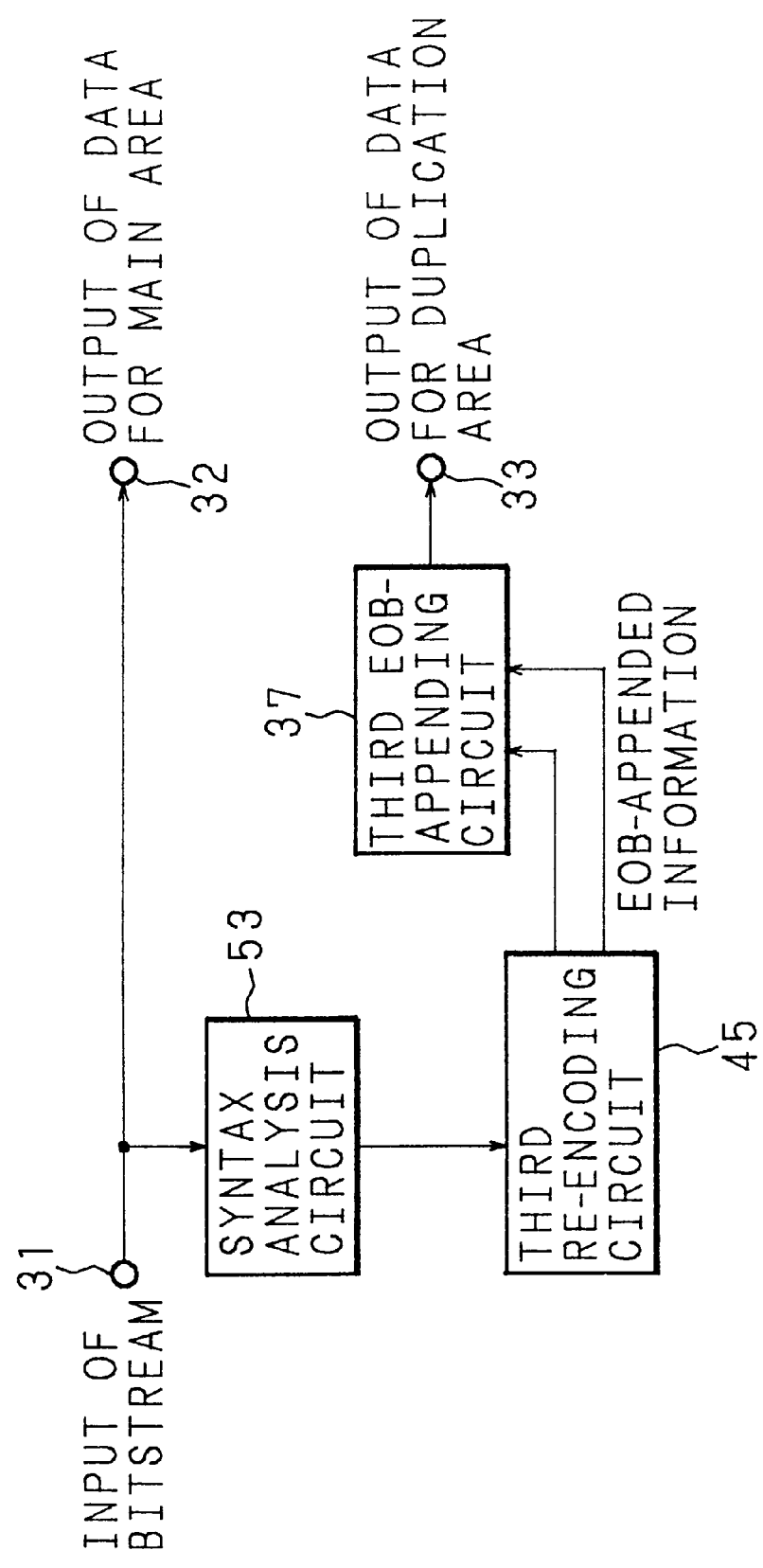
FIG. 31 is a block diagram showing the configuration of a bitstream recording apparatus in a digital VTR capable of high-speed playback according to a sixth embodiment of the present invention.

FIG. 31 is a block diagram showing the configuration of a bitstream recording apparatus in a digital VTR capable of high-speed playback according to a sixth embodiment of the invention. In the figure, the same parts as those shown in the fifth embodiment are designated by like reference numerals, and description of such parts is omitted here since they are identical in configuration and operation to the corresponding parts described in the fifth embodiment. In FIG. 31, reference numeral 45 is a third re-encoding circuit for re-encoding variable-length coded digital data inputted to it.

Next, the operation of the bitstream recording apparatus in the digital VTR according to the sixth embodiment will be described. An MPEG2 bitstream is inputted via the input terminal 31 and outputted unprocessed from the output terminal 32 for recording sequentially in a main area. The bitstream inputted via the input terminal 31 is also fed to the syntax analysis circuit 53, which analyzes the syntax of the MPEG2 bitstream and detects an intra-picture. When an intra-picture is detected, the bitstream of the intra-picture is inputted to the third re-encoding circuit 45 where it is re-encoded (details of the third re-encoding circuit 45 will be described later). The bitstream obtained by re-encoding the intra-picture is fed into the third EOB-appending circuit 37 where an EOB is appended to it to construct HP data, which is recorded in a duplication area.

Figure 32:
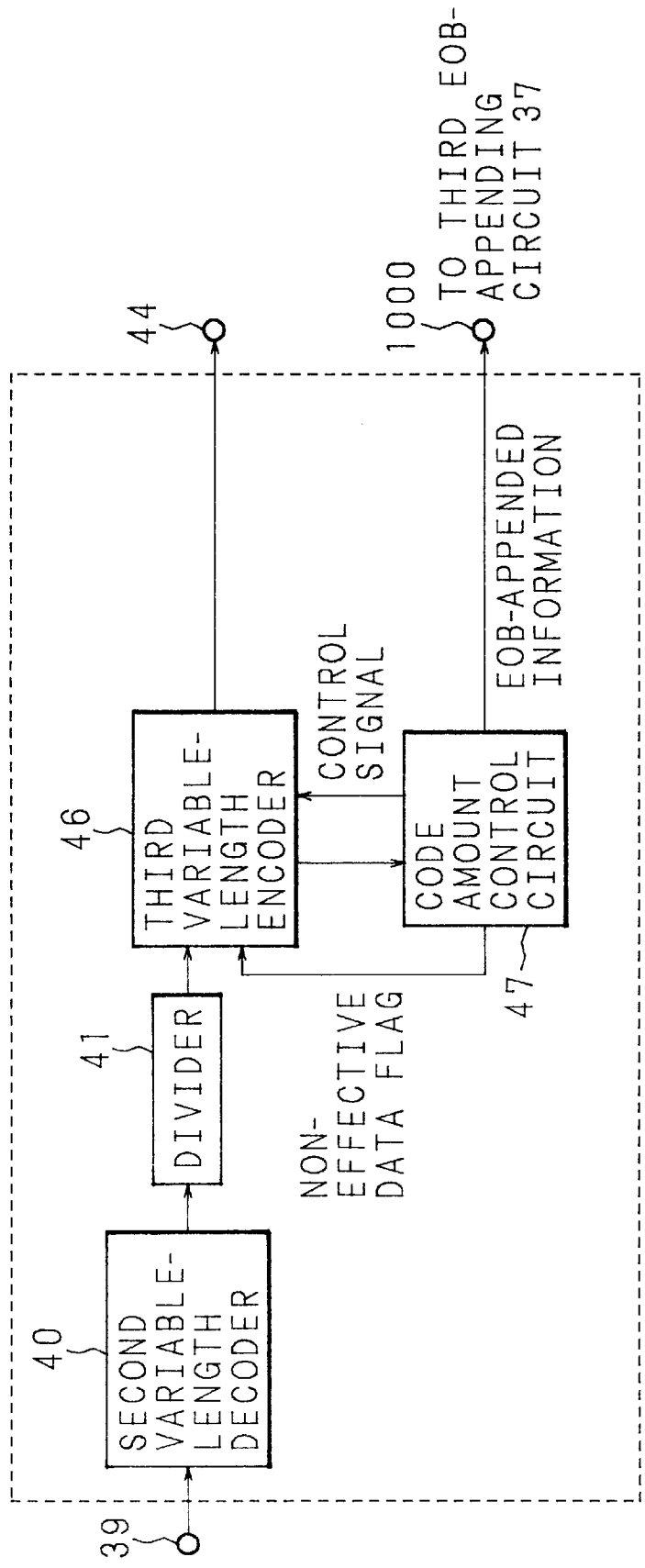
FIG. 32 is a block diagram showing the configuration of a third re-encoding circuit in the sixth embodiment.

FIG. 32 is a block diagram showing the configuration of the third re-encoding circuit 45 in the sixth embodiment. In the figure, the parts designated by the same reference numerals as those in the second re-encoding circuit 38 of the fifth embodiment are identical in configuration and operation to the corresponding parts described in the fifth embodiment, and therefore, their description is omitted here. In FIG. 32, reference numeral 46 is a third variable-length encoder, and 47 is a code amount control circuit.

Next, the operation of the third re-encoding circuit 45 will be described. The variable-length coded digital data inputted via the input terminal 39 is subjected to variable-length decoding in the second variable-length decoder 40, which outputs the digital data of the intra-coded block in the zigzag scanning order shown in FIG. 11. The digital data outputted from the second variable-length decoder 40 in the zigzag scanning order is inputted to the divider 41 which divides the data by a predetermined value Q. The digital data divided by the predetermined value Q in the divider 41 is inputted to the third variable-length encoder 46 which applies variable-length coding under the control of the code amount control circuit 47. The control performed by the code amount control circuit 47 will be described below. The code amount control circuit 47 adds up the code lengths of the data subjected to variable-length coding in the third variable-length encoder 46. When the code lengths add up to a predetermined length, a control signal is issued to the third variable-length encoder 46, and an noneffective data flag is appended to the data subsequently inputted from the divider 41 to invalidate the subsequently inputted data from the intra-coded block, thus performing control so that variable-length coding is not applied to the subsequently inputted data. The bitstream variable-length encoded under the control of the code amount control circuit 47 is outputted via the output terminal 44.

In variable-length coding, encoding up to the EOB may be completed before reaching the code amount predetermined by the code amount control circuit 17. In such a case, to indicate that an EOB is already appended in the third variable-length encoder 46, the code amount control circuit 47 generates an EOB-appended information signal, which is sent to the third EOB-appending circuit 37. When the EOB-appended information signal is received, the third EOB-appending circuit 37 passes the bitstream for output without appending an EOB.

As described, in the sixth embodiment, as well as in the fifth embodiment, the digital data inputted as high-speed playback HP data is first variable-length decoded, and then divided by the predetermined value to limit the amplitude of the data and hence the data amount, thus making it possible to use coefficients including higher-frequency coefficients to construct HP data for high-speed playback. The sixth embodiment, however, differs from the fifth embodiment in the process of variable-length coding applied to the data whose amplitude has been limited by the division operation; that is, in the fifth embodiment, the number of AC coefficients to be read out from the intra-coded block in increasing order of frequency following the DC coefficient is predetermined, and the same number of coefficients obtained from each block are variable-length encoded and used as the HP data for high-speed playback, while in the sixth embodiment, the HP data amount is predetermined, and the HP data is constructed by performing variable-length coding, regardless of the number of coefficients, until the amount of the variable-length coded data reaches the predetermined HP data amount. This makes it possible to also use higher-frequency coefficients as the HP data depending on the characteristic of the block.

In an alternative configuration, the third re-encoding circuit 45 may be configured so that the code amount control circuit 47 does not generate an EOB-appended information signal and so that control by this signal is not performed.

As described, according to the sixth embodiment, since an input variable-length coded digital data is first variable-length decoded and then divided by a predetermined value to limit the amplitude of the digital data and hence reduce the code amount, it becomes possible to transmit coefficients including higher-frequency coefficient as the HP data without increasing the HP data amount for high-speed playback. This contributes to improving picture quality in high-speed playback and achieving a significant improvement in the S/N ratio, as compared with the encoding performed by the prior art bitstream recording apparatus.

Embodiment 7

A seventh embodiment of the invention will be described below. In the seventh embodiment, as in the earlier described fifth embodiment, the input variable-length coded digital data is first subjected to variable-length decoding, and then divided by a predetermined value to limit the amplitude of the digital data and hence reduce the code amount, thus achieving the effect that coefficients including higher-frequency coefficients can be transmitted as HP data without increasing the amount of the HP data for high-speed playback. As in the foregoing fifth and sixth embodiments, amplitude-limited digital data is obtained by variable-length decoding the input variable-length coded digital data and dividing the decoded data by a predetermined value; the seventh embodiment, however, carries out the reconversion of the amplitude-limited digital data into variable-length coded digital data without requiring the process of first variable-length decoding and then variable-length coding, but by using a conversion table that can convert the digital data as it is inputted.

Figure 33:
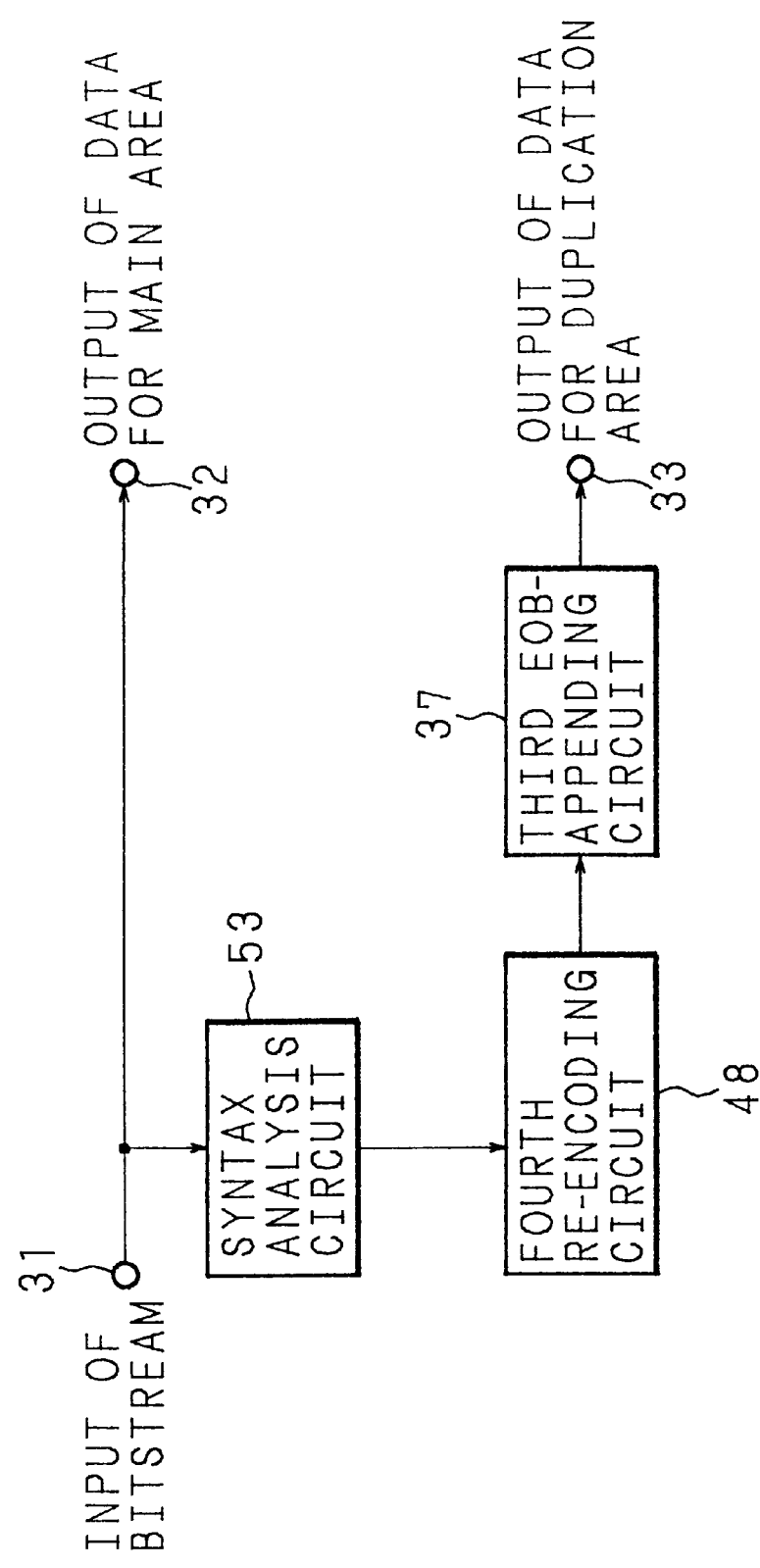
FIG. 33 is a block diagram showing the configuration of a bitstream recording apparatus in a digital VTR capable of high-speed playback according to a seventh embodiment of the present invention.

FIG. 33 is a block diagram showing the configuration of a bitstream recording apparatus in a digital VTR according to the seventh embodiment. In the figure, the same parts as those described in the foregoing embodiments are designated by like reference numerals, and description of such parts is omitted here since they are identical in configuration and operation to the corresponding parts described in the foregoing embodiments. In FIG. 33, reference numeral 48 is a fourth re-encoding circuit for re-encoding the input variable-length coded digital data.

Next, the operation of the bitstream recording apparatus in the digital VTR according to the seventh embodiment will be described. An MPEG2 bitstream is inputted via the input terminal 31 and outputted unprocessed from the output terminal for recording sequentially in a main area. The bitstream inputted via the input terminal 31 is also passed to the syntax analyzing circuit 53, which analyzes the syntax of the MPEG2 bitstream and detects an intra-picture. When an intra-picture is detected, the bitstream of the intra-picture is inputted to the fourth re-encoding circuit 48 for re-encoding (details of the fourth re-encoding circuit 48 will be given later). The bitstream obtained by re-encoding the intra-picture is fed to the third EOB-appending circuit 37 where an EOB is appended to it to construct HP data, which is recorded in a duplication area.

Figure 34:
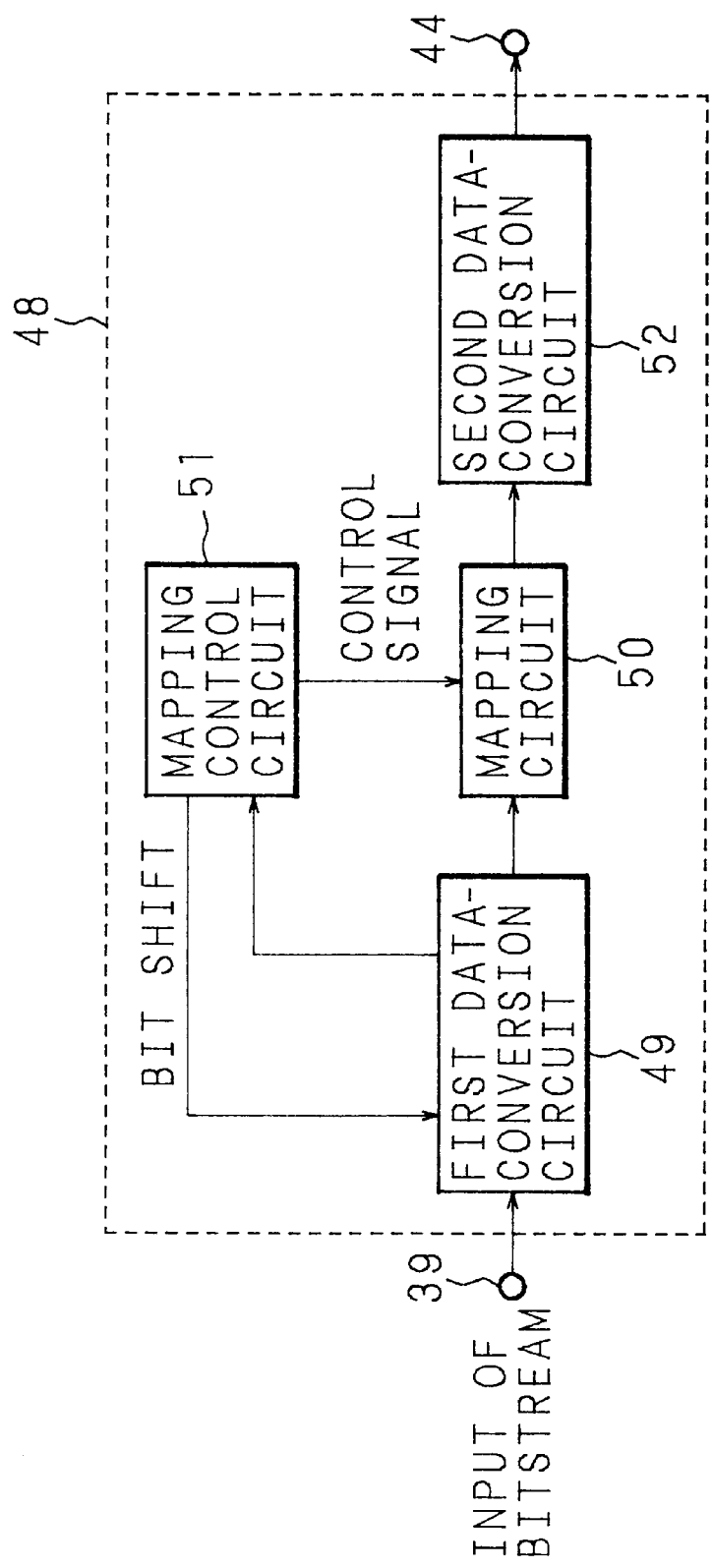
FIG. 34 is a block diagram showing the configuration of a fourth re-encoding circuit in the seventh embodiment.

FIG. 34 is a block diagram showing the configuration of the fourth re-encoding circuit 48 according to the seventh embodiment. In the figure, the same parts as those described in the foregoing embodiments are designated by like reference numerals, and description of such parts is omitted here since they are identical in configuration and operation to the corresponding parts described in the foregoing embodiments. In FIG. 34, reference numeral 49 is a first, data-conversion circuit for converting input serial data into parallel data; 50 is a mapping circuit containing a conversion table for converting variable-length coded digital data into a prescribed variable-length code; 51 is a mapping control circuit for controlling the mapping circuit 50; and 52 is a second data-conversion circuit for reconverting the parallel data into serial data.

Next, the operation of the fourth re-encoding circuit 48 will be described. The variable-length coded digital data inputted via the input terminal 39 is converted by the first data-conversion circuit 49 from serial data to parallel data corresponding to the maximum bit length of variable-length coding. The parallel data outputted from the first data-conversion circuit 49 is supplied to the mapping circuit 50, which converts the data into a prescribed variable-length code under the control of the mapping control circuit 51. The operation of the mapping circuit 50 and the mapping control circuit 51 will be described in detail later. The parallel data outputted from the mapping circuit 50 is reconverted by the second data-conversion circuit 52 into serial data, which is outputted from the output terminal 44.

Next, referring to FIGS. 33, 34, 35, and 36, we will describe by way of example how the variable-length coded data outputted in parallel from the first data-conversion circuit 49 is converted by the mapping circuit 50 and mapping control circuit 51 into a prescribed variable-length code.

Figure 36:
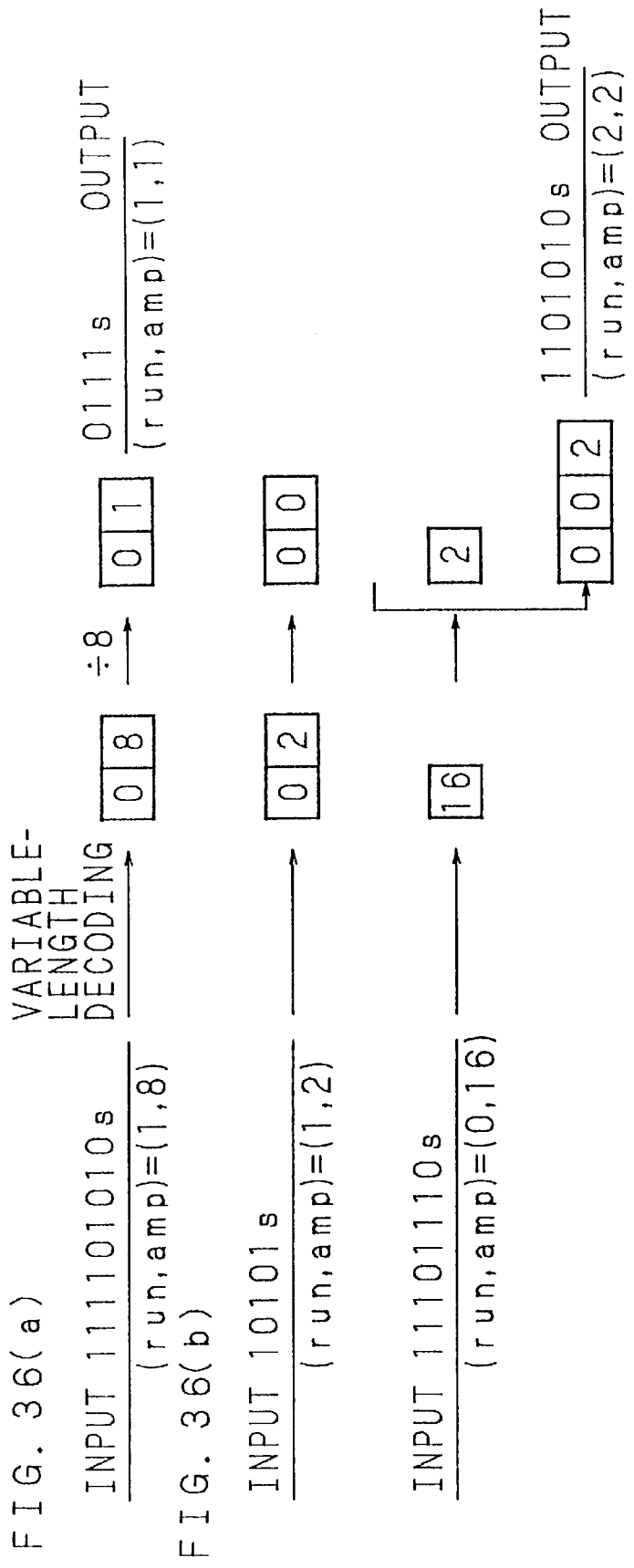
FIGS. 36A and 36B are block diagrams for explaining the operation of the fourth re-encoding circuit in the seventh embodiment.

FIG. 35 shows an example of a code table for mapping (zero run length, coefficient) (hereinafter described as (rum, amp)) in variable-length coding (VLC). For example, a VLC code for (0, 1), indicating a zero run length of 0 and a coefficient of 1, is 00s, where s indicates the code bit of the coefficient. Examples of ESC codes are not shown in the table since they have no relevance to the example shown here. Next, referring to the code table shown in FIG. 35, and to FIG. 36, we will explain the contents of the table, contained in the mapping circuit 50, for converting the input variable-length coded digital data into variable-length coded digital data that is outputted. First, reference is made to the example shown in FIG. 36(a). Parallel data corresponding to the maximum bit length of the variable-length code is outputted from the first data-conversion circuit 49 and inputted to the mapping circuit 50 and the mapping control circuit 51 (the following description is given assuming the maximum bit length is 16 bits). When the 16-bit parallel data is inputted to the mapping control circuit 51, the VLC table in the mapping control circuit 51 is referenced to search for a corresponding variable-length code; if the corresponding variable-length code is found, bits corresponding to that code are clipped from the parallel data. FIG. 36(a) shows that the high-order bits, 111101010s, are clipped as a variable-length code from the 16-bit, parallel data. According to the above VLC table, this corresponds to (run, amp)=(1, 8), and is therefore decoded into two successive data 0, 8. When these two data are subjected to division by Q=8 in the divider 41 in the second recoding circuit 38 described in the fifth embodiment, they are converted into two successive data 0, 1. This corresponds (run, amp)=(1, 1), and according to the above VLC table, the corresponding VLC code is 0111s. When division is performed and a corresponding code in the VLC table is assigned to the converted data, as described above, the mapping control circuit 51 outputs a control signal to the mapping circuit 50 which, in response, converts the parallel input data 111101010s into the parallel output data 0111s. When a variable-length code is clipped in the mapping control circuit 51, the mapping control circuit 51 outputs bit shift information to the first data-conversion circuit 49 to shift the parallel data in the mapping circuit 50 and mapping control circuit 51 by the number of bits of the clipped code. The parallel data held in the mapping circuit 50 and mapping control circuit 51 are then shifted by the number of clipped bits, and new parallel data of the bit length equal to that of the clipped variable-length code is outputted from the first data-conversion circuit 49 and loaded into the mapping circuit 50 and mapping control circuit 51.

Another shown in FIG. 36(b) will be described next. Example (b) in FIG. 36 shows that the bits, 10101s, are clipped as a variable-length code from the parallel data inputted from the first data-conversion circuit 49. According to the above VLC table, this corresponds to (run, amp)=(1, 2), and is therefore decoded into two successive data 0, 2. When these two data are subjected to division by Q=8 in the divider 41 in the second re-encoding circuit 38 described in the fifth embodiment, they are converted to two successive data 0, 0. When expressed in (run, amp), since amp is 0, this can be determined as an EOB if the data is the last sequence in one intra-coded block, but cannot be determined as an EOB if the data is a sequence partway through the block. In such a case, the mapping control circuit 51 cannot determine it as an EOB, and holds the number of zeros ( in this case, 2) in the remaining two data 0, 0 as zero information. Further, since 10101s has been clipped as the variable-length code in the mapping control circuit 51, bit shift information instructing a bit shift by 6 bits is supplied to the first data-conversion circuit 49, and the parallel data held in the mapping circuit 50 and mapping control circuit 51 are shifted by 6 bits, while new parallel data of a 6-bit length is outputted from the first data-conversion circuit 49 and loaded into the mapping circuit 50 and the mapping control circuit 51. Next, in FIG. 36(b), bits, 11101110s, are clipped from the new 16-bit parallel data as a variable-length code in the mapping control circuit 51. According to the above VLC table, this corresponds to (run, amp)=(0, 16), and is therefore converted to data "16". When this data "16" is divided by Q=8 as in FIG. 36(a), it is converted to data "2". At this time, since the zero information indicating two zero runs is held in the mapping control circuit 51, two zeros are added at the head, resulting in three converted data 0, 0, 2. According to the above VLC table, the corresponding VLC code is 1101010s. At this time, as in FIG. 36(a), the mapping control circuit outputs a control signal to the mapping circuit 50, which then outputs parallel data 1101010s. The zero information is reset to 0 when the control signal is issued.

As described, in the seventh embodiment, the amplitude-limited digital data, obtained by variable-length decoding the input variable-length coded digital data and dividing the decoded digital data by a predetermined value, is reconverted into variable-length coded digital data by using a table for converting the input variable-length coded digital data into prescribed variable-length coded digital data; this configuration, by using simple circuitry, allows all sequences within an intra-coded block to be transmitted as HP data for high-speed playback while reducing the code amount and without increasing the amount of the HP data. The seventh embodiment thus achieves improved picture quality and improved S/N ratio in high-speed playback, as compared with the encoding performed by the prior art bitstream recording apparatus.

In addition, in the above Embodiments 4 to 7, data after variable-length decoding is divided by the predetermined value, however, the present invention is not limited to this case. Several quantization values are prepared, and the divisor value may be changed according to the code amount of HP data.

Embodiment 8

Figure 37:
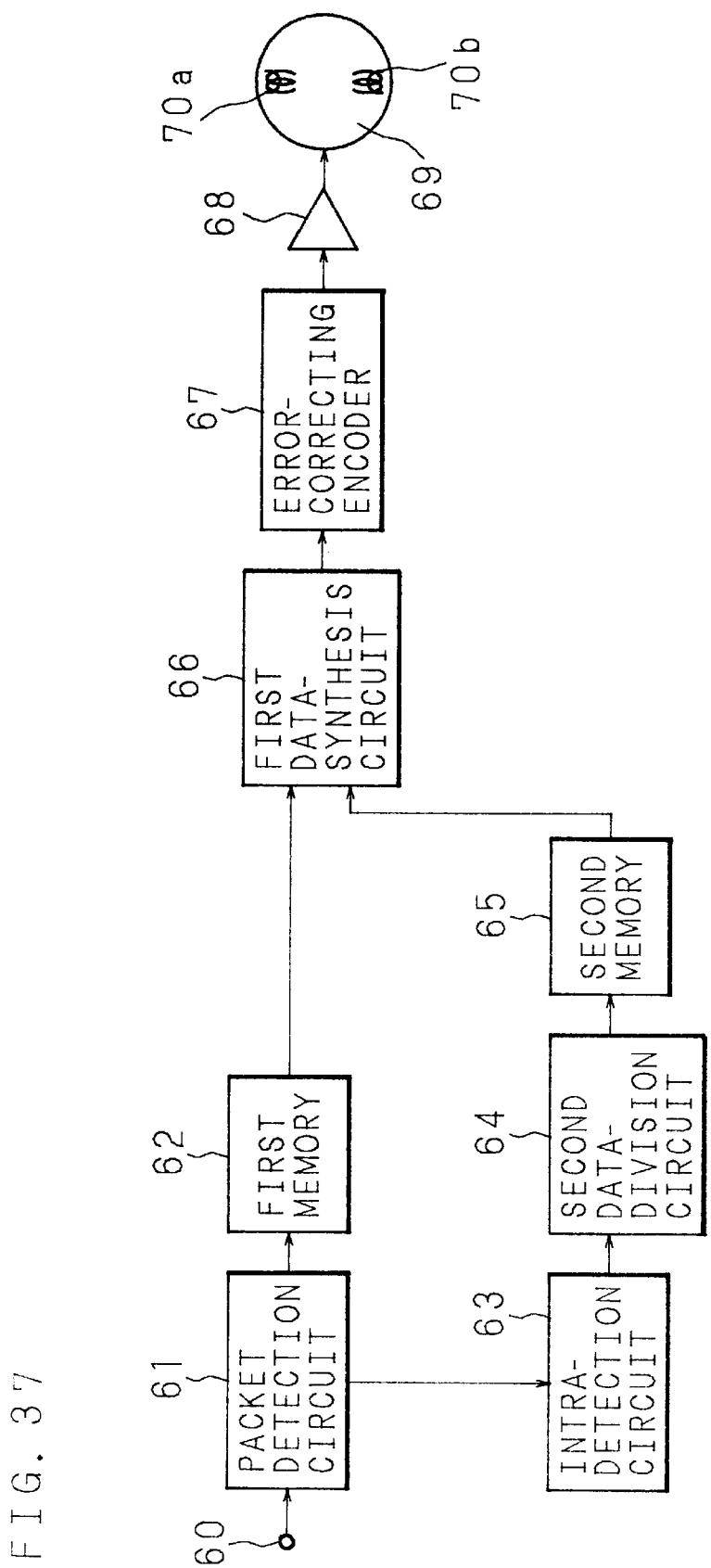
FIG. 37 is a block diagram showing the configuration of a recording system in a digital VTR according to an eighth embodiment of the present invention.

FIG. 37 is a block diagram showing the configuration of a recording system in a digital VTR according to an eighth embodiment of the invention. In the figure, reference numeral 60 is an input terminal via which a digital video signal and a digital audio signal are inputted in bitstream form; 61 is a packet detection circuit for detecting packets of the video signal, audio signal, etc. from the received bitstream; 62 is a first memory for storing the bitstream; 63 is an intra-detection circuit for detecting intra-coded data in the bitstream; 64 is a second data-division circuit for dividing the intra-coded data in accordance with a predetermined rule; 65 is a second memory for storing data outputted from the second data-division circuit 64; 66 is a first data-synthesis circuit for combining data outputted from the first memory 62 and second memory 65 and generating a record data stream; 67 is an error-correcting encoder for appending an error-correcting code to the record data stream outputted from the first data-synthesis circuit 66; 68 is a recording amplifier; 69 is a rotary drum; and 70a and 70b are rotary heads.

Figure 38:
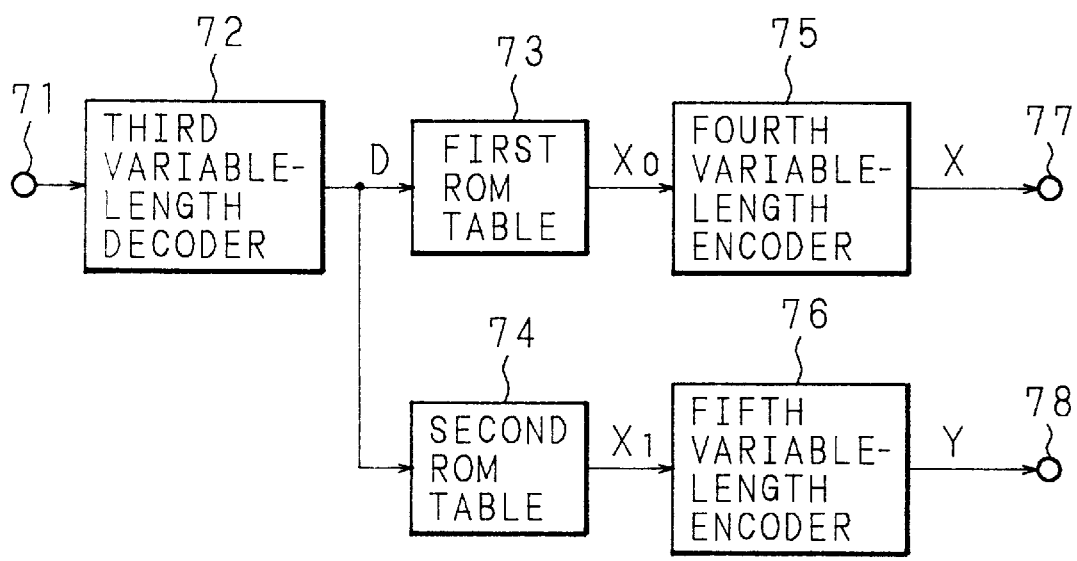
FIG. 38 is a block diagram showing the configuration of a second data-division circuit in FIG. 37.

FIG. 38 is a block diagram of the second data-division circuit 64 shown in FIG. 37. In the figure, reference numeral 71 is an input terminal via which intra-coded bitstream data is inputted; 72 is a third variable-length decoder for variable-length decoding the input bitstream data; 73 is a first ROM table; 74 is a second ROM table; 75 is a fourth variable-length encoder for variable-length encoding input data; 76 is a fifth for variable encoder for variable-length encoding input data; arid 77 arid 78 are output terminals.

Figure 40A:
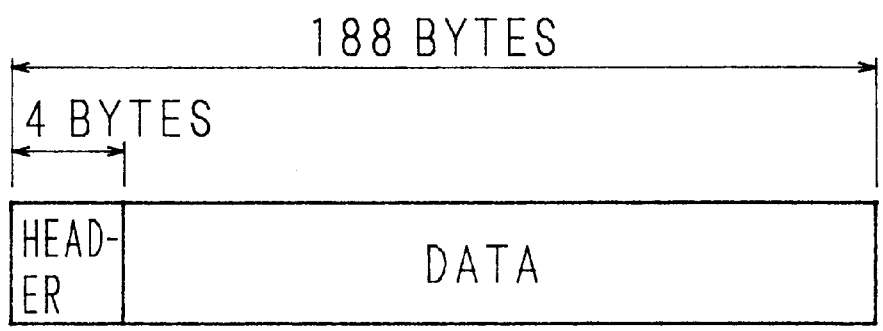
FIGS. 40A and 40B are diagrams showing the format of data packets according to the eighth embodiment.
Figure 40B:
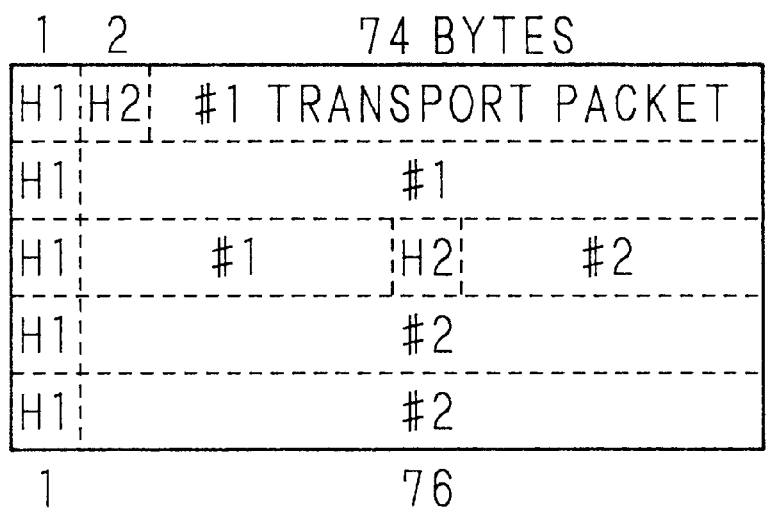
Figure 43:
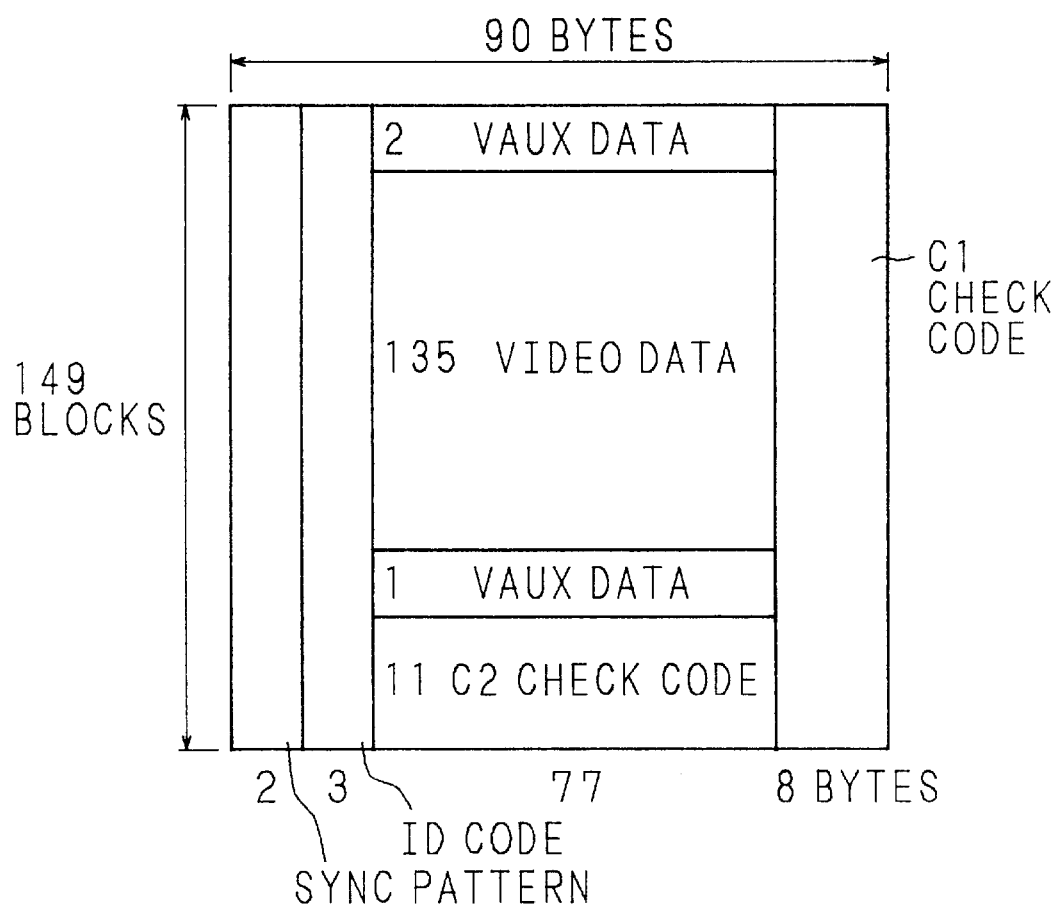
FIG. 43 is a diagram showing a data format within one track of a video signal in the SD standard.

FIG. 39 is a diagram showing the table contents of the first ROM table 73 and second ROM table 74 in FIG. 38. The method of determining the contents will be described in detail later. FIGS. 40A and 40B are diagrams showing data packet formats according to the eighth embodiment. FIG. 40A shows the format of transport packets contained in the input bitstream, and FIG. 40B shows the format of record data packets recorded on a magnetic tape. FIGS. 41A, 41B, and 41C are diagrams for explaining the operation of data division, FIG. 12 is a diagram showing the track format for the digital VTR according to the eighth embodiment, and FIG. 43 is a diagram showing the data format within one track of a video signal according to the SD standard.

Figure 44:
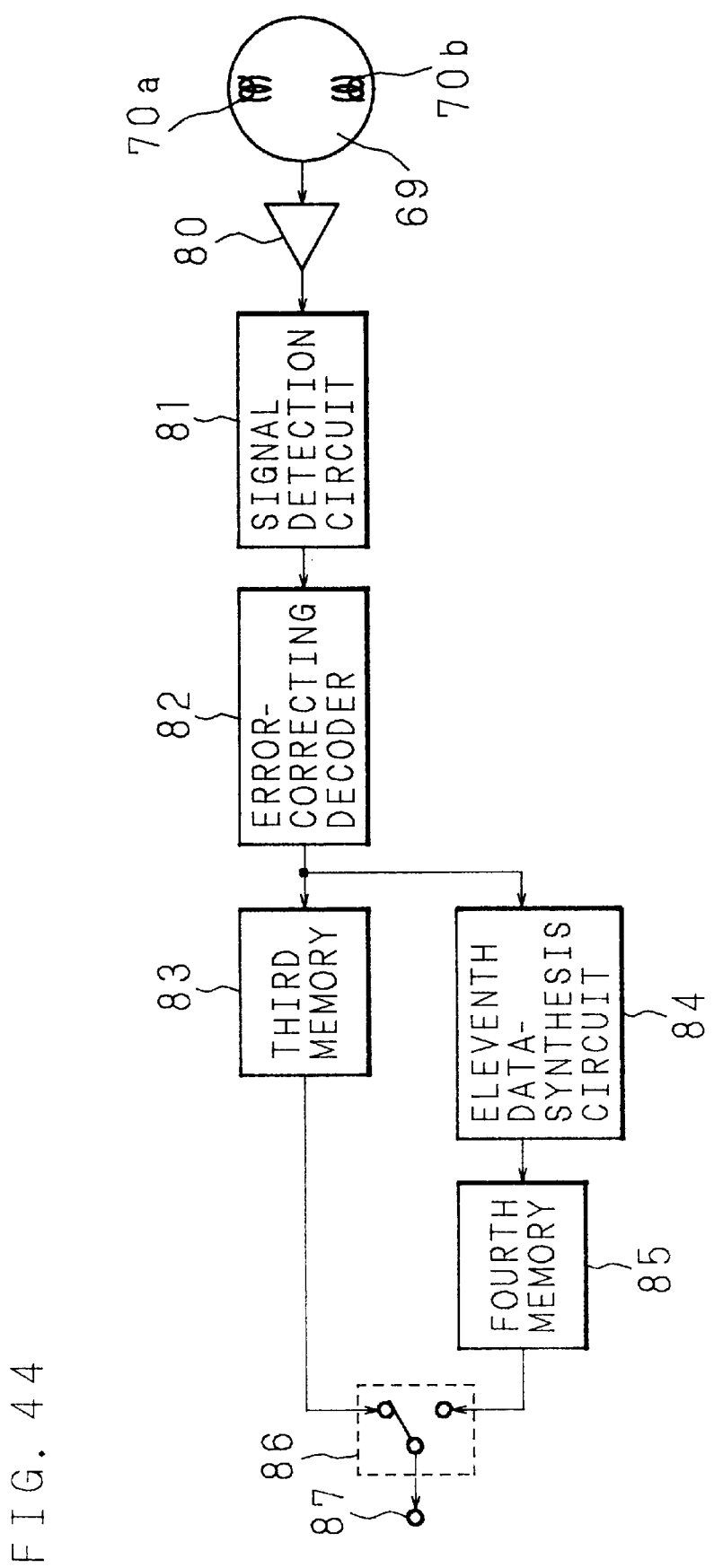
FIG. 44 is a block diagram showing the configuration of a playback system in the digital VTR according to the eighth embodiment.

FIG. 44 is a block diagram showing the configuration of a playback system in the digital VTR according to the eighth embodiment. In the figure, the parts designated by the same reference numerals as those in FIG. 37 are identical in configuration to the corresponding parts shown there, and therefore, description of such parts is omitted here. In FIG. 44, reference numeral 80 is a head amplifier; 81 is a signal detection circuit for detecting digital data from the playback signal and for performing digital decoding; 82 is an error-correcting decoder for correcting or detecting errors in the playback signal; 83 is a third memory; 84 is an 11th data-synthesis circuit for reconstructing the data that was divided for recording; 85 is a fourth memory; 86 is a switch; and 87 is a data output terminal.

Figure 45:
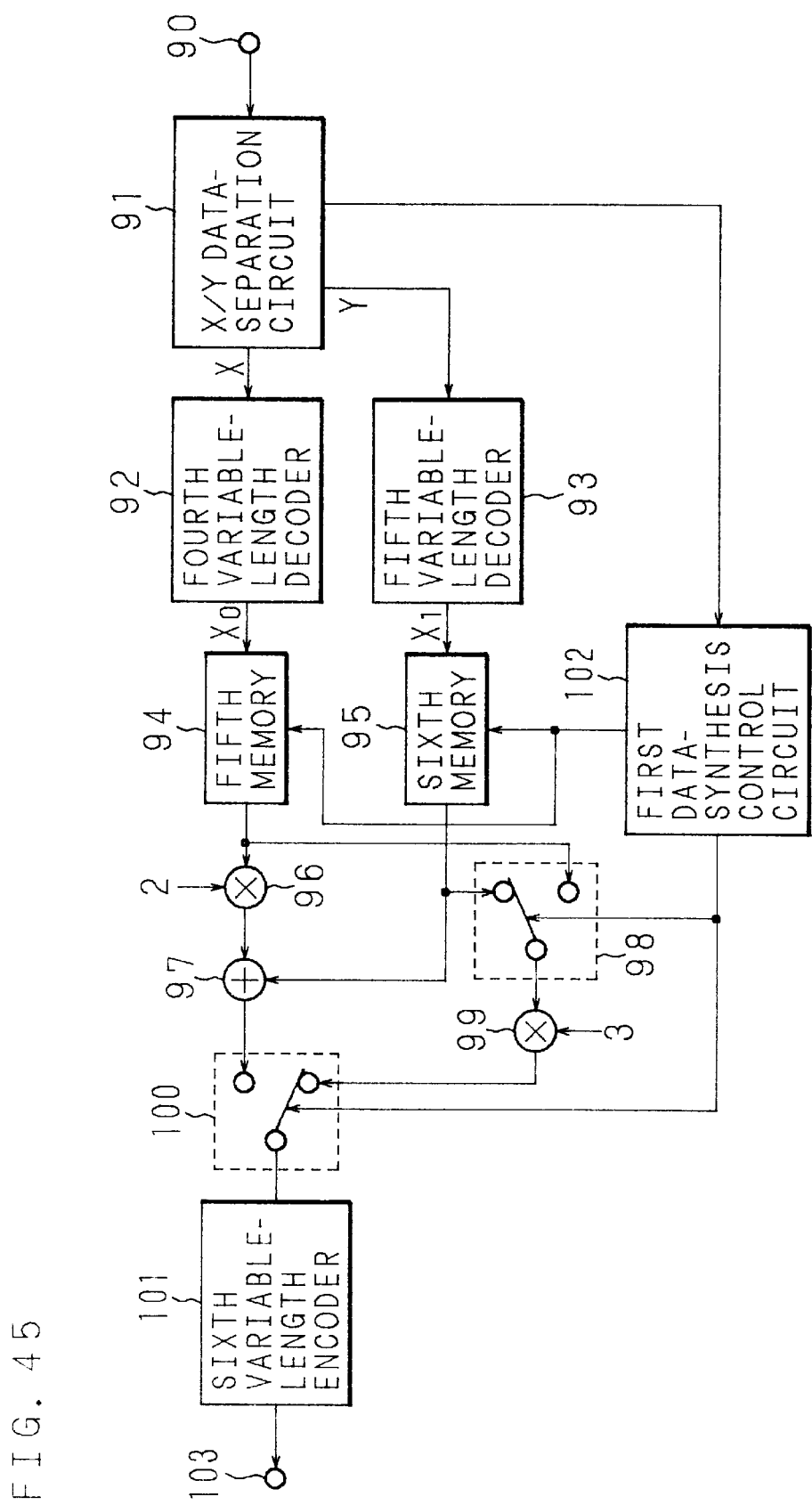
FIG. 45 is a block diagram showing the configuration of an 11th data-synthesis circuit in FIG. 44.

FIG. 45 is a block diagram showing the configuration of the 11th data-synthesis circuit 84 in FIG. 44. In the figure, reference numeral 90 is a data input terminal; 91 is an X/Y data separation circuit for separating X data and Y data from the input data; 92 is a fourth variable-length decoder; 93 is a fifth variable-length decoder; 94 is a fifth memory; 95 is a sixth memory; 96 is a multiplier that multiplies input, data by 2; 97 is an adder; 98 is a switch; 99 is a multiplier that multiplies input data by 3; 100 is a switch; 101 is a sixth variable-length encoder; 102 is a first data-synthesis control circuit; and 103 is an output terminal.

First, the recording operation of the eighth embodiment will be described with reference to FIGS. 37 to 43. The bitstream inputted via the input terminal 60 contains a digital video signal, a digital audio signal, and digital data concerning the video signal and audio signal. They are carried in transport packets whose format is shown in FIG. 40A. Each packet consists of a four-byte header field and a 184-byte data field. In the eighth embodiment, the bit-stream is detected with one transport packet as a unit, and each detected packet of intra-coded data is divided and encoded for recording in the aforementioned duplication area. Therefore, the bitstream inputted via the input terminal 60 is first fed into the packet detection circuit 61, which detects a transport packet and supplies it to the first memory 62 as well as to the intra-detection circuit 63.

In the SD standard, as noted in the description of the prior art, there are 149 sync blocks per track, as areas for recording video data, as shown in FIG. 43, of which three blocks are used as VAUX data recording areas and 11 blocks as error-correcting code recording areas (designated as C2 check code in the figure). Each sync block consists of 90 bytes, of which the first five bytes carry a sync pattern and an ID signal and the last eight bytes carry an error-correcting code (designated as C1 check code). This leaves 77 bytes in each sync block for the recording of data, as shown.

The first memory 62 stores bitstream data on a packet-by-packet basis, and data is read out in the recording data packet format shown in FIG. 40B. In the format of FIG. 40B, when the data length in each sync block is 77 bytes, as stated above, two transport packets are constructed using five sync blocks. In the figure, H1 is a first, header, and H2 is a second header. H1 carries data such as identification data indicating the order of the sync in the five sync blocks. H2 carries data such as identification data for identifying whether the data is video data or audio data. In the eighth embodiment, data read operations from the first, memory 62 and from the second memory 65 herein-after described are performed according to directions from the first data-synthesis circuit 66.

The bitstream output from the packet detection circuit 61 is also inputted to the intra-detection circuit 63. The intra-detection circuit 63 detects whether the data in the transport packet, is intra-coded data or not. As explained in the description of the prior art, in an MPEG2 bitstream, when data is intraframe- or intrafield-coded (intra-coded), intra-transport packets are sent successively. By detecting this, transport packets only of intra-coded data are extracted. Each extracted transport packet is passed to the second data-division circuit 64.

Generally, digital video data carried in the transport packet is variable-length coded data. Therefore, the description of the eighth embodiment is given on the assumption that, the video data in the input bitstream data is variable-length coded. It is also assumed that intra-coded data are data obtained by first applying an orthogonal transform based on DCT and then applying two-dimensional variable-length coding.

The operation of the second data-division circuit 64 will be described below with reference to FIGS. 38, 39, 51A, 41B, and 41C. The intra-coded transport packet detected by the intra-detection circuit 63 is variable-length decoded in the third variable-length decoder 72 to recover the original DCT coefficients D. The output D from the third variable-length decoder 72 is supplied to the first ROM table 73 and second ROM table 74. The following describes the method of data division performed in the first and second ROM tables 73 and 74.

In the data division method used in the eighth embodiment, two output data X0 and X1 are determined with respect to the input data D so that the relation D=2× X0+X1 holds. In determining X0, for a given sequence of D (for example, −1, 0, and 1) the same output code is assigned (0 for the −1, 0, and 1), and for the next sequence of codes (2 and 3) an output code greater by 1 is assigned (1 for the 2 and 3). Based on tare above relation, the first and second ROM tables 73 and 74 construct ROM tables. FIG. 39 shows the contents of the respective conversion ROM tables. The first and second ROM tables 73 and 74 thus divide the input data D into two data X0 and X1.

The above operation will be described in further detail with reference to FIGS. 41A, 41B, and 41C. FIG. 41A shows DCT coefficient data in one DCT block (in the eighth embodiment, it is assumed that one block consists of 8 lines×8 pixels as shown). FIG. 41B shows the X0 data resulting from the division in the first ROM table 73, and FIG. 41C shows the X1 data resulting from the division in the second ROM table 74. For example, the DC value 91 is divided into 31 and 29 (2×31+29=91).

The data divided as described above has the following characteristic. As an example, consider the situation where only X0 data is reproduced for the DC data. When only 31 is reproduced, for example, the original value 91 can be reconstructed approximately by calculating 31×3 (=93). In like manner, when only X1 is reproduced, the original value can be reconstructed approximately by calculating 29×3 (=87). When both X0 and X1 are reproduced, the original value 91 can be reconstructed by calculating 2×31+29 (=91). Similarly, D=−17 is converted into X0=−6 and X1=−5. With X0 alone, −6×3 (=−18), and with X1 alone, −5×3 (=−15), thus reconstructing approximately the original D.

That is, in decoding, when only X0 or X1 is reproduced, the original D can be reconstructed approximately by multiplying the reproduced data by 3, and when both data are reproduced, D can be reconstructed completely by calculating 2×X0+X1.

The operation of the eighth embodiment will be further described below. The X0 data resulting from the division in the first ROM table 73 is reconverted by the fourth variable-length encoder 75 into a variable-length code X. Likewise, the X1 data resulting from the division in the second ROM table 74 is reconverted by the fifth variable-length encoder 76 into a variable-length code Y. Here the contents of the variable-length codes in the fourth and fifth variable-length encoders 75 and 76 may be different from each other.

The variable-length codes X and Y resulting from the division in the second data-division circuit 64 are temporarily stored in the second memory 65. The second memory 65 thus stores temporarily the bitstreams of the X and Y data, and the data are read out in the recording data packet format with one sync block having a 77-byte data length, as in the case of the transport, packet earlier described.

Figure 42:
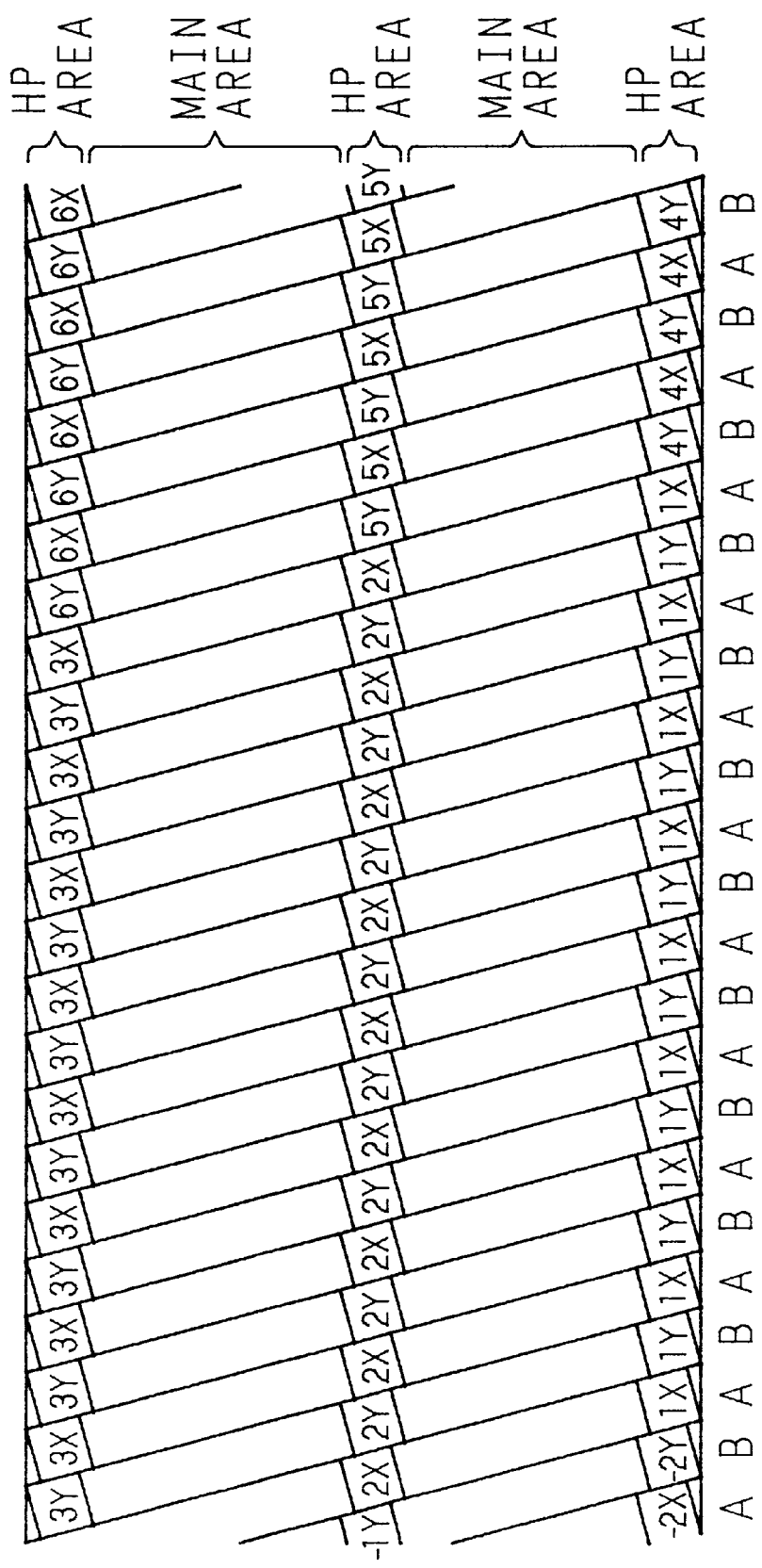
FIG. 42 is a diagram showing a track format employed in a digital VTR according to the eighth embodiment.

Next, the operation of data synthesis in the first data-synthesis circuit 66 will be described with reference to FIG. 42. FIG. 42 is a diagram showing a recording format on a magnetic tape for a digital VTR in one example of the eighth embodiment. In the figure, A and B designate tracks having different azimuth angles. Further, portions labeled identical reference signs in the figure (1X, 1Y, 2X, and so on) hold identical signals recorded thereon. In the eighth embodiment, the arrangement of the main area and the special playback data recording area (hereinafter referred to as the duplication area) on one track is the same as that employed in the prior art shown in FIG. 9. Furthermore, as in the prior art example, the contents of an intra-coded data block outputted from the second memory 65 for the same position on the screen are duplicated in a total of 17 duplication areas. That is, the track format in this embodiment, as in the prior art, can support high-speed shuttle up to 17 times the normal speed.

The data outputted from the first memory 62 and second memory 65 are fed into the first, data-synthesis circuit 66. The first data-synthesis circuit 66 combines the data from the first memory 62 and second memory 65 and produces a track format. The operation of the first data-synthesis circuit 66 will be described below.

The ATV signal bitstream stored in the first memory 62 is carried in transport packet form, two packets together comprising five sync blocks, as previously described, and is read out, one sync block at a time, from the first, memory 62 with prescribed timing for data synthesis for recording in the main area on the recorded track. The first, data-synthesis circuit 66 generates a memory read control signal (providing data read timing) for the first memory 62, and synthesizes data.

On the other hand, the two data X and Y divided in the second data-division circuit 64 and stored in the second memory 65 are read out, alternately track by track with prescribed timing, one sync block (77 bytes) at, a time, so that they are recorded in the recording format shown in FIG. 42. As a result, the X data and Y data for the block at the same position on the divided screen are respectively recorded on two different tracks A and B having different azimuth angles, as shown in FIG. 42.

The data synthesized in the above manner is passed to the error-correcting encoder 67 which appends an error-correcting code. The record data with an error-correcting code appended to it, is then fed into the recording amplifier 68 where it is digitally modulated and amplified for recording on the magnetic tape by the rotary heads 70a and 70b.

Next, the operation of the playback system will be described with reference to FIGS. 44 and 45. First, the normal playback operation will be described. In normal playback, data played back from the magnetic tape by the rotary heads 70a and 70b is amplified by the head amplifier 80 first, and then fed to the signal detection circuit 81 for signal detection, conversion to digital data, and digital demodulation. The digitally demodulated data is inputted to the error-correcting decoder 82 which, using the error-correcting code appended during the recording process, performs detection and correction of errors in the playback signal. The error-corrected data is supplied to the third memory 83 and the 11th data-synthesis circuit 84.

In the third memory 83, the bitstream of the ATV signal is separated from the input data, and only that bitstream is stored in memory. On the other hand, the data supplied to the 11th data-synthesis circuit 84 is first inputted to the X/Y data separation circuit 91 where the X and Y data divided during the recording process are separated from the playback signal. The data separation is performed in the following manner. Since, in the eighth embodiment, the X data is recorded on the track with azimuth angle A and the Y data on the track with azimuth angle B, the position of the duplication area on each track is detected using the sync block number recorded in the ID signal field of the sync block, and the X data or Y data is identified by the azimuth angle of the rotary head currently playing back the signal. If the data X and Y thus divided are recorded in this manner, the X and Y data can be separated easily and accurately without having to provide a special circuit.

The X data thus separated is variable-length decoded by the fourth variable-length decoder 92 into the X0 data, which is temporarily stored into the fifth memory 94. Similarly, the Y data separated in the X/Y data separation circuit 91 is variable-length decoded by the fifth variable-length decoder 93 into the X1 data, which is temporarily stored into the sixth memory 95.

In normal playback, in accordance with X/Y data reproduction information outputted from the X/Y data separation circuit 91, the first data-synthesis control circuit 102 outputs a data read control signal to the fifth and sixth memories 94 and 95 when the X (X0) data and Y (X1) data for the same position on the screen are reproduced. Detailed description is not given here, but a data write control signal given to the fifth and sixth memories 94 and 95 are generated using data separation information outputted from the X/Y data separation circuit 91. When both the X0 and X1 data are reproduced, the switch 100 selects the output of the adder 97. A control signal for the switch 100 is outputted from the first data-synthesis control circuit 102. The X0 data outputted from the fifth memory 94 is multiplied by 2 in the multiplier 96 and supplied to the adder 97. In the adder 97, the output of the multiplier 96 and the output of the sixth memory 95 are added together. In the eighth embodiment, the operation 2×X0+X1 is carried out using the multiplier 96 and the adder 97.

On the other hand, if an error occurs in the playback signal, resulting in the reproduction of only one or the other of the data, X data or Y data, for the same position on the screen, the first data-synthesis control circuit 102 performs control so that data is read out from the memory holding the data successfully reproduced. For example, when only the X data is reproduced, the first data-synthesis control circuit 102 outputs a data read control signal for the fifth memory 94, and at the same time, outputs a select signal to the switch 98 to select the output of the fifth memory 94 and a select signal to the switch 100 to select the output of the multiplier 99. On the other hand, when only the Y data is played back, the first data-synthesis control circuit 102 outputs a data read control signal for the sixth memory 95, and at the same time, outputs a select signal to the switch 98 to select the output of the sixth memory 95 and a select signal to the switch 100 to select the output of the multiplier 99.

The output of the switch 98 is multiplied by 3 in the multiplier 99 and then directed to the switch 100. This carries out 3×X0 (or 3×X1) in the eighth embodiment, thus reconstructing approximately the original value, as described above. The output of the switch 100 is coupled to the sixth variable-length encoder 101 which applies variable-length coding to generate a bitstream. The output of the 11th data-synthesis circuit 84 is temporarily stored in the fourth memory 85. The switch 86 is configured to always select the output of the third memory 83 in normal playback, and the ATV bitstream reconstructed as 188-byte packet information in the third memory 83 is outputted via the output terminal 87.

Next, still-mode operation will be described. Still-motion playback is started in one of two ways, i.e., by moving to the still mode during normal playback, or by selecting the still mode when the VTR is in stop condition. First, description is given of the still-motion operation when the still mode is set during normal playback. When the still mode is selected during normal playback, the playback data stops and no data is inputted either to the third memory 83 or to the 11th data-synthesis circuit 84. Then, the switch 86 switches its input to connect to the output of the fourth memory 85 so that a still picture is outputted at the output terminal 87 of the data in FIG. 40B, data excluding H1 and H2, that is, data in the transport packet, of FIG. 40A is written to the third and fourth memories 83 and 85. Since only intra-coded data synthesized in the 11th data-synthesis circuit 84 is written to the fourth memory 85, data stored in units of transport packets are read out in sequence to perform the still-motion playback.

Next, description is given of the still-motion operation when the still mode is selected when in stop condition. In stop condition, no useful data is stored in either the third memory 83 or the fourth memory 85. When the still mode is selected in this condition, playback is performed once, to store one-picture data in the fourth memory 85, and then, the tape is stopped.

Next, slow-motion operation will be described. In slow-motion playback, the magnetic tape runs at a slower speed than the normal speed, with the head scanning across the same slant track and reading the same portion a number of times. Accordingly, to accomplish the slow-motion playback, only sync blocks correctly demodulated are extracted by the signal detection circuit 81 and error-corrected by the error-correcting decoder 82, intra-coded data recorded in the duplication area is extracted to synthesize a still picture, and data stored in units of transport packets are sequentially read out from the fourth memory 85.

Next, high-speed playback operation will be described with reference to FIG. 46. When a high-speed playback mode signal is inputted, the switch 86 selects the output of the fourth memory 85. The playback data intermittently reproduced by the rotary heads 70a and 70b is first amplified by the head amplifier 80, and then, in the signal detection circuit 81, it is converted into digital data and subjected to digital demodulation. The data correctly demodulated in the signal detection circuit 81 is error-corrected in the error-correcting decoder 82 and inputted to the 11th data-synthesis circuit 84. The data is also supplied to the third memory 83, but since the data is reproduced intermittently, as described above, useful transport packets cannot, be generated. The operation of the 11th data-synthesis circuit 84 will be described below, first for the slower high-speed playback (5 times the normal speed) and then for the faster high-speed playback (17 times the normal speed).

First, we will describe the operation of the playback system in the slower high-speed playback mode (5 times the normal speed). The data supplied to the 11th data-synthesis circuit 84 is first inputted to the X/Y data separation circuit 91. The X/Y data separation circuit 91 separates the X and Y data, divided during the recording process, from the playback signal reproduced intermittently. The data separation method uses the sync block number recorded in the ID signal and the azimuth angle of the rotary heads, as previously described. The separated X data is variable-length decoded by the fourth variable-length decoder 92 into the X0 data, which is temporarily stored into the fifth memory 94. Similarly, the Y data separated in the X/Y data separation circuit 91 is variable-length decoded by the fifth variable-length decoder 93 into the X1 data, which is temporarily stored into the sixth memory 95.

Figure 46:
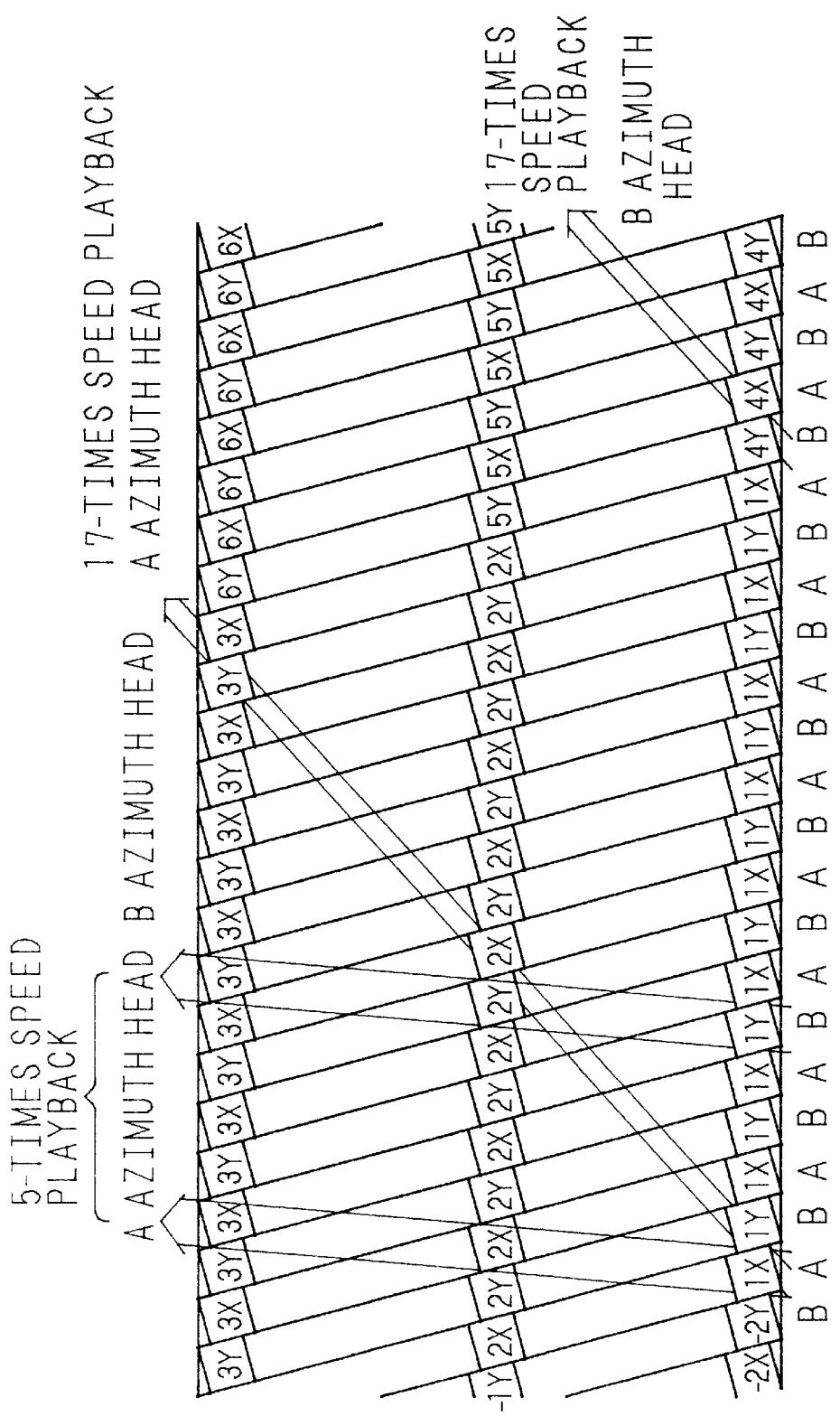
FIG. 46 is a diagram showing the scan paths of rotary heads when playback is performed at speeds five times and 17 times the normal speed on the digital VTR according to the eighth embodiment.

As shown in FIG. 46, in the 5-times speed playback, both the X and Y data recorded in separate duplication areas can be reproduced. That is, data pairs, 1X and 1Y, 2X and 2Y, 3X and 3Y, and so on, are reproduced. In accordance with X/Y data reproduction information outputted from the X/Y data separation circuit 91, the first data-synthesis control circuit 102 outputs a data read control signal to the fifth and sixth memories 94 and 95 when the X (X0) data and Y (X1) data for the same position on the screen are reproduced. Since both the X0 and X1 data are reproduced in the 5-times speed playback, as shown in FIG. 46, the switch 100 selects the output of the adder 97. The X0 data outputted from the fifth memory 94 is multiplied by 2 in the multiplier 96 and supplied to the adder 97. In the adder 97, the output of the multiplier 96 and the output of the sixth memory 95 are added together. The original data can therefore be reconstructed completely. The output of the switch 100 is variable-length encoded in the sixth variable-length encoder 101 and stored in the fourth memory 85. Then, from the fourth memory 85, intra-coded data are read out sequentially in units of transport packets.

Next, the operation of the 11th data-synthesis circuit 84 in the faster high-speed playback (17 times the normal speed) will be described. In the 17-times speed playback, of the data recorded in the duplication areas either X or Y data is reproduced, as shown in FIG. 46. That is, with 1X, 2X, 3X, 4Y, etc. in FIG. 46 reproduced, the 11th data-synthesis circuit 84 synthesizes a high-speed playback picture using reproduced information of either X or Y data outputted from the X/Y data separation circuit 91. The operation of the 11th data-synthesis circuit 84 will be described in further detail below.

When only one or other of the X/Y data representing the same position on the screen is reproduced, as described above, the first data-synthesis control circuit 102 performs control so that data is read out, from the memory holding the data successfully reproduced. For example, when only the X data is reproduced, the first data-synthesis control circuit 102 outputs a data read control signal for the fifth memory 94, and at the same time, outputs a select signal to the switch 98 to select the output of the fifth memory 94 and a select signal to the switch 100 to select the output of the multiplier 99. On the other hand, when only the Y data is reproduced, the first data-synthesis control circuit 102 outputs a data read control signal for the sixth memory 95, and at the same time, outputs a select signal to the switch 98 to select the output of the sixth memory 95 and a select signal to the switch 100 to select the output of the multiplier 99.

The output of the switch 98 is multiplied by 3 in the multiplier 99 and then directed to the switch 100. The output of the switch 100 is supplied to the sixth variable-length encoder 101 which applies variable-length coding to generate a bitstream. The output of the 11th data-synthesis circuit 84 is temporarily stored in the fourth memory 85. Then, from the fourth memory, intra-coded data are read out sequentially in units of transport packets.

As described, the input data D is divided into the X data and Y data for recording in the duplication areas, as shown in FIG. 42. It was confirmed, in the image data simulation we carried out, that when data is divided into two portions for recording, as in the present embodiment, the same amount of data can be transmitted at about 65% of the data capacity that would be required when transmitting the same data twice. In the present embodiment, the total data transmission rate of the X and Y data, each encoded after dividing all input DCT block data for one frame into two portions by the above method, was compared with the total transmission rate when the input data was directly encoded and transmitted twice.

Thus, using the duplication areas, the present embodiment can transmit about 1.5 times as much data as the prior art can, which means that higher-frequency DCT coefficient data can also be transmitted. In the still-motion, slow-motion, and slower high-speed playback modes that can playback both the X and Y data, therefore, a significant increase in playback picture quality can be achieved since DCT coefficients including higher-frequency coefficients can be transmitted as compared with the prior art method. In the faster high-speed playback mode that can only playback either one or the other of the divided data, picture quality comparable to that in the prior art can be obtained since the original value can be reconstructed almost completely using the X data or Y data as described above.

Furthermore, in the eighth embodiment, the two data portions are recorded as shown in FIG. 42, and since the position of the duplication area is identified using the sync block number recorded in the ID signal field of the sync block and the X data and Y data are each identified using the azimuth angle of the rotary head, it is possible to identify the X data and Y data without having to append a special signal. Moreover, since the X and Y data are identified using the azimuth angle of the rotary head, the data can be identified in a simple manner without having to add a special identification circuit in the playback system. This serves to reduce the circuit complexity.

In the eighth embodiment, the two data, X data and Y data, are arranged on the magnetic tape as shown in FIG. 42, but the arrangement is not limited to the illustrated example and a different arrangement may be employed. For example, an identification signal for each of the X data and Y data may be recorded in the H1 or H2 area shown in FIG. 40B. In any way, if the X data and Y data can be identified, the same effect can be achieved.

Embodiment 9

Figure 48:
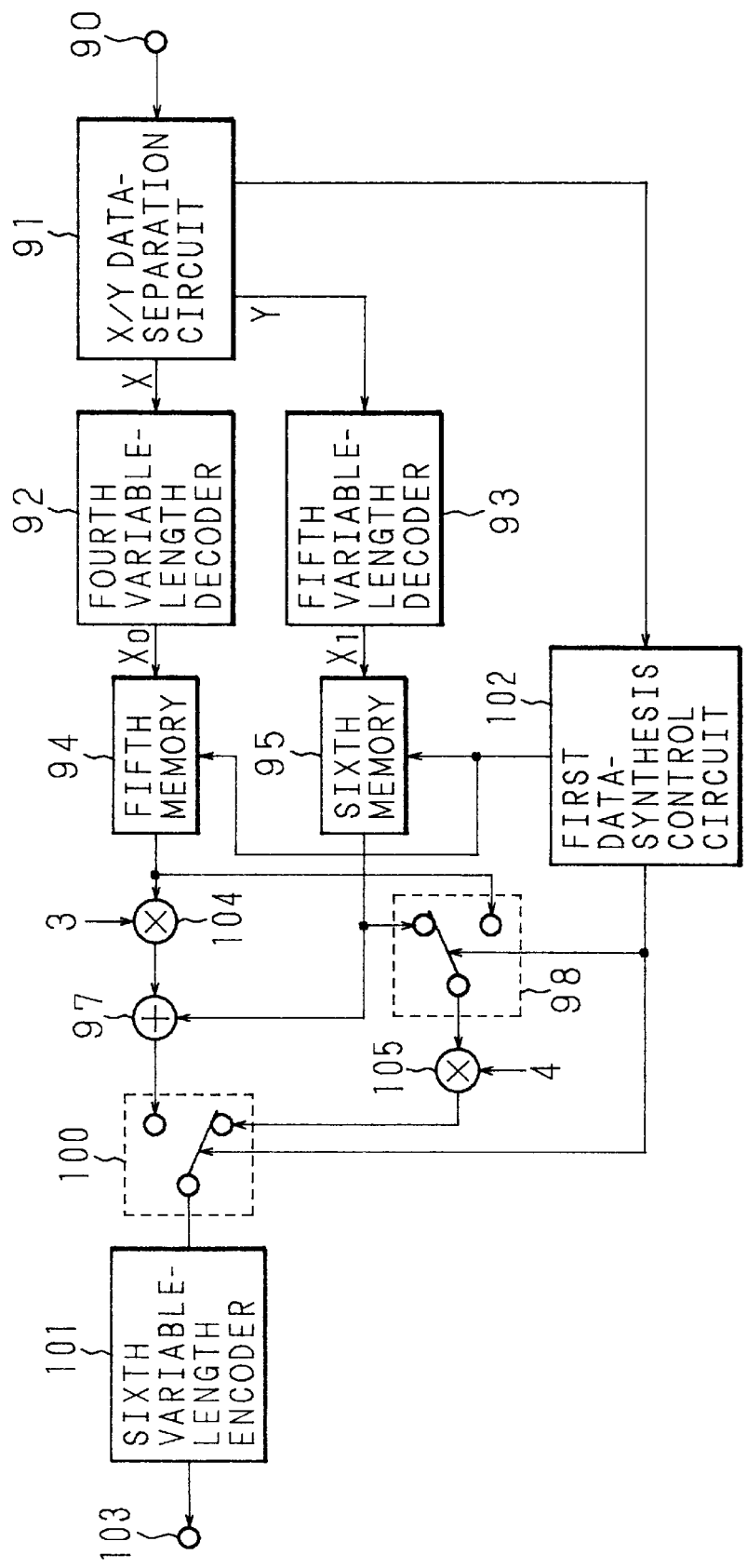
FIG. 48 is a block diagram showing the configuration of an 11th data-synthesis circuit according to the ninth embodiment.

Since the ninth embodiment hereinafter described differs from the eighth embodiment only in the method of division, description will be given only of the second data-division circuit 64 and the 11th data-synthesis circuit 84. FIG. 47 is a diagram showing the contents of the first, ROM table 73 and second ROM table 74 in the second data-division circuit, 64 according to the ninth embodiment. FIG. 48 is a block diagram showing the configuration of the 11th data-synthesis circuit 84 according to the ninth embodiment. In FIG. 48, the parts designated by the same reference numerals as those in the eight embodiment are identical in configuration and operation to the corresponding parts described in the eighth embodiment, and therefore, their detailed description will be omitted here. In FIG. 48, reference numeral 104 is a multiplier for multiplying input data by 3, and 105 is a multiplier for multiplying input data by 4.

The operation of the second data-division circuit 64 will be described below with reference to FIGS. 38 and 47. The intra-coded transport packet detected by the intra-detection circuit 63 is variable-length decoded by the third variable-length decoder 72 to recover the original DCT coefficients D. The output D from the third variable-length decoder 72 is supplied to the first ROM table 73 and second ROM table 74. The following describes the method of data division performed in the first and second ROM tables 73 and 74.

Similarly to the eighth embodiment, in the data division method used in the ninth embodiment, two output data X0 and X1 are determined with respect to the input data D so that the relation D=3×X0+X1 holds. In determining X0, for a given sequence of D (for example, −2, −1, 0, 1, and 2) the same output code is assigned (0 for the −2, −1, 0, 1, and 2), and for the next sequence of codes (3, 4, and 5) an output code greater by 1 is assigned (1 for the 3, 4, and 5). Based on the above relation, the first and second ROM tables 73 and 74 construct ROM tables. FIG. 47 shows the contents of the respective conversion ROM tables. The first and second ROM tables 73 and 74 thus divide the input data D into two data X0 and X1.

The above operation will be described in further detail using numeric values. Suppose, for example, a value 91 is inputted to the second data-division circuit 64. The value 91 is divided into 23 and 22 (3×23+22=91). The data thus divided has the following characteristic. As an example, consider the situation where only X0 data is reproduced. When only 23 is reproduced, the original value 91 can be reconstructed almost completely by calculating 23×4 (=92). In like manner, when only X1 is reproduced, the original value can be reconstructed almost completely by calculating 22×4 (=88). When both X0 and X1 are reproduced, the original value 91 can be reconstructed by calculating 3×23+22 (=91).

That is, in decoding, when only X0 or X1 is reproduced, the original D can be reconstructed almost completely by multiplying the reproduced data by 4, and when both data are reproduced, D can be reconstructed completely by calculating 3×X0+X1.

The operation of the ninth embodiment will be further described below. The X0 data resulting from the division in the first ROM table 73 is reconverted by the fourth variable-length encoder 75 into a variable-length code X. Likewise, the X1 data resulting from the division in the second ROM table 74 is reconverted by the fifth variable-length encoder 76 into a variable-length code Y. Here the contents of the variable-length codes in the fourth and fifth variable-length encoders 75 and 76 may be different, from each other. Needless to say, the contents of either code is different from the variable-length codes in the eighth embodiment.

The variable-length codes X and Y resulting from the division in the second data-division circuit 64 are temporarily stored in the second memory 65. The second memory 65 thus stores temporarily the bitstreams of the X and Y data, and the data are read out in the record data packet format with one sync block having a 77-byte data length, as in the case of the transport packet earlier described. The subsequent circuit operation and the recording format on the magnetic tape of the main data and the two duplication data are the same as the eighth embodiment, and therefore, description thereof is omitted here.

Next, the operation of the 11th data-synthesis circuit 84 in playback will be described with reference to FIG. 48. The data supplied to the 11th data-synthesis circuit 84 is first inputted to the X/Y data separation circuit 91 where the X and Y data divided during the recording process are separated from the playback signal. The data separation is performed in the same manner as in the eighth embodiment.; that is, since the X data is recorded on the track with azimuth angle A and the Y data on the track with azimuth angle B, as shown in FIG. 42, the position of the duplication area on each track is detected using the sync block number recorded in the ID signal field of the sync block, and the X data or Y data is identified by the azimuth angle of the rotary head currently playing back the signal.

The separated X data is variable-length decoded by the fourth variable-length decoder 92 into the X0 data, which is temporarily stored into the fifth memory 94. Similarly, the Y data separated in the X/Y data separation circuit 91 is variable-length decoded by the fifth variable-length decoder 93 into the X1 data, which is temporarily stored into the sixth memory 95.

In normal playback, in accordance with X/Y data reproduction information outputted from the X/Y data separation circuit 91, the first data-synthesis control circuit 102 outputs a data read control signal to the fifth and sixth memories 94 and 95 when the X (X0) data and Y (X1) data for the same position on the screen are reproduced. As in the eighth embodiment, at data write control signal given to the fifth and sixth memories 94 and 95 are generated using data separation information outputted from the X/Y data separation circuit 91. When both the X0 and X1 data are reproduced, the switch 100 selects the output of the adder 97. A control signal for the switch 100 is outputted from the first data-synthesis control circuit 102. The X0 data outputted from the fifth memory 94 is multiplied by 3 in the multiplier 104 and supplied to the adder 97. In the adder 97, the output of the multiplier 104 and the output of the sixth memory 95 are added together. In the ninth embodiment, the operation 3×X0+X1 is carried out using the multiplier 104 and the adder 97.

On the other hand, if an error occurs in the playback signal, resulting in the reproduction of only one or the other of the data, X data or Y data, for the same position on the screen, the first data-synthesis control circuit 102 performs control so that data is read out from the memory holding the data successfully reproduced. For example, when only the X data is reproduced, the first data-synthesis control circuit 102 outputs a data read control signal for the fifth memory 94, and at the same time, outputs a select signal to the switch 98 to select the output of the fifth memory 94 and a select signal to the switch 100 to select the output of the multiplier 105. On the other hand, when only the Y data is reproduced, the first data-synthesis control circuit 102 outputs a data read control signal for the sixth memory 95, and at the same time, outputs a select signal to the switch 98 to select the output of the sixth memory 95 and a select signal to the switch 100 to select the output of the multiplier 105.

The output of the switch 98 is multiplied by 4 in the multiplier 105 and then directed to the switch 100. This carries out 4×X0 (or 4×X1) in the ninth embodiment, thus reconstructing the value approximately equal to the original value, as described above. The output of the switch 100 is supplied to the sixth variable-length encoder 101 which applies variable-length coding to generate a bitstream. The output of the 11th data-synthesis circuit 84 is temporarily stored in the fourth memory 85. The switch 86 is configured to always select the output of the third memory 83 in normal playback, and the ATV bitstream reconstructed as 188-byte packet information in the third memory 83 is outputted via the output terminal 87.

The subsequent operation of the playback system is the same as described in the eighth embodiment, and therefore, description thereof is omitted here. The operation in special playback modes, such as still-motion, slow-motion, and slower high-speed and faster high-speed playback, is also the same as described in the eighth embodiment, and therefore, description thereof is omitted here.

As described, the input data D is divided into the X data and Y data for recording in the duplication areas as shown in FIG. 42 in accordance with the rule shown in FIG. 47. It was confirmed, in the image data simulation we carried out, that when data is divided into two portions for recording in accordance with the rule $D=3\times X0+X1$, as in the ninth embodiment, the same amount of data can be transmitted at about 60% of the data capacity that would be required when transmitting the same data twice. The simulation was carried out under the same condition as in the eighth embodiment.

Thus, using the duplication areas, the present embodiment can transmit about 1.6 times as much data as the prior art can, which means that higher-frequency DCT coefficient data can also be transmitted. In the still-motion, slow-motion, and slower high-speed playback modes that can playback both the X and Y data, therefore, a significant improvement in playback picture quality can be achieved as compared with the prior art method, since DCT coefficients including higher-frequency coefficients can be transmitted. In the faster high-speed playback mode that can only playback either one or the other of the data, picture quality comparable to that in the prior art can be obtained since, as in the eighth embodiment, the original value can be reconstructed almost completely using the X data or Y data as described above.

Furthermore, in the ninth embodiment, as in the eighth embodiment, the two data portions are recorded as shown in FIG. 42, and since the position of each duplication area is identified using the sync block number recorded in the ID signal field of the sync block and the X data and Y data are each identified using the azimuth angle of the rotary head, it is possible to identify the X data and Y data without having to append a special signal. Moreover, since the X and Y data are identified using the azimuth angle of the rotary head, the data can be identified in a simple manner without having to add a special identification circuit in the playback system. This serves to reduce the circuit complexity.

The eighth and ninth embodiments described above have dealt with examples in which the input data D is divided into two portions in accordance with the rule $D=2\times X0+X1$ or $D=3\times X0+X1$, but the data division method is not limited to the illustrated examples. For example, if one input code is divided into two input codes so that the relation $A\times X0+B\times X1$ (A and B are real numbers), such as $D=X0+X1$, $D=2\times X0+3\times X1$, etc., holds, a significant improvement in picture quality in the above special playback modes can be achieved as compared with the prior art digital VTR that records the same data two or more times in duplication areas.

Embodiment 10

In the eighth and ninth embodiments, the intra-coded input data D detected by the intra-detection circuit 63 was divided into two output codes and recorded in respectively predetermined duplication areas as shown in FIG. 42. Instead of dividing the data into two portions, there are other methods that divide the input data into three or more portions for recording. One such method will be described in the 10th embodiment below in which the input data D is divided into four portions for recording and playback. The description of the 10th embodiment will deal only with the method of division (division table).

In the 10th embodiment, the input data D is divided into four portions in accordance with the rule $D=4\times X0+2\times X1+2\times X2+X3=2\times(2\times X0+X1)+(2\times X2+X3)$. That is, after the input data D is divided as $D=2\times D0+D1$, D0 and D1 are further divided in accordance with the rules $D0=2\times X0+X1$ and $D1=2\times X2+X3$, respectively. As a result, the input data D is divided into four data, X0, X1, X2, and X3.

Figure 49:
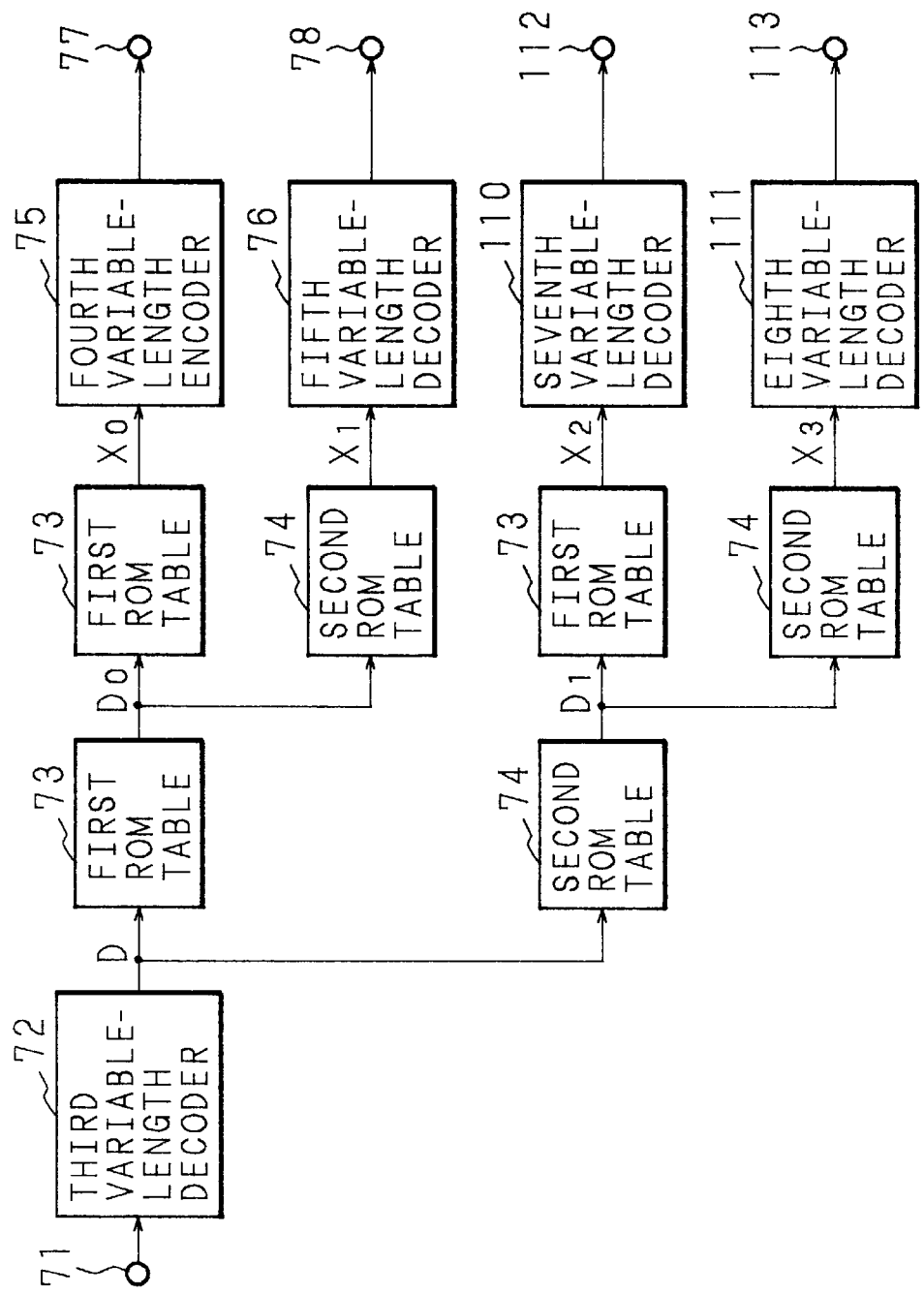
FIG. 49 is a block diagram showing the configuration of a second data-division circuit according to a 10th embodiment of the present invention.

FIG. 49 is a block diagram showing the configuration of the second data-division circuit 64 according to the 10th embodiment. In the figure, the parts designated by the same reference numerals as those in the eighth embodiment are identical in configuration and operation to the corresponding parts in the eighth embodiment, and therefore, their detailed description is omitted here. In FIG. 49, reference numeral 110 is a seventh variable-length encoder, 111 is an eighth variable-length encoder, and 112 and 113 are output terminals.

The operation of the second data-division circuit 64 will be described with reference to FIG. 49. Each intra-coded transport packet detected by the intra-detection circuit 63 is decoded by the third variable-length decoder 72 to recover the original DCT coefficient data D. The output D of the third variable-length decoder 72 is supplied to the first ROM table 73 and the second ROM table 74. The first ROM tables 73 and the second ROM tables 74, respectively designated by the same reference numerals in the figure, have the same ROM table contents. In the 10th embodiment, the contents of the respective ROM tables are the same as the corresponding ROM tables shown in FIG. 39.

In the 10th embodiment, using the first and second ROM tables 73 and 74 in the first stage, the input data D is divided into D0 and D1, as described above. This division is performed so that the relation $D=2\times D0+D1$ holds. The data D0 and D1 resulting from the division in accordance with the first and second ROM tables 73 and 74 in the first stage are further divided into X0 and X1, and X2 and X3, respectively, using the first and second ROM tables 73 and 74 in the subsequent stage. These divisions are performed so that the relations $D0=2\times X0+X1$ and $D1=2\times X2+X3$, respectively, hold. The method of determining the ROM contents of the first and second ROM tables 73 and 74 is the same as that of the eighth embodiment, therefore, explanation of the method will be omitted here.

As in the eighth embodiment, an example will be described below in which a value 91, for example, is divided in the second data-division circuit 64. First, D=91 is divided into D0=31 and D1=29 ($2\times 31+29=91$). The resulting D0=31 is further divided into X0=11 and X1=9 ($2\times 11+9=31$), and D1=29 into X2=10 and X3=9 ($2\times 10+9=29$).

The data thus divided has the following characteristic. For example, when only the X0 data is reproduced, the original value can be reconstructed almost completely by calculating $9\times X0$ ($9\times 11=99$). Similarly, when only one of the other data, X1, X2, or X3, is reproduced, the original value can be reconstructed almost completely by calculating $9\times 9$ (=81), $9\times 10$ (=90), or $9\times 9$ (=81), respectively. That is, $9\times Xi$ (i=0, 1, 2, 3) is calculated. Further, when X0 and X1 are reproduced, the original value of D can be reconstructed almost completely by calculating $3\times(2\times X0+X1)=3\times(2\times 11+9)=93$; when X2 and X3 are reproduced, the original value of D can be reconstructed almost completely by calculating $3\times(2\times X2+X3)=3\times(2\times 10+9)=87$. When X0 and X2 are reproduced (that is, when one split data from D0 and one split data from D1 are reproduced), the original value of D can be reconstructed almost completely by calculating $2\times 3\times X0+3\times X2=2\times 3\times 11+3\times 10=99$ (that is, $2\times 3\times$ one split data from $D0+3\times$one split data from D1). When three data are reproduced, the values of D0 and D1 are reconstructed using the three data, to recover the original value of D. For example, when X3 was not reproduced, then $D0=2\times 11+9=31$ and $D1=3\times 10=30$, which gives $D=2\times 31+30=92$, thus reconstructing the value approximately equal to the value of D. When all four data are reproduced, then D0=2×11+9=31 and D1=2×10+9=29, so that the value of D can be reconstructed by calculating D=2×31+29=91.

That is, when any one of the data, X0, X1, X2, or X3, is reproduced, the original D can be reconstructed almost completely by the above method using the reproduced data (this may be one, two, or three data), and when all four data are reproduced, D can be reconstructed completely by performing the above calculation. As described, using all reproduced data, a value closest, possible to the original value of D is obtained. This improves playback picture quality.

The operation of the second data-division circuit 64 in the 10th embodiment will be described in further detail below. The X0 data resulting from the division in the first ROM table 73 is reconverted by the fourth variable-length encoder 75 into a variable-length code, while the X1 data resulting from the division in the second ROM table 74 is reconverted by the fifth variable-length encoder 76 into a variable-length code. Similarly, the X2 data resulting from the division in the first ROM table 73 is reconverted by the seventh variable-length encoder 110 into a variable-length code, while the X3 data resulting from the division in the second ROM table 74 is reconverted by the eighth variable-length encoder 111 into a variable-length code. The contents of the variable-length codes in the fourth variable-length encoder 75, fifth variable-length encoder 76, seventh variable-length encoder 110, and eighth variable-length encoder 111 may be different from one another.

The subsequent operation of the playback system is the same as that described in the eighth embodiment, the only difference being in the operation of the 11th data-synthesis circuit, and therefore, description thereof is omitted here. Further, the 11th data-synthesis circuit 84 only operates to restore the input data D in the above manner according to the playback condition of the four data, and therefore, detailed description of its operation will not be given here. Furthermore, the operation in the still-motion, slow-motion, slower high-speed playback and faster high-speed playback modes is the same as previously described, and therefore, description thereof is omitted here.

As described, the input data D is divided into four data for recording in accordance with the above-described rule. It was confirmed, in the image data simulation we carried out, that according to the above method, the same amount of data can be transmitted at about 39% of the data capacity required by the prior art digital VTR that writes the same intra-coded data four times in duplication areas. The simulation was carried out using the same condition as used in the eighth embodiment.

Thus, using the duplication areas, the present embodiment can transmit about 2.6 times as much data as the prior art can, which means that higher-frequency DCT coefficient data can also be transmitted. In the still-motion, slow-motion, and slower high-speed playback modes that can playback both the X and Y data, therefore, a significant improvement in playback picture quality can be achieved as compared with the prior art method, since DCT coefficients including higher-frequency coefficients can be transmitted. In the faster high-speed playback mode that can only playback either one or the other of the data, picture quality comparable to that in the prior art can be obtained since, as in the eighth embodiment, if any one of the data can be reproduced, the original value can be reconstructed almost completely using the reproduced data.

In the 10th embodiment, unlike the eighth embodiment, the input data is divided into four portions for recording, and the four data portions are separated for playback. To enable each of the four data portions to be separated, a sync block number indicating the position of the duplication area is recorded in the ID signal field of the sync block, and an identification code for identifying what data portion is carried in the sync block is recorded in the H1 or H2 header field of the sync block.

In the 10th embodiment, the second data-division circuit 64 for dividing the data into four portions has been described as being constructed as shown in the block diagram of FIG. 49, but the construction is not limited to the illustrated example. For example, the circuit may be constructed by arranging four conversion ROM tables in parallel, or by using random logic, microcomputer, or the like. Any of such configurations can provide the same effect as described above.

The 10th embodiment described above has dealt with a case where all data portions are used to recover the original value, but the present embodiment is not limited to the illustrated case. To reduce the circuit complexity, it may be so configured that when all data portions are not reproduced, one of reproduced data portions is used to approximately reconstruct the original D.

The eighth, ninth, and 10th embodiments have each dealt with an example in which the input data D is divided in accordance with the rule D=2×X0+X1, D=3×X0+X1, or D=4×X0+2×X1+2×X2+X3, respectively, but the method of division is not limited to the illustrated examples. Generally, when dividing the input data D into n data, X0, X1, ..., Xn−1 (n is 2 or a larger integer), if the rule is made so that the relationship between the input digital data D and the output digital data X0, X1, ..., Xn−1 is expressed as D=K0×X0+K1×X1+ ... +Kn−1×Xn−1 (K0, K1, ..., Kn−1 are real numbers) to enable the input digital data to be uniquely determined by X0, X1, ..., Xn−1, a larger amount of data (higher-frequency data) can be transmitted than by the prior art digital VTR that records the same data in duplication areas two or more times, and accordingly, a significant improvement in picture quality can be achieved in any of the above-mentioned special playback modes.

Embodiment 11

In an 11th embodiment, the divided data are recorded on a magnetic tape in a different recording format from the one shown in FIG. 42. The recording format employed in the 11th embodiment will be described below with reference to FIG. 50. The recording system and playback system in the 11th embodiment are identical in configuration to those shown in FIGS. 37, and 44, and their description is omitted here. Further, the second data-division circuit 64 and the 11th data-synthesis circuit 84 are identical in configuration to the corresponding parts shown in FIGS. 38 and 45, and description thereof is omitted here. In the 11th embodiment, the D=2×X0+X1 method, the same method as used in the eighth embodiment, will be employed as the data division method.

The bitstream inputted via the input terminal 60 is fed to the packet detection circuit 61, which detects a transport packet and supplies it to the first memory 62 and the intra-detection circuit 63. As previously described, there are 149 sync blocks per track, as areas for recording video data, of which three blocks are used as VAUX data recording areas and 11 blocks as error-correcting code recording areas. Each sync block consists of 90 bytes, of which the first five bytes carry a sync pattern and an ID signal and the last eight bytes carry an error-correcting code. This leaves 77 bytes in each sync block for the recording of data.

The first memory 62 stores bitstream data on a packet-by-packet, basis, and, as in the eighth embodiment, the data is read out in the recording data packet format shown in FIG. 40B. In the format of FIG. 40B, when the data length in each sync block is 77 bytes, as described above, two transport packets are constructed using five sync blocks. In the figure, H1 is a first header, and H2 is a second header. These headers are the same as described in the eighth embodiment, and therefore, description thereof is omitted here.

The bitstream output from the packet detection circuit 61 is also inputted to the intra-detection circuit 63. The intra-detection circuit 63 detects whether the data in the transport packet is intra-coded data or not. In an MPEG2 bitstream, when data is intraframe- or intrafield-coded (intra-coded), as described above, intra-transport packets are sent successively. By detecting this, transport packets only of intra-coded data are extracted. Each extracted transport packet is passed to the second data-division circuit 64. In the second data-division circuit 64, the input intra-coded data is divided into two portions in accordance with the rule D=2×X0+X1, as in the eighth embodiment.

The variable-length codes X and Y resulting from the division in the second data-division circuit 64 are temporarily stored in the second memory 65. The second memory 65 thus stores temporarily the bitstreams of the X and Y data, and the data are read out in the recording data packet format with one sync block having a 77-byte data length, as in the case of the transport packet earlier described.

Figure 50:
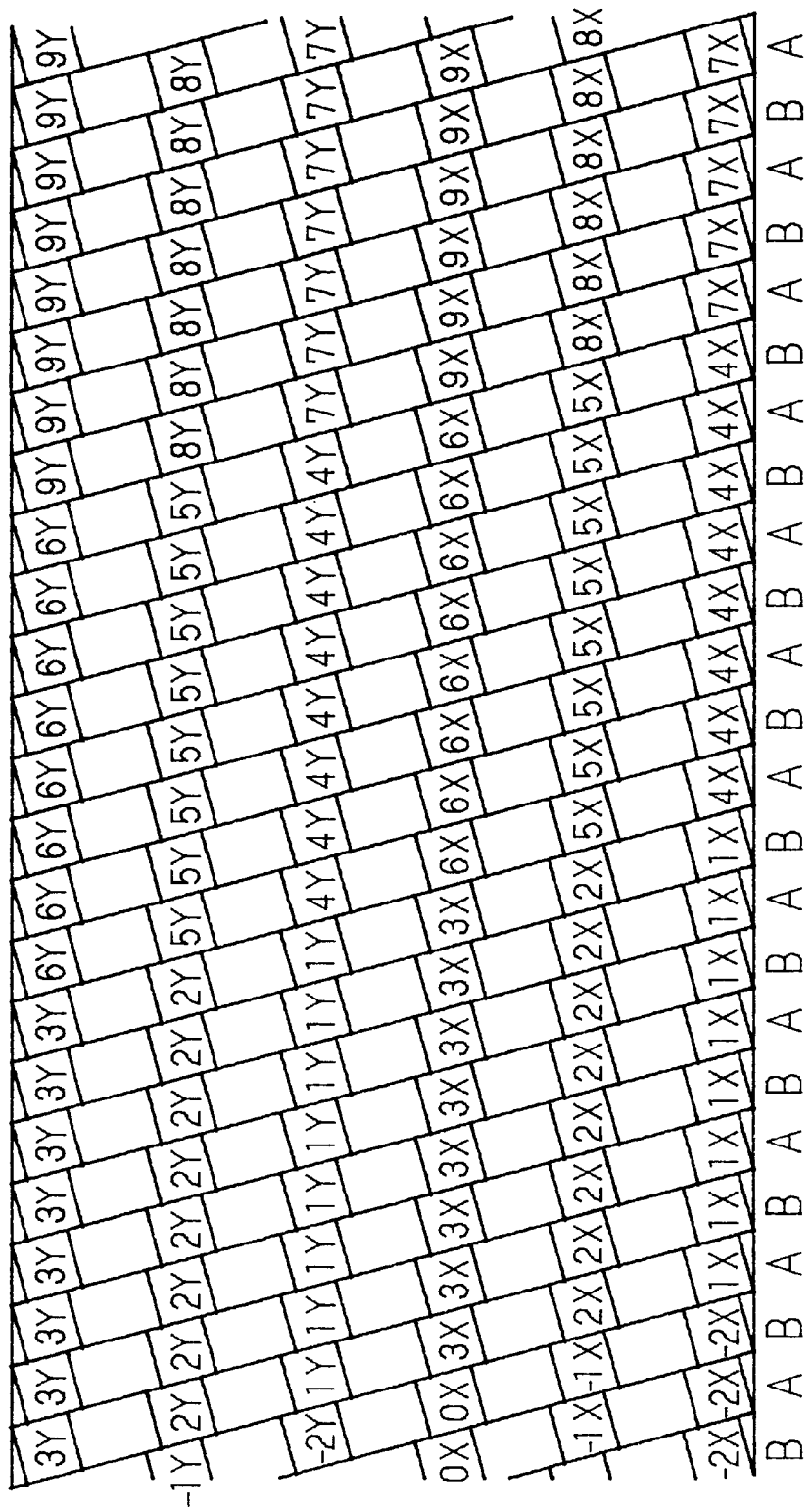
FIG. 50 is a diagram showing a recording format on a magnetic tape for a digital VTR according to an 11th embodiment of the present invention.

Next, the operation of data synthesis in the first data-synthesis circuit 66 will be described with reference to FIG. 50. FIG. 50 is a diagram showing a recording format on a magnetic tape for the digital VTR of the 11th embodiment of the invention. In the figure, A and B designate tracks having different azimuth angles. Further, portions labeled identical reference signs in the figure (1X, 1Y, 2X, and so on) hold identical signals recorded thereon. As shown, in the 11th embodiment, six areas per track are provided as special playback data recording areas (hereinafter referred to as the duplication areas), comprising a total of 32 sync blocks per track, that is, two duplication areas of 6 sync blocks each and four duplication areas of 5 sync blocks each. Further, in the 11th embodiment, the contents of an intra-coded data block outputted from the second memory 65 for the same position on the screen are duplicated in a total of 16 duplication areas.

The data outputted from the first memory 62 and second memory 65 are fed into the first data-synthesis circuit 66. The first data-synthesis circuit 66 combines the data from the first memory 62 and second memory 65 and produces a track format. The operation of the first data-synthesis circuit 66 will be described below.

The ATV signal bitstream stored in the first memory 62 is carried in transport packet form, two packets together comprising five sync blocks, as previously described, and is read out, one sync block at a time, from the first memory 62 with prescribed timing for data synthesis for recording in the main area on the recorded track. The first data-synthesis circuit 66 generates a memory read control signal (providing data read timing) for the first memory 62, and synthesizes data.

On the other hand, the two data X and Y divided in the second data-division circuit 64 and stored in the second memory 65 are read out alternately track by track with prescribed timing, one sync hook (77 bytes) at a time, so that they are recorded in the recording format shown in FIG. 50. That is, the two data X and Y are recorded in duplication areas provided on the same track but, at different track heights. The X data is always recorded in the recording areas arranged at the same track height; likewise, the Y data is always recorded in the recording areas arranged at the same track height. Data representing the same position on the screen (for example, 1X and 1Y) is duplicated in a total of 16 areas on eight successive tracks.

The data synthesized in the above manner is passed to the error-correcting encoder 67 which appends an error-correcting code. The record data with an error-correcting code appended to it is then fed into the recording amplifier 68 where it is digitally modulated and amplified for recording on the magnetic tape by the rotary heads 70a and 70b.

Next, the operation of the playback system will be described with reference to FIGS. 44 and 45. In normal playback, data played back from the magnetic tape by the rotary heads 70a and 70b is first amplified by the head amplifier 80, and then fed to the signal detection circuit, 81 for signal detection, conversion to digital data, and digital demodulation. The digitally demodulated data is inputted to the error-correcting decoder 82 which, using the error-correcting code appended during the recording process, performs detection and correction of errors in the playback signal. The error-corrected data is supplied to the third memory 83 and the 11th data-synthesis circuit 84.

In the third memory 83, the bitstream of the ATV signal is separated from the input data, and only that bitstream is stored in memory. On the other hand, the data supplied to the 11th data-synthesis circuit 84 is first inputted to the X/Y data separation circuit 91 where the X and Y data divided during the recording process are separated from the playback signal. The data separation is performed in the following manner. Since, in the 11th embodiment, the sync block numbers of the duplication areas for recording the X data and Y data are predetermined, each data is identified by detecting the position of the duplication area on the track using the sync block number recorded in the ID signal field of each sync block. The decoding method for recovering the original DCT coefficients from the identified X data and Y data is the same as described in the eighth embodiment, and description thereof is omitted here. The recovered DCT coefficient data is stored in the fourth memory 85.

The switch 86 is configured to select the output of the third memory 83 in normal playback, as described in the eighth embodiment, and the ATV bitstream reconstructed as 188-byte packet information in the third memory 83 is outputted via the output terminal 87. In special playback modes, the output of the fourth memory 85 is selected so that a special playback picture synthesized in the 11th data-synthesis circuit 84 is outputted in sequence from the output terminal 87 in units of transport packets. The operation in still-motion and slow-motion playback is the same as described in the eighth embodiment, and therefore, detailed description of the operation is omitted here.

Figure 51:
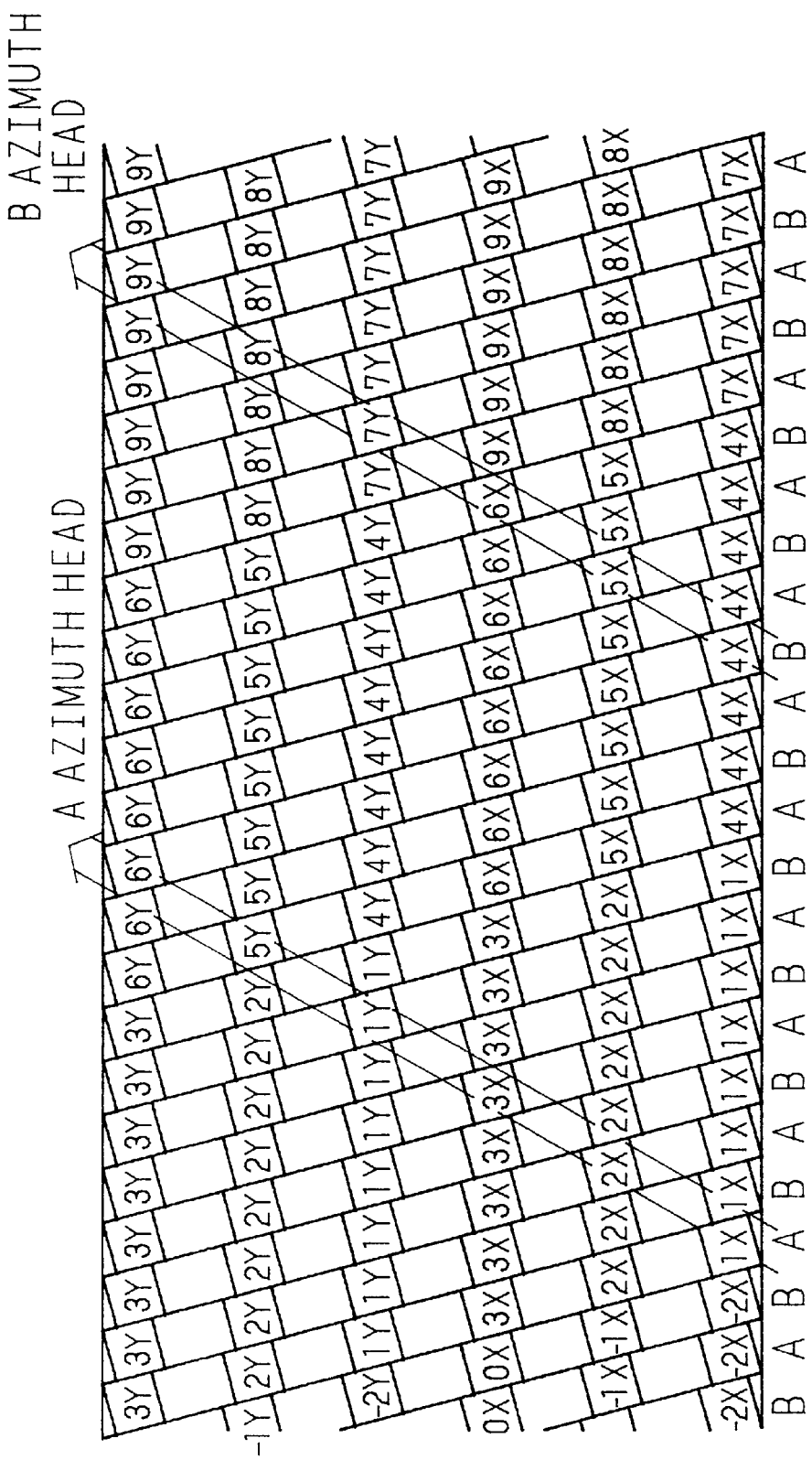
FIG. 51 is a diagram showing the scan paths of rotary heads when high-speed playback at the speed 11 times the normal speed is performed on the digital VTR of the 11th embodiment.

The operation in high-speed playback will be briefly described below. FIG. 51 is a diagram showing the head scar paths of the rotary heads when high-speed playback 11 times the normal speed is performed on the digital VTR of the 11th embodiment. In the 11-times speed playback mode, data is reproduced in the order of 1X, 2X, 3X, 1Y, 5Y, 6Y, 4X, 5X, . . . from the respective duplication areas, as shown in the figure. For (1X, 1Y) and (5X, 5Y) for which both of the two data are reproduced, decoding is performed using the two data, and for each of the other data, decoding is performed using only one data that has been reproduced. The subsequent operation is the same as described in the eighth embodiment, and therefore, further description is omitted here.

Generally, in performing a special playback on the above digital VTR, the number of sync blocks within one duplication area, the number of duplication areas per track, and the arrangement of the duplication areas within each track are particularly critical. The number of sync blocks within one duplication area determines the maximum fast playback speed in high-speed playback, and the number of duplication areas per track and their arrangement determine the playback speeds in low- and middle-speed fast playback modes. That is, when the number of duplication areas is increased, the number of sync blocks within one duplication area decreases, making it possible to support higher speed playback. On the other hand, when the number of duplication areas is increased, there occur many playback speeds, especially in lower-speed special playback, where all display information recorded in the duplication areas cannot be reproduced if the speed is set at an integral multiple of the normal speed. Accordingly, in the recording format shown in the present embodiment, the speed is set at N+½ times the normal speed (N=−4, −3, −2, 1, 2, 3) for fast playback between −4 and 4 times the normal speed. This is because the data recorded in the duplication areas in a cycle of 8 tracks can be switched between these speeds.

As described, the divided data are recorded on the same track but at different track heights; therefore, when separating the X data and Y data for special playback, since the sync block numbers of the duplication areas where the X and Y data are recorded are predetermined, each data can be identified by detecting the position of the duplication area on the track using the sync block number recorded in the ID signal field of the sync block. This eliminates the need to add an identification circuit, etc., so that the circuit complexity can be reduced.

Since one of the divided data is arranged in the lower portion of a track and the other data in the upper portion, as described, the positions of the X and Y data can be estimated from the rotation phase of the rotary head. This serves to avoid mistaking X data for Y data when synthesizing data in decoding.

Furthermore, the data need not necessarily be divided into two portions, but may be divided into three or four portions; in such cases also, if the recording position on the track is predetermined for each data portion, the same effect as described above can be obtained. In the 11th embodiment, the divided data are recorded on the same track, but the embodiment is not limited to this arrangement. For example, if the kinds of divided data (X and Y) to be recorded in the duplication areas are predetermined, and if the recording format is configured so that the same kind of data is always recorded at the same height on each track (for example, in FIG. 50, the X data is placed in three duplication areas at the lower end of the track, and the Y data in three duplication areas at the upper end of the track), the separation of the X data and Y data can be accomplished easily; this serves to reduce the circuit complexity and achieves the same effect as described above.

Embodiment 12

In a 12th embodiment, the divided data are recorded on the same number of tracks as the number of data divisions. The recording format employed in the 12th embodiment will be described below with reference to FIG. 52. In the example hereinafter described, the data shown in the 10th embodiment is divided into four portions. The recording system and playback system in the 12th embodiment are identical in configuration to those shown in FIGS. 37, and 44, and their description is omitted here. Further, the second data-division circuit 64 is identical in configuration to that shown in FIG. 49, and description thereof is omitted here. In the 12th embodiment, the D=4×X0+2×X1+2×X2+X3 method, the same method as used in the 10th embodiment, will be employed as the data division method.

Figure 52:
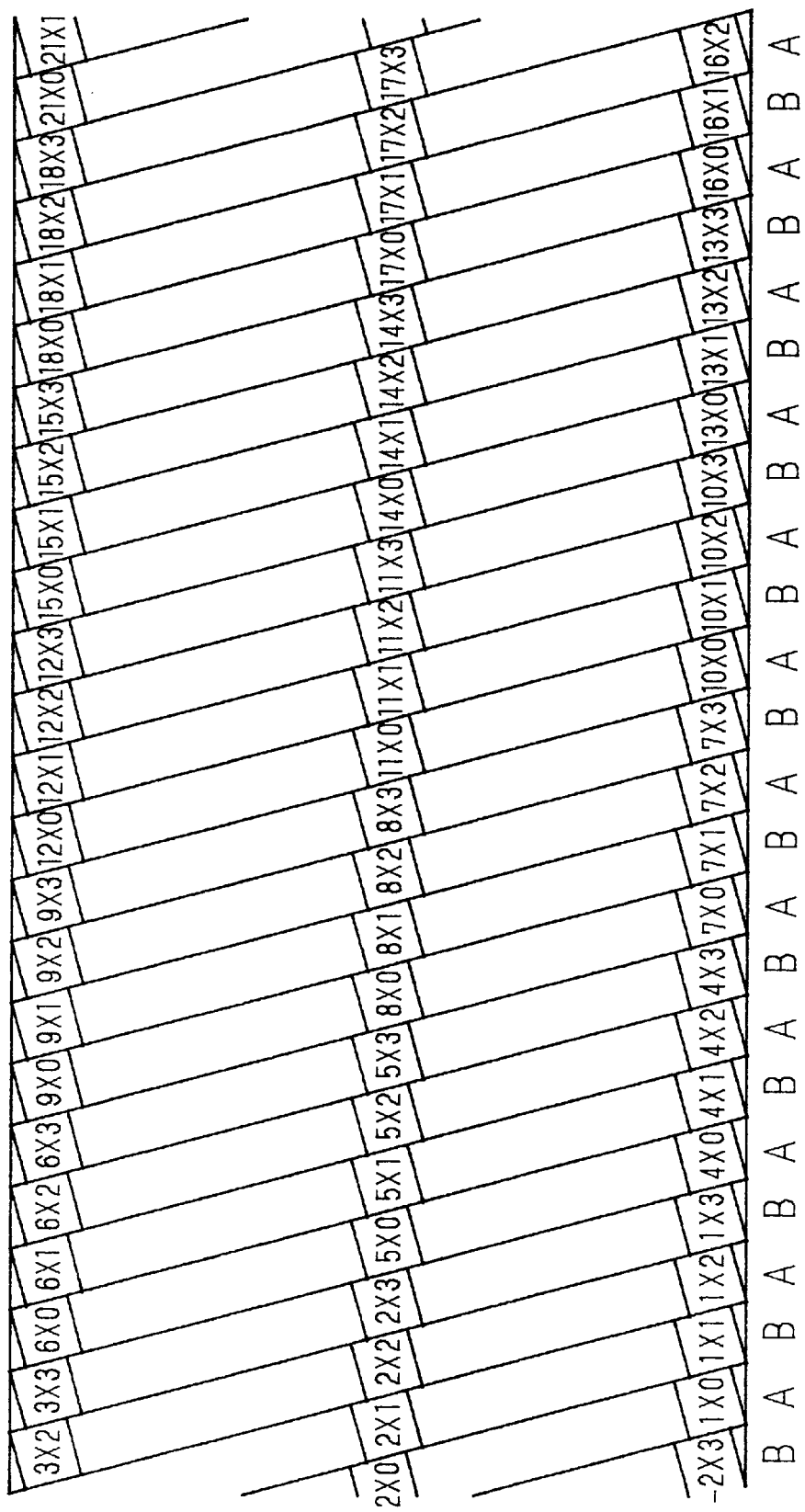
FIG. 52 is a diagram showing a recording format on a magnetic tape for a digital VTR according to a 12th embodiment of the present invention.

FIG. 52 is a diagram showing a recording format on a magnetic tape for the digital VTR according to the 12th embodiment of the invention. In the figure, A and B designate tracks having different azimuth angles. Further, (1X0, 1X1, 1X2, 1X3), (2X0, 2X1, 2X2, 2X3), etc. in the figure each indicate divided data representing the same position on the screen. As shown, in the 12th embodiment, as in the 10th embodiment, three areas per track are provided as special playback data recording areas (hereinafter referred to as the duplication areas).

The operation of the 12th embodiment will be described with reference to FIG. 52. The four data, X0, X1, X2, and X3, resulting from the division in the second data-division circuit 64 are first stored in the second memory 65, and then fed into the first data-synthesis circuit 66. The first data-synthesis circuit 66 combines the data from the first memory 62 and second memory 65 and produces a track format. The operation of the first data-synthesis circuit 66 will be described below. The ATV signal bitstream stored in the first memory 62 is carried in transport packet form, two packets together comprising five sync blocks, as in the foregoing embodiment, and is read out, one sync block at a time, from the first memory 62 with prescribed timing for data synthesis for recording in the main area on the recorded track. The first data-synthesis circuit 66 generates a memory read control signal (providing data read timing) for the first memory 62, and synthesizes data.

On the other hand, the four data, X0, X1, X2, and X3, divided in the second data-division circuit 64 and stored in the second memory 65, are read out with prescribed timing, one sync block (77 bytes) at a time and on a track-by-track basis, for recording in the data recording format shown in FIG. 52. That is, the four data are recorded in the respective duplication areas only once.

The data synthesized in the above manner is passed to the error-correcting encoder 67 which appends an error-correcting code. The recording data with an error-correcting code appended to it is then fed into the recording amplifier 68 where it is digitally modulated and amplified for recording on the magnetic tape by the rotary heads 70a and 70b.

As described in the foregoing embodiment, the digital VTR that has the recording format shown in FIG. 52 can reliably support high-speed playback up to four times the normal speed. Since information represent in the same position on the screen is recorded in four duplication areas, and since the same information is not duplicated in other duplication areas, as shown in FIG. 52, special playback data can be recorded with the best efficiency and DCT coefficients including higher-frequency coefficients can be transmitted, providing good picture quality in special playback modes, especially, in slow-motion and still-motion playback.

The above description of the 12th embodiment has dealt with an example in which data divided into four portions is recorded in four duplication areas, but the embodiment is not limited to the illustrated example. For example, when data divided into eight portions is recorded in eight duplication areas, that is, when data divided into N portions (N is an integer not smaller than 2) is recorded in N duplication areas, special playback data can be recorded more efficiently than when the same data is recorded N times in the duplication areas. This allows the transmission of higher-frequency DCT coefficients, so that good picture quality can be obtained in special playback modes, especially, in slow-motion and still-motion playback.

Embodiment 13

In a 13th embodiment, different methods of division are employed between DC data and AC data in the DCT coefficient data. Generally, the DC data in the DCT coefficient data is transmitted as a direct value. This is because an effective reduction in the data amount cannot be expected if variable-length coding is applied to the DC data. Furthermore, with the division methods described in the eighth and ninth embodiments, a reduction in the data amount by the data division can hardly be achieved for the DC data. Moreover, in cases where the DC data is transmitted as a direct value after division, for example, in the case of the division according to D=2×X0+X1 shown in the eighth embodiment, if D is 8-bit data, X0 and X1 are 7 bits long each; thus, almost no effective data amount reduction by the data division can be obtained for the DC data.

Figure 53:
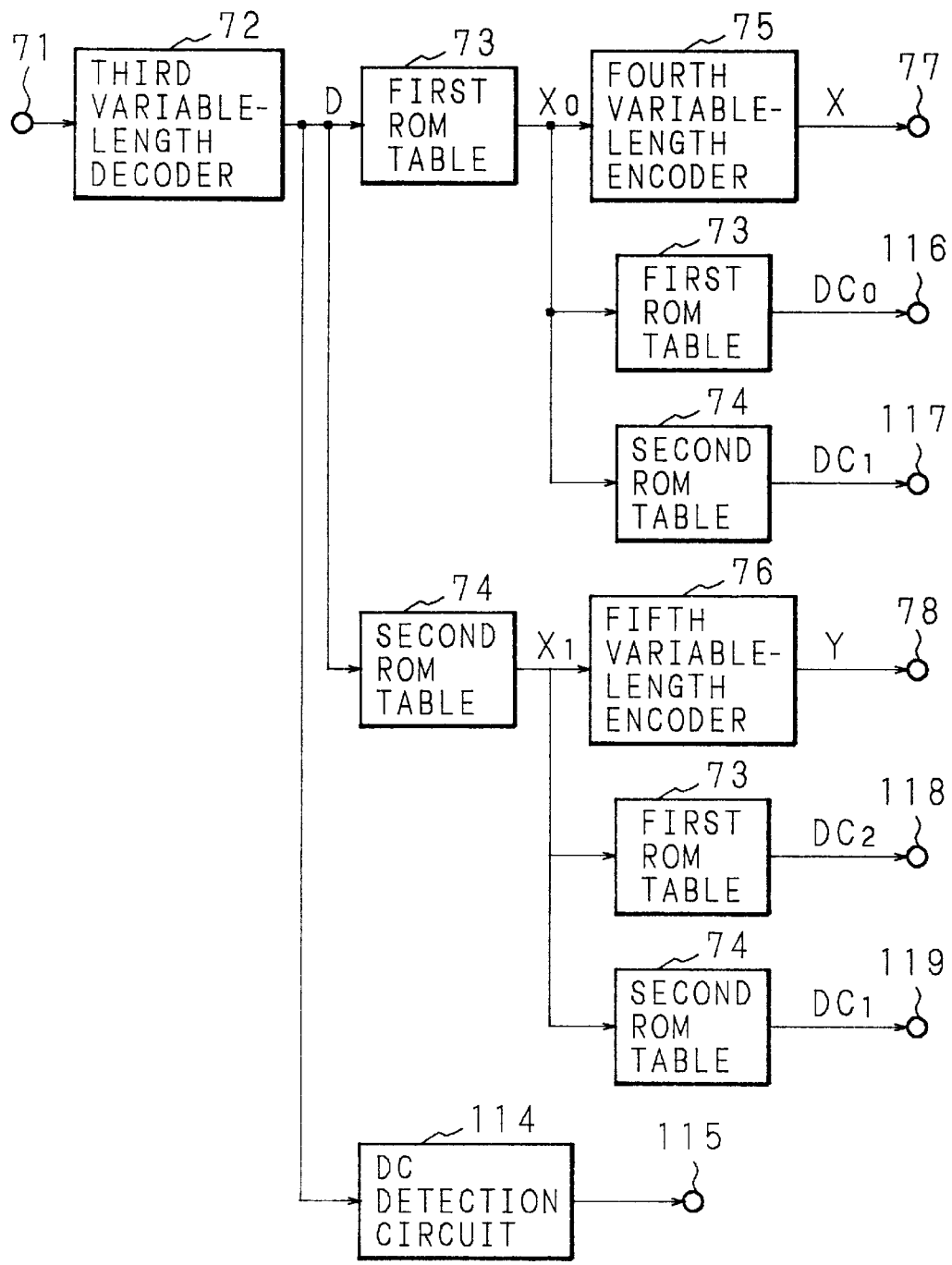
FIG. 53 is a block diagram showing the configuration of a second data-division circuit according to a 13th embodiment of the present, invention.
Figure 54:
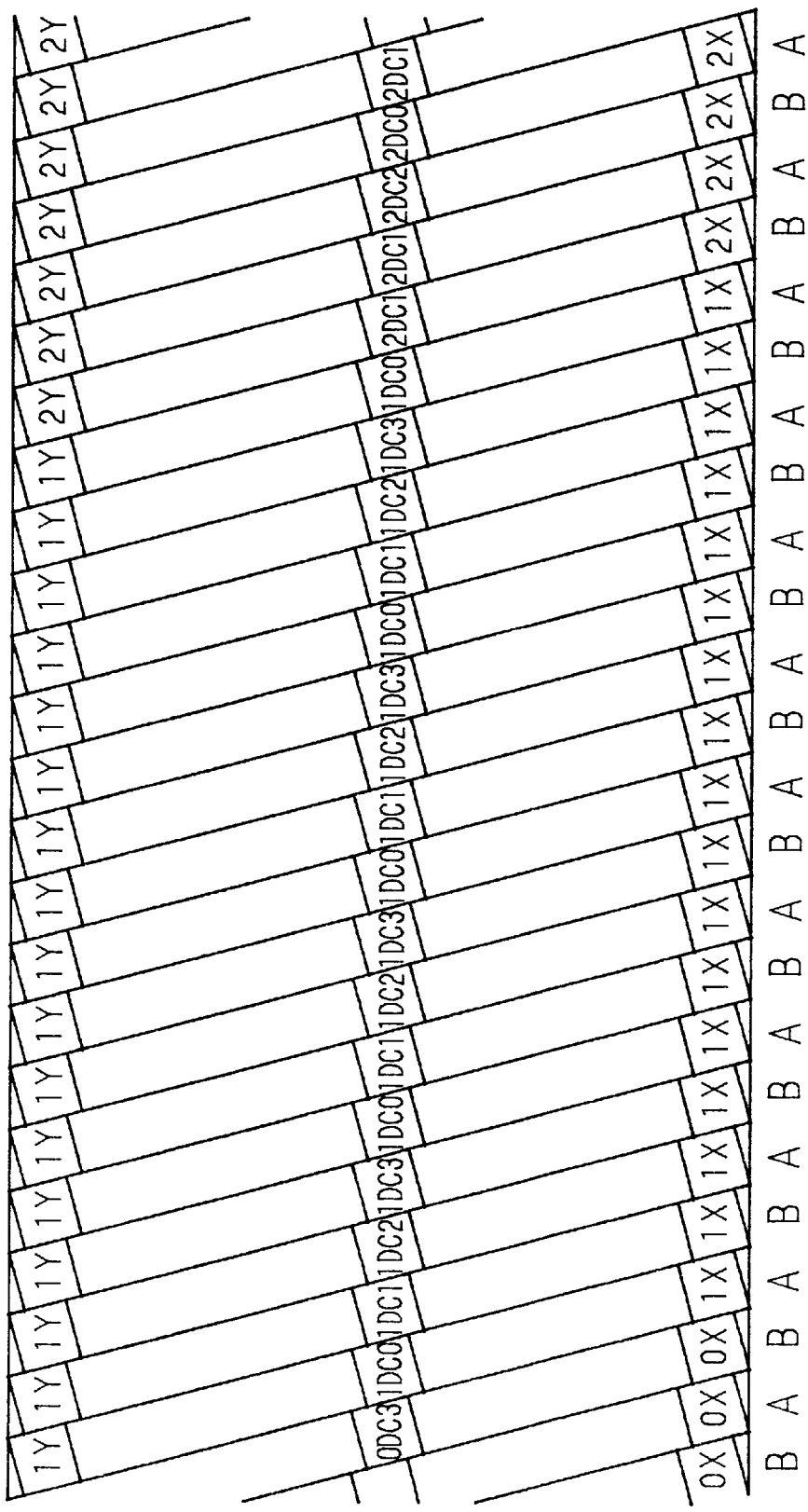
FIG. 54 is a diagram showing a track format employed in a digital VTR according to the 13th embodiment.
Figure 55:
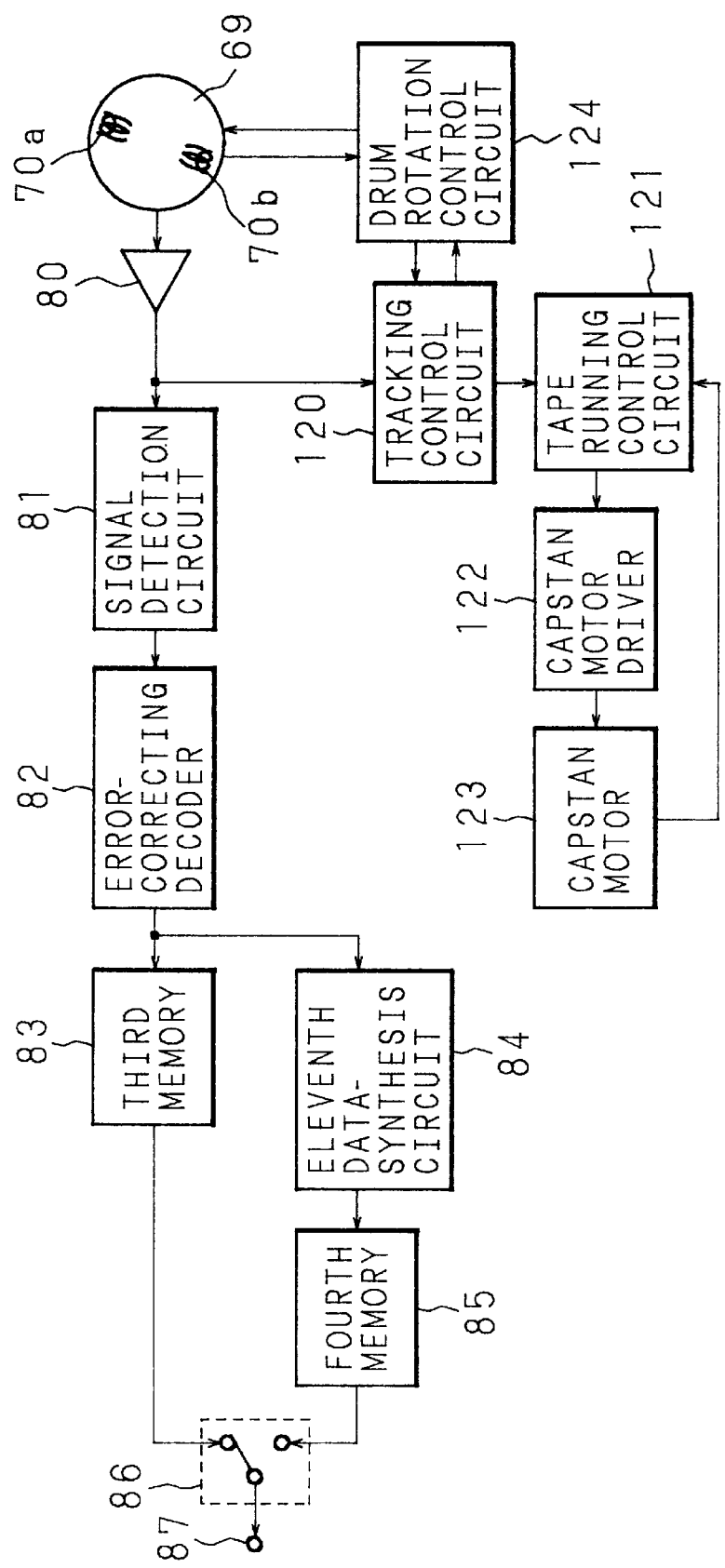
FIG. 55 is a block diagram showing a playback system in the digital VTR according to the 13th embodiment.

FIG. 53 is a block diagram showing the second data-division circuit 64 according to the 13th embodiment, of the invention. In the figure, the parts designated by the same reference numerals as those in the foregoing embodiments are identical in configuration and operation to the corresponding parts described previously, and therefore, detailed description of such parts is omitted here. In FIG. 53, reference numeral 114 is a DC detection circuit, and 115 to 119 are output terminals. FIG. 54 is a diagram showing a track format for a digital VTR according to the 13th embodiment. FIG. 55 is a block diagram showing the configuration of a playback system in the digital VTR according to the 13th embodiment. In the figure, the parts designated by the same reference numerals as those in the foregoing embodiments are identical in configuration and operation to the corresponding parts described previously, and therefore, detailed description of such parts is omitted here. In FIG. 55, reference numeral 120 is a tracking control circuit for generating a tracking control signal for the rotary heads 70a and 70b on the basis of a pilot signal superimposed on the playback signal and of a drum PG signal outputted from the rotary drum 69; 121 is a tape running control circuit for outputting a control signal for a capstan motor driver 122 on the basis of tape speed information outputted from a capstan motor 123 and tracking information outputted from the tracking control circuit 120; 122 is the capstan motor driver; 123 is the capstan motor; and 124 is a drum rotation control circuit for controlling the rotation of the rotary drum 69.

The operation of the recording system according to the 13th embodiment will be described with reference to FIGS. 37, 40, 53, and 54. The bitstream inputted via the input terminal 60 is first fed into the packet detection circuit 61, which detects a transport packet and supplies it to the first memory 62 as well as to the intra-detection circuit 63. The first memory 62 stores the bitstream data on a packet-by-packet basis, and as in the eighth embodiment, the data is read out in the record data packet format shown in FIG. 40B.

The bitstream output from the packet detection circuit 61 is also inputted to the intra-detection circuit 63. The intra-detection circuit 63 detects whether the data in the transport packet is intra-coded data or not. The intra-coded transport packet thus detected is fed to the second data-division circuit 64. In the second data-division circuit 64, the third variable-length decoder 72 performs variable-length decoding to recover the original DCT coefficients D. The output D of the third variable-length decoder 72 is supplied to the DCT detection circuit 114, the first ROM table 73 and second ROM table 74. The contents of each ROM table of the first, and second ROM tables 73 and 74 shown in FIG. 53 are the same as those shown in FIG. 39.

The division method employed in the 13th embodiment will be described below. In the 13th embodiment, the division method used is changed between the most significant data (the DC data in the case of DCT transformed data) and other significant data (low-frequency DCT coefficient data) in the input intra-coded data. That is, the division method shown in the 10th embodiment, 4×X0+2×X1+2×X2+X3, is used to divide the DC data for which the division efficiency is not good when dividing data with a limited data transmission capacity, as earlier described; for other low-frequency DCT coefficient data, on the other hand, the data division method shown in the eighth embodiment is used.

Generally, as the number of data divisions increases, the data reconstruction error increases when the original data has to be reconstructed using only one of the divided data. In particular, unlike the DC data, the other DCT coefficient data (AC coefficient data) are small-amplitude data. It is therefore desirable not to increase the number of data divisions when dividing the low-frequency DCT coefficient data. On the other hand, the DC data represents a large-amplitude component, and the ratio of the reconstruction error to the full amplitude is very small, so that there will be no problem if the number of divisions is increased to some degree.

When the DC data (8-bit data) is divided into four portions, as described above each data portion can be transmitted with five bits. This achieves a transmission efficiency of 5/8=0.625 for the DC data. The operation of the second data-division circuit 64 will be described below.

The DC detection circuit 114 detects DC data from the input DC coefficient data, and outputs a DC detection signal at the output terminal 115. On the other hand, the DCT coefficient data D inputted to the first and second ROM tables 73 and 74 in the first stage is divided into two portions in accordance with the rule 2×X0+X1. The data outputted from the first ROM table 73 in the first stage is converted by the fourth variable-length encoder 75 into a variable-length code X, which is outputted at the output terminal 77. Likewise, the data outputted from the second ROM table 74 in the first stage is converted by the fifth variable-length encoder 76 into a variable-length code Y, which is outputted at the output terminal 78.

The first and second ROM tables 73 and 74 arranged at the subsequent stage further divide the input data in accordance with the rules X0=2×DC0+DC1 and X1=2×DC2+DC3, thus accomplishing data division into four portions. The four data DC0–DC3, resulting from the division in the first and second ROM tables 73 and 74, are outputted at the output terminals 116–119, respectively.

The output from the second data-division circuit, 64 is stored in the second memory 65. For the DC data, the second memory 65 stores the DC0–DC3 outputted via the output, terminals 116–119, based on the DC detection signal detected by the second data-division circuit 64, and for the AC coefficient components, stores the X and Y data outputted via the output terminals 77 and 78. The data stored in the first memory 62 and second memory 65 are combined in the first data-synthesis circuit 66.

Next, the operation of the first data-synthesis circuit 66 will be described with reference to FIG. 54. FIG. 54 is a diagram showing a recording format on a magnetic tape for the digital VTR of the 13th embodiment of the invention. In the figure, A and B designate tracks having different azimuth angles. Further, portions labeled identical reference signs in the figure (1X, 1Y, 1DC0, 1DC1, 1DC2, 1DC3, 2X, and so on) hold identical signals recorded thereon. As shown, in the 13th embodiment, three areas per track are provided as special playback data recording areas (hereinafter referred to as the duplication areas); the DC data most significant for the reconstruction of image data is recorded at the center of each track, and other divided data are recorded at the upper and lower ends of the magnetic tape.

The ATV signal bitstream stored in the first memory 62 is carried in transport packet form, two packets together comprising five sync blocks, as previously described, and is read out, one sync block at a time, from the first, memory 62 with prescribed timing for data synthesis for recording in the main area of the recording track. The first data-synthesis circuit 66 generates a memory read control signal (providing data read timing) for the first memory 62, and synthesizes data.

On the other hand, the data portions resulting from the division in the second data-division circuit 64l are read out of the second memory 65 so that they are recorded track by track in the data recording format shown in FIG. 54. More specifically, the data divided into two portions is alternately switched and read out with prescribed timing, one sync block (77 bytes) at a time. The DC data divided into four portions is switched from one portion to the next and read out, one sync block at a time, for recording in the center of the tracks. As a result, for the DC data, the four data portions are recorded in the center of the tracks, and for the AC data, the two data portions are placed at both ends of each track. More specifically, the DC data divided into four portions representing the same position on the screen is recorded in the duplication areas in the center of 17 tracks, and the AC data divided into two portions (for example, 1X and 1Y) is recorded in a total of 34 duplication areas on the 17 tracks.

The data synthesized in the above manner is passed to the error-correcting encoder 67 which appends an error-correcting code. The record data with an error-correcting code appended to it is then fed into the recording amplifier 68 where it is digitally modulated and amplified for recording on the magnetic tape by the rotary heads 70a and 70b.

Next, the operation of the playback system will be described with reference to FIG. 55. In normal playback, data played back from the magnetic tape by the rotary heads 70a and 70b is first amplified by the head amplifier 80, and then fed to the signal detection circuit 81 for signal detection, conversion to digital data, and digital demodulation. The digitally demodulated data is inputted to the error-correcting decoder 82 which, using the error-correcting code appended during the recording process, performs detection and correction of errors in the playback signal. The error-corrected data is supplied to the third memory 83 and the 11th data-synthesis circuit 84.

The playback signal amplified by the head amplifier 80 is also inputted to the tracking control signal 120. Based on the output level of the pilot signal superimposed on the playback signal and the drum PG signal outputted from the rotary drum 19, the tracking control circuit 120 generates a control signal for controlling the tracking phase of the rotary heads, and supplied the control signal to the tape running control circuit 121 and the drum rotation control circuit 124. The drum rotation control circuit 124 controls the rotation phase of the rotary drum 69 on the basis of the tracking control signal outputted from the tracking control circuit 120.

The tape running control circuit 121 generates a tape running control signal, based on the tracking control signal and the speed information of the capstan motor 123, and supplied the control signal to the capstan motor driver 122. Based on the tape running control signal, the capstan motor driver 122 outputs a drive voltage for driving the capstan motor 123.

The operation of the playback signal processing system will be further described below. In the third memory 83, the bitstream of the ATV signal is separated from the input data, and only that bitstream is stored in memory. On the other hand, the data supplied to the 11th data-synthesis circuit 84 is separated into the DC data and AC data which are separately decoded. The DC data is decoded in accordance with the procedure described in the 10th embodiment, while the AC data is decoded in accordance with the procedure described in the eighth embodiment. Since the separation of the DC data and the X and Y data can be accomplished by identifying the track height (i.e., the sync block number recorded in the ID signal field of each sync block), there is no need to append, in the recording process, an identification signal for separating the data, or to add an extra circuit for separating the data in the reproduction process. This contributes to reducing the circuit complexity. The recovered DCT coefficient data is stored in the fourth memory 85.

The switch 86 is configured to select the output of the third memory 83 in normal playback, as described in the eighth embodiment, and the ATV bitstream reconstructed as 188-byte packet information in the third memory 83 is outputted at the output terminal 87. In special playback modes, the output of the fourth memory 85 is selected so that a special playback picture synthesized in the 11th data-synthesis circuit 84 is outputted in sequence from the output terminal 87 in units of transport packets. The operation in still-motion and slow-motion playback is the same as described in the eighth embodiment, and therefore, detailed description of the operation is omitted here.

The operation of the tracking control system in high-speed playback will be briefly described below. As previously described, the playback signal is reproduced intermittently in high-speed playback modes. FIG. 46 given in the description of the eighth embodiment showed the scan paths of the rotary heads 70a and 70b in 5-times and 17-times speed playback modes. In ordinary home VTRs, however, there occurs the problem of track skew due to mechanical inaccuracies. Particularly in compatible playback modes, there is no guarantee that the divided data shown in FIG. 46 will always be reproduced. For example, a situation can occur where information in the center of tracks cannot be reproduced whereas information on both ends of the tracks can be reproduced.

If the center portions of the tracks fail to be reproduced, some data in a special playback image will riot be updated and the resulting image will be very unpleasing to see. In the 13th embodiment, the DC data, the most significant data in the image data, is recorded in the center of tracks, and in special playback, the rotation phase of the rotary heads 70a and 70b is controlled so that the center portions will be reproduced without fail. This ensures reproduction of the most significant image data even if there is track skew, and all information in a special playback picture can be updated accordingly, thus providing good picture quality in variable-speed playback.

The tracking control operation in high-speed playback will be briefly described below. The playback signal amplified by the head amplifier 80 is inputted to the tracking control circuit 120. When a high-speed playback command is received, the drum rotation control circuit 124 detects the rotation phase of the rotary heads 70a and 70b from the drum PG signal outputted from the rotary drum 69, and supplies the result of the detection to the tracking control circuit 120. In the 13th embodiment, tracking information at the center portions of the tracks scanned by the rotary heads 70a and 70b is outputted. Based on the output level of the pilot signal superimposed on the playback signal and the information on the rotation phase of the rotary heads 70a and 70b outputted from the drum rotation control circuit 124, the tracking control circuit 120 outputs a tracking control signal so that the reproduction output is the largest at the center portions of the tracks. The drum rotation control circuit 124 controls the rotation phase of the rotary drum 69 on the basis of the tracking control information outputted from the tracking control circuit 120.

The tape running control circuit 121 generates a tape running control signal, based on the tracking control signal and the rotational speed information of the capstan motor 123, and supplied the control signal to the capstan motor driver 122. Based on the tape running control signal, the capstan motor driver 122 outputs a drive voltage for driving the capstan motor 123.

As described, the divided data and DC data are recorded on the same track but at different track heights; therefore, when separating the divided data and DC data to perform special playback, since the sync block numbers of the duplication areas are predetermined, each data can be identified by detecting the position of the duplication area on the track using the sync block number recorded in the ID signal field of the sync block. This eliminates the need to add an identification circuit, etc., so that the circuit complexity can be reduced.

Furthermore, since the DC data is recorded in the center portions of the tracks as described above (may be recorded in the lower end portions or upper portions of the tracks if the positions are predetermined), a special playback picture of good quality can be reconstructed even when some of the duplication areas failed to be reproduced due to mechanical inaccuracies such as track skew. In this embodiment, since the DCT transform is used to perform intra-coding, the DC data is used as the most significant data, but it will be appreciated that when employing other coding schemes such as predictive coding, the same effect as described above can be obtained if the most significant data in the data is recorded in duplication areas at predetermined positions on each track.

In the eighth to 13th embodiments, the second data-division circuit 64 is constructed using the first ROM table 23 and the second ROM table 24, as shown in FIG. 38, but the construction is not limited to the illustrated example. The same effect as described above can be obtained if random logic, microprocessor, etc. are used instead of the ROM tables. In the eighth and ninth embodiments, when performing data division in accordance with the general equation D=A×X0+B×X1, the X1 data may be obtained by calculating X1=(D−A×X0)/B. Further, the configuration of the 11th data-synthesis circuit 84 is not limited to the one shown in FIG. 45 or 48.

The eighth to 13th embodiments have dealt, with linear transformation shown as 2×X0+X1, 3×X0+1, or 4×X0+2×X1+2×X2+X3, but the invention is not limited to such linear transformation. Rather, the same effect can be obtained if data is divided and recorded (for example, in accordance with D=X0$^A$+X1) in such a manner that the original value can be reconstructed almost completely by using one of the data portions. More specifically, in a digital VTR having a track format that records a digital video signal and a digital audio signal in predetermined areas on each slant track, if the digital VTR comprises data separation means for accepting a data stream of intraframe- or intrafield-coded or interframe- or interfield-coded digital video and digital audio signals, and for extracting intraframe- or intrafield-coded data from the inputted bitstream; data dividing means for dividing the separated intraframe- or intrafield-coded data into two or more data in accordance with a predetermined rule; and data arranging means for arranging a designated number of data thus divided alternately in predetermined recording areas on the track, and if the data dividing means satisfies the above condition (for example, A×X0+B×X1, X0$^A$+X1, etc.), then the same effect as described above can be obtained.

In each of the eighth to 13th embodiments, explanation was given by taking DCT transformed data as an example of intra-coded data, but the invention is not limited to the illustrated example. For example, when another coding scheme is used, for example, orthogonal transform such as Hadamard transform represented by DCT, KL transform, predictive coding, ADRC transform, etc., if the intra-coded data is divided into two or more data and recorded in the duplication areas in the above manner, picture quality in special playback can be improved, thus providing the same effect as described above.

Further, in each of the eighth to 13th embodiments, the DC data in a DCT block was taken as an example of the most significant data, but the invention is not limited to the illustrated example. For example, when predictive coding is used, intra-data, etc. at, the beginning of the code will be taken as the most significant data. Furthermore, the ATV signal was used as an example of record data, but the invention is not limited to the ATV signal.

The eighth embodiment has dealt with an example in which the DC component of the DCT data is also divided, but since the division efficiency of the DC component is not good, as previously noted, the DC component may be transmitted as a direct value without applying data division; in that case also, the same effect can be obtained.

Embodiment 14

Figure 56:
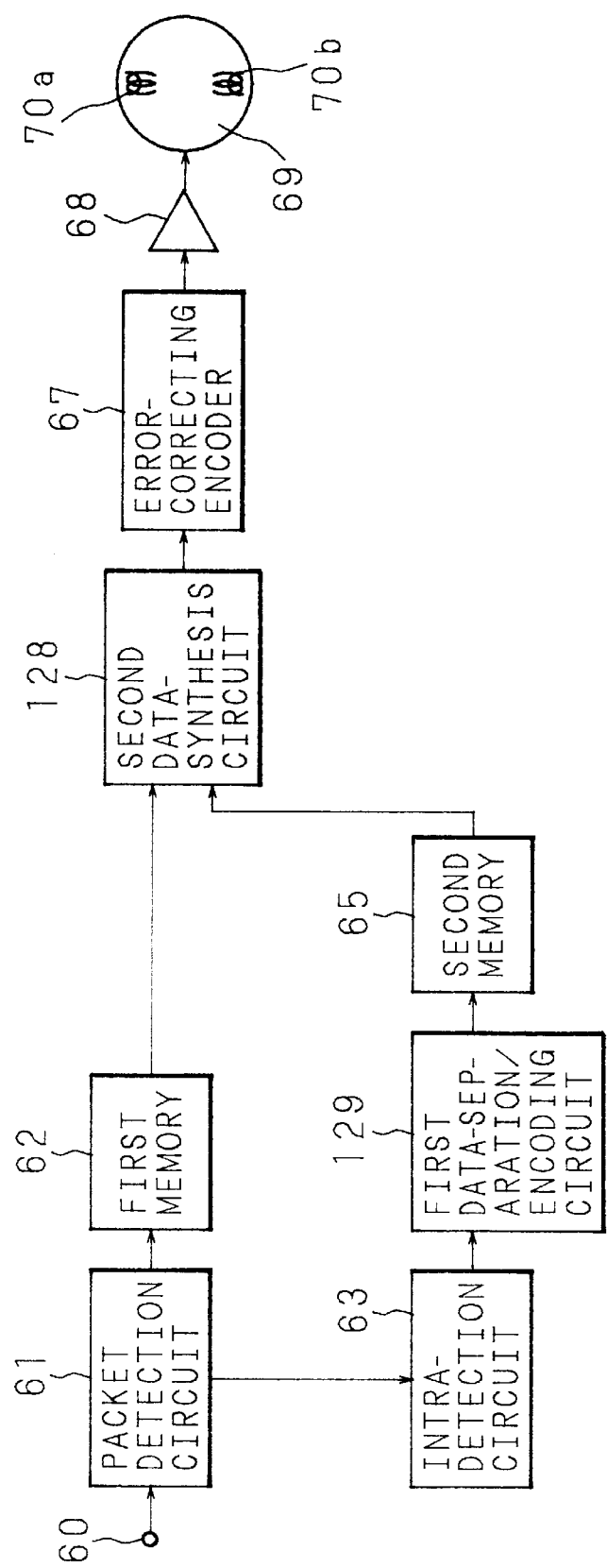
FIG. 56 is a block diagram showing the configuration of a recording system in a digital VTR according to a 14th embodiment of the present invention.

FIG. 56 is a block diagram showing the configuration of a recording system in a digital VTR according to a 14th embodiment of the invention. In the figure, the parts identical or corresponding to those shown in FIG. 37 are designated by like numerals, and description of such parts is omitted here. In FIG. 56, reference numeral 128 is a second data-synthesis circuit for combining the data outputted from the first memory 62 and second memory 65 and thereby generating a record data stream, and 129 is a first data-separation/encoding circuit for separating the intra-coded data from the intra-detection circuit 63 in accordance with a predetermined rule and for applying variable-length coding to it.

Figure 57:
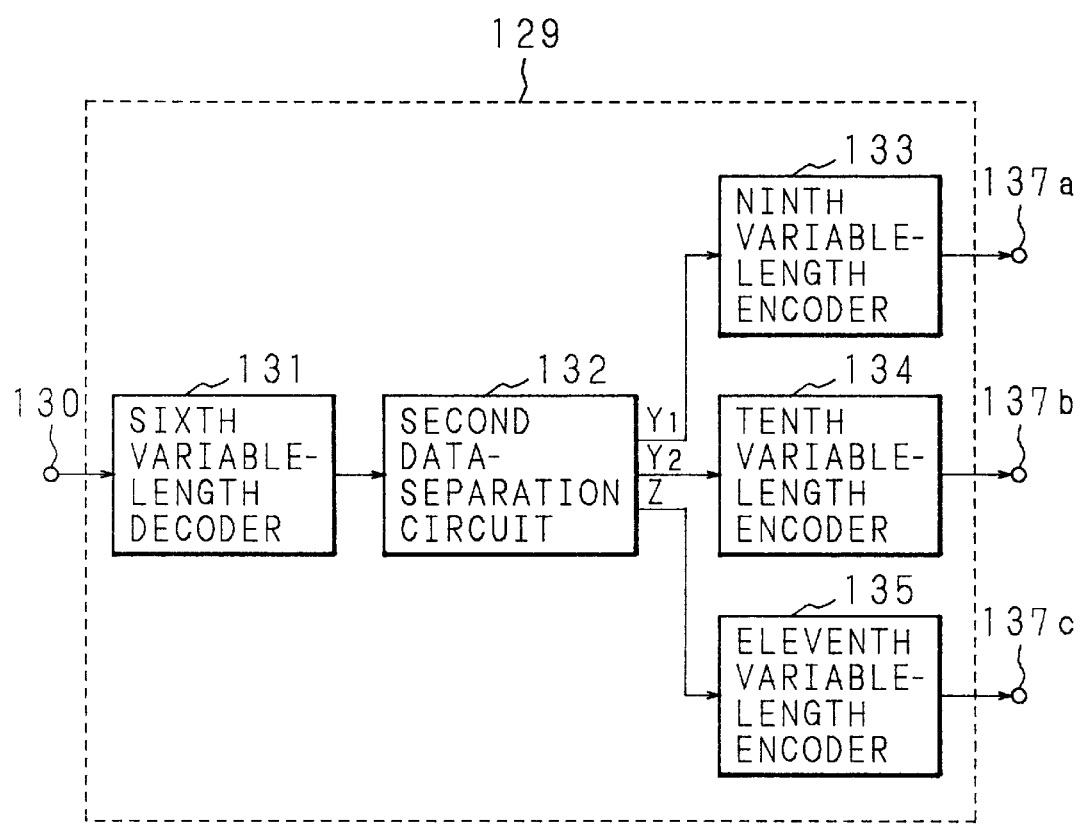
FIG. 57 is a block diagram showing the configuration of a first data-separation/encoding circuit in FIG. 56.

FIG. 57 is a block diagram showing the configuration of the first data-separation/encoding circuit 129 in FIG. 56. In the figure, reference numeral 130 is an input terminal, 131 is a sixth variable-length decoder, 132 is a second data-separation circuit, 133 is a ninth variable-length encoder, 134 is a 10th variable-length encoder, 135 is an 11th variable-length encoder, and 137a to 137c are output terminals.

Figure 58:
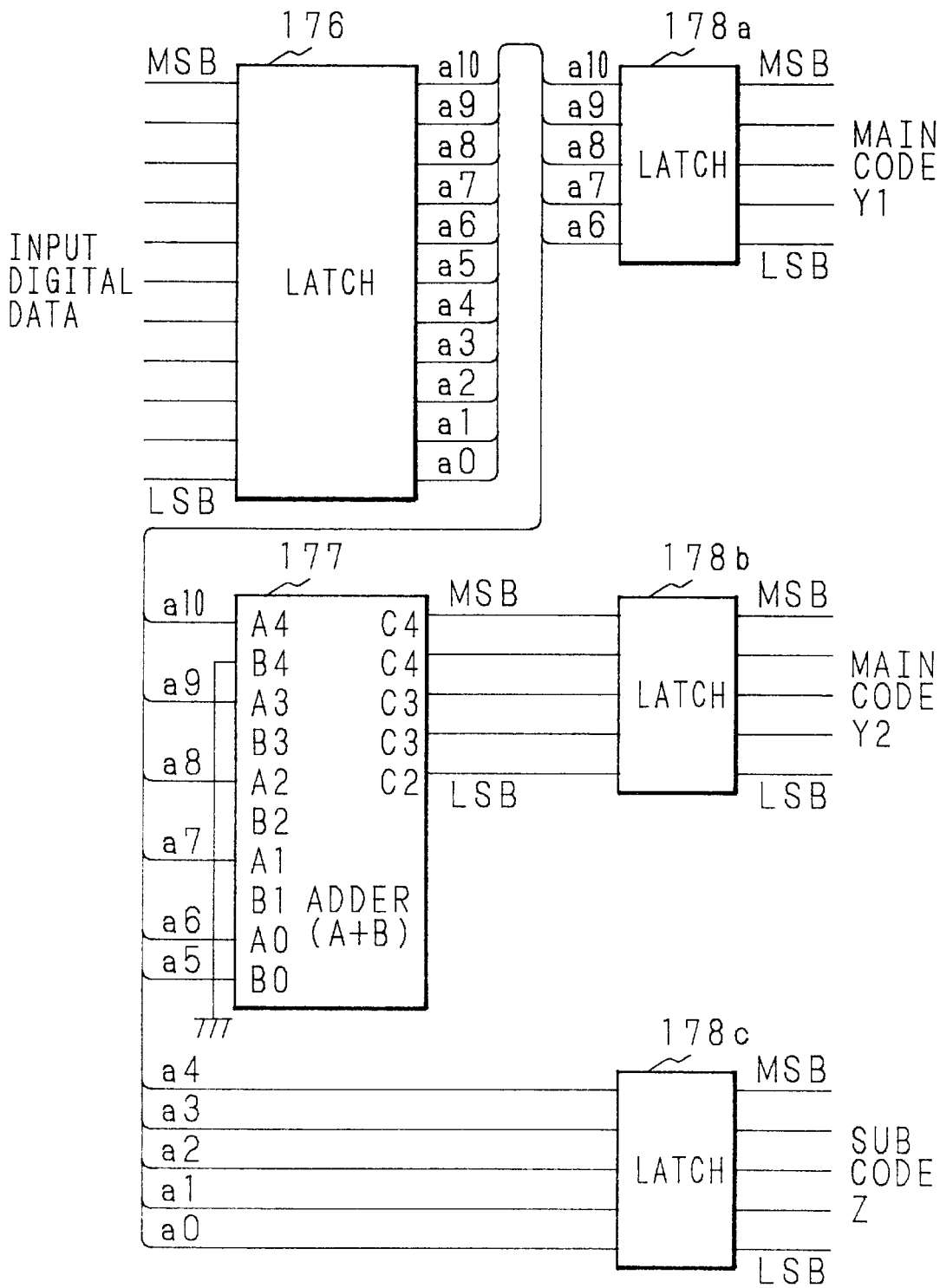
FIG. 58 is a block diagram showing the configuration of a second data-divisional circuit in FIG. 57.

FIG. 58 is a block diagram showing the configuration of the second data-separation circuit 132 in FIG. 57. The 14th embodiment deals with an example in which 11-bit input data is separated into two 5-bit main codes and a 5-bit subcode. In the figure, reference numeral 176 is an 11-bit data latch circuit, 177 is an adder, and 178a to 178c are data latch circuits.

The data packet format employed in the 14th embodiment is the same as that shown in FIGS. 40A and 40B, and the data format within one track of a video signal in the SD standard in this embodiment is the same as that shown in FIG. 43.

Figure 59:
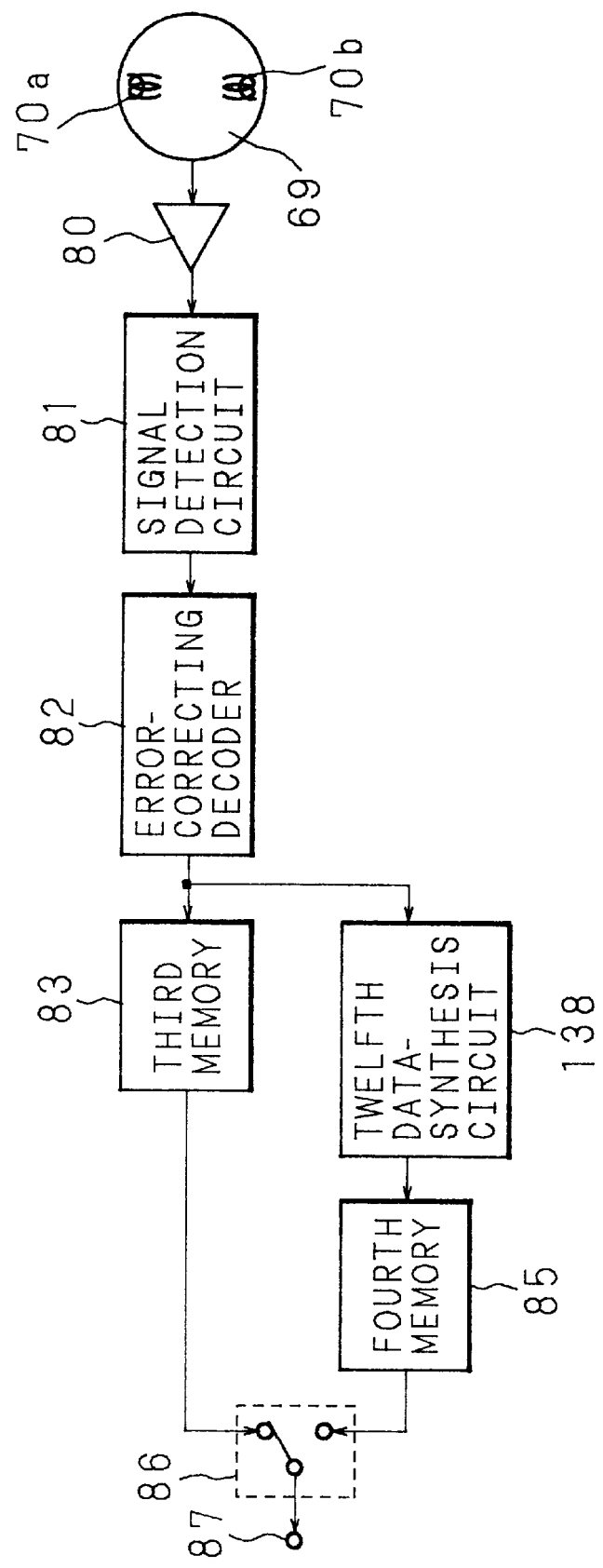
FIG. 59 is a block diagram showing the configuration of a playback system in the digital VTR according to the 14th embodiment.

FIG. 59 is a block diagram of a playback system in the digital VTR according to the present embodiment. In FIG. 59, the parts identical or corresponding to those shown in FIG. 44 are designated by like reference numerals, and description of such parts is omitted here. Reference numeral 138 is a 12th data-synthesis circuit.

Figure 60:
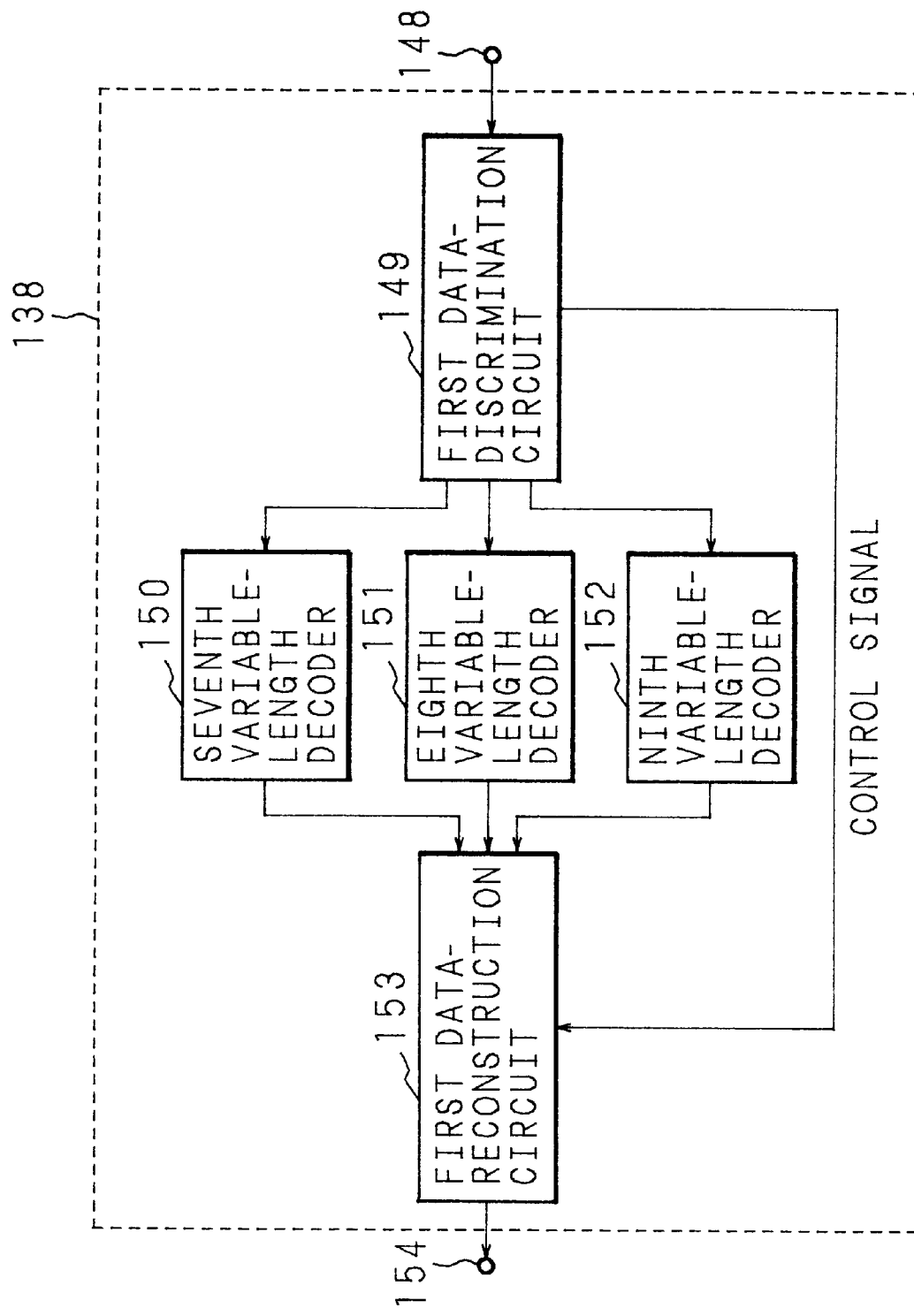
FIG. 60 is a block diagram showing the configuration of a 12th data-synthesis circuit in FIG. 59.

FIG. 60 is a block diagram showing the configuration of the 12th data-synthesis circuit 138 in FIG. 59. In the figure, reference numeral 148 is an input terminal, 149 is a first data-discrimination circuit, 150 is a seventh variable-length decoder, 151 is an eighth variable-length decoder, 152 is a ninth variable-length decoder, 153 is a first data-reconstruction circuit, and 154 is an output terminal.

Figure 61:
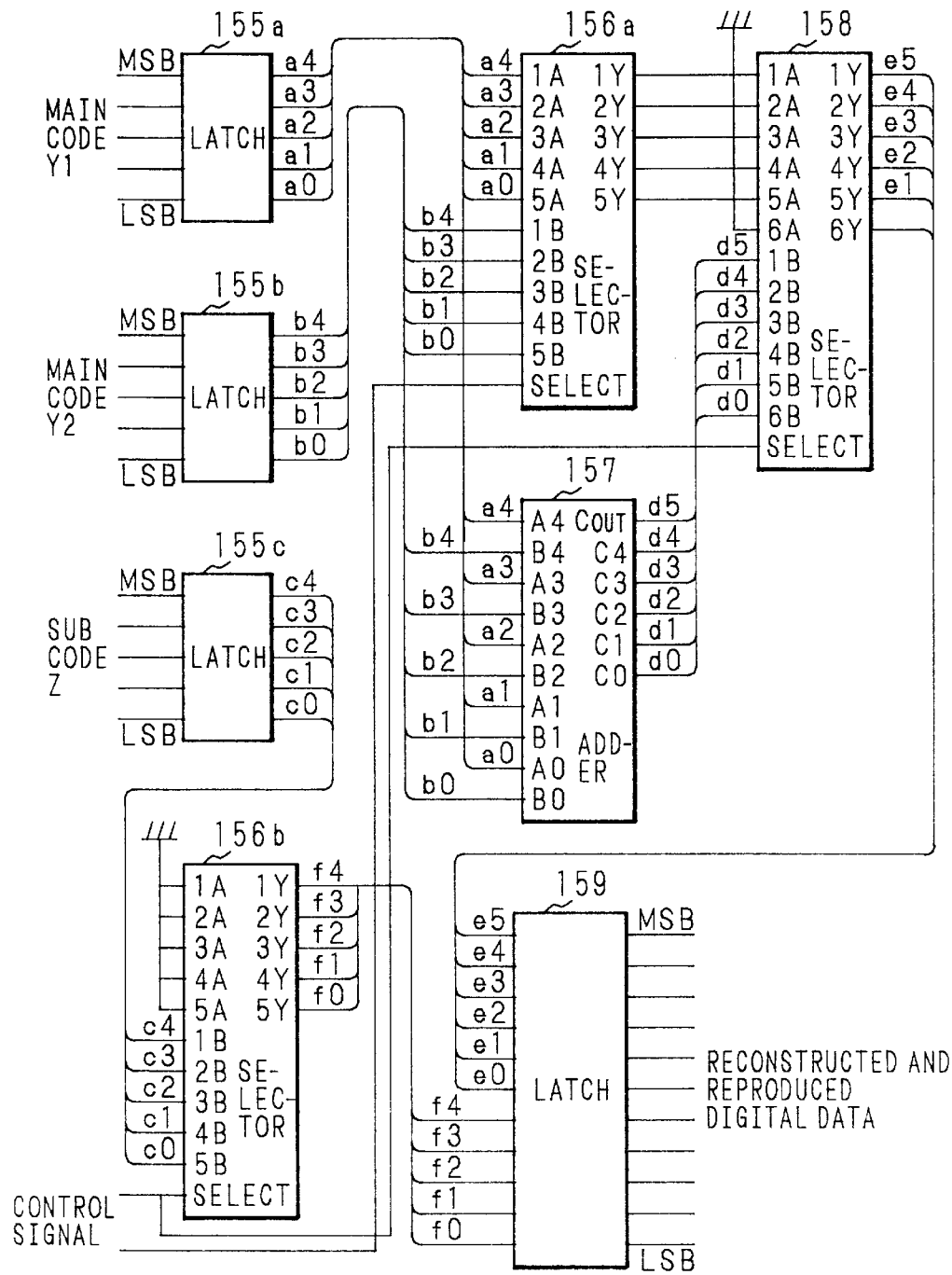
FIG. 61 is a block diagram showing the configuration of a first data-reconstruction circuit in FIG. 60.

FIG. 61 is a block diagram showing the configuration of the first data-reconstruction circuit 153 in FIG. 60. The circuit shown in this embodiment is an implementation of the circuit for reconstructing the digital data that was separated into two main codes and a subcode by the second data-separation circuit 132 shown in FIG. 58.

Next, the recording operation of the 14th embodiment will be described with reference to FIGS. 56 to 58. The bitstream inputted via the input terminal 60 contains a digital video signal, a digital audio signal, and digital data concerning the video signal and audio signal. They are carried in transport packets whose format is shown in FIG. 40A. Each packet, consists of a four-byte header field and a 184-byte data field. In the 14th embodiment, the bitstream is detected with one transport packet as a unit, and each detected packet of intra-coded data is divided and encoded for recording in the duplication area. Thus, the bitstream inputted via the input terminal 60 is first fed into the packet detection circuit 61, which detects a transport packet and supplies it to the first memory 62 as well as to the intra-detection circuit 63.

In the SD standard, as noted in the description of the prior art, there are 149 sync blocks per track, as areas for recording video data, as shown in FIG. 43, of which three blocks are used as VAUX data recording areas and 11 blocks as error-correcting code recording areas (designated as C2 check code in the figure). Each sync block consists of 90 bytes, of which the first five bytes carry a sync pattern and an ID signal and the last eight bytes carry an error-correcting code (designated as C1 check code). This leaves 77 bytes in each sync block for the recording of data, as shown in FIG. 43.

The first memory 62 stores bitstream data on a packet-by-packet, basis, and data is read out in the record data packet format shown in FIG. 40B. In the format of FIG. 40B, when the data length in each sync block is 77 bytes, as stated above, two transport packets are constructed using five sync blocks. In FIG. 40B, the first header H1 carries data such as identification data indicating the order of the sync in the five sync blocks. The second header H2 carries data such as identification data for identifying whether the data is video data or audio data. In the 14th embodiment, data read operations from the first memory 62 and from the second memory 65 hereinafter described are performed according to direct ions from the second data-synthesis circuit 128.

The bitstream output from the packet detection circuit 61 is also inputted to the intra-detection circuit 63. The intra-detection circuit 63 records data such as identification data for identifying whether the data in the transport packet is intra-coded data or not. In the 14th embodiment, data read operations from the first memory 62 and from the second memory 65 hereinafter described are performed according to directions from the second data-synthesis circuit 128.

The bitstream output from the packet detection circuit 61 is inputted to the intra-detection circuit 63, as described above. The intra-detection circuit 63 detects whether the data in the transport packet is intra-coded data or not. As explained in the description of the prior art, in an MPEG2 bitstream, when data is intraframe- or intra-field-coded (intra-coded), intra-transport packets are sent successively.

By detecting this, transport packets only of intra-coded data are extracted. Each extracted transport packet is passed to the first data-separation/encoding circuit 129.

Generally, the digital video data carried in the transport packet is variable-length coded data. Therefore, the description of the 14th embodiment is given on the assumption that the video data in the input bitstream data is variable-length coded. It is also assumed that intra-coded data are data obtained by first applying an orthogonal transform based on DCT and then applying two-dimensional variable-length coding.

Next, the operation of the first data-separation/encoding circuit 129 will be described with reference to FIG. 57. The variable-length coded digital data inputted via the input terminal 130 is subjected to variable-length decoding in the sixth variable-length decoder 131, which outputs the digital data in the DCT block in the zigzag scanning order shown in FIG. 11. The digital data outputted from the sixth variable-length decoder 131 in the zigzag scanning order is inputted to the second data-separation circuit 132 which separates the digital data into three data in accordance with a predetermined method. The method of data separation performed in the second data-separation circuit 132 will be described in detail later. The digital data separated into three data in accordance with the predetermined method in the second data-separation circuit 132 are inputted to the ninth variable-length encoder 133, 10th variable-length encoder 134, and 11th variable-length encoder 135, respectively, where the data are subjected to variable-length coding. The data variable-length encoded respectively in the ninth to 11th variable-length encoders 133 to 135 are outputted at the output terminals 137a to 137c.

The operation of the second data-separation circuit 132 in the present embodiment will be described in detail below. Suppose here that the value of the digital data, variable-length decoded in the sixth variable-length decoder 131 and inputted to the second data-separation circuit 132, is X. Then, the second data-separation circuit 132 separates the data into three data in accordance with the following method.

The digital data X inputted to the second data-separation circuit 132 is separated into main codes Y1 and Y2 and a subcode Z in accordance with the rule $X=2^{n-1}\times(Y1+Y2)+Z$. For Y1, Y2, and Z, the values calculated by the following equations are used.

$$Y1=INT(X/2^n) \quad (1)$$

$$Y2=INT(X/2^{n-1})-INT((X/2^n)) \quad (2)$$

$$Z=X \bmod 2^{n-1} \quad (3)$$

where INT(A/B) is the quotient when A is divided by B, and A mod B is the remainder when A is divided by B.

The above data separation rule will be explained using concrete numeric values. Suppose, for example, that data having a digital value of 395 is inputted to the second data-separation circuit 132. In the present embodiment, it is assumed that n=6. The input digital data is converted into two main codes Y1 and Y2 and a subcode Z in accordance with the above equations (1), (2), and (3). That is, $$Y1=INT(395/2^6)=6$$

$$Y2=INT(395/2^5)-INT(395/2^6)=6$$

$$Z=395 \bmod 2^5=11$$

The original digital value X is then $X=2^5\times(6+6)+11=395$, thus accomplishing complete reconstruction of the original value.

According to the above separation method, the original input digital value X can be reconstructed almost completely from either one of the main codes, Y1 or Y2, in accordance with the following equation.

When the reconstructed value is denoted as X', then $$X' = Y1 \text{ (or } Y2) \times 2^n \quad (4)$$

which, in this embodiment, gives $$X' = 6 \times 2^6 = 384$$

This shows that the original input digital value X can be reconstructed almost completely by using only one of the main codes, Y1 or Y2.

According to the above separation method, compared with the method of transmitting the same data in duplicate, the number of transmitted data bits is (m−n) for each of the main codes Y1 and Y2 and (n−1) for the subcode Z, where m is the number of bits of the diital data inputted to the second data-separation circuit 132. Accordingly, when the input digital data is 11 bits long, the total number of transmitted bits is 15 after data separation. Here, it is assumed that n=6. The transmission bit rate is thus reduced, as compared with the method of transmitting the same data in duplicate.

The operation of the second data-separation circuit 132, an implementation of the above separation rule, will be described with reference to FIG. 58. The input 11-bit digital data X is latched into the data latch circuit 176, and then supplied to the adder 177 and also to the data latch circuit 178a. The data latch circuit 178a carries out $INT(X/2^6)$ shown in equation (1). In the present embodiment handling binary data, in calculating equation (1) the input data is shifted to the right by n bits and all digits to the right of the decimal point is discarded. For example, in binary notation, the above value 395 is 00110001011. Therefore, the result of the calculation of $INT(375/2^6)$ is 00110 in binary notation since the data is shifted to the right by 6 bits and all digits to the right of the decimal point is discarded. That is, the five MSBs are selected.

Likewise, the adder 177 performs $INT(X/2^{6-1}) - INT(X/2^6)$ in equation (2). Detailed explanation is not given here, but the same result of calculation can be obtained by adding the data at the 5th bit to the right of the MSB to the result of $(INT/2^6)$. More specifically, 00000 is added to 00110 to obtain 00110 as the result of the calculation.

Similarly, since (X mod $2^5$) in equation (3) is the remainder when X is divided by $2^5$, the five LSBs are output. Thus, the result of the calculation of (395 mod $2^5$) is 01011.

Of the three data separated in the second data-separation circuit 132, the main code Y1 is inputted to the ninth variable-length encoder 133, the main code Y2 is inputted to the 10th variable-length encoder 134, and the subcode Z is inputted to the 11th variable-length encoder 135, where they are subjected to variable-length coding. The main code Y1, the main code Y2, and the subcode Z are outputted at the output terminals 137a, 137b, and 137c, respectively.

The main codes Y1 and Y2 and the subcode Z, separated and variable-length encoded in the first data-separation/encoding circuit 129, are temporarily stored in the second memory 65. The bitstreams of the separated and variable-length encoded main codes Y1 and Y2 and subcode Z are thus stored temporarily in the second memory 65; then, the data are read out in the record data packet format with one sync block having a 77-byte data length, as in the case of the transport packet earlier described.

The data outputted from the first memory 62 and second memory 65 are fed into the second data-synthesis circuit 128. The second data-synthesis circuit 128 combines the data from the first memory 62 and second memory 65 and produces a track format.

Figure 62:
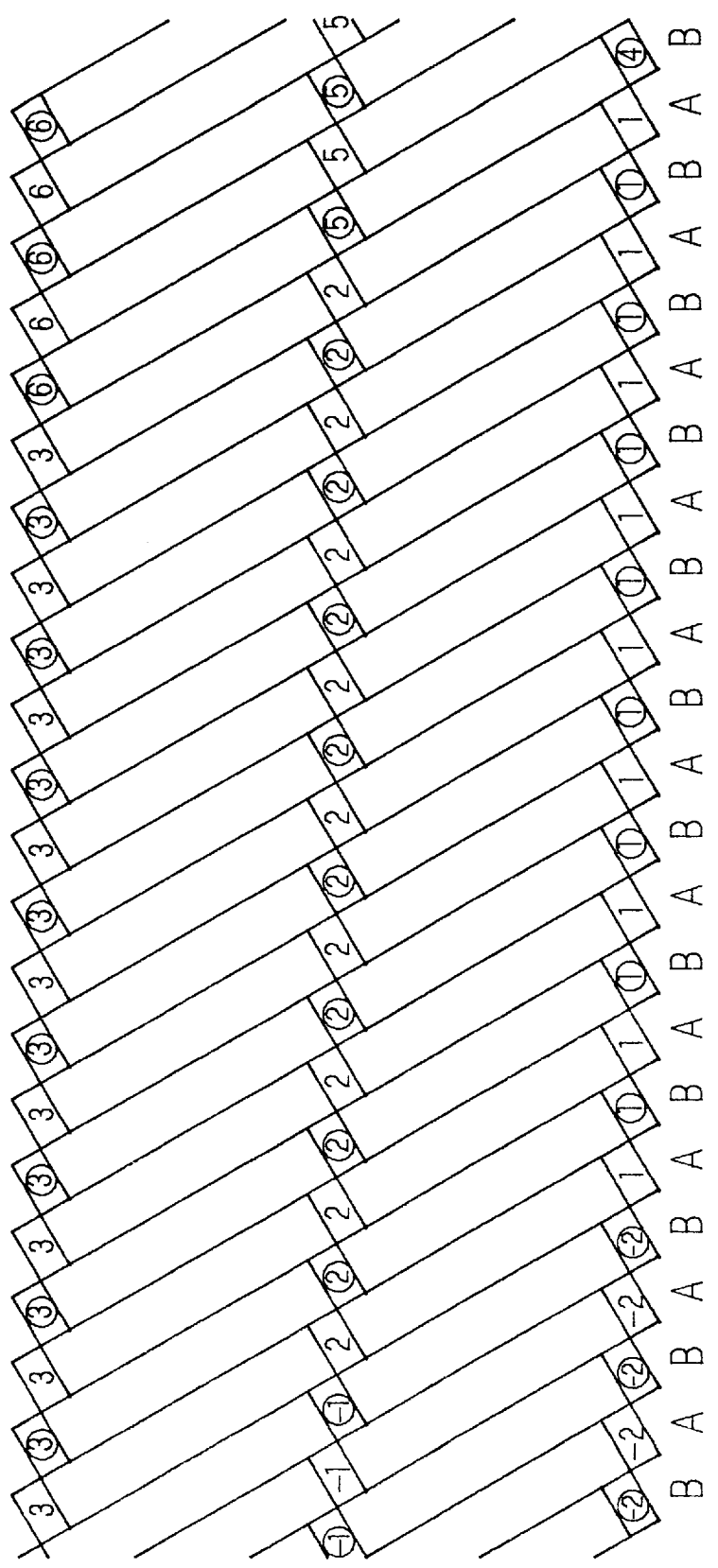
FIG. 62 is a diagram showing an example of a recording format on a magnetic tape for the digital VTR according to the 14th embodiment.

The data-synthesis operation in the second data-synthesis circuit 128 will be described below with reference to FIG. 62. FIG. 62 is a diagram showing an example of a recording format on a magnetic tape for a digital VTR according to the 14th embodiment of the invention. In the figure, A and B respectively indicate tracks recorded by heads having different azimuth angles. According to the track format shown in FIG. 62, the output data from the ninth variable-length encoder 133, i.e., the data obtained by variable-length encoding the main code Y1, is recorded in duplication areas on track A, while the output data from the 10th variable-length encoder 134, i.e., the data obtained by variable-length encoding the main code Y2, is recorded in duplication areas on track B. In the figure, each pair of numbers, one circled and the other not circled, designates a pair of duplication areas holding a pair of data divided as described above and representing the same position on the screen.

The ATV signal bitstream stored in the first memory 62 is carried in transport, packet form, two packets together comprising five sync blocks, as previously described, and is read out, one sync block at a time, from the first memory 62 with prescribed timing for data synthesis for recording in the main area on the recorded track. The second data-synthesis circuit 128 generates a memory read control signal (providing data read timing) for the first, memory 62, and synthesizes data.

Figure 13:
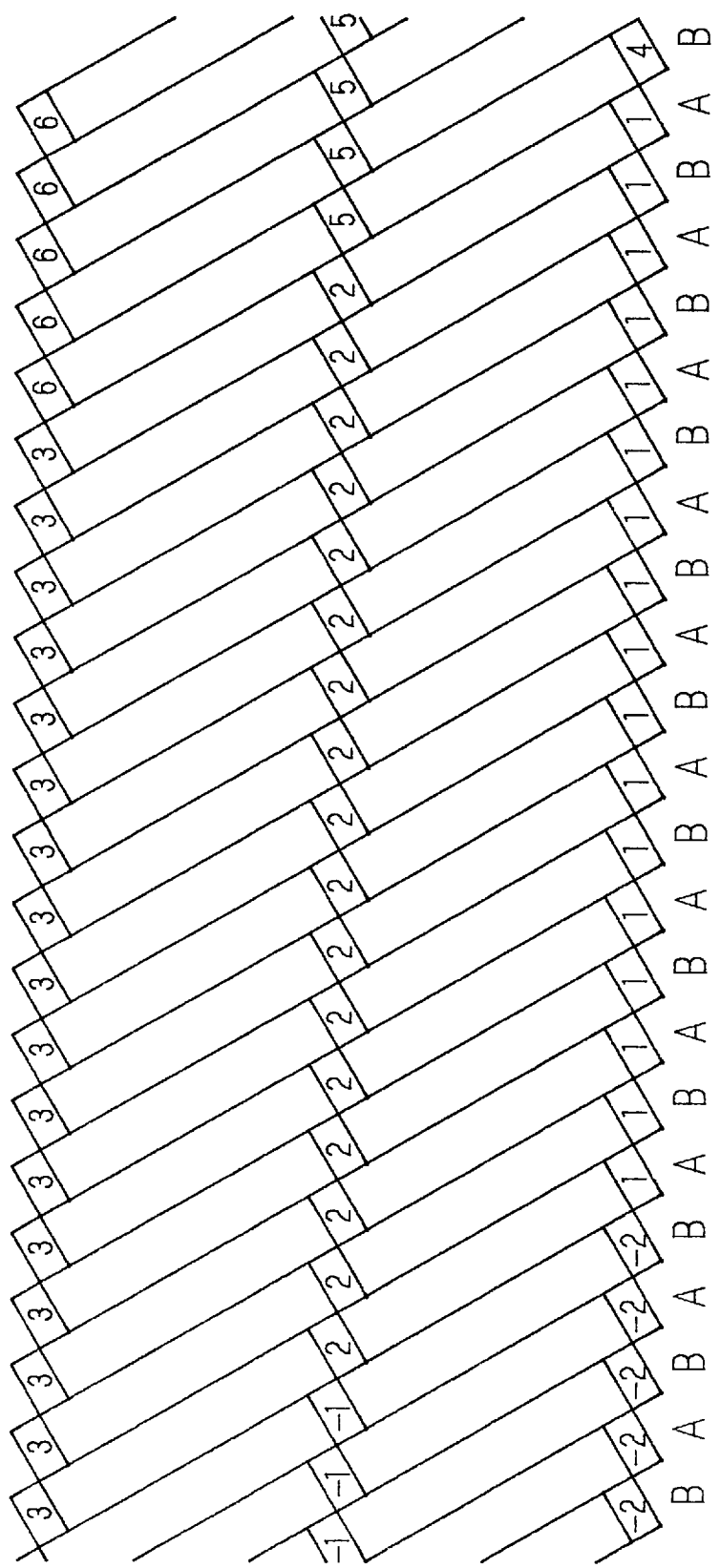
FIG. 13 is a diagram for explaining the prior art method of recording HP data.
Figure 14:
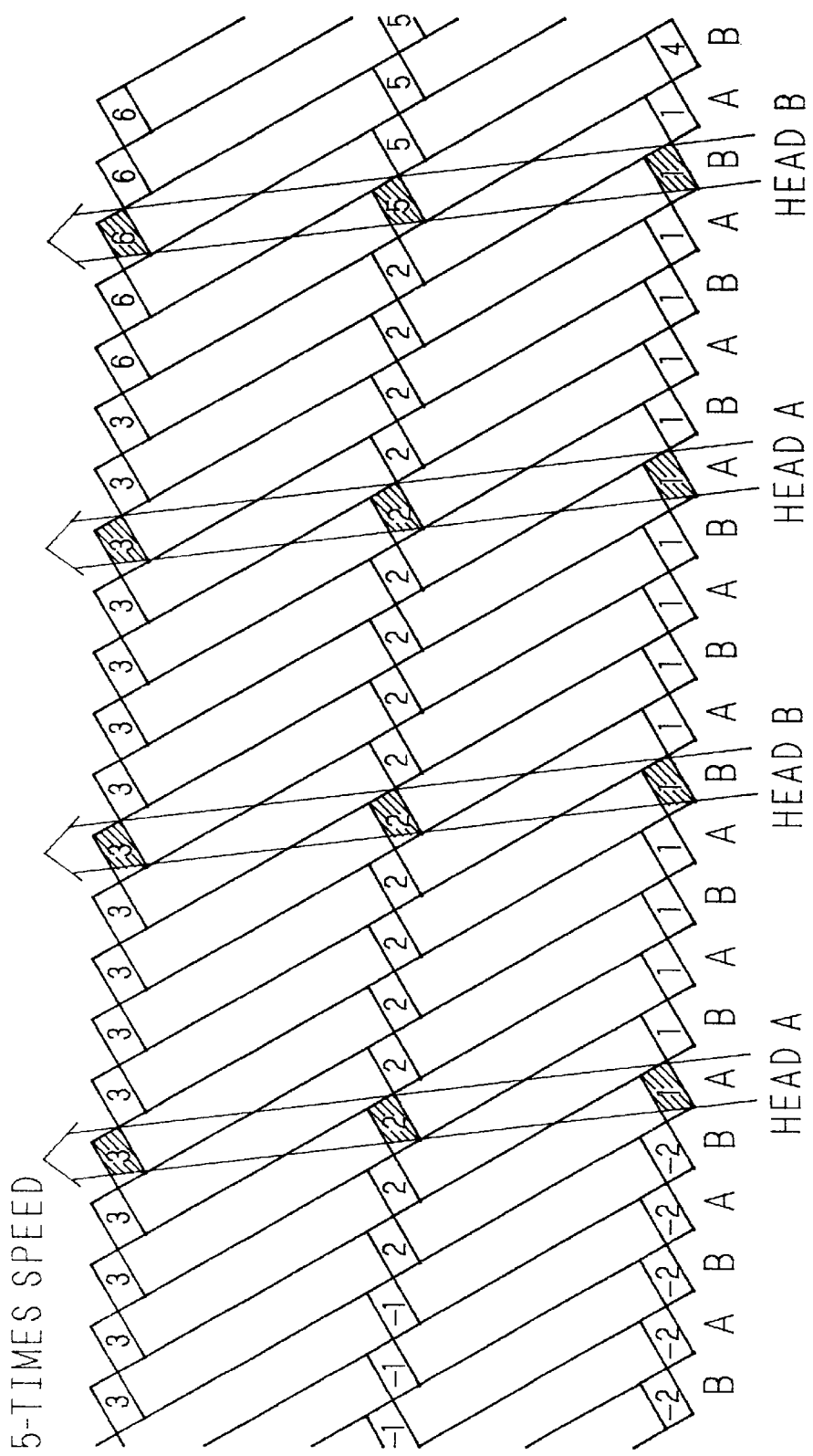
FIG. 14 is a diagram showing the head scan path in high-speed playback at the speed five times the normal speed.
Figure 15:
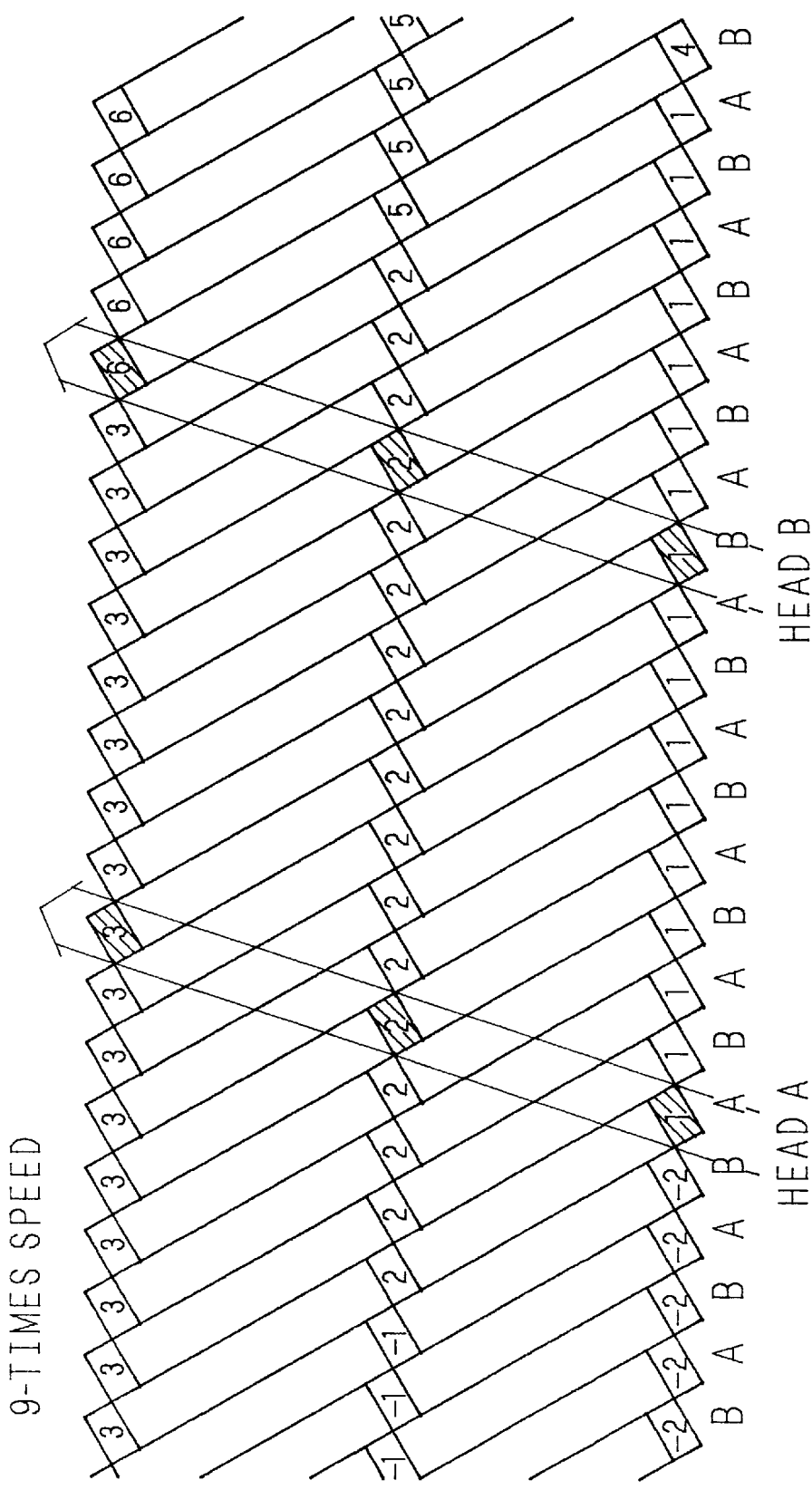
FIG. 15 is a diagram showing the head scan path in high-speed playback at the speed nine times the normal speed.
Figure 16:
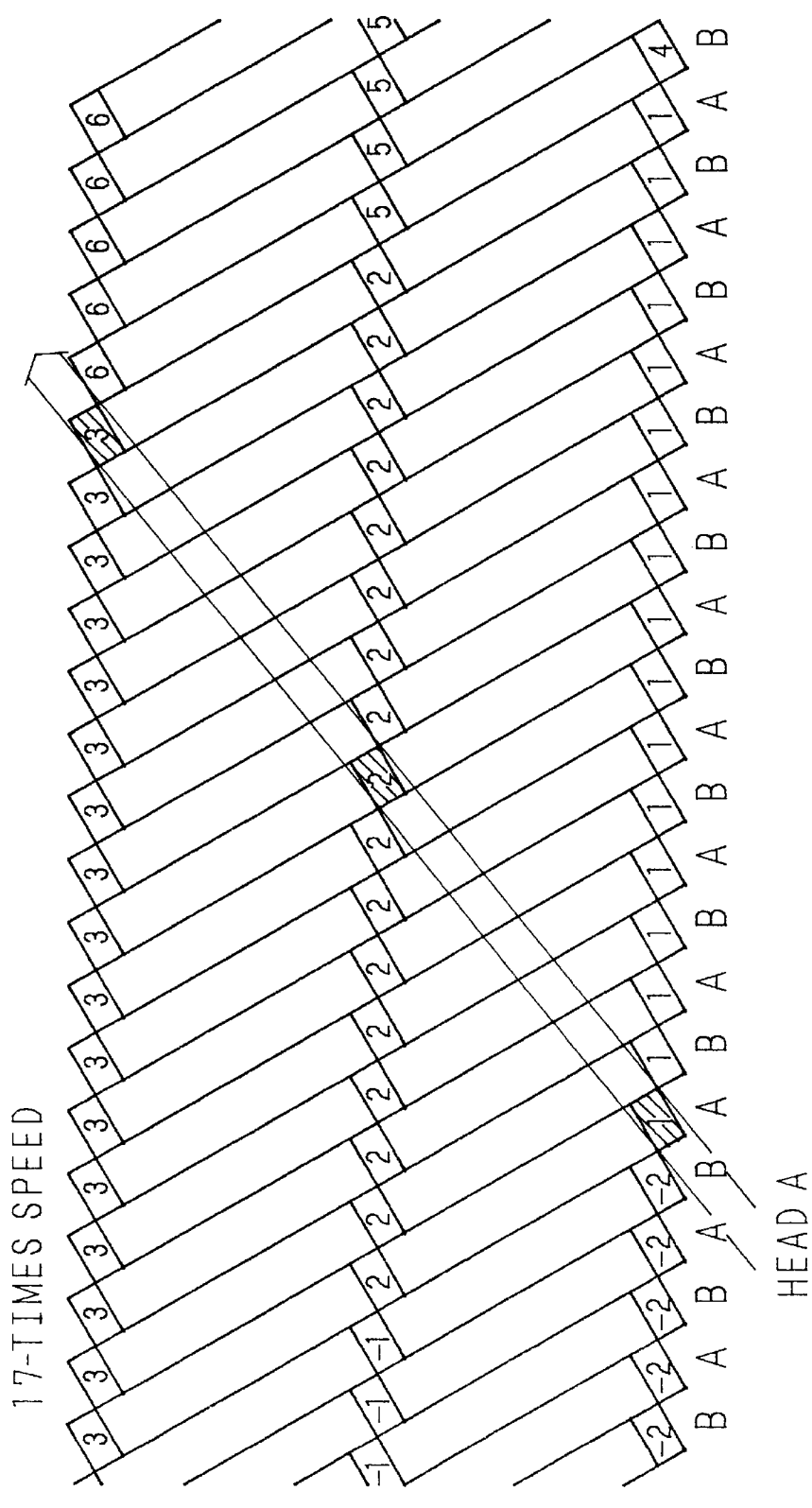
FIG. 16 is a diagram showing the head scan path in high-speed playback at the speed 17 times the normal speed.

On the other hand, the main codes Y1 and Y2 and the subcode Z separated in the first, data-separation/encoding circuit 129 are read out of the second memory 65, with prescribed timing and one sync block (77 bytes) at a time, so that they are recorded in the data recording format shown in FIG. 62, each pair of separated data being switched alternately from one track to the next. As a result, the separated block information from the same position on the screen is recorded on different tracks separately by the pair of heads having different azimuth angles A and B, as shown in FIG. 62. That is, the main code Y1 data is recorded in areas 1, 2, 3, . . . , while the main code Y2 data is recorded in areas ①, ②, ③, Further, data synthesis is performed so that the output data from the 11th variable-length encoder 135, i.e., the data obtained by variable-length encoding the subcode Z, is recorded in units of variable-length codes alternately between the duplication areas on track A where the main code Y1 is recorded and the duplication areas on track B where the main code Y2 is recorded. The example of the HP data arrangement on the tracks shown in FIG. 62 is based on the arrangement shown in FIG. 13 where identical HP data is recorded 17 times; in the present embodiment, each data pair of the same number is recorded 9 or 8 times. That is, when the data pair of the main code Y1 and subcode Z is recorded 9 times, then the data pair of the main code Y2 and subcode Z is recorded 8 times; likewise, when the data pair of the main code Y1 and subcode Z is recorded 8 times, then the data pair of the main code Y2 and subcode Z is recorded 9 times.

The data synthesized in the above manner is passed to the error-correcting encoder 67 which appends an error-correcting code. The record data with an error-correcting code appended to it is then fed into the recording amplifier 68 where it is digitally modulated and amplified for recording on the magnetic tape by the rotary heads 70a and 70b.

Next, the operation of the playback system will be described with reference to FIGS. 59, 60, and 61. First, the operation in normal playback will be described. In normal playback, data played back from the magnetic tape by the rotary heads 70*a* and 70*b* is first amplified by the head amplifier 80, and then fed to the signal detection circuit 81 for signal detection, conversion to digital data, and digital demodulation. The digitally demodulated data is inputted to the error-correcting decoder 82 which, using the error-correcting code appended during the recording process, performs detection and correction of errors in the playback signal. The error-corrected data is supplied to the third memory 83 and the 12th data-synthesis circuit 138.

In the third memory 83, the bitstream of the ATV signal is separated from the input data, and only that bitstream is stored in the third memory 83. The switch 86 is configured to always select the output of the third memory 83 in normal playback, and the ATV bitstream reconstructed as 188-byte packet information in the third memory 83 is outputted at the output terminal 87. Data is also inputted to the 12th data-synthesis circuit 138, but this data is a playback signal from the duplication areas, which in normal playback, is discarded and not played back.

Next, the operation in high-speed playback will be described. When a high-speed playback mode signal is inputted, the switch 86 selects the output of the fourth memory 85. The playback data intermittently reproduced by the rotary heads 70*a* and 70*b* is first amplified by the head amplifier 80, and then, in the signal detection circuit 81, is converted into digital data and subjected to digital demodulation. The data correctly demodulated in the signal detection circuit 81 is error-corrected in the error-correcting decoder 82 and inputted to the 12th data-synthesis circuit 138. The data is also supplied to the third memory 83, but since the data is reproduced intermittently, as described above, useful transport packets cannot be generated. The data input to the 12th data-synthesis circuit 138 via the input terminal 148 is fed into the first data-discrimination circuit 149 where the main codes Y1 and Y2 and the subcode Z separated during the recording process are separated from the playback signal. The data division method employed in the 14th embodiment is as follows: since Y1+Z data is recorded on tracks with azimuth angle A and Y2+Z data recorded on tracks with azimuth angle B, the position of the duplication area on each track is detected using the sync block number recorded in the ID signal field of the sync block, and the Y1+Z data or Y2+Z data is identified by the azimuth angle of the rotary head currently playing back the signal. If the separated Y1+Z data and Y2+Z data are recorded in the above manner, the Y1+Z data and Y2+Z data can be separated easily and accurately without, having to provide a special circuit. The first data-discrimination circuit 149 further separates the main code Y1+subcode Z and the main code Y2+subcode Z into the respective variable-length codes to obtain the three data, the main codes Y1 and Y2 and the subcode Z.

The first data-discrimination circuit 149 discriminates the main codes Y1 and Y2 and the subcodes Z, as described above. The data discriminated as the main code Y1 is fed to the seventh variable-length decoder 150, the data discriminated as the main code Y2 is fed to the eighth variable-length decoder 151, and the data discriminated as the subcode Z is fed to the ninth variable-length decoder 152, where they are subjected to variable-length decoding. The digital data variable-length decoded by the respective variable-length decoders are inputted to the first data-reconstruction circuit 153. The first data-discrimination circuit 149 also generates a control signal indicating whether or not all of the two main codes Y1 and Y2 and the sub code Z are reproduced, and supplied the control signal to the first data-reconstruction circuit 153.

Tile operation of the first data-reconstruction circuit 153 in the present embodiment will be described in detail below with reference to FIG. 61. In the present embodiment, the digital data inputted to the first data-reconstruction circuit 153 is reconstructed in accordance with the following method. The reconstructed value denoted as X is given by $$X=2^5 \times (Y1+Y2)+Z \qquad (5)$$

or $$X=2^6 \times Y1 \text{ (or } Y2) \qquad (6)$$

Based on the control signal supplied from the first data-discrimination circuit, 149, when all of the three separated data (Y1, Y2, and Z) are reproduced, for example, the data is reconstructed in accordance with equation (5). On the other hand, when, of the same numbered data pairs, 1, 2, 3, ... recorded on the duplication areas on track A and ①, ②, ③, ... recorded on the duplication areas on track B shown in FIG. 62, one or the other of any paired data is not reproduced, then the data is reconstructed in accordance with equation (6). When equation (6) is selected, the data Y1 or Y2, whichever reproduced, is used.

The reproduced main codes and subcode are first latched into the data latch circuits 155*a*–155*c*. The main codes Y1 and Y2 outputted on two channels from the data latch circuits 155*a* and 155*b* are each inputted to both the selector 156*a* and the adder 157. The adder 157 sums the 5-bit main codes inputted to it and outputs 6-bit digital data (Y1+Y2 is carried out). The 6-bit digital data outputted from the adder 157 is fed to the selector 158. On the other hand, of the main codes Y1 and Y2 inputted to the selector 156*a*, the correctly reproduced one is selected.

The outputs of the adder 157 and the selector 156*a* are thus inputted to the selector 158 ("0" is appended to the LSB of the output. of the selector 156*a* so that 6-bit data is inputted to the selector 158 from the selector 156*a* (2×Y1 (or Y2) is carried out); the selector 158 is configured to select the output of the selector 156*a* when only either one of Y1 or Y2 is reproduced in the playback digital signal, and select the output of the adder 157 when both Y1 and Y2 are reproduced. Likewise, the selector 156*b* is configured to select 00000 when only either one of Y1 or Y2 is reproduced in the playback digital signal, and select the subcode when both Y1 and Y2 are reproduced. Then, the outputs of the selectors 158 and 156*a* are mixed together in the latch circuit 159 ($2^5 \times (Y1+Y2)+Z$ or $2^5 \times 2 \times Y1$ (or Y2) is carried out), and the reconstructed playback digital data is outputted.

Figure 63:
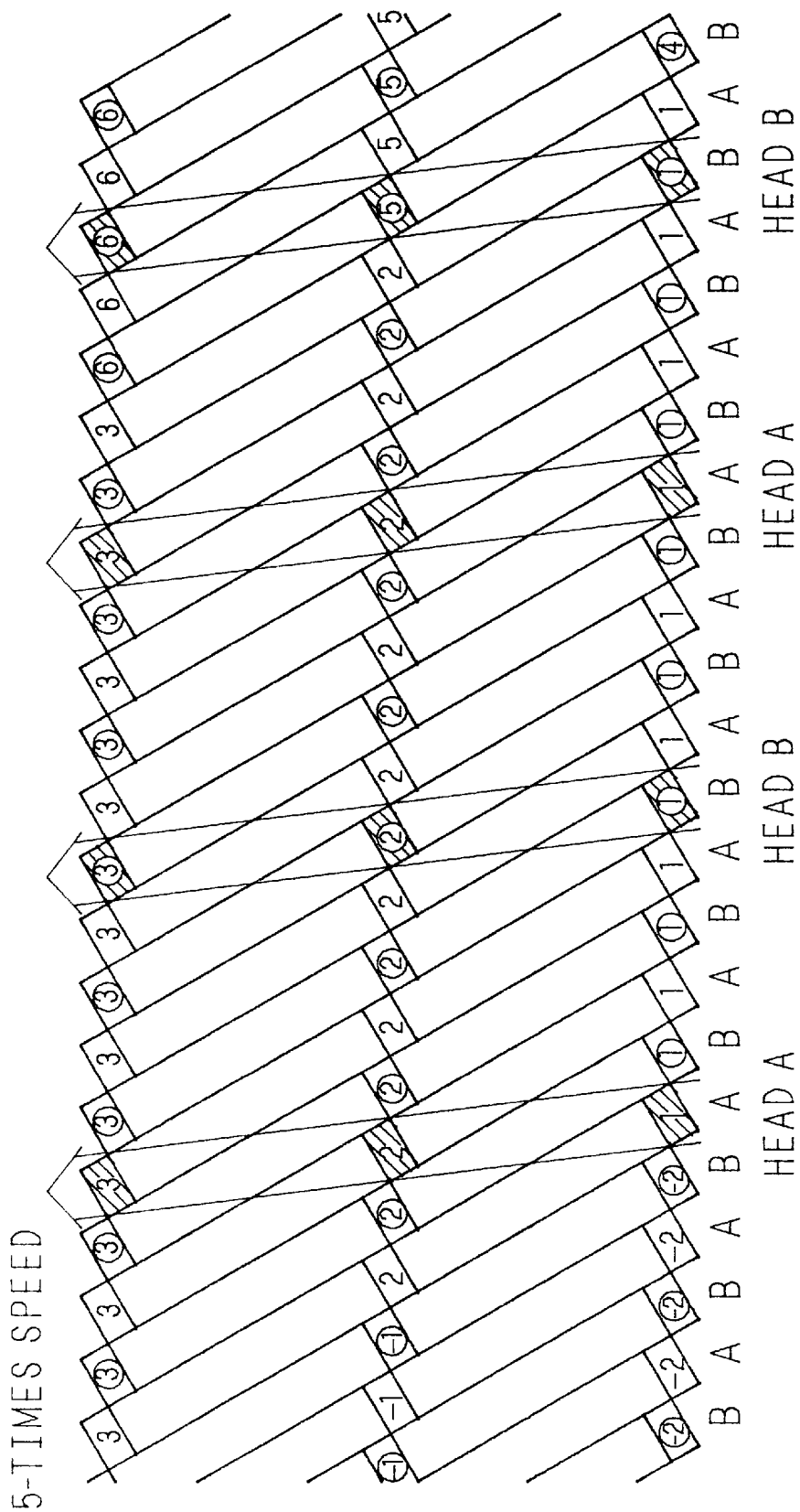
FIG. 63 is a diagram showing head scan paths on the recording tracks in FIG. 62 in high-speed playback at the speed five times the normal speed.

The operation of high-speed playback on the digital VTR according to the present embodiment will be described below. FIG. 63 is a diagram showing head scan paths on the recorded tracks in FIG. 62 in high-speed playback five times the normal speed. Playback data is obtained from the hatched regions shown in the figure. As shown, head A scans the HP data regions in the same azimuth playback areas in the order of 1, 2, 3, 1, 2, 3. On the other hand, head B scans the HP data regions in the same azimuth playback areas in the order of ①, ②, ③, ①, ⑤, ⑥, ... As a result, for data pairs of 1 and ①, 2 and ②, and 3 and ③, both HP data are all reproduced from the different azimuth playback areas. These data are combined to reconstruct the complete data.

Figure 64:
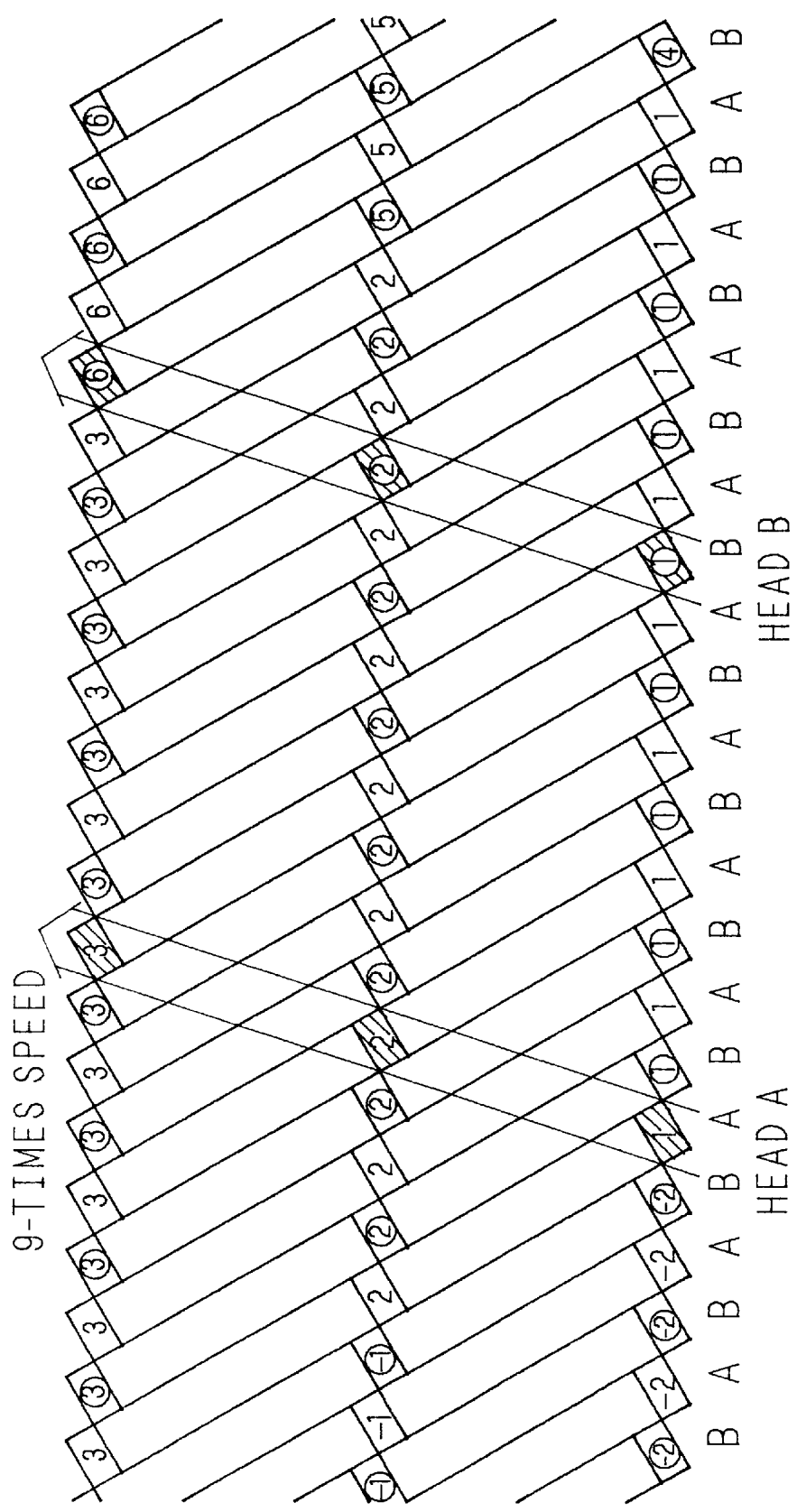
FIG. 64 is a diagram showing head scan paths on the recording tracks in FIG. 62 in high-speed playback at the speed nine times the normal speed.

FIG. 64 is a diagram showing head scan paths on the recorded tracks in FIG. 62 in high-speed playback nine times the normal speed. Playback data is obtained from the hatched regions shown in the figure. As shown, head A scans the HP data regions in the same azimuth playback areas in the order of 1, 2, 3, 1, 2, 3. On the other hand, head B scans the HP data regions in the same azimuth playback areas in the order of ①, ②, ③, ①, ⑤, ⑥, . . . As a result, for data pairs of 1 and ①, 2 and ②, and 3 and ③, both HP data are all reproduced from the different azimuth playback areas. These data are combined to reconstruct the complete data.

Figure 65:
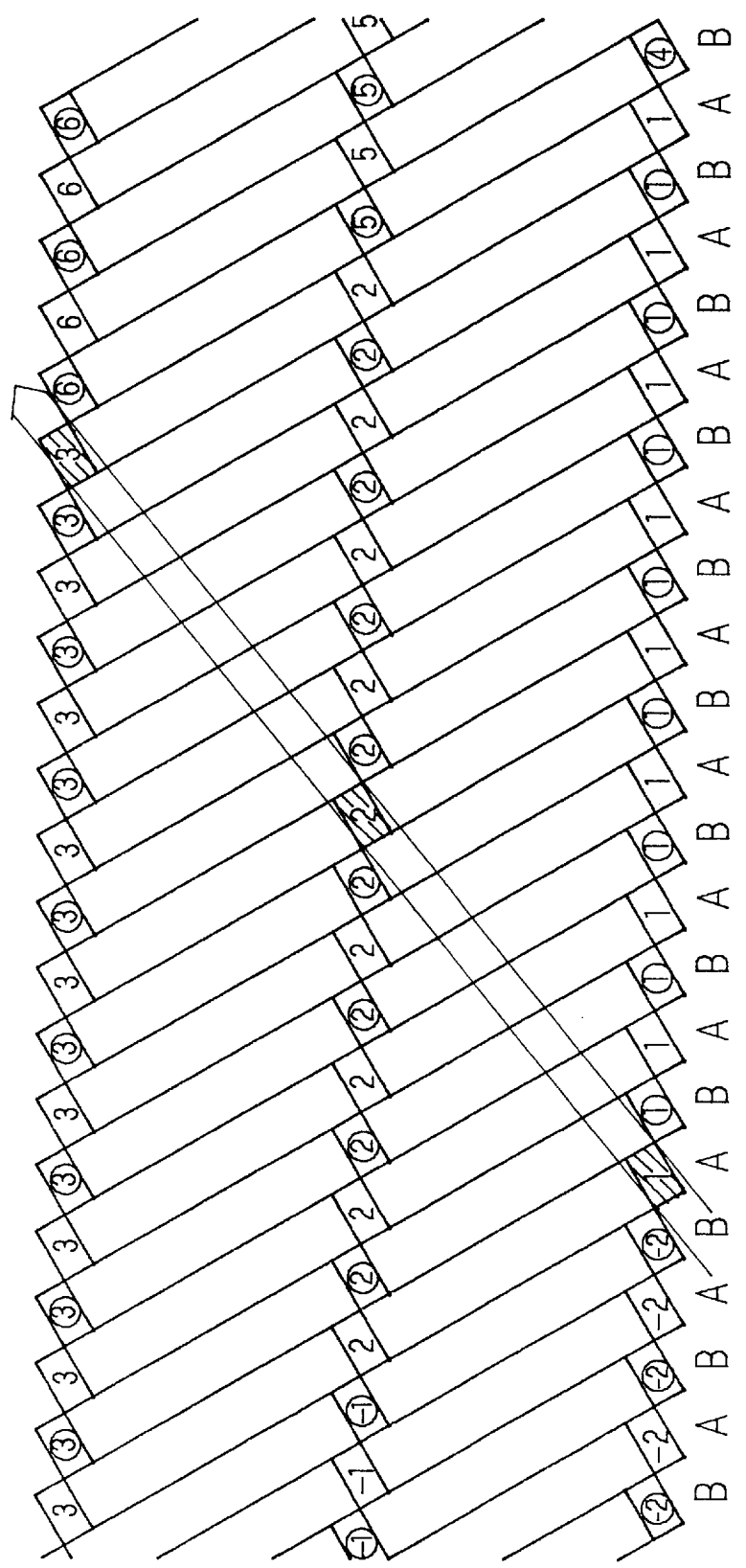
FIG. 65 is a diagram showing head scan paths on the recording tracks in FIG. 62 in high-speed playback at the speed 17 times the normal speed.

FIG. 65 is a diagram showing head scan paths on the recorded tracks in FIG. 62 in high-speed playback 17 times the normal speed. Playback data is obtained from the hatched regions shown in the figure. As shown, head A scans the HP data regions in the same azimuth playback areas in the order of 1, 2, 3. On the other hand, HP data at ①, ②, and ③ in the same azimuth playback areas cannot be obtained as a playback signal from head B. The figure shows the playback of the portions corresponding to positions 1, 2, and 3 on the screen; as shown, the data at the regions 1, 2, and 3 scanned by head A are reproduced, but the data at the regions ①, ②, and ③ to be scanned by head B are not reproduced. Since both data are not reproduced, the complete data cannot, be reconstructed, but according to the digital VTR of the present embodiment, if either one of the main codes (Y1 or Y2) can be reproduced, the original digital value can be reconstructed almost completely using equation (6) calculated as $$X'=2^6 \times Y1 (\text{or } Y2)$$

$$X'=2^6 \times Y2 (\text{or } Y1)$$

For example, when a digital value of 395 is inputted, if both data are reproduced, the original value can be reconstructed using equation (5) calculated as $$2^5 \times (6+6)+11=395$$

When only the main code Y1 is reproduced, equation (6) is used to reconstruct the digital value as $$2^6 \times 6=384$$

Next, still-mode operation will be briefly described with reference to FIG. 59. Still-motion playback is started in one of two ways, i.e., by moving to the still mode during normal playback, or by selecting the still mode when the VTR is in stop condition. First, description is given of the still-motion operation when the still mode is entered during normal playback. When the still mode is selected during normal playback, the playback data stops and no data is inputted either to the third memory 83 or too the 12th data-synthesis circuit 138. Then, the switch 86 switches its input to connect to the output of the fourth memory 85 so that a still picture is outputted at the output terminal 87. Transport packet data is written to the third and fourth memories 83 and 85. Since only intra-coded data synthesized in the 12th data-synthesis circuit 138 is written to the fourth memory 85, data stored in units of transport packets are read out in sequence to perform the still-motion playback.

Next, description is given of the still-motion operation when the still mode is selected when in stop condition. In stop condition, no useful data is stored in either the third memory 83 or the fourth memory 85. When the still mode is selected in this condition, playback is performed once, to store one-picture data in the fourth memory 85, and then, the tape is stopped.

Next, slow-motion operation will be briefly described with reference to FIG. 59. In slow-motion playback, the magnetic tape runs at a slower speed than the normal speed, with the head scanning across the same slant track and playing back the same portion a number of times. Accordingly, to accomplish the slow-motion playback, only sync blocks correctly demodulated are extracted by the signal detection circuit, 81 and error-corrected by the error-correcting decoder 82, intra-coded data recorded in the duplication area is extracted to synthesize a still picture, and data stored in units of transport packets are sequentially read out from the fourth memory 85.

Thus, according to the method of the present embodiment, efficient data separation can be achieved by performing data separation on the input digital data in accordance with a predetermined calculation rule (for example, a calculation is performed using one of the equations (1) to (3)), and even if one of the main codes is not reproduced, the original digital value of the recorded data can be reconstructed almost completely using the other main code.

Furthermore, according to the method of the present embodiment, the transmission data amount is 15/22 before the input, to the ninth to 11th variable-length encoders 133 to 135, and thus the data redundancy is about 70% of that when the same data is simply written twice on the tracks.

Accordingly, by performing data separation and recording the separated data by the heads having different azimuth angles, as in the present embodiment, the amount of data that can be transmitted as HP data can be increased by about 30% as compared with the method of writing the same data twice. In the prior art, HP data for high-speed playback is constructed using the lower-frequency coefficients in intra-coded blocks, but according to the present embodiment, as the transmission data amount of HP data is increased, higher-frequency coefficients in intra-coded blocks can also be transmitted, thus achieving an improvement, in high-speed playback picture quality.

As described, in the 14th embodiment, of the input digital data, the digital data of the intra-coded block to be used for high-speed playback is variable-length decoded first, and then, the decoded digital data is separated into three data according to a predetermined method, each of which data is then variable-length encoded; the three variable-length encoded data are then synthesized into HP data pairs so that the data in each pair are recorded by the heads having different azimuth angles. This increases the data efficiency of the HP data, as compared with the prior art VTR in which the same HP data is duplicated on the same number of tracks as the maximum fast playback tape speed expressed as a multiple of its normal speed. Since the data format is such that the HP data is duplicated a fewer number of times than the maximum tape speed expressed as a multiple of its normal speed, higher-frequency coefficients in the intra-coded block can also be used to construct the HP data. This improves the picture quality in high-speed playback and also the S/N ratio, as compared with the encoding of HP data by the prior art, digital VTR.

Embodiment 15

Figure 66:
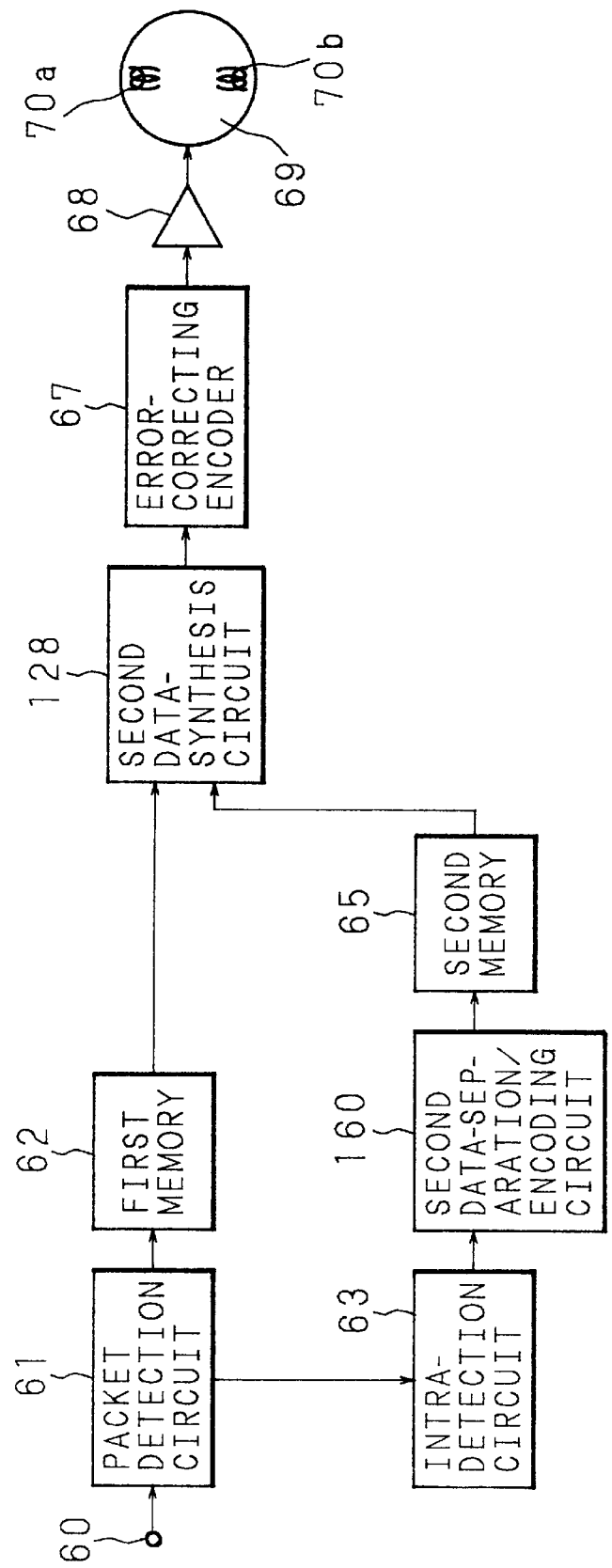
FIG. 66 is a block diagram showing the configuration of a recording system in a digital VTR according to a 15th embodiment of the present invention.

A 15th embodiment, of the digital VTR of the invention will be described below. FIG. 66 is a block diagram showing the configuration of a recording system in the digital VTR according to the 15th embodiment of the invention. In FIG. 66, the same parts as those shown in FIG. 56 (14th embodiment) are designated by like reference numerals, and description of such parts is omitted here since they are identical in configuration and operation to the corresponding parts described in the 14th embodiment. In FIG. 66, reference numeral 160 is a second data-separation/encoding circuit for performing data separation on intra-coded data in accordance with a predetermined rule and for applying variable length coding to separated data.

Figure 67:
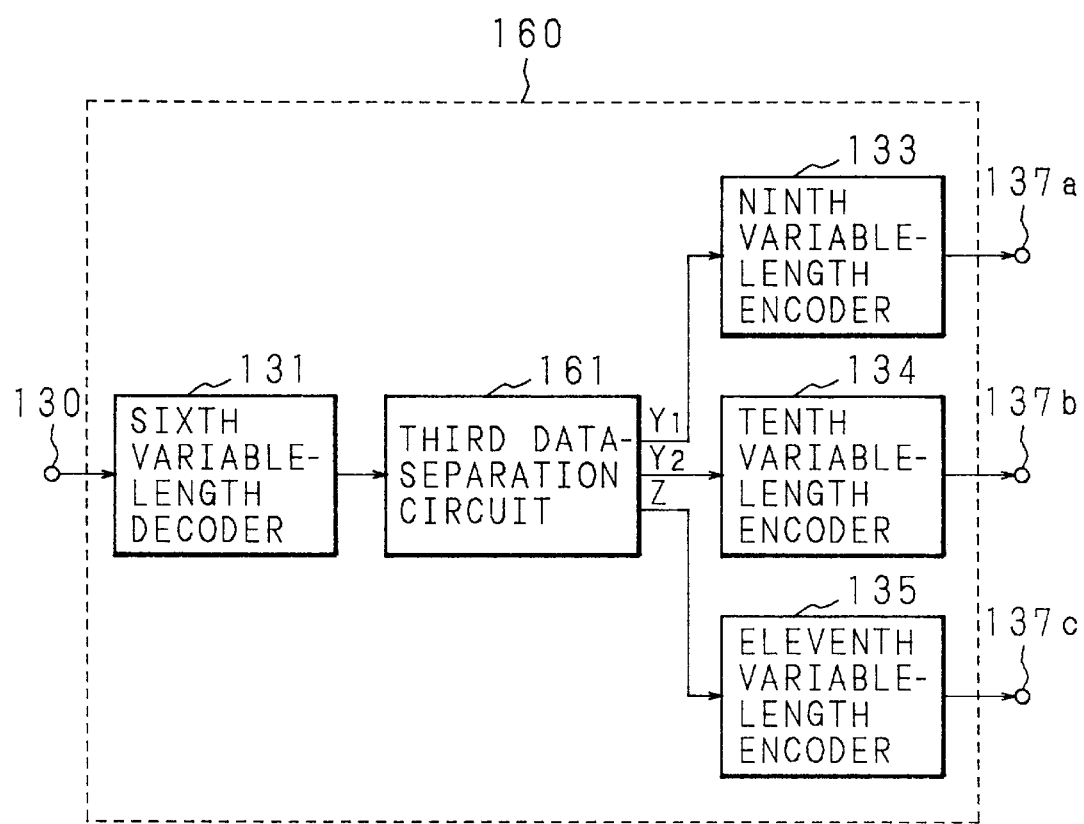
FIG. 67 is a block diagram showing the configuration of a second data-separation/encoding circuit in FIG. 66.

FIG. 67 is a block diagram showing the configuration of the second data-separation/encoding circuit 160 in FIG. 66.

In FIG. 67, the same parts as those shown in FIG. 57 (14th embodiment) are designated by like reference numerals, and description of such part is omitted here since they are identical in configuration and operation to the corresponding parts described in the 14th embodiment. In FIG. 67, reference numeral 161 is a third data-separation circuit.

Figure 68:
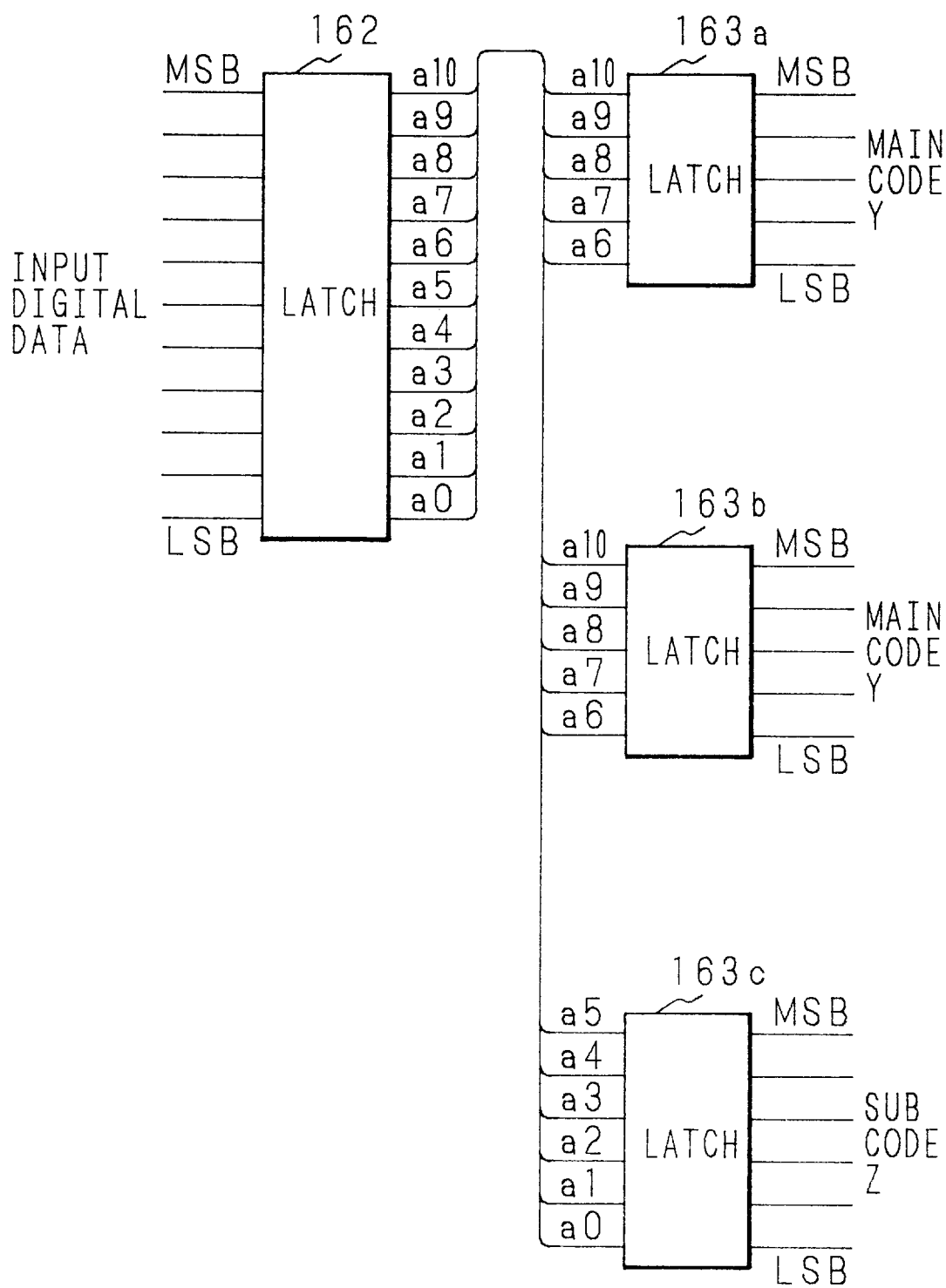
FIG. 68 is a block diagram showing the configuration of a third data-separation circuit in FIG. 67.

FIG. 68 is a block diagram showing the configuration of the third data-separation circuit 161 in FIG. 67. In FIG. 68, reference numeral 162 is a data latch circuit, and 163a to 163c are data latch circuits.

Figure 69:
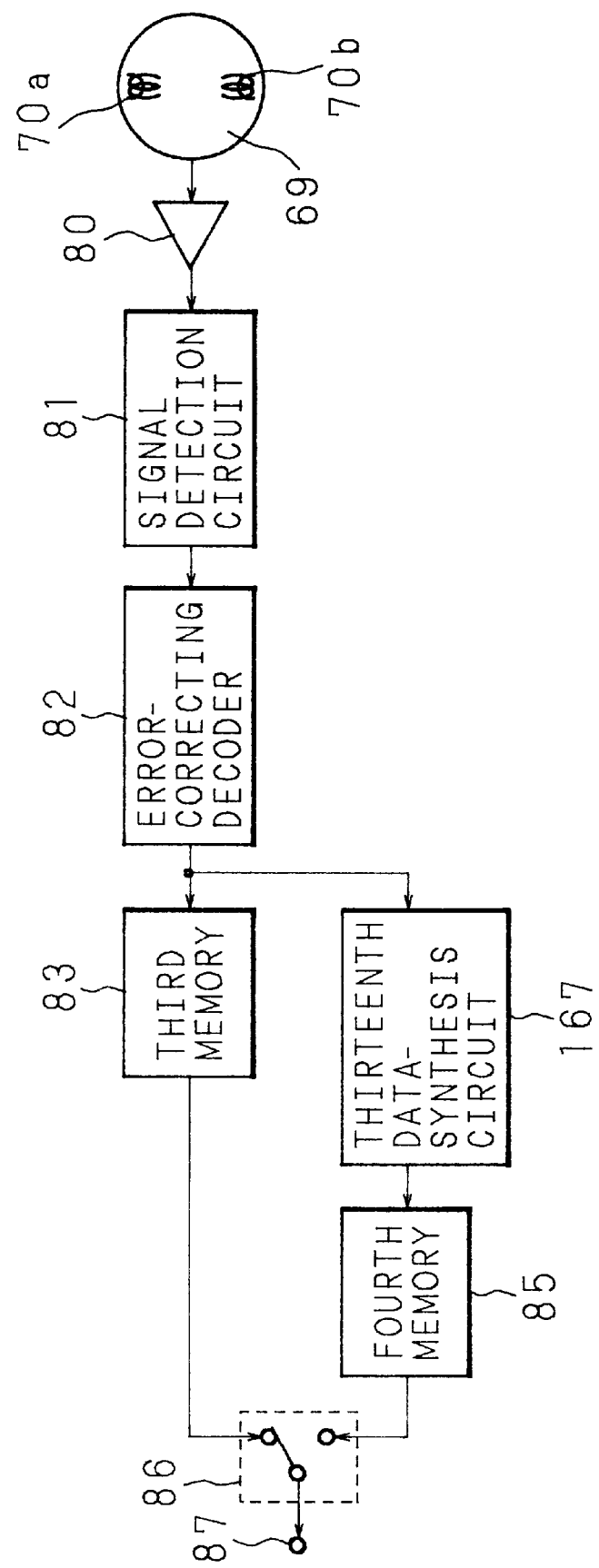
FIG. 69 is a block diagram showing the configuration of a playback system in the digital VTR according to the 15th embodiment.

FIG. 69 is a block diagram showing the configuration of a playback system in the digital VTR according to the 15th embodiment of the invention. In FIG. 69, the same parts as those shown in FIG. 59 (14th embodiment) are designated by like reference numerals, and description of such parts is omitted here since they are identical in configuration and operation to the corresponding parts described in the 14th embodiment. In FIG. 69, reference numeral 167 is a 13th data-synthesis circuit.

Figure 70:
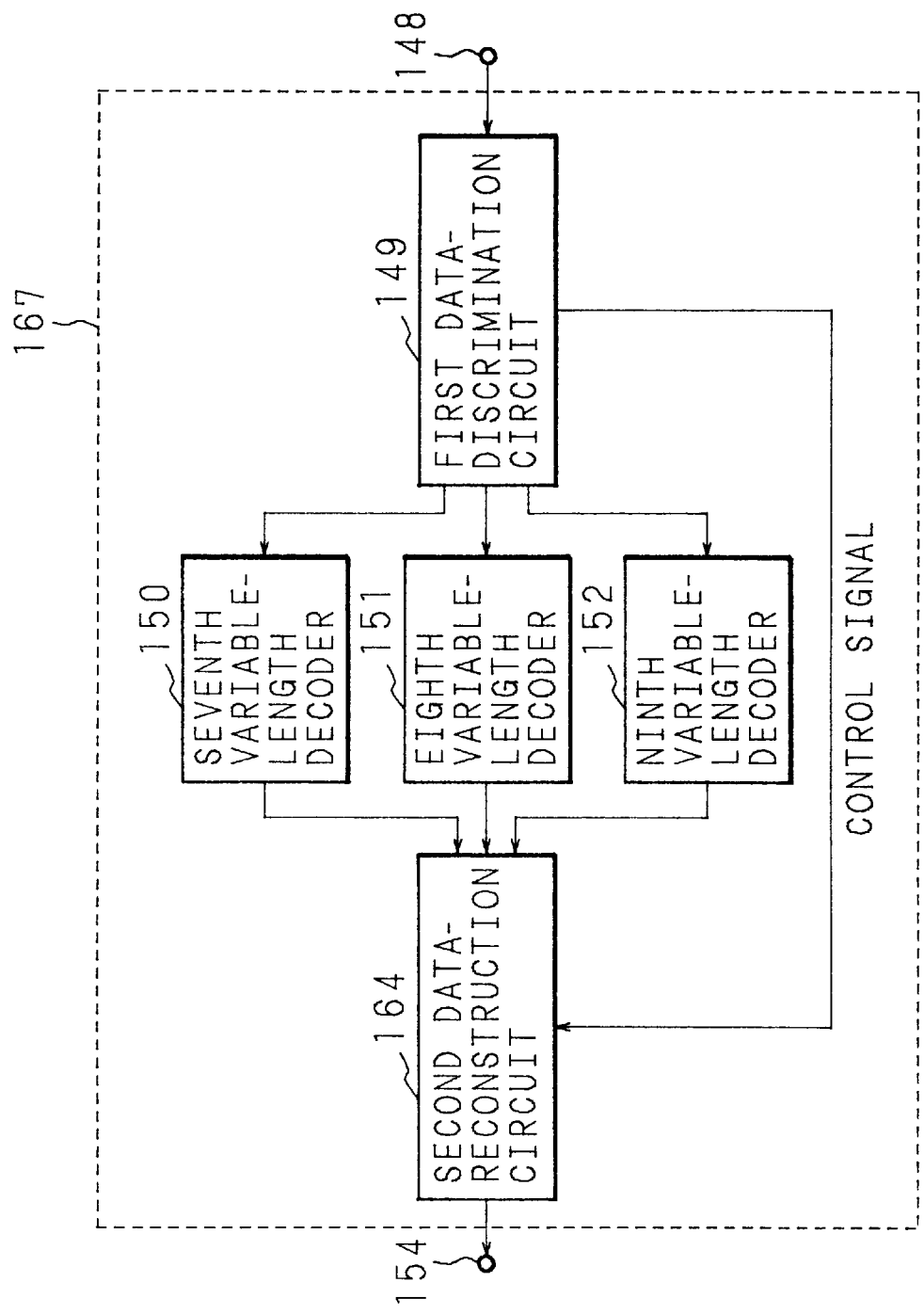
FIG. 70 is a block diagram showing the configuration of a 13th data-synthesis circuit in FIG. 69.

FIG. 70 is a block diagram showing the configuration of the 13th data-synthesis circuit 167 in FIG. 69. In FIG. 70, the same parts as those shown in FIG. 60 (14th embodiment) are designated by like reference numerals, and description of such parts is omitted here since they are identical in configuration and operation to the corresponding parts described in the 14th embodiment. In FIG. 70, reference numeral 164 is a second data-reconstruction circuit.

Figure 71:
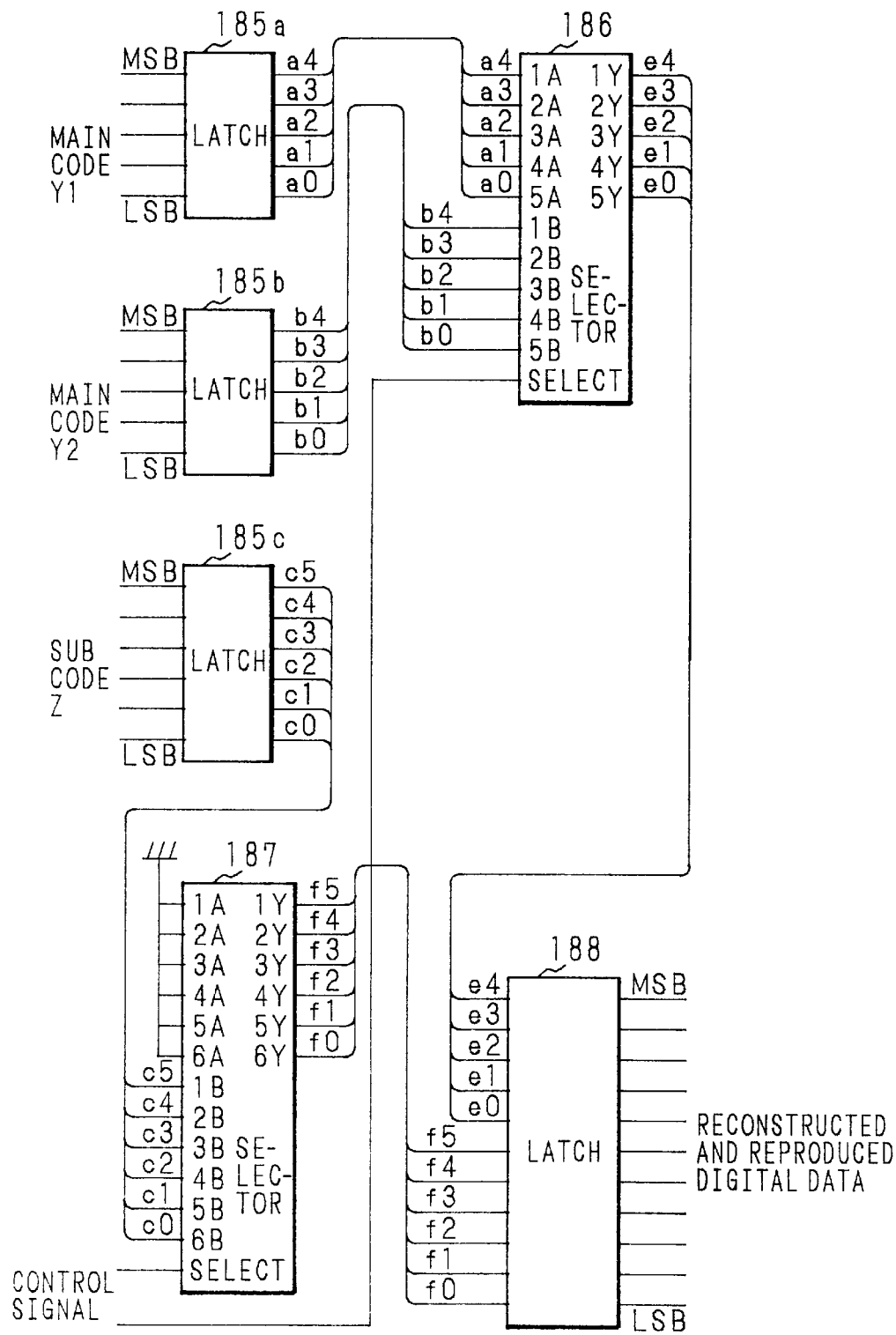
FIG. 71 is a block diagram showing the configuration of a second data-reconstruction circuit in FIG. 70.

FIG. 71 is a block diagram showing the configuration of the second data-reconstruction circuit 164 in FIG. 70. The circuit shown in this embodiment is an implementation of the circuit for reconstructing the digital data that was separated into two main codes and a subcode by the third data-separation circuit 161 shown in FIG. 68. In FIG. 71, 185a to 185c are data latch circuits, 186 and 187 are selectors, and 188 is a data latch circuit.

Next, the operation of the 15th embodiment will be described. The basic operation of the 15th embodiment is the same as that of the foregoing 14th embodiment; the only difference is in the operation of the third data-separation circuit 161 and the second data-reconstruction circuit 164. Therefore, description of the basic operation of the 15th embodiment is omitted here, and the following detailed description deals only with the operation of each of the third data-separation circuit 161 and the second data-reconstruction circuit 164.

The operation of the third data-separation circuit 161 in the present embodiment, will be described in detail below. Suppose here that the value of the digital data, variable-length decoded in the sixth variable-length decoder 131 and inputted to the third data-separation circuit 161, is X. Then, the third data-separation circuit 161 separates the data into three data in accordance with the following method.

The digital data X inputted to the third data-separation circuit 161 is separated into main codes Y1 and Y2 and a subcode Z in accordance with the rule $X=2^n \times Y1$ (or Y2)+Z. For Y1, Y2, and Z, the values calculated by the following equations are used.

$$Y1 (\text{or } Y2) = INT(X/2^n) \quad (7)$$

$$Z = X \bmod 2^n \quad (8)$$

where INT(A/B) is the quotient when A is divided by B, and A mod B is the remainder when A is divided by B.

The above separation rule will be explained using concrete numeric values. Suppose, for example, that data having a digital value of 395 is inputted to the third data-separation circuit, 161. In the present embodiment, it is assumed that n=6. The input digital data is converted into two main codes Y1 and Y2 and a subcode Z in accordance with the above equations (7) and (8). That is, $$Y1 (\text{or } Y2) = INT(395/2^6) = 6$$

$$Z = 395 \bmod 2^6 = 11$$

The original digital value X is therefore $X=2^6 \times 6+11=395$, thus accomplishing complete reconstruction of the original value.

According to the above separation method, the original input digital value X can be reconstructed almost completely from either one of the main codes, Y1 or Y2, in accordance with the following equation.

When the reconstructed value is denoted as X', then $$X' = Y1 (\text{or } Y2) \times 2^n \quad (9)$$

which, in the above example, gives $$X' = 6 \times 2^6 = 384$$

This shows that, the original input, digital value X can be reconstructed almost completely by using only one of the main codes, Y1 or Y2.

According to the above separation method, compared to the method of transmitting the same data in duplicate, the number of transmitted data bits is (m−n) for each of the main codes Y1 and Y2 and n for the subcode Z, where m is the number of bits of the digital data inputted to the third data-separation circuit 161. Accordingly, when the input digital data is 11 bits long, the total number of transmitted bits is 16 after data separation. Here, it is assumed that n=6. The transmission bit rate is thus reduced, as compared with the method of transmitting the same data in duplicate.

The operation of the third data-separation circuit 161, an implementation of the above separation rule, will be described with reference to FIG. 68. The input 11-bit digital data X is first latched into the data latch circuit 162, and then inputted to the data latch circuits 163a–163c. The data latch circuits 163a and 163b carry out $INT(X/2^6)$ shown in equation (7). In the present embodiment handling binary data, in calculating equation (7) the input data is shifted to the right by n bits and all digits to the right of the decimal point is discarded. For example, in binary notation, the above value 395 is 00110001011. Therefore, the result of the calculation of $INT(395/2^6)$ is 00110 in binary notation since the data is shifted to the right by 6 bits and all digits to the right of the decimal point is discarded. That is, the five MSBs are selected.

Likewise, since (X mod $2^6$) in equation (8) is the remainder when X is divided by $2^6$, the six LSBs are output. Thus, the result of the calculation of (395 mod $2^6$) is 001011.

Of the three data separated in the third data-separation circuit 161, the main code Y1 is inputted to the ninth variable-length encoder 133, the main code Y2 is inputted to the 10th variable-length encoder 134, and the subcode Z is inputted to the 11th variable-length encoder 135, where they are subjected to variable-length encoding. The variable-length coded data are outputted via the output terminals 137a–137c, and inputted t,o the second data-synthesis circuit 128.

The operation of the second data-synthesis circuit 128 is the same as that of the 14th embodiment, and therefore, description thereof is omitted here.

Next, referring to FIG. 70, we will describe briefly how high-speed playback is performed using the high-speed playback HP data in the above format. When the HP data is input as the playback signal via the input terminal 148 for high-speed playback, the first data-discrimination circuit 149 discriminates the main codes Y1 and Y2 and the subcode Z on the basis of the playback track position. The data discriminated as the main code Y1 is fed to the seventh variable-length decoder 150, the data discriminated as the main code Y2 is fed to the eighth variable-length decoder 151, and the data discriminated as the subcode Z is fed to the ninth variable-length decoder 152, where they are subjected to variable-length decoding. The digital data variable-length decoded by the respective variable-length decoders are inputted to the second data-reconstruction circuit 164. The first, data-discrimination circuit 149 also generates a control signal indicating whether or not all of the two main codes Y1 and Y2 and the sub code Z are reproduced, and supplied the control signal to the second data-reconstruction circuit 164.

The operation of the second data-reconstruction circuit 164 in the present embodiment will be described in detail below with reference to FIG. 71. In the present embodiment, the digital data inputted to the second data-reconstruction circuit 164 is reconstructed in the following manner. The reconstructed value denoted as X is given by $$X = 2^6 \times Y1 (\text{or } Y2) + Z \qquad (10)$$

or $$X = 2^6 \times Y1 (\text{or } Y2) \qquad (11)$$

Based on the control signal supplied from the first data-discrimination circuit 149, when all of the three separated data (Y1, Y2, and Z) are reproduced, for example, the data is reconstructed in accordance with equation (10). On the other hand, when, of the same numbered data pairs, 1, 2, 3, . . . recorded on the duplication areas on track A and ①, ②, ③, . . . recorded on the duplication areas on track B shown in FIG. 62, one or the other of any paired data is not reproduced, then data is reconstructed in accordance with equation (11). When equation (11) is selected, the data Y1 or Y2, whichever reproduced, is used.

The reproduced main codes and subcode are first latched into the data latch circuits 185a to 185c. The main codes Y1 and Y2 outputted from the data latch circuits 185a and 185b are inputted to the selector 186. The selector 186 selects the main code Y1 or main code Y2 for output in accordance with the control signal supplied from the first, data-discrimination circuit 149. Likewise, the selector 187 is configured to select 000000 when the control signal indicates that only either one of Y1 or Y2 is reproduced, and select, the subcode when it, indicates that both Y1 and Y2 are reproduced. Then, the outputs of the selectors 186 and 187 are mixed together in the data latch circuit 188 ($2^6 \times Y1$ (or Y2)+Z or $2^6 \times Y1$ (or Y2) is carried out), and the reconstructed playback digital data is outputted.

The operation of high-speed playback 17 times the normal speed on the digital VTR of the present embodiment is the same as that of high-speed playback 17 times the normal speed described with reference to FIG. 65 in the 14th embodiment, and therefore, the description will not be repeated here.

In the 17-times speed mode, the data at the regions 1, 2, and 3 scanned by head A are reproduced, but the data at the regions ①, ②, and ③ are not reproduced by head B. Therefore, the complete data cannot the reconstructed, but according to the digital VTR of the present embodiment, as in the foregoing 14th embodiment, if either one of the main codes (Y1 or Y2) can be reproduced, the original digital value can be reconstructed almost completely. For example, when a digital value 395 is inputted, if both data can be reproduced, the original value can be reconstructed using equation (10) calculated as $$2^6 \times 6 + 11$$

When only the main code Y1 is reproduced, equation (11) is used to reconstruct the digital value as $$2^6 \times 6 = 384$$

Thus, according to the method of the present embodiment, efficient data separation can be achieved by performing data separation on the input digital data in accordance with a predetermined calculation the (for example, a calculation is performed using equation (7) and (8)), and even if one of the main codes is not reproduced, a high-speed playback picture can be obtained efficiently since the original digital value of the recorded data can be reconstructed almost completely using the other main code reproduced from the same numbered data.

Furthermore, according to the method of the present embodiment, the transmission data amount is 16/22 before the input to the ninth to 11th variable-length encoders 133 to 135, and thus the data redundancy is about 73% of that when the same data is simply written twice on the tracks.

According to a simulation where the present embodiment was actually applied to image data (in the simulation, 11-bit input, data was separated into a 9-bit main code and a 2-bit subcode using the above data separation method), it was found that the data transmission amount after data separation was about 62.5% of that when the same data was written twice.

Accordingly, by performing data separation and recording the separated data on separate tracks by the heads having different azimuth angles, as in the present embodiment, the amount of data that can in be transmitted as HP data can be increased by about 27%, as compared with the method of writing the same data twice. In the prior art, HP data for high-speed playback is constructed using the lower-frequency coefficients in DCT blocks, but according to the present embodiment, as the transmission data amount of HP data is increased, higher-frequency coefficients in DCT blocks can also be transmitted, thus achieving an improvement in high-speed playback picture quality.

As described, in the 15th embodiment, of the input digital data, the digital data of the DCT block to be used for high-speed playback is variable-length decoded first, and then, the decoded digital data is separated into three data according to a predetermined method, each of which data is then variable-length encoded; the variable-length encoded data are then synthesized into two data, and the synthesized two data are recorded as HP data on separate tracks using the heads having different, azimuth angles. By such data division, instead of duplicating the same HP data on the same number of tracks as the maximum high-speed playback tape speed expressed as a multiple of its normal speed, separated data is duplicated a fewer number of times than the maximum tape speed expressed as a multiple of its normal speed, making it possible to also use higher-frequency coefficients in DCT blocks to construct the HP data. This improves the picture quality in high-speed playback and also the S/N ratio, as compared with the encoding of HP data by the prior art bitstream recording apparatus.

Embodiment 16

Figure 72:
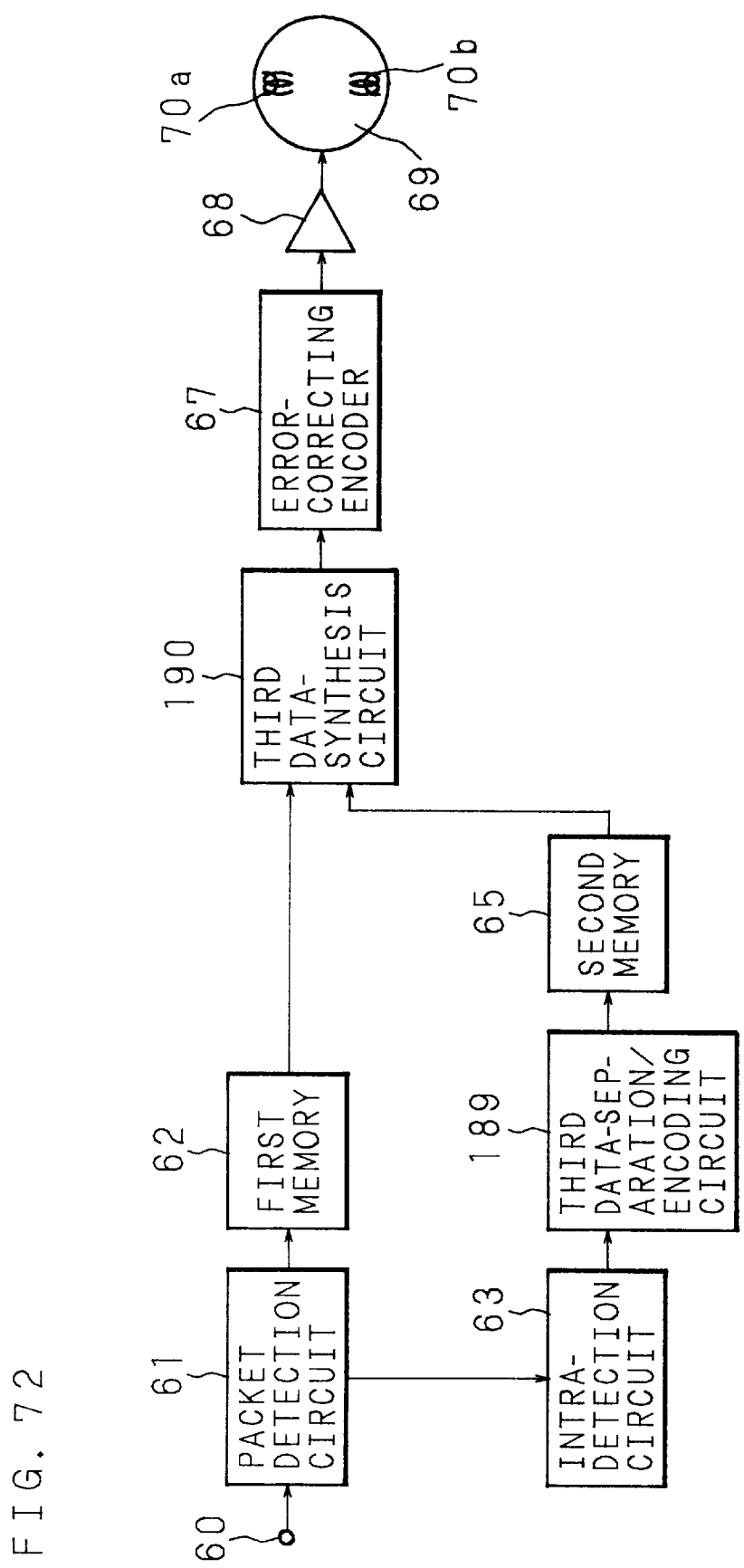
FIG. 72 is a block diagram showing the configuration of a recording system in a digital VTR according to a 16th embodiment of the present invention.

A 16th embodiment of the digital VTR of the invention will be described below. FIG. 72 is a block diagram showing the configuration of a recording system in the digital VTR according to the 16th embodiment of the invention. In FIG. 72, the same parts as those shown in FIG. 56 (14th embodiment) are designated by like reference numerals, and description of such parts is omitted here since they are identical in configuration and operation to the corresponding parts described in the 14th embodiment. In FIG. 72, reference numeral 189 is a third data-separation/encoding circuit for performing data separation on input variable-length coded digital data in accordance with a predetermined rule and for applying variable length coding to separated data, and 190 is a third data-synthesis circuit for combining the outputs of the first memory 62 and second memory 65.

Figure 73:
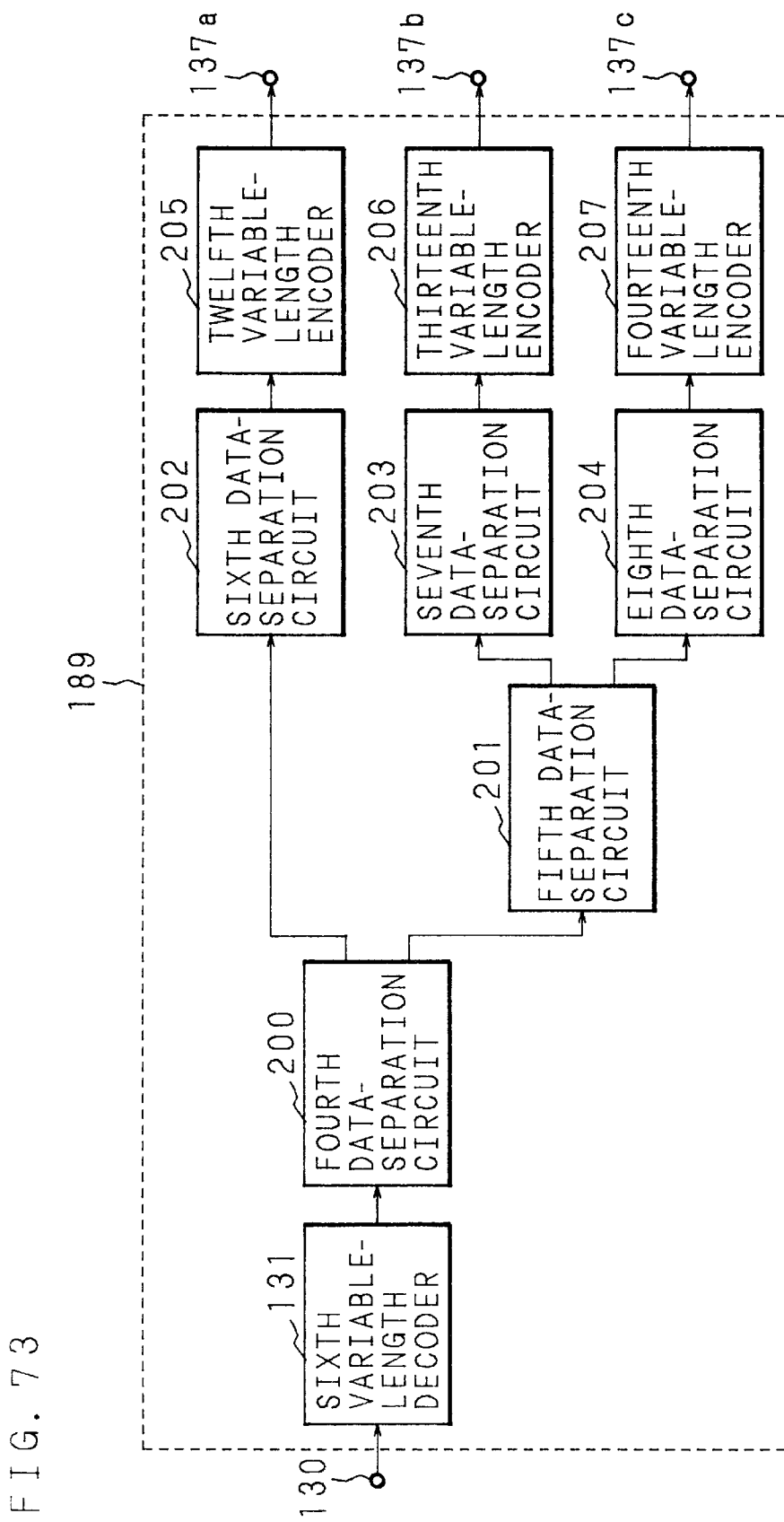
FIG. 73 is a block diagram showing the configuration of a third data-separation/encoding circuit in FIG. 72.

FIG. 73 is a block diagram showing the configuration of the third data-separation/encoding circuit 189 in FIG. 72. In FIG. 73, the same parts as those shown in FIG. 57 (14th embodiment) are designated by like reference numerals, and description of such parts is omitted here since they are identical in configuration and operation to the corresponding parts described in the 14th embodiment. In FIG. 73, reference numerals 200 to 204 are fourth to eighth data-separation circuits, and 205 to 207 are 12th to 14th variable-length encoders.

Figure 74:
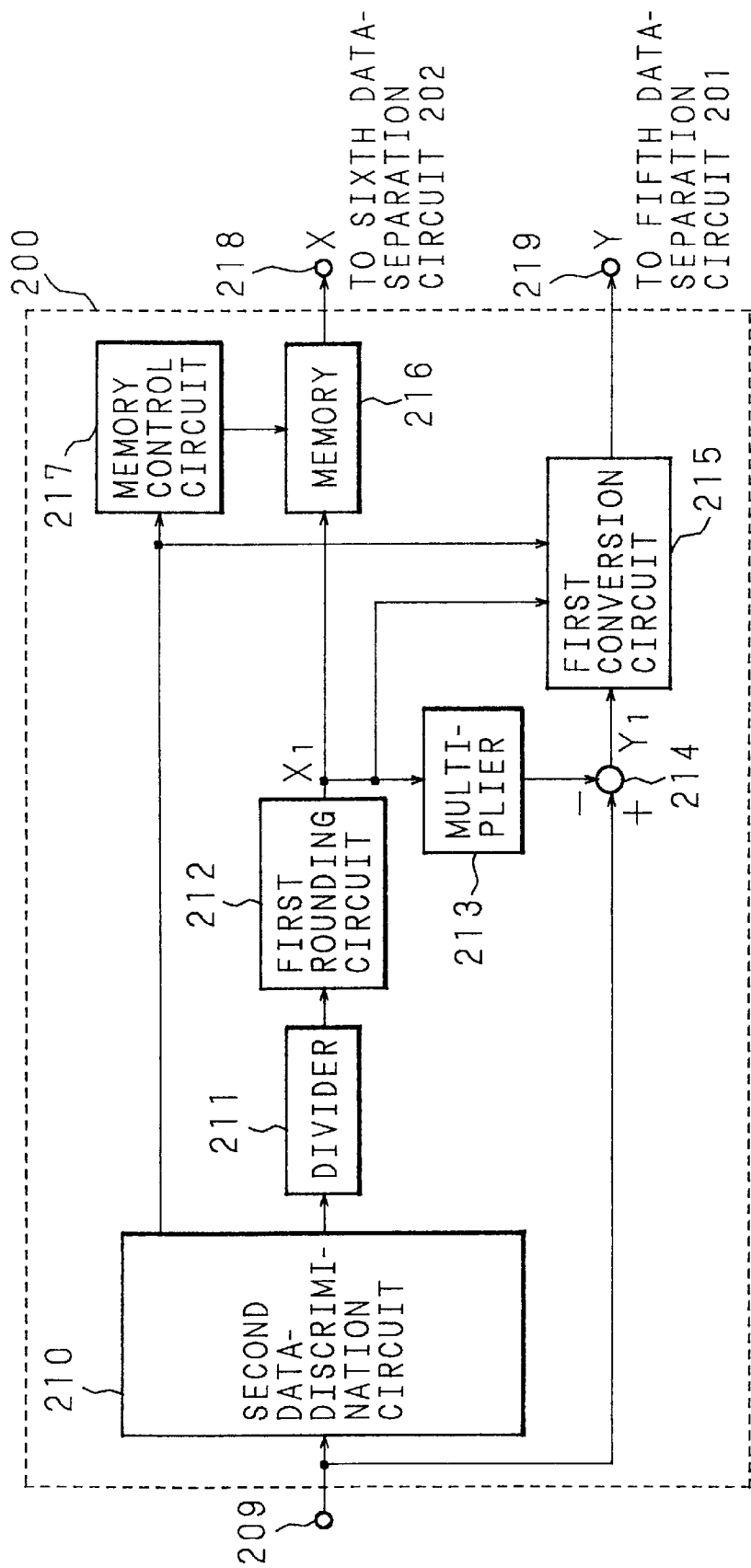
FIG. 74 is a block diagram showing the configuration of a fourth data-separation circuit in FIG. 73.

FIG. 74 is a block diagram showing the configuration of the fourth data-separation circuit 200 in FIG. 73. In the figure, reference numeral 209 is an input terminal; 218 and 219 are output terminals; 210 is a second data-discrimination circuit for detecting input 0 data; 211 is a divider for dividing the data outputted from the second data-discrimination circuit 210 by a coefficient a; 212 is a first rounding circuit for rounding the result of the division outputted from the divider 211; 213 is a multiplier for multiplying the data outputted from the first rounding circuit 212 by the coefficient a; 214 is a subtractor; 215 is a first conversion circuit for converting the output of the subtractor 214 into a predetermined value; 216 is a memory; and 217 is a memory control circuit for controlling data write to the memory 216 in accordance with the data detection result outputted from the second data-discrimination circuit 210. The memory control circuit 217 also controls data read from the memory 216.

Figure 75:
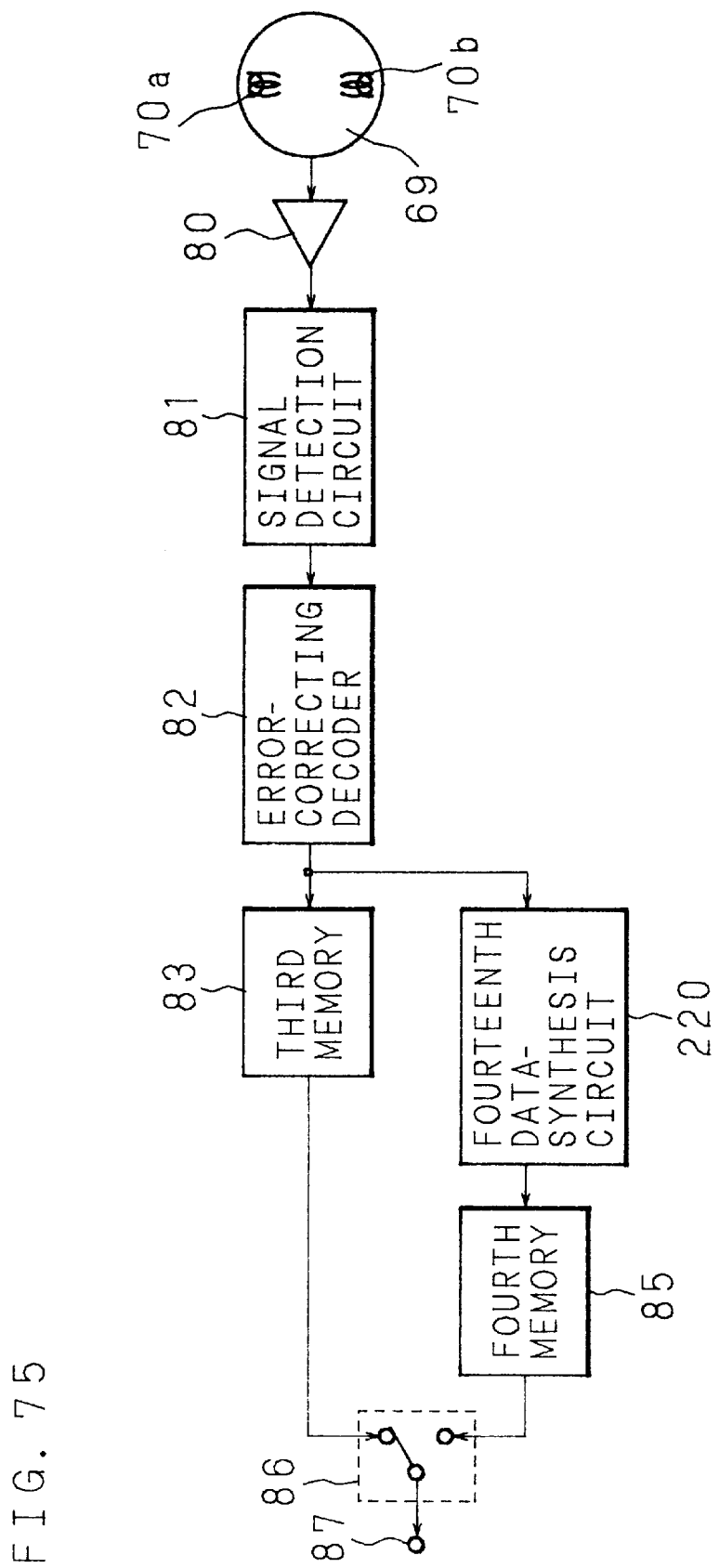
FIG. 75 is a block diagram showing the configuration of a playback system in the digital VTR according to the 16th embodiment.

FIG. 75 is a block diagram showing the configuration of a playback system in the digital VTR according to the 16th embodiment of the invention. In FIG. 75, the same parts as those shown in FIG. 59 (14th embodiment) are designated by same reference numerals, and description of such parts is omitted here since they are identical in configuration and operation to the corresponding parts described in the 14th embodiment. In FIG. 75, reference numeral 220 is a 14th data-synthesis circuit.

Figure 76:
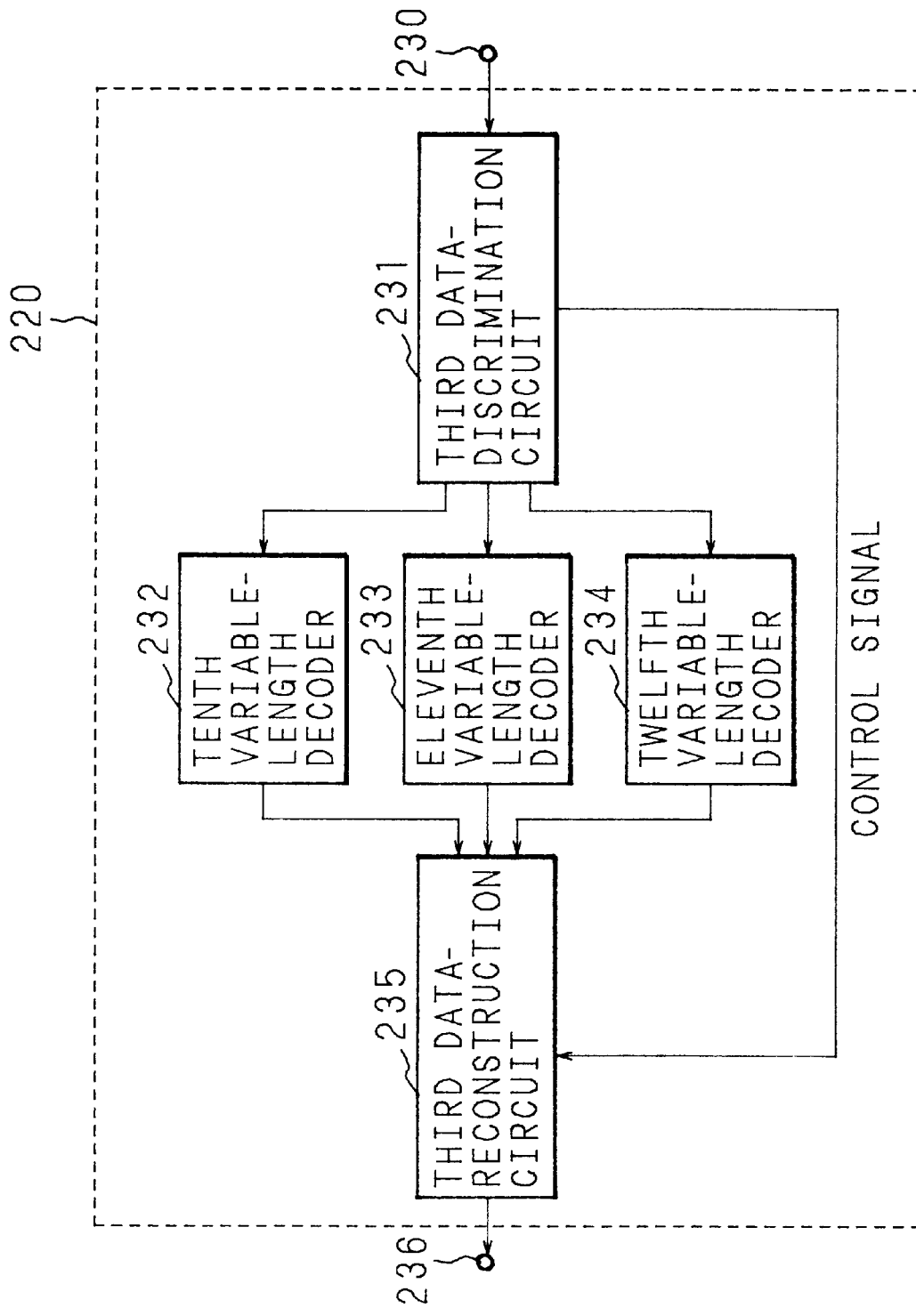
FIG. 76 is a block diagram showing the configuration of a 14th data-synthesis circuit in FIG. 75.

FIG. 76 is a block diagram showing the configuration of the 14th data-synthesis circuit 220. In the figure, reference numeral 230 is an input terminal; 231 is a third data-discrimination circuit; 232 is a 10th variable-length decoder; 233 is an 11th variable-length decoder; 234 is a 12th variable-length decoder; 235 is a third data-reconstruction circuit; and 236 is an output terminal.

Before describing the operation of the digital VTR in the 16th embodiment, we will first describe the method of data separation performed in the fourth data-separation circuit 200. The fourth data-separation circuit 200 shown in this embodiment is constructed to efficiently reduce the data amount by separating input data according to its amplitude and thereby modifying the data distribution structure when applying Huffman coding. The operating principle of the fourth data-separation circuit 200 in the present embodiment will be described below with reference to FIGS. 72 to 74.

Digital data z variable-length decoded in the sixth variable-length decoder 131 is first separated into two variables X1 and Y1 in accordance with the following equations. (The digital data z will hereinafter be referred to as the original coefficient z. In the fourth data-separation circuit 200, this z is separated into X and Y data.)

When $0 \leq z$ $X1=[z/a+0.49*]$ $Y1=z-a \times X1$

When $0 > z$ $X1=[z/a-0.49*]$ $Y1=z-a \times X1$ where "a" represents a predetermined integer not smaller than 2. Further, 0.49* is a recurring decimal with 9 in the second decimal place recurring infinitely, and the symbol [t] indicates the integer part of a real number t. If the separated X1 and Y1 are directly encoded in accordance with the above equations, data z=0 that does not have any data separation efficiency will be carried in both X1 and Y1, which will greatly impair the efficiency. By taking this into consideration, the fourth data-separation circuit 200 increases the data separation efficiency by transmitting data z=0 inputted from the sixth variable-length decoder 131 only on the Y side. It was confirmed in simulation that the same effect can be obtained if data z=0 is transmitted only on the X side.

The following description is given assuming a=16. FIG. 77 is a table diagram illustrating a specific example of data separation and conversion performed in the fourth data-separation circuit 200. Shown here is a portion of a specific example of a separation table of X1, Y1, X, and Y when a=16. According to the above equations, when z=9, the data is separated into X1=1 and Y1=−7; similarly, when z=16, the data is separated into X1=1 and Y1=0. Since data z=0 is transmitted on the Y side, as described above, the original "0" in the data z=0 must be discriminated from the "0" in the Y1 when z=16. When z=17, the data is separated into X1=1 arid Y1=1, but considering the numerical distribution of the original coefficient z, a higher efficiency can be achieved by transmitting Y as Y=1, not Y1=−7, when z=9, and Y as Y=5, not Y1=1, when z=17. This is because the probability of occurrence of z =9 is higher than that of z=17. Conversion from Y1 to Y will be described later.

Figure 78A:
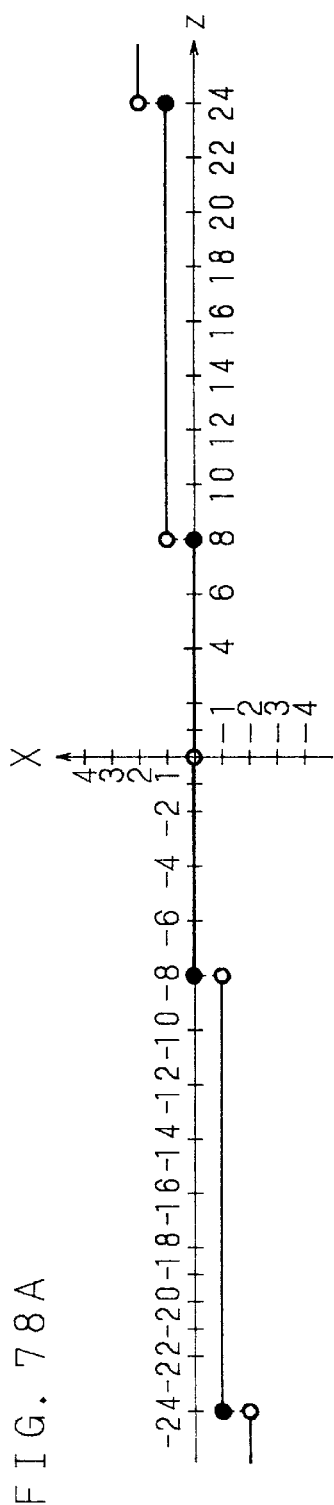
FIGS. 78A and 78B are diagrams showing specific examples of data separation and conversion operations performed in the fourth data-separation circuit in FIG. 73.
Figure 78B:
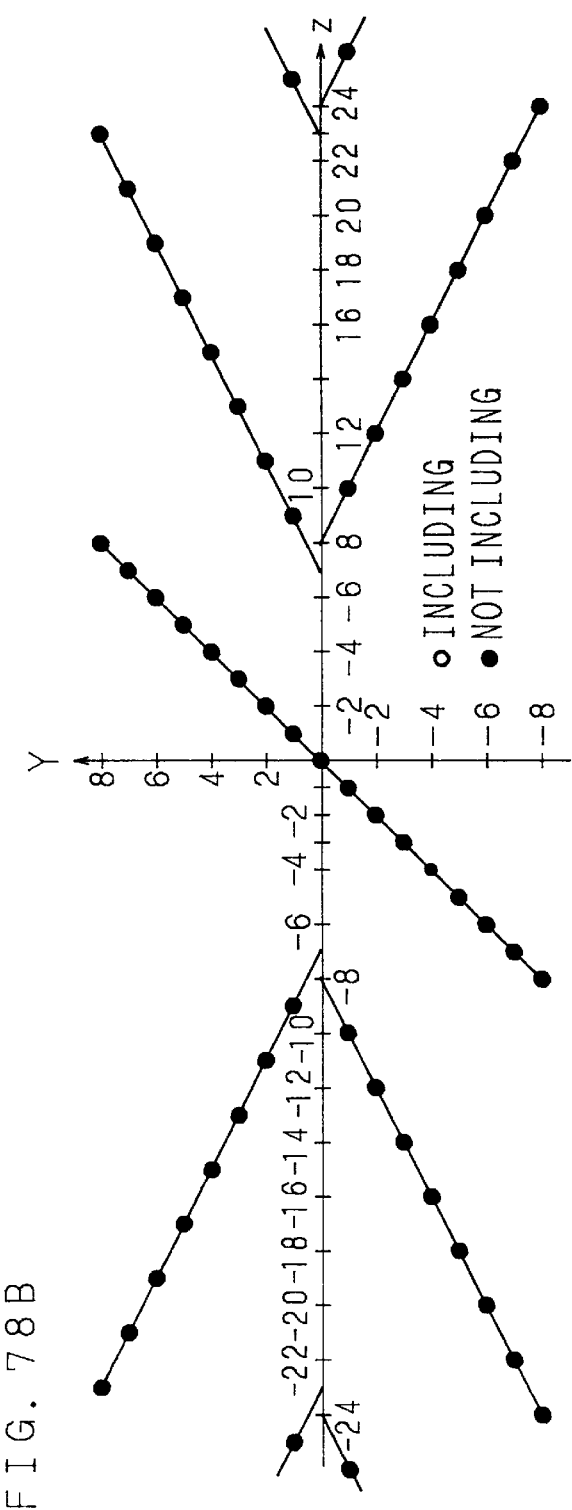

FIGS. 78A and 78B are diagrams showing specific examples of data separation and conversion operations performed by the fourth data-separation circuit 200. In FIGS. 78A and 78B, original coefficient z is plotted along the abscissa and separation coefficient X (Y) along the ordinate, showing in graphical form how data is separated in the fourth data-separation circuit 200.

Referring first to FIG. 78A, a method of calculating the integer X will be described by taking a=16 as an example. When the original coefficient z is in the range of $-a/2 \leq z \leq a/2$, X1 is rounded to 0, and X1=0 is outputted. When $z < -a/2$, the first rounding circuit 212 subtracts 0.49* from the decimal x'=z/a outputted from the divider 211 and discards the fractional part of it to obtain an integer, which is outputted as X1. When z>a/2, the first rounding circuit 212 adds 0.49* to the decimal x'=z/a outputted from the divider 211 and discards the fractional part of it to obtain an integer, which is outputted as X1. From the X1 separated in this operation, X is generated, excluding X1=0 when z=0.

Next, a method of calculating the integer Y will be described with reference to FIG. 78B. Since "0" data of the original coefficient z is transmitted only in Y, as described above, when z=0, Y1 calculated by the above equation is outputted as Y=0 on the basis of the "0" detection result inputted to the first conversion circuit 215. On the other hand, when $-a/2 \leq z \leq a/2$ ($z \neq 0$), that is, when X1=0, the value of the original coefficient z is directly outputted as Y. In other words, Y is outputted as the remainder when the original coefficient z is divided by the integer a (2 or greater integer). When z<−a/2, for the integer Y1 obtained by Y1=z−a×X1 the Y is given as +1, −1, +2, −2, ..., an integer increasing in absolute value with decreasing value of Y1. More specifically, when z=−a/2−1, Y=1, and after that, as the value of the original coefficient z decreases down to $z \geq -3 \times a/2$, that is, in the interval where X1 takes the same value, Y1 is converted into −1, 2, −2, ..., (a/2) −1, −((a/2) −1), a/2, −a/2, in this order in accordance with Y1=z−a×X1. Thereafter, the same conversion is repeated for each interval where the value of the original z decreases by a, that is, where X1 takes the same value.

Further, when z>a/2, for the integer Y1 obtained by Y1=z−a×X2 the coefficient Y is given as +1, −1, +2, −2, ..., an integer increasing in absolute value with increasing value of Y1. More specifically, when z=a/2+1, Y=1, and after that, as the value of the original coefficient z increases tip to $z \leq 3 \times a/2$, that is, in the interval where X1 takes the same value, Y1 is converted into −1, 2, −2, ..., (a/2) −1, −((a/2) −1), a/2, −a/2, in this order in accordance with Y1=z−a×X1. Thereafter, the same conversion is repeated for each interval where the value of the original z increases by a, that is, where X1 takes the same value.

The decimal data x'=z/16 outputted from the divider 211 is fed into the first, rounding circuit 212, which, when $-8 \leq z \leq 8$ ($z \neq 0$), rounds the data to 0 and outputs X=0. When z<−8, 0.49* is subtracted from x'=z/16, the fractional part is discarded, and the resulting integer is outputted as X. When z>8, 0.49* is added to x'=z/16, the fractional part is discarded, and the resulting integer is outputted as X.

For Y, on the other hand, Y=0 when z=0, and when $-8 \leq z \leq 8$ ($z \neq 0$), that is, when X1=0, the value of the original coefficient z is directly outputted as Y. That is, the coefficient Y1 is given as the remainder when the original coefficient z is divided by the integer a (2 or greater integer). When z<−8, for the integer Y1 obtained by Y1=z−16×X1, the Y is given as 1, −1, 2, −2, ..., an integer increasing in absolute value with decreasing value of Y1. More specifically, when z=−9, Y=1, and after that, as the value of the original coefficient z decreases down to $z \geq -24$, that is, in the interval where X1=−1, Y1 is converted into −1, 2, −2, 3, −3, 4, −4, 5, −5, 6, −6, 7, −7, 8, −8 in this order in accordance with Y1=z−16×X1. Thereafter, the same conversion is repeated for each interval where the value of z decreases by 16, that is, where X1 takes the same value.

Further, When z>8, for the integer Y1 obtained by Y1=z−16×X1 the coefficient Y is given as 1, −1, 2, −2, ..., an integer increasing in absolute value with increasing value of Y1. More specifically, when z=9, Y=1, and after that, as the value of the original coefficient z increases up to $z \leq 24$, that is, in the interval where X1 =1, Y1 is converted into −1, 2, −2, 3, −3, 4, −4, 5, −5, 6, −6, 7, −7, 8, −8 in this order in accordance with Y1=z−16×X1. Thereafter, the same conversion is repeated for each interval where the value of the original z increases by 16, that is, where X1 takes the same value. In FIGS. 78A and 78B, each black dot indicates the inclusion of the value at that dot, while each white dot indicates the exclusion of the value at that dot. The above separation method will hereinafter be referred to as the amplitude separation method.

Figure 11:
FIG. 11 is a diagram showing the structure of a DCT block.
Figure 79:
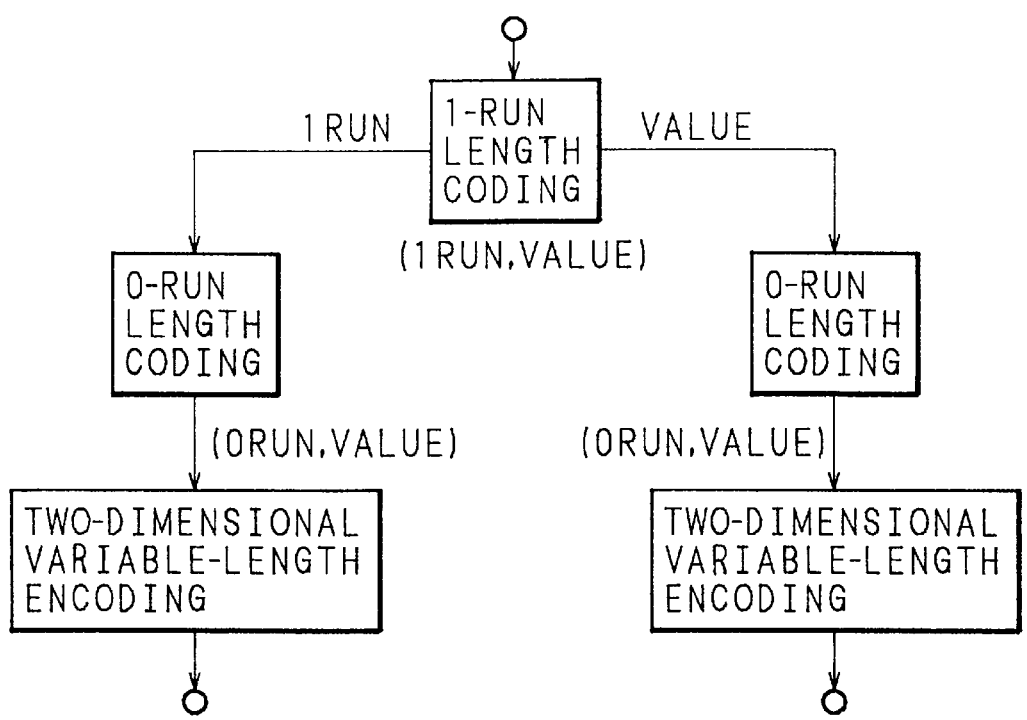
FIG. 79 is a diagram for explaining the data separation operation performed in a fifth data-separation circuit in FIG. 73.

A different separation method from the amplitude separation method is employed for the fifth data-separation circuit 201 in the present embodiment, and its operating principle will be described below with reference to FIG. 73 in conjunction with the flow diagram (algorithm) shown in FIG. 79. The digital data inputted from the fourth data-separation circuit 200 is zigzag-scanned as shown in FIG. 11 to reorder the data for output.

The zigzag-scanned data is separated into data having the highest probability of occurrence other than 0s, in this embodiment, runs of 1s (one-run length), and coefficient data. FIGS. 80A to 80E are diagrams for explaining the operation of data separation performed in the fifth data-separation circuit 201. FIG. 80A shows an example of one DCT block data. FIG. 80B shows data within one DCT block, the one-run length data and coefficient data obtained by separating the data shown in FIG. 80A. In the figure, data (0, 1) indicates EOB. The data within one DCT block thus separated as (one-run length data, coefficient data) pairs are further separated into one-run length data events and coefficient data events (see FIG. 80C). Run-length coding is then applied to the one-run length data events to encode runs of zeros having the highest probability of occurrence, and (zero-run length data, coefficient data) pairs are obtained (FIG. 80D). In the figure, data (0, 0) indicates EOB. For the coefficient data also, run-length coding is applied to encode runs of zeros having the highest probability of occurrence, and (zero-run length data, coefficient data) pairs are obtained (FIG. 80E).

The data thus subjected to run-length coding twice are then subjected to variable-length coding using separately provided variable-length coding tables before being outputted. In the following description of this embodiment, to distinguish between the first run-length coding performed to encode runs of ones and the subsequent run-length coding performed to encode runs of zeros, the first run-length coding will be referred to as the first one-run-length coding, and of the subsequent run-length coding, the zero-run-length coding applied to the one-run length data will be referred to as the second RO-run-length coding, and the zero-run-length coding applied to the coefficient data will be referred to as the second VO-run-length coding.

More specifically, the data subjected to one-run-length coding in the fifth data-separation circuit 201, i.e., (one-run length data, coefficient data), is first separated into two data groups, the one-run length data and the coefficient data (the first one-run-length coding). Then, run-length coding is applied to the one-run length data to encode runs of zeros having the highest probability of occurrence (the second RO-run-length coding). In like mariner, zero-run-length coding is applied to the coefficient data (the second VO-run-length coding).

In this embodiment, when performing one-run-length coding, no distinction is made between 1 and −1, but after the one-run-length coding, code bits indicating the numbers of 1s and −1s are appended to the coded data for transmission. It should also be noted that the above separation has been performed only on the AC coefficients within one DCT block. The above separation method will hereinafter be referred to as the one-run, zero-run length separation method.

Figure 81:
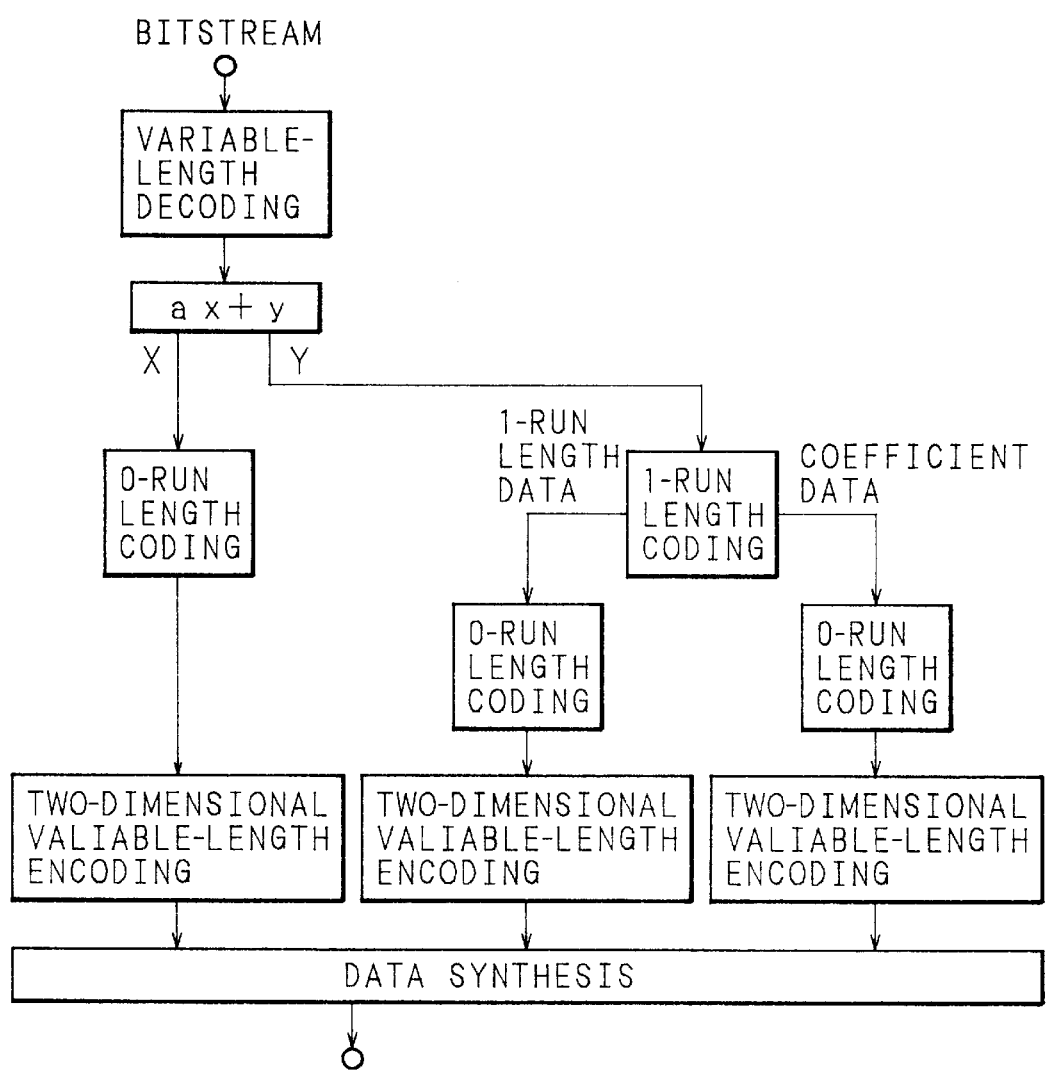
FIG. 81 is a diagram showing the operational flow in the third data-separation circuit in FIG. 73.

Based on the above description, we will now describe the operation of the third data-separation/encoding circuit 189 in the digital VTR of the 16th embodiment with reference to FIG. 73. FIG. 81 shows a flow diagram (algorithm) for HP data encoding in the third data-separation/encoding circuit 189 according to the present embodiment. As described, the amplitude separation encoding method and the one-run, zero-run length separation encoding method are both aimed at reducing the data amount by data separation. In the digital VTR of the 16th embodiment, when constructing HP data for high-speed playback from the ATV bitstream, data separation is performed by using the amplitude separation encoding method in conjunction with the one-run, zero-run length separation encoding method, thereby reducing the data amount and thus making it possible to transmit higher-frequency coefficients in an intra-coded block as the HP data.

The operation of the third data separation/encoding circuit 189 will be described below with reference to FIGS. 73 and 81. The variable-length coded digital data inputted via the input terminal 130 is variable-length decoded in the sixth variable-length decoder 131. The variable-length decoded digital data is fed into the fourth data-separation circuit 200, which separates the data into X and Y in accordance with the amplitude separation encoding method. The X data separated in accordance with the amplitude separation encoding method is fed into the sixth data-separation circuit 202 where zero-run-length coding is applied. The zero-run-length coded data is then inputted to the 12th variable-length encoder 205 for variable-length coding on the other hand, the separated Y data is fed into the fifth data-separation circuit 201, where one-run-length coding is performed to encode runs of 1s and the data is separated into one-run length data and coefficient data. The one-run length data is inputted to the seventh data-separation circuit 203 where zero-run-length coding is performed to encode runs of zeros. The zero-run-length coded data is then inputted to the 13th variable-length encoder 206 for variable-length coding. Similarly, the coefficient data is inputted to the eighth data-separation circuit 204 where zero-run-length coding is performed to encode runs of zeros. The zero-run-length coded data is then inputted to the 14th variable-length encoder 207 for variable-length coding. The data variable-length encoded in the 12 to 14th variable-length encoders 205 to 207 are outputted via the output terminals 137a to 137c, respectively. The variable-length coded data outputted via the output terminals 137a to 137c are first stored in the second memory 65, and then inputted to into the third data-synthesis circuit 190 in synchronism with the output timing of the first memory 62.

Figure 82:
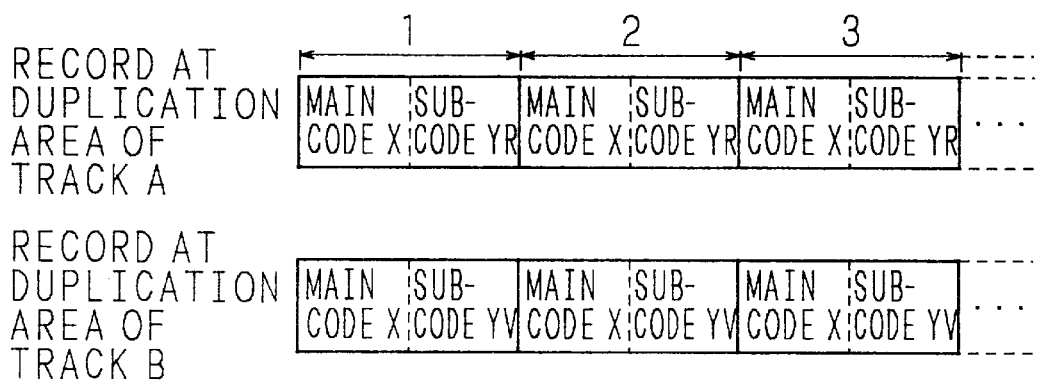
FIG. 82 is a diagram illustrating a method of data synthesis in a third data-synthesis circuit in FIG. 73.

Next, the operation of the third data-synthesis circuit 190 will be described in detail. The data variable-length encoded in the 12th to 14th variable-length encoders 205 to 207 are inputted to the third data-synthesis circuit 190, where the data are synthesized into two data so that the two synthesized data will be recorded by the heads having different azimuth angles. FIG. 82 shows the synthesized data recording format according to the present embodiment. In the figure, the numbers 1, 2, 3, . . . indicate the absolute addresses designating the positions of the HP data on the screen, as in the foregoing embodiment. In the following description, the variable-length coded data outputted from the 12th variable-length encoder 205 will be referred to as the main code X; likewise, the variable-length coded data outputted from the 13th variable-length encoder 206 will be referred to as the subcode YR, and the variable-length coded data outputted from the 14th variable-length encoder 207 will be referred to as the subcode YV. Data synthesis is performed in the third data-synthesis circuit 190 so that the main code X and subcode YR are recorded in duplication areas on track A while the main code X and subcode YV are recorded in duplication areas on track B, as shown in FIG. 82. The main code X is thus duplicated on both tracks.

Using the recording format example shown in FIG. 62, an example of HP data arrangement on the tracks in the present embodiment will be described in detail below. On the tracks shown in FIG. 62, the output data from the 12th variable-length encoder 205, the main code X, and the output data from the 13th variable-length encoder 206, the subcode YR, are recorded in the duplication areas on track A, while the same output data from the 12th variable-length encoder 205, the main code X, and the output data from the 14th variable-length encoder 207, the subcode YV, are recorded in the duplication areas on track B. In the figure, each pair of numbers, one circled and the other not circled, designates a pair of duplication areas holding a pair of data separated as described above and representing the same position on the screen. That is, the data consisting of main code X and subcode YR is recorded in areas 1, 2, 3, . . . while the data consisting of main code X and subcode YV is recorded in areas ①, ②, ③, . . . The example of the HP data arrangement on the tracks shown in FIG. 62 is based on the arrangement shown in FIG. 13 where identical HP data is recorded 17 times; in the present embodiment, each data pair of the same number is recorded 9 or 8 times. That is, when the data consisting of the main code X and subcode YR is recorded 9 times, then the data consisting of the main code X and subcode YV is recorded 8 times; likewise, when the data consisting of the main code X and subcode YR is recorded 8 times, then the data consisting of the main code X and subcode YV is recorded 9 times.

Next, referring to FIG. 76, we will describe briefly how high-speed playback is performed using the high-speed playback HP data in the above format. When the HP data is inputted as the playback signal via the input terminal 230 for high-speed playback, the third data-discrimination circuit 231 discriminates the main code X and the subcodes YR and YV on the basis of the playback track position. The data discriminated as the main code X is fed to the 10th variable-length decoder 232, the data discriminated as the subcode YR is fed to the 11th variable-length decoder 233, and the data discriminated as the subcode YV is fed to the 12th variable-length decoder 234, where they are subjected to variable-length decoding. The digital data variable-length decoded by the respective variable-length decoders are inputted to the third data-reconstruction circuit 235. The third data-discrimination circuit 231 also generates a control signal indicating whether or not all of the main code X and the subcodes YR and YV are reproduced, and supplies the control signal to the third data-reconstruction circuit 235.

The operation of the third data-reconstruction circuit 235 in the present embodiment will be briefly described below. In the present embodiment, the digital data inputted to the third data-reconstruction circuit 235 is reconstructed in the following manner. In the present embodiment, data reconstruction is performed with one DCT block treated as a unit. Here, the original variable-length decoded digital data is denoted as z. For example, when the control signal outputted from the third data-discrimination circuit 231 indicates that all three separated data (X, YR, and YZ) are reproduced, each pair of the decoded data (zero-run length data, coefficient data) outputted from the 11th and 12th variable-length decoders 233 and 234 is expanded to reconstruct the (one-run length data, coefficient data) pair constructed in the fifth data-separation circuit 210. Then, each (one-run length data, coefficient data) pair is further expanded to reconstruct the original zigzag scan data Y. The thus obtained data Y is inverse-transformed using a transform table provided for performing exactly the inverse of the transform performed with the transform table used in the fourth data-separation circuit 200 in the encoding Process. Using the data X outputted from the 10th variable-length decoder 232 and the data Y obtained by the inverse transform, (a×X) +Y is calculated to reconstruct the original digital data z. On the other hand, when, of the same numbered data pairs, 1, 2, 3, . . . recorded in the duplication areas on track A and ①, ②, ③, . . . recorded in the duplication areas on track B shown in FIG. 62, one or the other of any paired data is not reproduced, data is reconstructed from the main code X a lone by calculating a ×X.

The operation of high-speed playback on the digital VTR according to the present embodiment will be described below. FIG. 63, as previously described, is a diagram showing head scan paths on the recorded tracks in FIG. 62 in high-speed playback five times the normal speed. Playback data is obtained from the hatched regions shown in the figure. As shown, head A scans the HP data regions in the same azimuth playback areas in the order of 1, 2, 3, 1, 2, 3. On the other hand, head B scans the HP data regions in the same azimuth playback areas in the order of ①, ②, ③, ①, ⑤, ⑥, . . . . As a result, for data pairs of 1 and ①, 2 and ②, and 3 and ③, both HP data are all reproduced from the different azimuth playback areas. These data are combined to reconstruct the complete data.

Also, the operation of high-speed playback 17 times the normal speed on the digital VTR of the present embodiment will be described. FIG. 65, as previously described, is a diagram showing head scan paths on the recorded tracks in FIG. 62 in high-speed playback 17 times the normal speed. Playback data is obtained from the hatched regions shown in the figure. As shown, head A scans the HP data regions in the same azimuth playback areas in the order of 1, 2, 3. However, no playback signal from the same azimuth playback areas ①, ②, and ③, is obtained from head B. Since the data in areas ①, ②, and ③, are not reproduced by head B, the HP data for positions 1, 2, and 3 on the screen cannot be reconstructed completely. In the digital VTR of the present embodiment, a×X is calculated using the main code X, and the result , is outputted as the reconstructed data, as described above.

A computer simulation was carried out based on the flow shown in FIG. 78, and it was found that a data amount reduction of about 3.2% was achieved as a whole. When performing one-run-length coding on the above numeric data, no distinction was made between 1 and −1, but after the one-run-length coding, code bits indicating the numbers of 1s and −1s were appended to the coded data. The simulation was performed only on the AC coefficients in DCT blocks.

As described, when the input digital data is separated by using the amplitude separation encoding method in conjunction with the one-run, zero-run length coding method, as in the present embodiment, since the code amount is reduced using variable-length coding, a reversible process, the transmission code amount can be reduced without any loss of picture quality, as contrasted to the prior art construction method for high-speed playback HP data.

Accordingly, by performing data separation and recording the separated data on separate tracks by the heads having different azimuth angles, as in the present embodiment, the amount of data that can be transmitted as HP data can be increased by about 3.2% compared with the method of writing the same data twice. In the prior art, HP data for high-speed playback is constructed using the lower-frequency coefficients in DCT blocks, but according to the present embodiment, as the amount of data that can be transmitted as the HP data is increased, higher-frequency coefficients in DCT blocks can also be transmitted, thus achieving an improvement in high-speed playback picture quality.

As described, in the 16th embodiment, of the input digital data, the digital data of the DCT block to be used for high-speed playback is variable-length decoded first, and then, the decoded digital data is separated into three data according to a predetermined method, each of which data is then variable-length coded; the variable-length coded data are then synthesized into two data, and the synthesized two data are recorded as HP data on separate tracks using the heads having different azimuth angles. By such data division, instead of duplicating the same HP data on the same number of tracks as the maximum high-speed playback tape speed expressed as a multiple of its normal speed, separated data is duplicated a fewer number of times than the maximum tape speed expressed as a multiple of its normal speed, thus making it possible to also use higher-frequency coefficients in DCT blocks to construct the HP data. This improves the picture quality in high-speed playback and also the S/N ratio, as compared with the encoding of HP data by the prior art bitstream recording apparatus.

Embodiment 17

Figure 83:
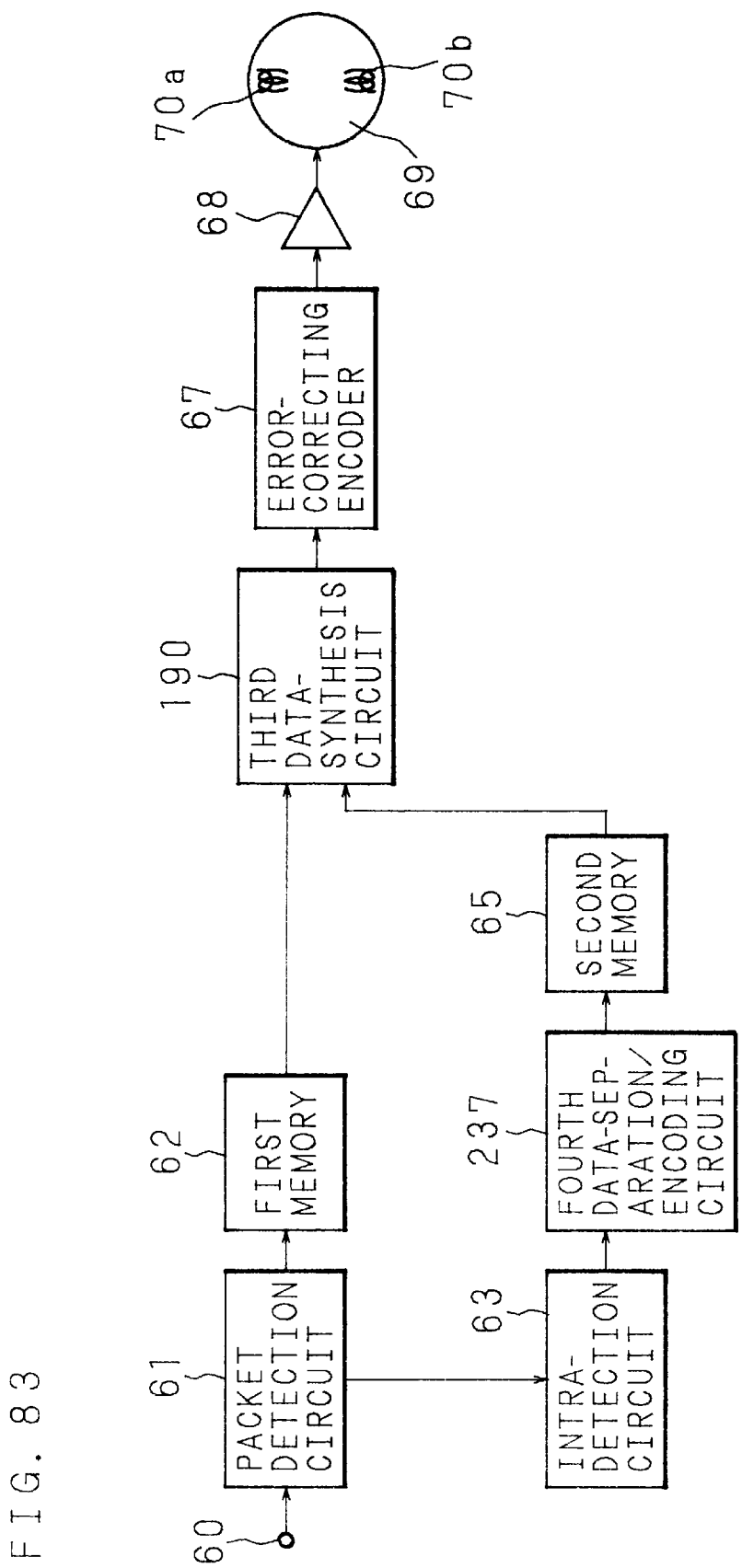
FIG. 83 is a block diagram showing the configuration of a recording system in a digital VTR according to a 17th embodiment of the present invention.

A 17th embodiment of the digital VTR of the invention will be described below. FIG. 83 is a block diagram showing the configuration of a recording system in the digital VTR according to the 17th embodiment of the invention. In FIG. 83, the same parts as those shown in FIG. 66 (16th embodiment) are designated by like reference numerals, and description of such parts is omitted here since they are identical in configuration and operation to the corresponding parts described in the 16th embodiment. In FIG. 83, reference numeral 237 is a fourth data-separation/encoding circuit for performing data separation on input variable-length coded digital data in accordance with a predetermined rule and for applying variable length coding to separated data.

Figure 84:
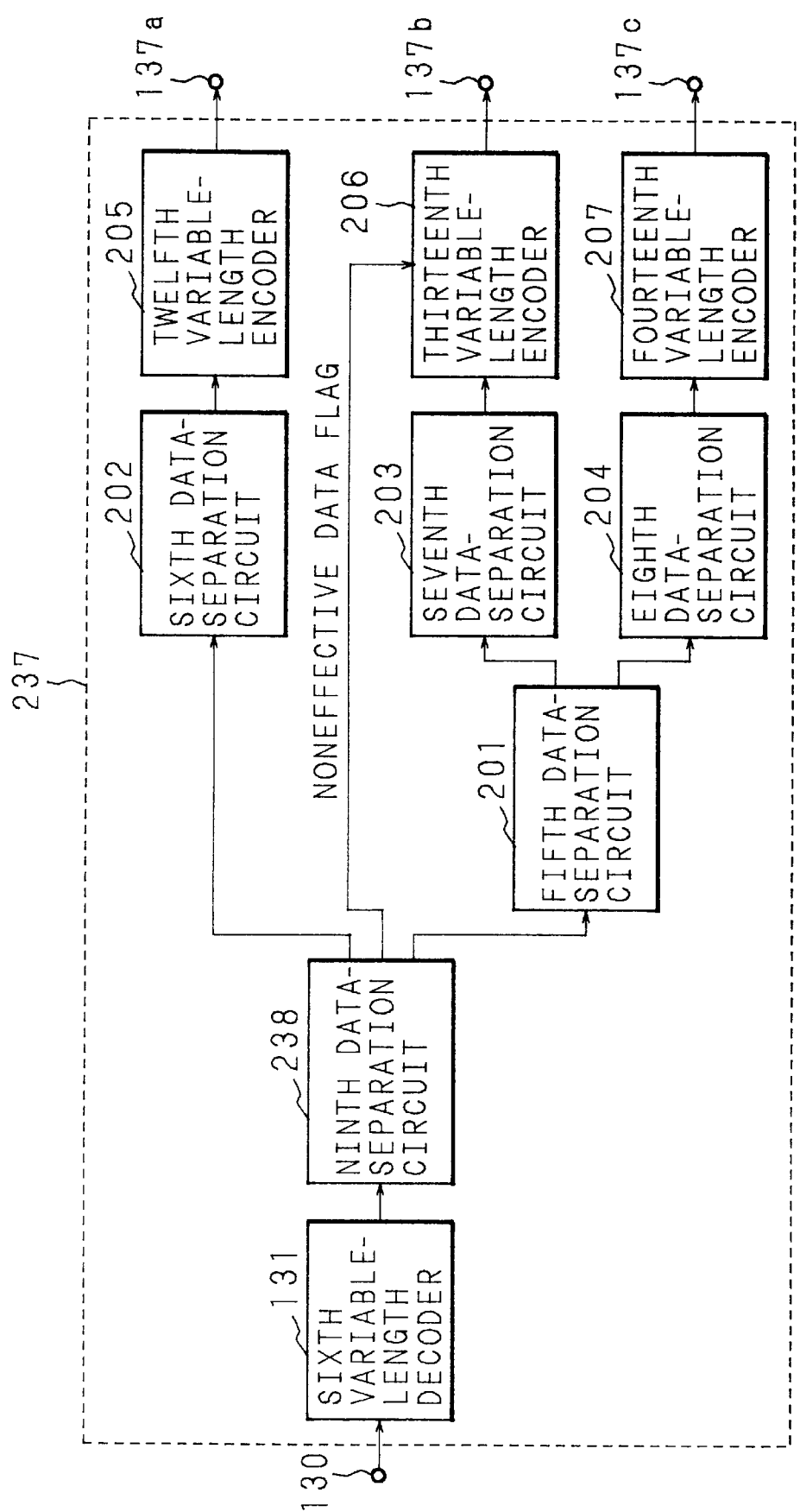
FIG. 84 is a block diagram showing the configuration of a fourth data-separation/encoding circuit in FIG. 83.

FIG. 84 is a block diagram showing the configuration of the fourth data-separation/encoding circuit 237 in FIG. 83. In FIG. 84, the same parts as those shown in FIG. 73 (16th embodiment) are designated by like reference numerals, and description of such parts is omitted here since they are identical in configuration and operation to the corresponding parts described in the 16th embodiment. In FIG. 84, reference numerals 238 is a ninth data-separation circuit.

Figure 85:
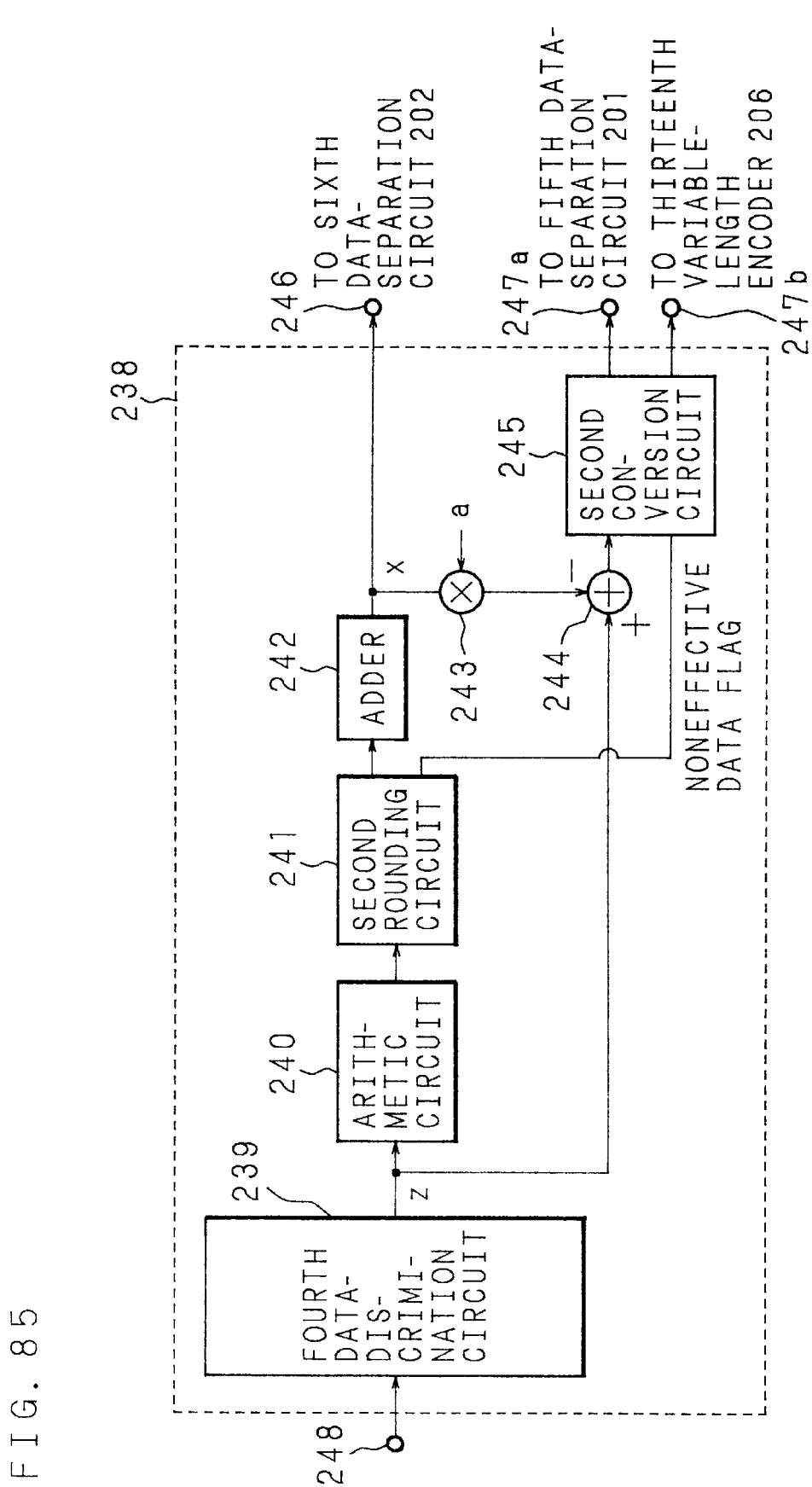
FIG. 85 is a block diagram showing the configuration of a ninth data-separation circuit in FIG. 84.

FIG. 85 is a block diagram showing the configuration of the ninth data-separation circuit 238 in FIG. 84. In FIG. 85, reference numeral 248 is an input terminal; 239 is a fourth data-discrimination circuit; 240 is an arithmetic circuit for performing arithmetic operations on the digital data z variable-length decoded in the sixth variable-length decoder 131, in accordance with a predetermined rule (which will be described later); 241 is a second rounding circuit; 242 is an adder for adding 1 or −1 to an integer coefficient X outputted from the second rounding circuit 241; 243 is a multiplier; 244 is a subtractor; 245 is a second conversion circuit for converting the output (hereinafter referred to as coefficient Y') of the subtractor 244 into a predetermined coefficient Y; and 246, 247a, and 247b are output terminals.

The playback system in the digital VTR of the 17th embodiment is identical in configuration to the one shown in FIG. 76 in the 16th embodiment, and therefore, description thereof is omitted here.

Next, the operation of the 17th embodiment will be described. The basic operation of the 17th embodiment is the same as that of the foregoing 16th embodiment; the only difference is in the operation of the ninth data-separation circuit 238. Therefore, the basic operation of the 17th embodiment is omitted, and the following detailed description deals only with the operation of the ninth data-separation circuit 238.

Referring to FIG. 85, the operation of the ninth data-separation circuit 238 will be described below. In this embodiment, the digital data z (hereinafter referred to as the original coefficient z) variable-length decoded in the sixth variable-length decoder is first inputted to the fourth data-discrimination circuit 239, which determines whether the original coefficient z is "0" or not. If it is determined that the original coefficient z is not "0", the original coefficient z is inputted to the arithmetic circuit 240, which performs arithmetic operations in accordance with a predetermined rule and outputs real number data X'. The real number data X' outputted from the arithmetic circuit 240 is fed into the second rounding circuit 241 which discards the fractional part of the data and outputs the result as integer coefficient X. The integer coefficient X outputted from the second rounding circuit 241 is inputted to the adder 242 where 1 or −1 is added. The integer coefficient X with 1 or −1 is added to it in the adder 242 is supplied to the sixth data-separation circuit 202. The integer coefficient X outputted from the adder 242 is also inputted to the multiplier 243 where it is multiplied by a. The result of the multiplication (a×X) is inputted to the subtractor 244, to which the original coefficient z is also inputted. The subtractor 244 calculates coefficient Y'=z −a×X. The coefficient Y' outputted from the subtractor 244 is fed into the second conversion circuit 245 for conversion into a predetermined coefficient Y, which is supplied to the fifth data-separation circuit 201. On the other hand, if it is determined in the fourth data-discrimination circuit 239 that the original coefficient z is "0", data is not transmitted by the coefficient Y, but data "0" is transmitted by the coefficient X. That is, a noneffective data flag is appended to the coefficient Y, and the value of the coefficient X is set to 0 for transmission.

When it is determined in the fourth data-discrimination circuit 239 that the original coefficient z is a non-zero value, the coefficient X is obtained in the following manner. First, the fourth data-discrimination circuit 239 determines whether the original coefficient z is positive or negative; then, according to <<Equation A>> shown below, the arithmetic circuit 240 performs calculation to output real number data, which is then rounded to an integer in the second rounding circuit 241, and 1 or −1 is added to the integer in the adder 242.

<<Equation A>> when z>0

$X=[(z-1)/a]+1$ when z<0

$X=[(z+1)/a]-1$ (where "a" is a positive odd number, and [t] indicates the integer part of a real number t)

Figure 86A:
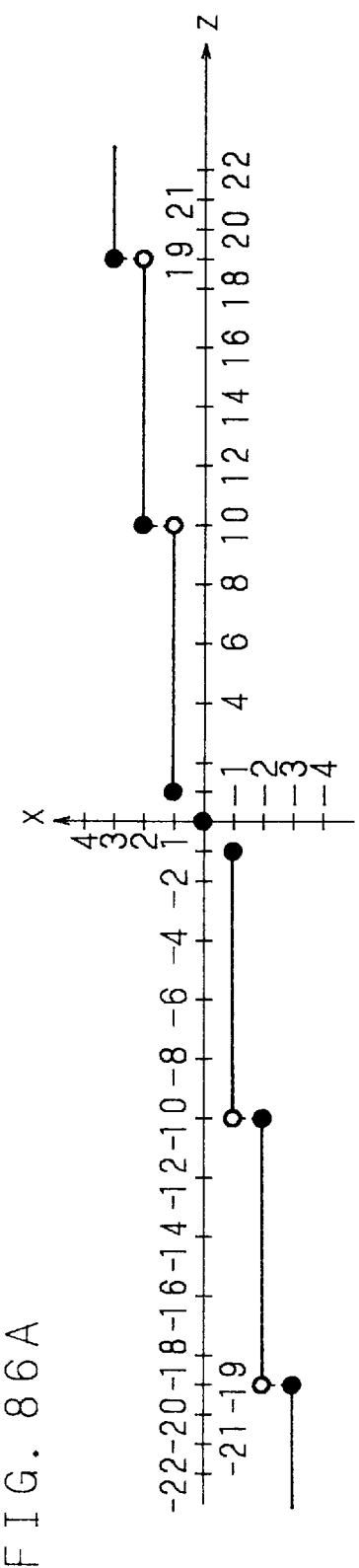
FIGS. 86A and 86B are diagrams showing specific examples of data separation and conversion operations performed in the ninth data-separation circuit.
Figure 86B:
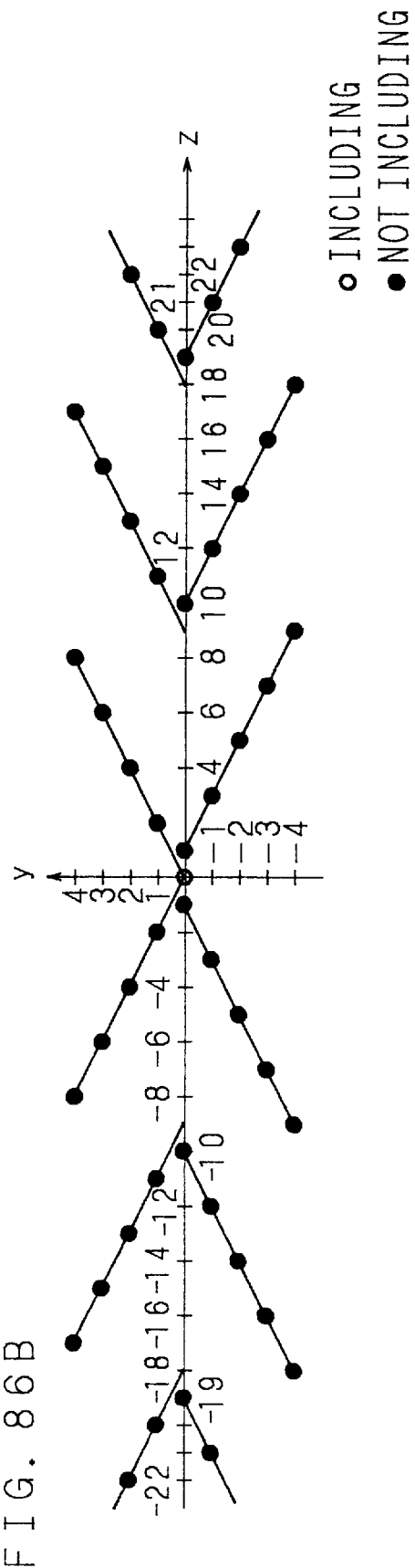

Referring to FIGS. 86A and 86B, a further description will be given below of the process of separating the original coefficient z into the coefficients X and Y according to <<Equation A>>. The following example assumes natural number "a"=9. First, reference is made to FIG. 86A. The fourth data-discrimination circuit 239 determines whether the original coefficient z=0, z>0, or z<0. When z=0, the coefficient X=0 is outputted, as described above. Further, when $1 \leq z<9$, the arithmetic circuit 240 calculates X'= (z−1)/9. The real number coefficient X' thus obtained arid outputted from the arithmetic circuit 240 is inputted to the second rounding circuit 241, where the fractional part of the real number X' is discarded and the real number X' is thus rounded to an integer for output; thus, when $1 \leq z<9$, X'=0. The integer data outputted from the second rounding circuit 241 is fed to the adder 242 which adds 1 to it; as a result, X=1 when $1 \leq z<9$. When $z \geq 9$, the coefficient X can be obtained in like manner. Further, when $-9<z \leq -1$, the arithmetic circuit 240 calculates X'= (z+1)/9. The real number coefficient X' thus obtained and outputted from the arithmetic circuit 240 is inputted to the second rounding circuit 241, where the fractional part of the real number X' is discarded and the real number X' is thus rounded to an integer for output; thus, when $-9<z \leq -1$, X'=0. The integer data outputted from the second rounding circuit, 241 is fed to the adder 242 which adds −1 to it; as a result, X=−1 when $-9<z \leq -1$. When $z \leq -9$, the coefficient X can be obtained in like manner.

On the other hand, the coefficient Y is obtained in the following manner, as shown in FIG. 86B. That is, when z=0, a noneffective data flag is appended to Y; as described above, data z=0 is transmitted only by the coefficient X as x=0.

Next, when $1 \leq z$, the coefficient Y is converted to 0, 1, −1, 2, −2, . . . , an integer increasing in absolute value with increasing value of Y' (=z−9×X). That is, when $1 \leq z<10$ (where X=1), Y=0 for z=1, and for z=2, 3, 4, 5, 6, 7, 8, 9, Y is converted to 1, −1, 2, −2, 3, −3, 4, −4, respectively. Further, when $z \geq 10$, the coefficient Y is converted to 0, 1, −1, 2, −2, . . . , an integer increasing in absolute value with increasing value of Y' (=z−9×X). That is, in the interval $10 \leq z<19$ (the interval where X=2), Y=0 for z=10, and for z=11, 12, 13, 14, 15, 16, 17, 18, Y is converted to 1, −1, 2, −2, 3, −3, 4, −4, respectively. Thereafter, the same conversion is repeated each time when the coefficient X takes the same value (X =3, 4, . . .).

Next, when $z \leq -1$, the coefficient Y is converted to 0, 1, −1, 2, −2, . . . , an integer increasing in absolute value with decreasing value of Y' (=z−9×X). That is, when $10<z \leq -1$ (where X=−1), for z=−2, −3, −4, −5, −6, −7, −8, −9, Y is converted to 1, −1, 2, −2, 3, −3, 4, −4, respectively. Further, when $z \leq -10$, the coefficient Y is converted to 0, 1, −1, 2, −2, . . . , an integer increasing in absolute value with decreasing value of Y' (=z−9×X). That is, when $-19<z \leq -10$ (where X=−2), Y=0 for z=−10, and for z=−11, −12, −13, −14, −15, −16, −17, −18, Y is converted to 1, −1, 2, −2, 3, −3, 4, −4, respectively. Thereafter, the same conversion is repeated each time when the coefficient X takes the same value (X=−3, −4, . . .). The conversion table for the above operation is shown in FIG. 87. In FIGS. 86A and 86B, each black dot indicates the inclusion of the value at that dot, while each white dot indicates the exclusion of the value at that dot.

Based on the above description, we will now describe the operation of the fourth data-separation/encoding circuit 237 in the digital VTR of the 17th embodiment with reference to FIG. 84. The present embodiment is identical in configuration and operation as the foregoing 16th embodiment, except for the fourth data-separation/encoding circuit 237 and the ninth data-separation circuit 238. In the present embodiment, as in the 16th embodiment, when constructing HP data for high-speed playback from the ATV bitstream, data separation is performed by using the amplitude separation encoding method in conjunction with the one-run, zero-run length separation encoding method, thereby reducing the data amount and thus making it possible to transmit higher-frequency coefficients in a DCT block as the HP data.

The operation of the fourth data separation/encoding circuit 237 will be described below with reference to FIG.

84. The variable-length coded digital data inputted via the input terminal 130 is variable-length decoded in the sixth variable-length decoder 131. The variable-length decoded digital data is fed into the ninth data-separation circuit 238, which separates the data into X and Y in accordance with the amplitude separation encoding method. The X data separated in accordance with the amplitude separation encoding method is fed into the sixth data-separation circuit 202 where zero-run-length coding is applied. The zero-run-length coded data is then inputted to the 12th variable-length encoder 205 for variable-length coding. On the other hand, the separated Y data is fed into the fifth data-separation circuit 201, where one-run-length coding is performed to encode runs of 1s and the data is separated into one-run length data and coefficient data. The one-run length data is inputted to the seventh data-separation circuit 203 where zero-run-length coding is performed to encode runs of zeros. The zero-run-length coded data is then inputted to the 13th variable-length encoder 206 for variable-length coding. Similarly, the coefficient data is inputted to the eighth data-separation circuit 204 where zero-run-length coding is performed to encode runs of zeros. The zero-run-length coded data is then inputted to the 14th variable-length encoder 207 for variable-length coding. The data variable-length encoded in the 12 to 14th variable-length encoders 205 to 207 are first stored in the second memory 65, and then outputted into the third data-synthesis circuit 190 in synchronism with the output timing of the first memory 62. The operation of the third data-synthesis circuit 190 is the same as that in the foregoing 16th embodiment, and therefore, description thereof will not be repeated here.

In the present embodiment also, a computer simulation was carried out based on the flow shown in FIG. 81, as in the 16th embodiment. The result showed a data amount reduction of about 3.0% as a whole. When performing one-run-length coding on the above numeric data, no distinction was made between 1 and −1, but after the one-run-length coding, code bits indicating the numbers of 1s and −1s were appended to the coded data as appending bits. The simulation was performed only on the AC coefficients in DCT blocks.

As described, when the input digital data is separated by using the amplitude separation encoding method in conjunction with the one-run, zero-run length coding method, as in the present embodiment, since the code amount is reduced using variable-length coding, a reversible process, the transmission code amount can be reduced without any loss of picture quality, as contrasted to the prior art construction method for high-speed playback HP data.

Accordingly, by performing data separation and recording the separated data on separate tracks by the heads having different azimuth angles, as in the present embodiment, the amount of data that can be transmitted as HP data can be increased by about 3.0% compared with the method of writing the same data twice. In the prior art, HP data for high-speed playback is constructed using the lower-frequency coefficients in intra-coded blocks, but according to the present embodiment, as the amount of data that can be transmitted as the HP data is increased, higher-frequency coefficients in intra-coded blocks can also be transmitted, thus achieving an improvement in high-speed playback picture quality.

As described, in the 17th embodiment, of the input digital data, the intra-coded digital data to be used for high-speed playback is variable-length decoded first, and then, the decoded digital data is separated into three data according to a predetermined method, each of which data is then variable-length coded; the variable-length coded data are then synthesized into two data, and the synthesized two data are recorded as HP data on separate tracks using the heads having different azimuth angles. By such data division, instead of duplicating the same HP data on the same number of tracks as the maximum high-speed playback tape speed expressed as a multiple of its normal speed, separated data is duplicated a fewer number of times than the maximum tape speed expressed as a multiple of its normal speed, making it possible to also use higher-frequency coefficients in the DCT block to construct the HP data. This improves the picture quality in high-speed playback and also the S/N ratio, as compared with the encoding of HP data by the prior art bitstream recording apparatus. In the above description of the embodiment, the Y data separated by the amplitude separation encoding method is further subjected to the one-run, zero-run length coding as described above, but the embodiment is not limited to the illustrated example. Alternatively, the one-run, zero-run length coding may be applied to the X data separated by the amplitude separation encoding method.

Embodiment 18

Figure 88:
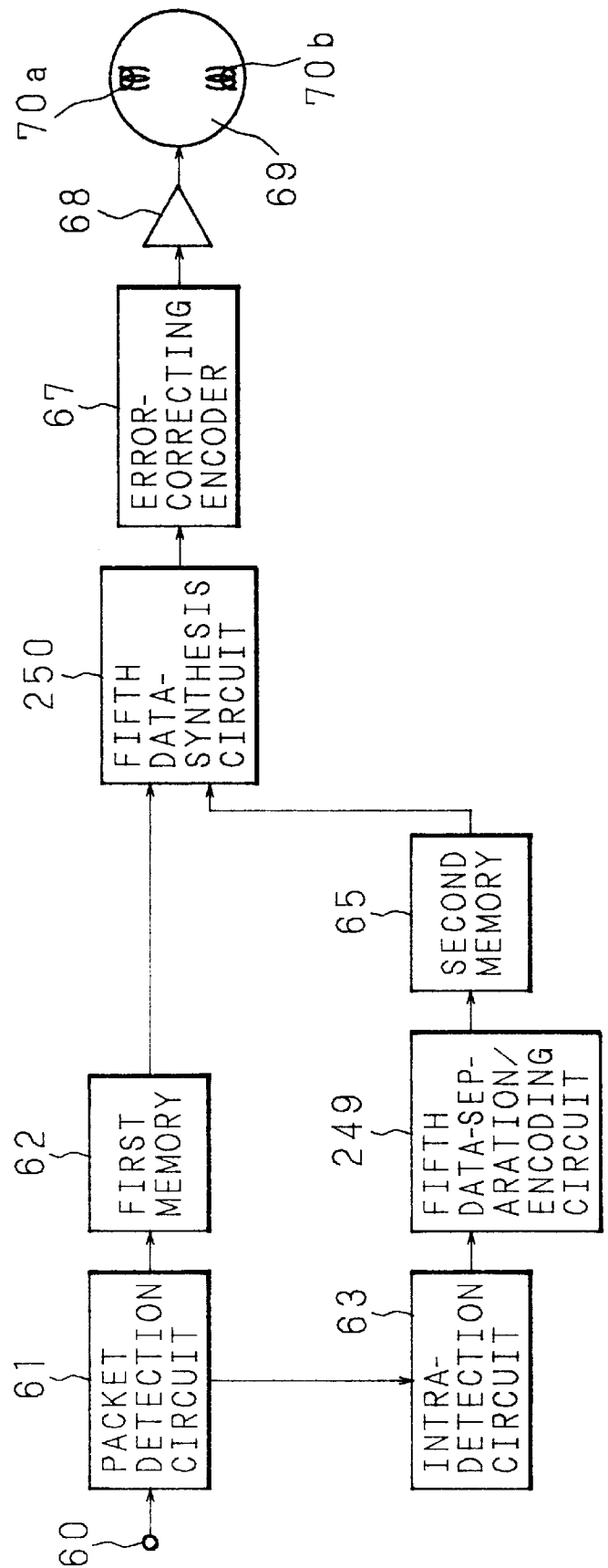
FIG. 88 is a block diagram showing the configuration of a recording system in a digital VTR according to an 18th embodiment of the present invention.

FIG. 88 is a block diagram showing the configuration of a recording system in a digital VTR according to an 18th embodiment of the invention. In FIG. 88, the same parts as those shown in FIG. 56 (14th embodiment) are designated by like reference numerals, and description of such parts is omitted here since they are identical in configuration and operation to the corresponding parts described in the 14th embodiment. In FIG. 88, reference numeral 249 is a fifth data-separation/encoding circuit for performing data separation on input variable-length coded digital data in accordance with a predetermined rule and for applying variable length coding to the separated data, and 250 is a fourth data-synthesis circuit for combining the separated data and generating a record data stream.

Figure 89:
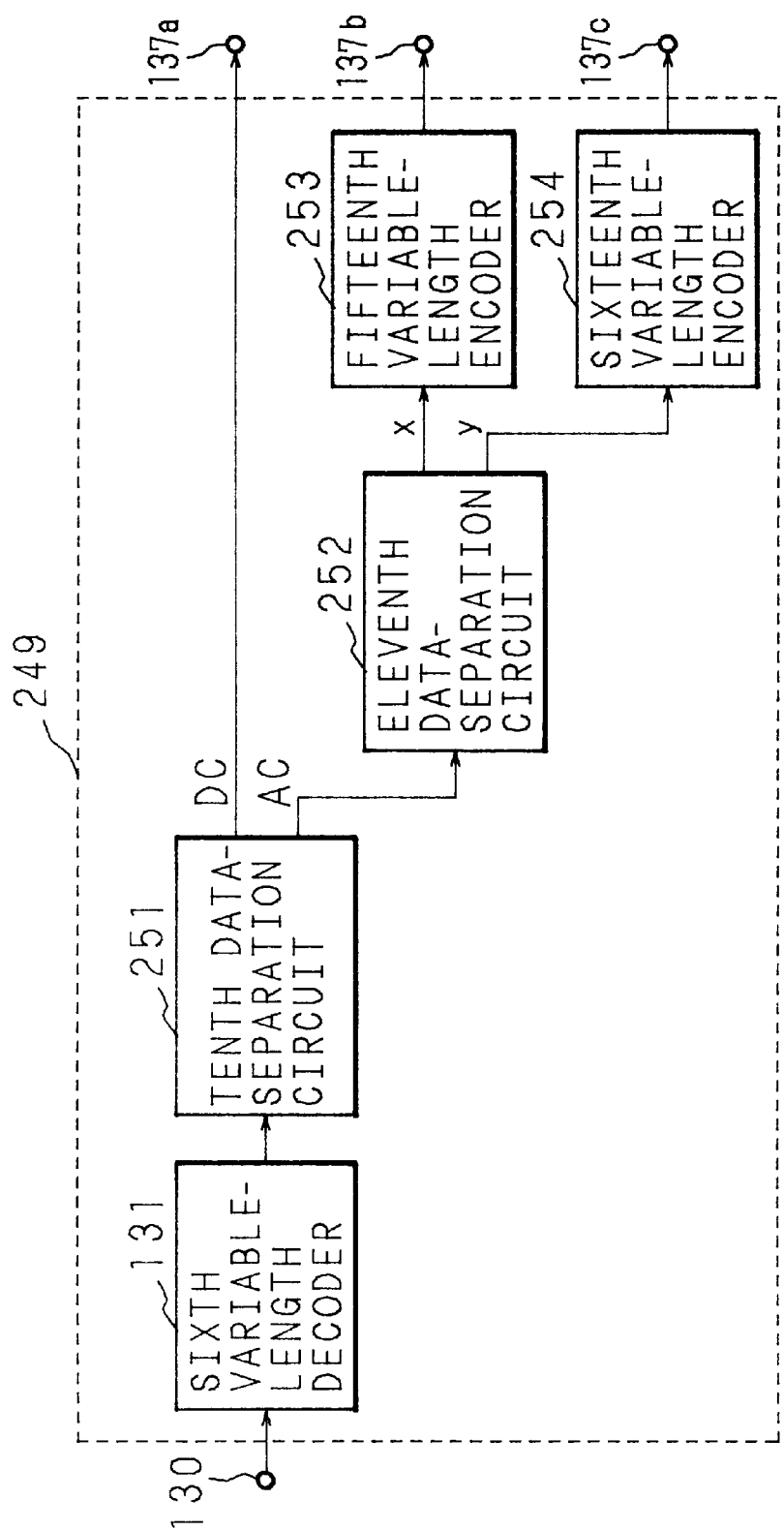
FIG. 89 is a block diagram showing the configuration of a fifth data-separation/encoding circuit in FIG. 88.

FIG. 89 is a block diagram showing the configuration of the fifth data-separation/encoding circuit 249. In FIG. 89, the same parts as those shown in FIG. 57 (14th embodiment) are designated by like reference numerals, and description of such parts is omitted here since they are identical in configuration and operation to the corresponding parts described in the 14th embodiment. In FIG. 89, reference numeral 251 is a 10th data-separation circuit, 252 is an 11th data-separation circuit, 253 is a 15th variable-length encoder, and 254 is a 16th variable-length encoder.

Figure 90:
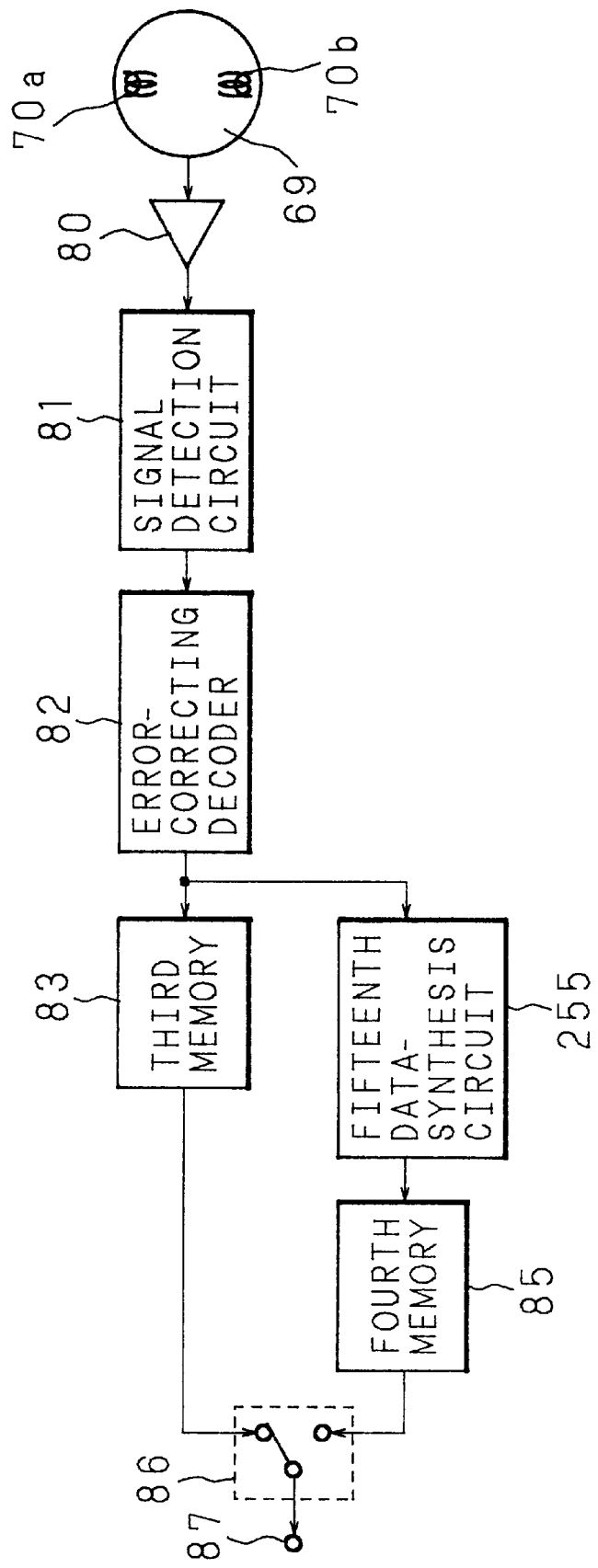
FIG. 90 is a block diagram showing the configuration of a playback system in the digital VTR according to the 18th embodiment.

FIG. 90 is a block diagram showing a playback system in the digital VTR according to the 18th embodiment of the invention. In FIG. 90, the same parts as those shown in FIG. 59 (14th embodiment) are designated by like reference numerals, and description of such parts is omitted here since they are identical in configuration and operation to the corresponding parts described in the 14th embodiment. In FIG. 90, reference numeral 255 is a 15th data-synthesis circuit.

Figure 91:
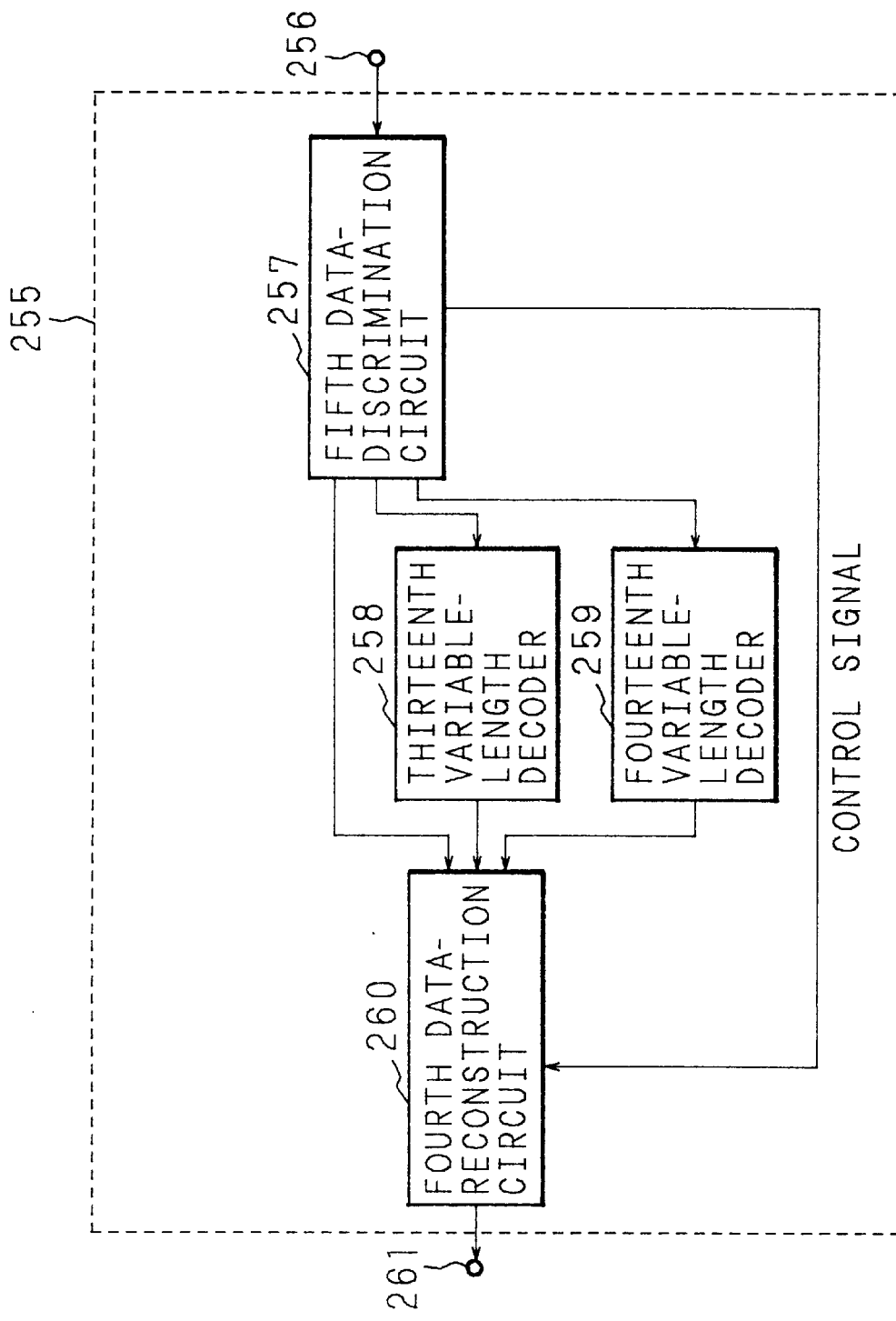
FIG. 91 is a diagram showing the configuration of a 15th data-synthesis circuit in FIG. 90.

FIG. 91 is a block diagram showing the configuration of the 15th data-synthesis circuit 255 in FIG. 90. In the figure, reference numeral 256 is an input terminal, 257 is a fifth data-discrimination circuit, 258 is a 13th variable-length decoder, 259 is a 14th variable-length decoder, 260 is a fourth data-reconstruction circuit, and 261 is an output terminal.

Before describing the operation of the digital VTR of the 18th embodiment, we will first describe the concept of this embodiment. In the digital VTR of this embodiment, when constructing HP data, input variable-length coded digital data is variable-length decoded, and the variable-length decoded DCT block data is first separated into the DC coefficient and AC coefficients. The separated DC coefficient as digital data is used as HP data. On the other hand, the separated AC coefficients are further separated into two data, which are respectively variable-length encoded. The two separately variable-length coded data are used as HP data. Of the three data thus separated, the DC coefficient is recorded in all duplication areas on the tracks by all of the heads having different azimuth angles; on the other hand, the two separated AC coefficient data are recorded on different tracks by the heads having different azimuth angles.

The operation of the fifth data-separation/encoding circuit 249 of the present embodiment will be described below with reference to FIGS. 88 and 89. The digital data variable-length decoded in the sixth variable-length decoder 131 is fed into the 10th data-separation circuit 251 where the data is separated into the DC coefficient and AC coefficients. The separated DC coefficient as digital data is directly outputted at the output terminal 137a. On the other hand, the separated AC coefficient data is inputted to the 11th data-separation circuit 252, where the data is divided by a predetermined value "a" and separated into quotient x and remainder y. The data x and y separated in the 11th data-separation circuit 252 are directed to the 15th variable-length encoder 253 and 16th variable-length encoder 254, respectively, for variable-length coding. The data x and y variable-length encoded in the 15th and 16th variable-length encoders 253 and 254 are outputted at the output terminals 137b and 137c, respectively.

Figure 92:
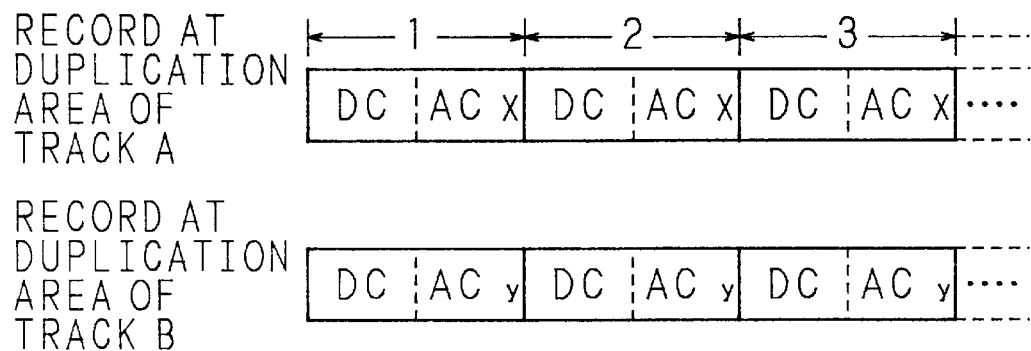
FIG. 92 is a diagram illustrating a method of data synthesis in the 15th data-synthesis circuit.

The DC coefficient data separated in the fifth data-separation/encoding circuit 249, and the two AC coefficient data x and y, obtained by first dividing the input AC coefficient data by the predetermined value "a" into the quotient x and remainder y in the 11th data-separation circuit 252 and then variable-length encoding them in the 15th and 16th variable-length encoders 253 and 254, are first stored in the second memory 65, and then outputted into the fourth data-synthesis circuit 250 in synchronism with the output timing of the first memory 62. The fourth data-synthesis circuit 250 performs data synthesis so that the DC coefficient data and the two AC coefficient data variable-length encoded in the 15th and 16th variable-length encoders 253 and 254 are recorded in predetermined pairs by the two heads having different azimuth angles. FIG. 92 shows the synthesized data recording format according to the present embodiment. In the figure, the numbers 1, 2, 3, . . . indicate the absolute addresses designating the positions of the HP data on the screen, as in the foregoing embodiment. In the figure, the DC coefficient data separated in the 10th data-separation circuit 251 is designated as DC, and of the likewise separated AC coefficient data, the data x and y separated in the 11th data-separation circuit 252 are designated as ACx and ACy, respectively. Data synthesis is performed in the fourth data-synthesis circuit 250 so that DC and ACx are recorded in duplication areas on track A and DC and ACy are recorded in duplication areas on track B, as shown in FIG. 92. DC is thus duplicated on both tracks.

Using the recording format example shown in FIG. 62, an example of HP data arrangement on the tracks in the present embodiment will be described in detail below. On the tracks shown in FIG. 62, the DC coefficient data and the ACx data output from the 15th variable-length encoder 253 are recorded in the duplication areas on track A, while the same DC coefficient data and the ACy data output from the 16th variable-length encoder 254 are recorded in the duplication areas on track B. In the figure, each pair of numbers, one circled and the other not circled, designates a pair of duplication areas holding a pair of data separated as described above and representing the same position on the screen. That is, the data consisting of the DC and ACx data is recorded in areas 1, 2, 3, . . . while the data consisting of the DC and ACy data is recorded in areas ①, ②, ③, . . . The example of the HP data arrangement on the tracks shown in FIG. 62 is based on the arrangement shown in FIG. 13 where identical HP data is recorded 17 times; in the present embodiment, each data pair of the same number is recorded 9 or 8 times. That is, when the data consisting of the DC and ACx data is recorded 9 times, then the data consisting of the DC and ACy data is recorded 8 times; likewise, when the data consisting of the DC and ACx data is recorded 8 times, then the data consisting of the DC and ACy data is recorded 9 times.

Next, referring to FIGS. 91 and 92, we will describe briefly how high-speed playback is performed using the high-speed playback HP data in the above format. When the HP data thus constructed as the playback signal is inputted via the input terminal 256 for high-speed playback, the fifth data-discrimination circuit 257 discriminates the DC data and the ACx and ACy data on the basis of the playback track position. The data discriminated as the DC data is directly fed as digital data into the fourth data-reconstruction circuit 260. On the other hand, the data discriminated as the ACx is fed to the 13th variable-length decoder 258, and the data discriminated as the ACy data is fed to the 14th variable-length decoder 259, where they are subjected to variable-length decoding. The digital data variable-length decoded by the respective variable-length decoders are inputted to the fourth data-reconstruction circuit 260. The fifth data-discrimination circuit 257 also generates a control signal indicating whether or not all of the DC data and the ACx and ACy data are reproduced, and supplied the control signal to the fourth data-reconstruction circuit 260.

The operation of the fourth data-reconstruction circuit 260 in the present embodiment will be briefly described below. In the present embodiment, the digital data inputted to the fourth data-reconstruction circuit 260 is reconstructed in the following manner. In the present embodiment, data reconstruction is performed with one DCT block as a unit. Here, the original digital data variable-length decoded in the sixth variable-length decoder 131 is denoted as z. For example, when the control signal outputted from the fifth data-discrimination circuit 257 indicates that all three separated data (DC, ACx, and ACy) are reproduced, then a Xx+y is calculated using the value "a" predetermined in the 11th data-separation circuit 252 and the decoded original AC coefficient data pair (quotient X and remainder y) outputted from the 13th and 14th variable-length decoders 258 and 259, to reconstruct the original digital data z that was variable-length decoded in the sixth variable-length decoder 131. On the other hand, when, of the same numbered data pairs, 1, 2, 3, . . . recorded in the duplication areas on track A and ①, ②, ③, . . . recorded in the duplication areas on track B shown in FIG. 62, one or other of any paired data is not reproduced, then data reconstruction is performed using the other of the paired data reproduced. That is, when data is reproduced only from track A, since the DC data and the quotient x of the AC data are recovered, the DC coefficient data can be reconstructed correctly, while for the AC coefficient data, data reconstruction is performed by calculating a×ACx. Similarly, when data is reproduced only from track B, since the DC data and the remainder y of the AC data are recovered, the DC coefficient data can be reconstructed correctly, while for the AC coefficient data, data reconstruction is performed by calculating a×ACy.

The operation of high-speed playback on the digital VTR according to the present embodiment will be described below. FIG. 63 is a diagram showing head scan paths on the recorded tracks in FIG. 62 in high-speed playback five times the normal speed. Playback data is obtained from the hatched regions shown in the figure. As shown, head A scans the HP data regions in the same azimuth playback areas in the order of 1, 2, 3, 1, 2, 3. On the other hand, head B scans the HP data regions in the same azimuth playback areas in the order of ①, ②, ③, ①, ⑤, ⑥, . . . . As a result, for data pairs of 1 and ①, 2 and ②, and 3 and ③, both HP data are all reproduced from the different azimuth playback areas. These data are combined to reconstruct the complete data.

Also, the operation of high-speed playback 17 times the normal speed on the digital VTR of the present embodiment will be described. FIG. 65 is a diagram showing head scan paths on the recorded tracks in FIG. 62 in high-speed playback 17 times the normal speed. Playback data is obtained from the hatched regions shown in the figure. As shown, head A scans the HP data regions in the same azimuth playback areas in the order of 1, 2, 3. However, no playback signal from the same azimuth playback areas ①, ②, and ③ is obtained from head B. Since the data in areas ①, ②, and ③ are not reproduced by head B, the HP data for positions 1, 2, and 3 on the screen cannot be reconstructed completely. In the digital VTR of the present embodiment, as described above, when ACx recorded on track A is reproduced, a×ACx is calculated to reconstruct the data, and when ACy recorded on track B is reproduced, the ACy is outputted as the reconstructed data.

As described, according to the present embodiment, the variable-length coded digital data is variable-length decoded, and the resulting DCT block is separated into the DC coefficient and AC coefficients, the AC coefficients then being divided by the predetermined value "a" for further separation into the quotient x and remainder y which are respectively subjected to variable-length coding; the DC coefficient is recorded by both heads with different azimuth angles, while for the AC coefficient data, the data x and y are recorded separately by the heads having different azimuth angles. This provides the effect of increasing the amount of data that can be transmitted as HP data, as compared with the prior art method that writes identical data twice. In the prior art, the HP data for high-speed playback is constructed using the low-frequency coefficients in DCT blocks. In the present embodiment, on the other hand, since the amount of data that can be transmitted as HP data is increased, higher-frequency coefficients in DCT blocks can also be transmitted HP data. This provides higher picture quality in high-speed playback than when the HP data is encoded in the prior art digital VTR.

Embodiment 19

Figure 93:
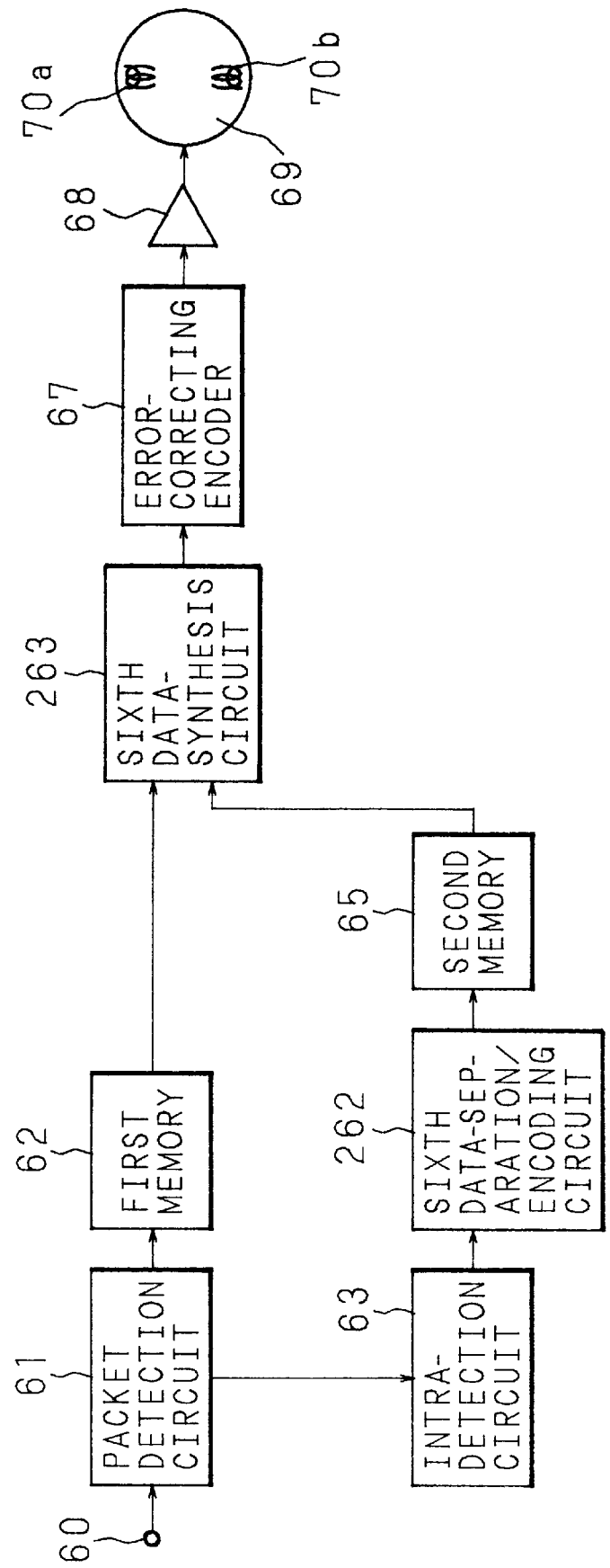
FIG. 93 is a block diagram showing the configuration of a recording system in a digital VTR according to a 19th embodiment of the present invention.

FIG. 93 is a block diagram showing the configuration of a recording system in a digital VTR according to a 19th embodiment of the invention. In FIG. 93, the parts corresponding or similar to those shown in FIG. 37 (8th embodiment) are designated by like reference numerals, and description of such parts is omitted here. In FIG. 93, reference numeral 262 is a sixth data-separation/encoding circuit for performing data separation on intra-coded data in accordance with a predetermined rule and for applying variable length coding to the separated data, and 263 is a sixth data-synthesis circuit for combining data outputted from the first memory 62 and second memory 65 and thereby generating a record data stream.

Figure 94:
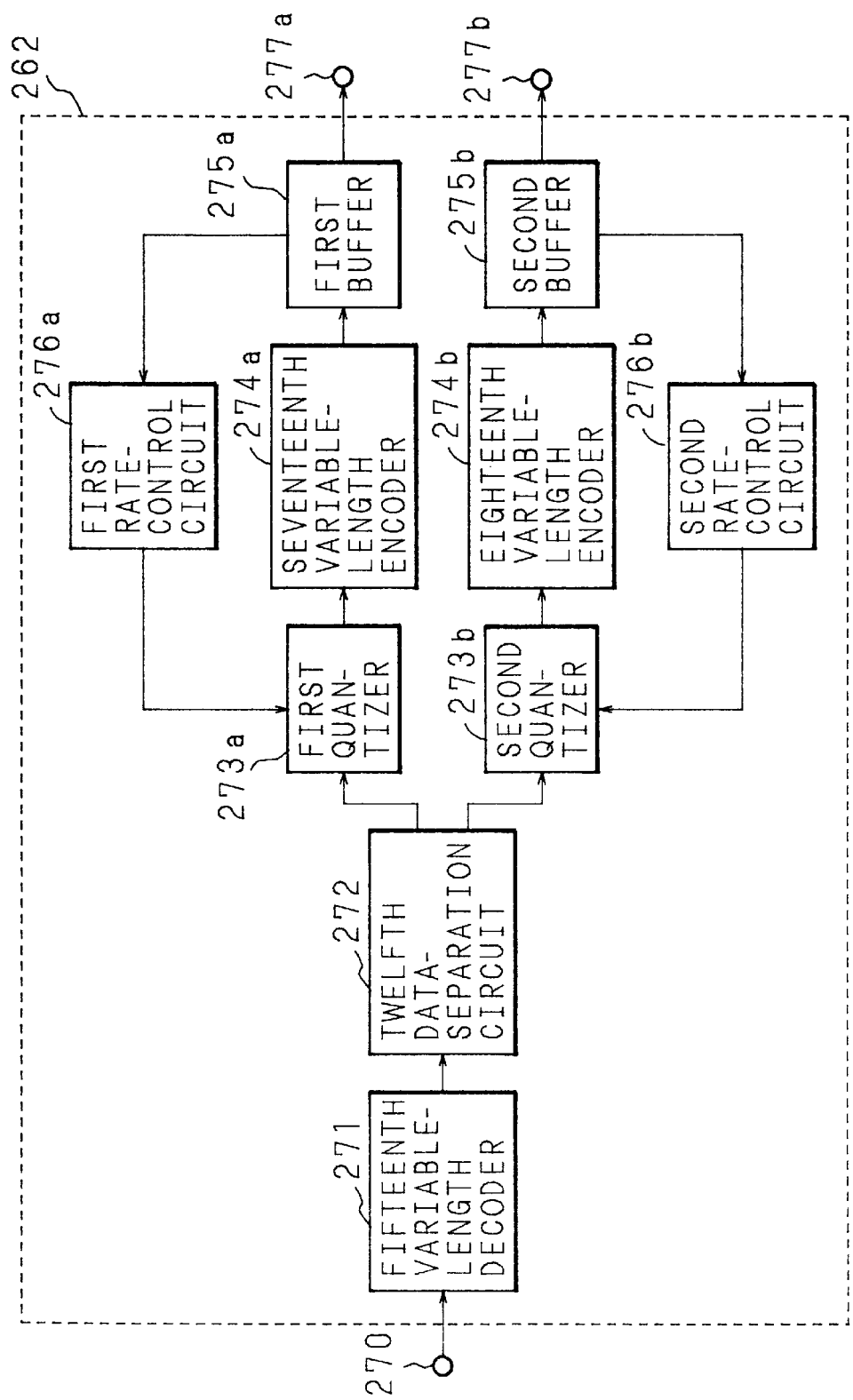
FIG. 94 is a block diagram showing the configuration of a sixth data-separation/encoding circuit in FIG. 93.

FIG. 94 is a block diagram showing the configuration of the sixth data-separation/encoding circuit 262 in FIG. 93. In the figure, reference numeral 270 is an input terminal; 271 is a 15th variable-length decoder; 272 is a 12th data-separation circuit; 273*a* is a first quantizer; 273*b* is a second quantizer; 274*a* is a 17th variable-length encoder; 274*b* is a 18th variable-length encoder; 275*a* is a first buffer; 275*b* is a second buffer; 276*a* is a first rate-control circuit; 276*b* is a second rate-control circuit; and 277*a* and 277*b* are output terminals.

Figure 95:
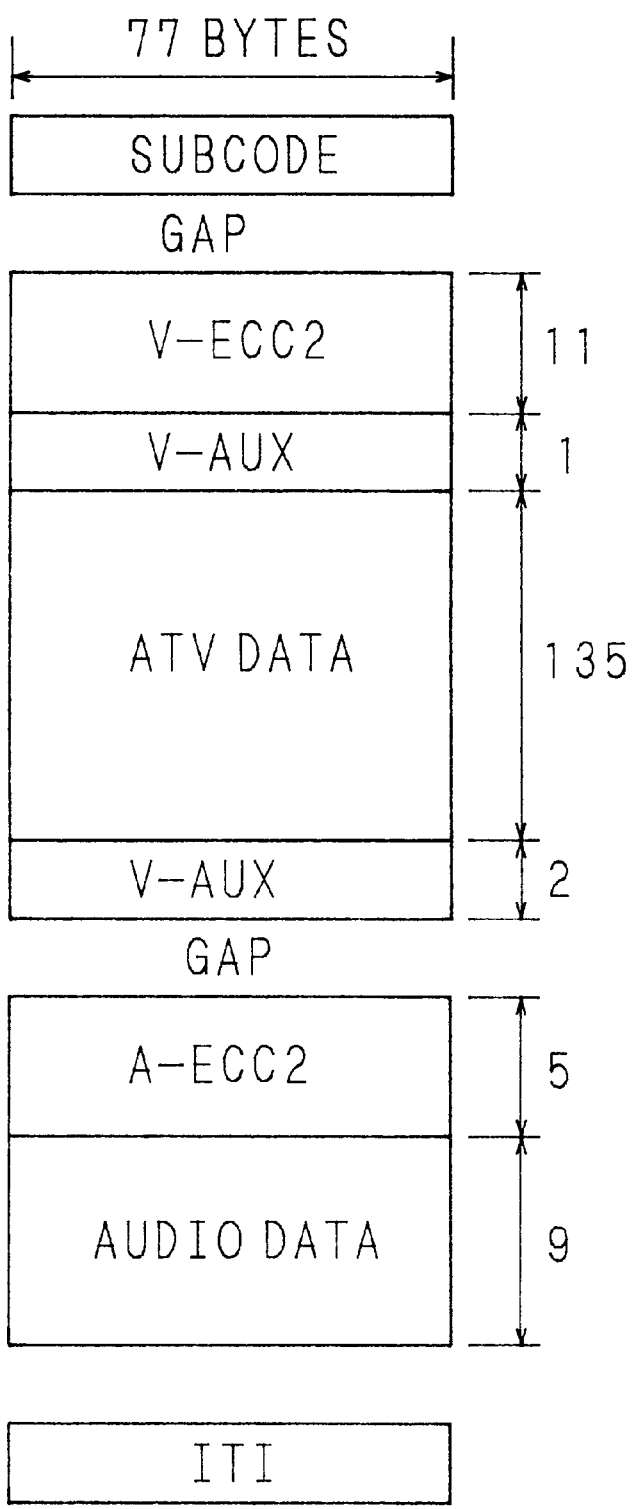
FIG. 95 is a diagram showing a data format within one track of a video signal in the SD standard, according to the 19th embodiment.
Figure 96:
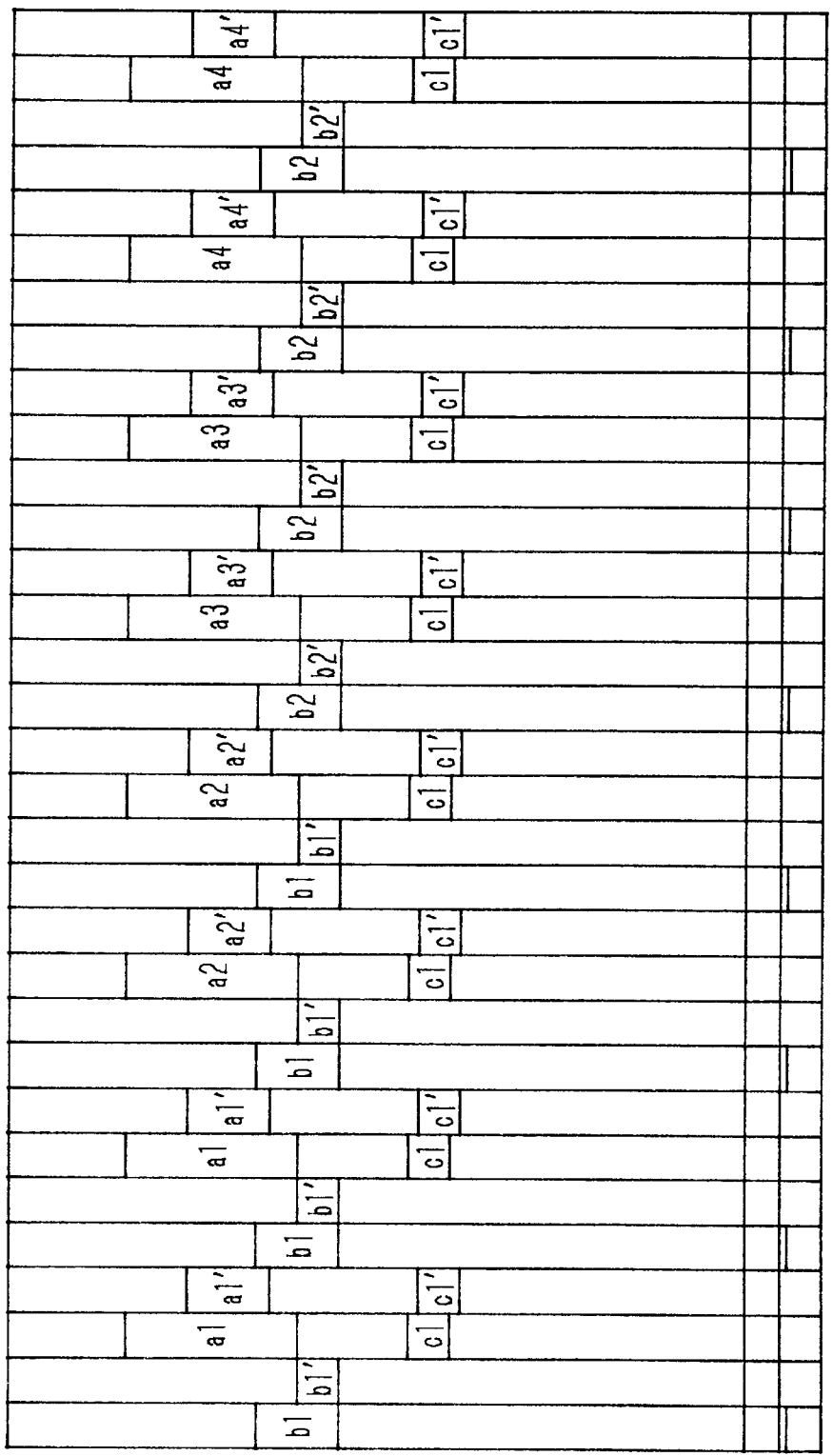
FIG. 96 is a diagram showing a track format according to the 19th embodiment.
Figure 97A:
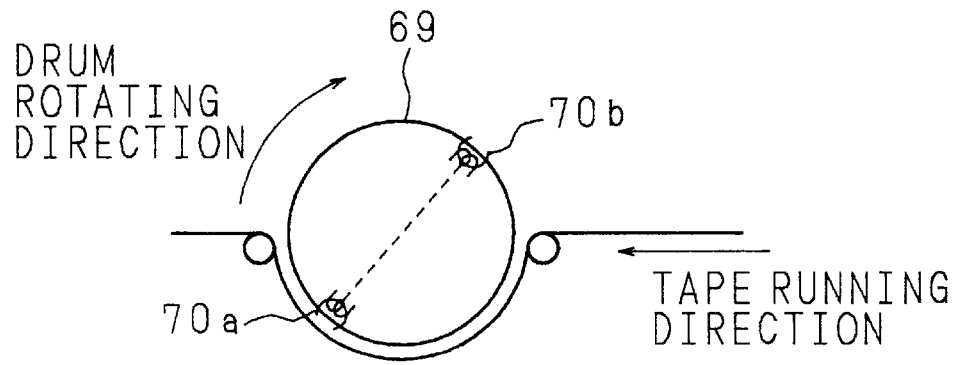
FIGS. 97A, 97B, and 97C are diagrams showing drum configurations according to the 19th embodiment.
Figure 97B:
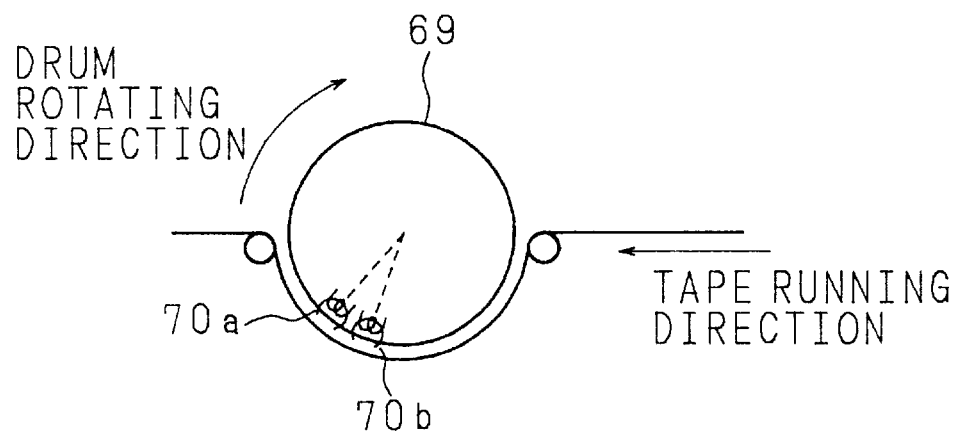
Figure 97C:
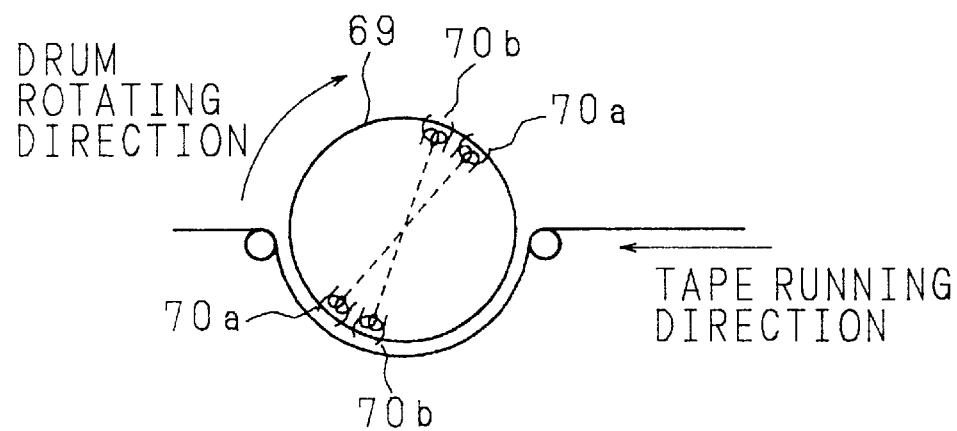

An example of the data packet of an input bitstream in the 19th embodiment is as shown in the previously given FIG. 40. FIG. 95 is a diagram showing the per-track data format of the SD standard video signal in the 19th embodiment. FIG. 96 shows the track format according to the 19th embodiment. In the figure, areas indicated at a1 to a4 and a1' to a4' are duplication areas for playback 2 times, 4 times, and −2 times the normal speed. Each of these duplication areas is recorded every four tracks, and the same data is written twice. In the figure, the areas indicated by the same reference sign holds the same data. Further, in the FIG., b1, b2, b1', and b2' are areas for recording special playback data for playback 8 times and −6 times the normal speed, and c1 and c1' are areas for recording special playback data for playback 16 times and −14 times the normal speed. Though details will not be given here, in the present embodiment the areas a1 to a4, b1, b2, and c1 are duplication areas employed in a system (hereinafter referred to as the 9000 rpm system) having the head configuration shown in FIG. 97A or 97B, and a1' to a4', b1', b2', and c1' are duplication areas employed in a system (hereinafter referred to as the 4500 rpm system) having the head configuration shown in FIG. 97C.

Figure 98:
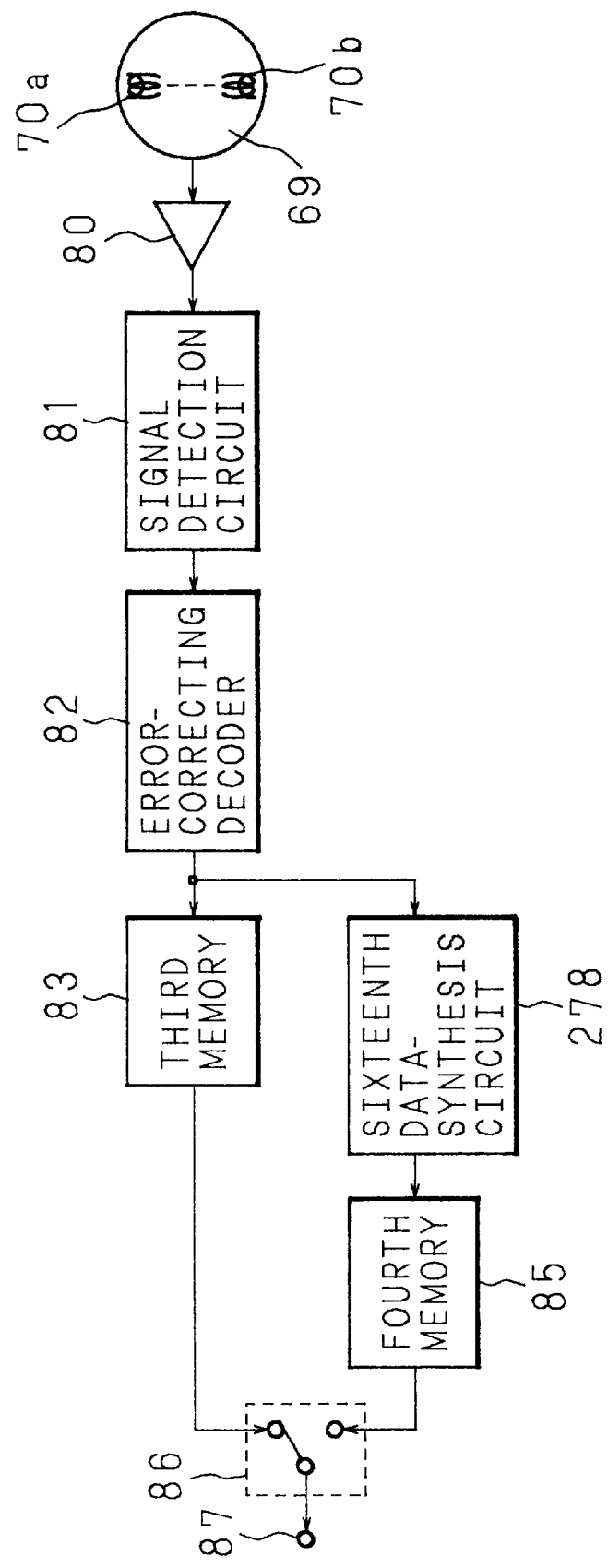
FIG. 98 is a block diagram showing the configuration of a playback system in the digital VTR according to the 19th embodiment.

FIG. 98 is a block diagram showing the configuration of a playback system in the digital VTR according to the 19th embodiment of the invention. In FIG. 98, the parts corresponding or similar to those shown in FIG. 44 (8th embodiment) are designated by like reference numerals, and description of such parts is omitted here. Numeral 278 is a 16th data-synthesis circuit.

Figure 99:
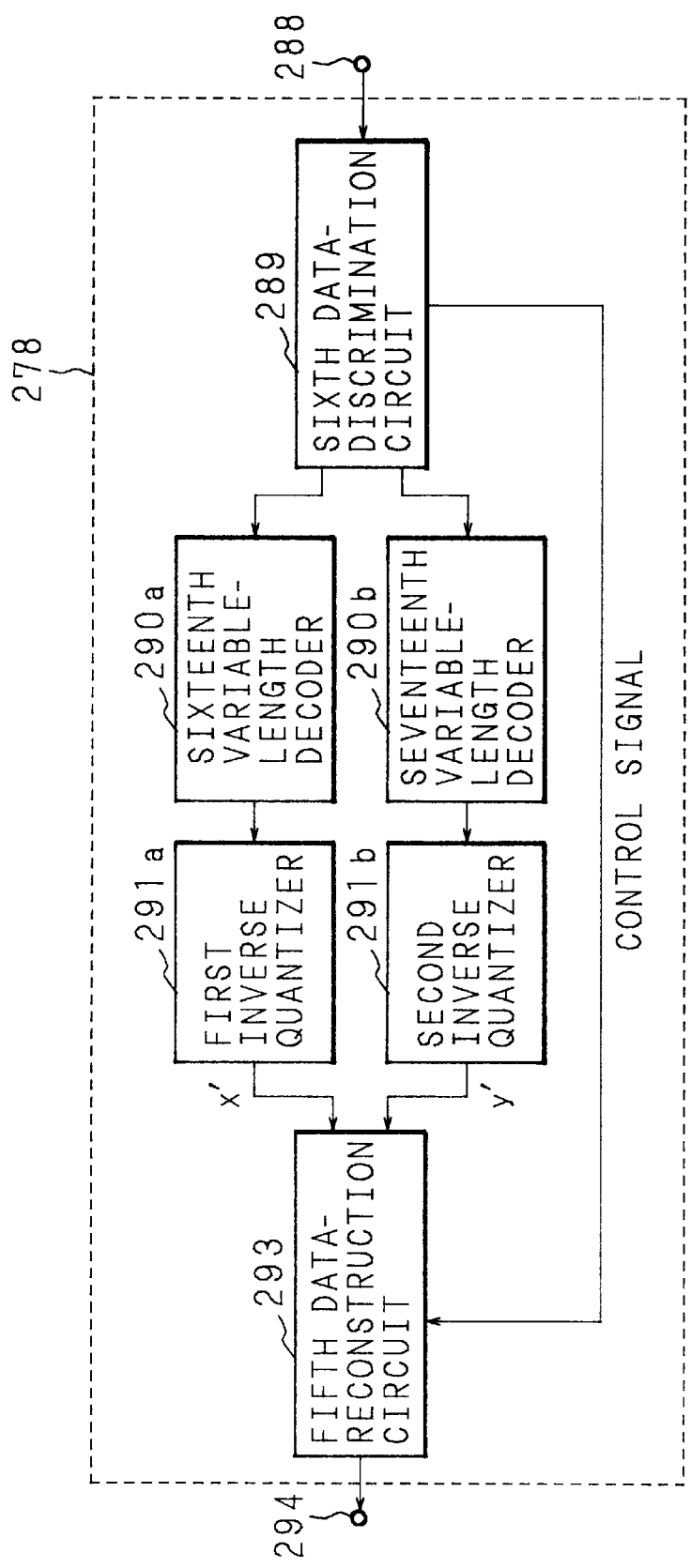
FIG. 99 is a block diagram showing the configuration of a 16th data-synthesis circuit in FIG. 98.

FIG. 99 is a block diagram showing the configuration of the 16th data-synthesis circuit 278 in FIG. 98. In the figure, reference numeral 288 is an input terminal; 289 is a sixth data-discrimination circuit; 290*a* is a 16th variable-length decoder; 290*b* is a 17th variable-length decoder; 291*a* is a first inverse quantizer; 291*b* is a second inverse quantizer; 293 is a fifth data-reconstruction circuit; and 294 is an output terminal.

First, the recording operation of the 19th embodiment will be described with reference to FIGS. 93 and 94. The bitstream inputted via the input terminal 60 contains a digital video signal, a digital audio signal, and digital data concerning the video signal and audio signal. They are carried in transport packets whose format is shown in FIG. 40A. Each packet consists of a four-byte header field and a 184-byte data field. In the 19th embodiment, the bitstream is detected with one transport packet as a unit, and each detected packet of intra-coded data is divided and encoded for recording in the special playback data areas in the data format shown in FIG. 95. Thus, the bitstream inputted via the input terminal 60 is first fed into the packet detection circuit 61, which detects a transport packet and supplies it to the first memory 62 as well as to the intra-detection circuit 63.

In the SD standard, as noted in the description of the prior art, there are 149 sync blocks per track, as areas for recording video data, as shown in FIG. 95, of which three blocks are used as VAUX data recording areas and 11 blocks as error-correcting code recording areas (designated as "V-ECC2" in the figure). Each sync block consists of 90 bytes, of which the first five bytes carry a sync pattern and an ID signal and the last eight bytes carry an error-correcting code. This leaves 77 bytes in each sync block for the recording of data, as shown in FIG. 95.

The first memory 62 stores bitstream data on a packet-by-packet basis, and data is read out in the record data packet format shown in FIG. 40B. In the format of FIG. 40B, when the data length in each sync block is 77 bytes, as described above, two transport packets consists of five sync blocks. In FIG. 40B, H1 is a first header, and H2 is a second header. H1 carries data such as identification data indicating the order of the sync in the five sync blocks. H2 carries data such as identification data for identifying whether the data is video data or audio data. In the 19th embodiment, data read operations from the first memory 62 and from the second memory 65 hereinafter described are performed according to directions from the sixth data-synthesis circuit 263.

The bitstream output from the packet detection circuit 61 is also inputted to the intra-detection circuit 63. The intra-detection circuit 63 detects whether the data in the transport packet is intra-coded data or not. As explained in the description of the prior art, in an MPEG2 bitstream, when data is intraframe- or intrafield-coded (intra-coded), intra-transport packets are sent successively. By detecting this, transport packets only of intra-coded data are extracted. Each extracted transport packet is passed to the sixth data-separation/encoding circuit 262.

Generally, the digital video data carried in the transport packet is variable-length coded data. Therefore, the description of the 19th embodiment is given on the assumption that the video data in the input bitstream data is variable-length coded. It is also assumed that intra-coded data are data obtained by first applying an orthogonal transform based on DCT and then applying two-dimensional variable-length coding.

Next, the operation of the sixth data-separation/encoding circuit 262 will be described with reference to FIG. 94. The variable-length coded digital data inputted via the input terminal 270 is subjected to variable-length decoding in the 15th variable-length decoder 271, which outputs the digital data in the DCT block in the zigzag scanning order shown in FIG. 11. The digital data outputted from the 15th variable-length decoder 271 in the zigzag scanning order is inputted to the 12th data-separation circuit 272 which separates the digital data into two data in accordance with a predetermined method. The method of data separation performed in the 12th data-separation circuit 272 will be described in detail later. The digital data separated into two data in accordance with the predetermined method in the 12th data-separation circuit 272 are inputted to the first quantizer 273a and second quantizer 273b, where the data are respectively quantized on the basis of rate control variables K set by the first and second rate-control circuits 276a and 276b, respectively. The digital data quantized in the first quantizer 273a and second quantizer 273b are fed into the 17th variable-length encoder 274a and 18th variable-length encoder 274b, respectively, for variable-length coding. The data variable-length encoded in the 17th variable-length encoder 274a and 18th variable-length encoder 274b are then temporarily stored in the first buffer 275a and second buffer 275b, respectively. The quantization and variable-length coding process is repeated until the respective rate control variables K are determined by the code amount control performed by the first and second rate-control circuits 276a and 276b. Details of the code amount control method of the present embodiment will be described later.

Data from the first buffer 275a and second buffer 275b are outputted at the respective output terminals 277a and 277b.

The method of data separation performed in the 12th data-separation circuit 272 in the present embodiment will be described below. FIG. 100 is a data map diagram for explaining the data separation according to the present embodiment. Suppose here that the value of the digital data, variable-length decoded in the 15th variable-length decoder 271 and inputted to the 12th data-separation circuit 272, is z. Then, the 12th data-separation circuit 272 separates the data z into two data, x and y, in accordance with the data map shown in FIG. 100.

More specifically, in the present embodiment, the digital data z inputted to the 12th data-separation circuit 272 is separated into data x and data y in accordance with equation z=x+y. However to balance the data amount between x and y, when z=1 the data is separated as x=0 and y=1, and when z=−1 the data is separated as y=0 and x=−1, relative to the state of x=y=0 when z=0. That is, the data x and y are calculated by the following equation (12).

when $z \geq 0$ $$x = (INT)(z/2)$$

$$y = z - x$$

when $z < 0$ $$x = (INT)((z-1)/2)$$

$$y = z - x \quad (12)$$

where (INT)(A/B) is the quotient when A is divided by B.

The above separation rule will be explained using concrete numeric values. Suppose, for example, that data having a digital value of 395 is inputted to the 12th data-separation circuit 272. Then, the input digital data z is separated into the data x and y in accordance with the above equation (12).

Since $z \geq 0$ $$x = (INT)(395/2) = 197$$

$$y = z - x = 395 - 197 = 198$$

The original digital value z is given as $$z = x + y \quad (13)$$

Therefore, z=197+198=395, thus completely reconstructing the original value.

According to the above separation method, the input digital value z can be reconstructed almost completely from either x or y using the following equation (14). That is, when the reconstructed value is denoted as z', then $$z' = x(\text{or } y) \times 2 \quad (14)$$

In the above example, from data x the original value is calculated as $$z' = x \times 2 = 197 \times 2 = 394$$

Similarly, from data y $$z' = y \times 2 = 198 \times 2 = 396$$

This shows that the original input digital value z can be reconstructed almost completely by using data x or y alone. FIG. 101 shows examples of reconstruction of the input digital data x from the separated data x and y. In the figure, zx is the reconstructed value from data x and zy the reconstructed value from data y.

Referring next to FIG. 96, we will describe the method of constructing special playback data and the method of determining the rate control variables K in the first and second rate-control circuits 276a and 276b in the present embodiment. As previously mentioned, the areas indicated at a1 to a4 and a1' to a4' in the figure are the areas for recording data for special playback 2 times and 4 times the normal speed. As previously noted, the same data is written twice. The reason will be described below.

Figure 102:
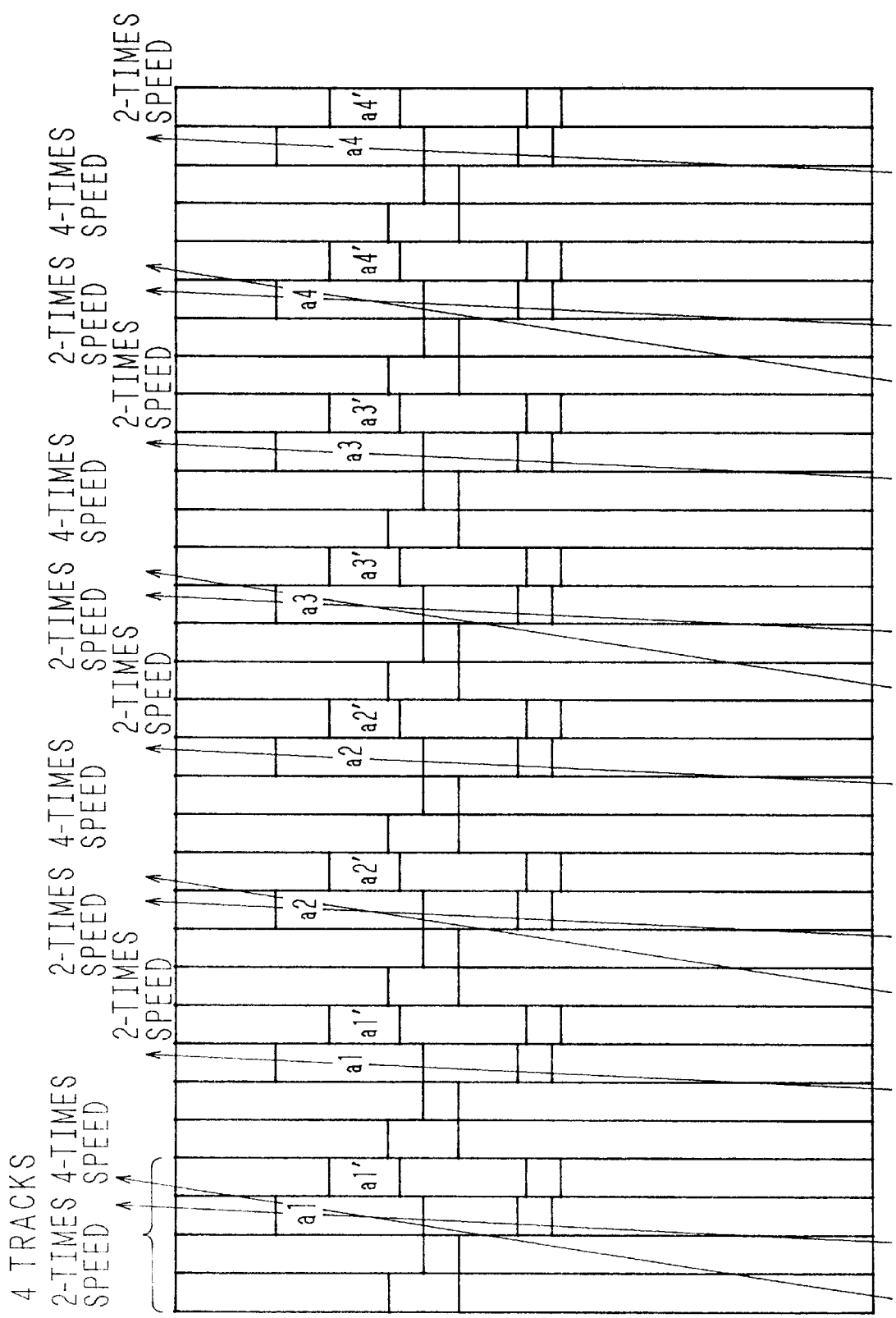
FIG. 102 is a diagram showing the relationship between duplication area and head scan path in playback at the speed two times and four times the normal speed on the track format shown in FIG. 96.

FIG. 102 is a diagram showing the relationship between duplication area and head scan path in playback 2 times and 4 times the normal speed on the track format of the present embodiment shown in FIG. 96. In the present embodiment, the same special playback data is shared between the 2-times and 4-times speed playback modes. As shown in FIG. 102, in the 2-times speed playback mode, area a1 is scanned in the first scan, and in the second scan also, area a1 is scanned. Scanning then proceeds in the order of a2, a2, a3, a3, a4, a4, thus scanning the same data area twice. On the other hand, in the 4-times speed playback mode, area a1 is scanned in the first scan, and area a2 is scanned in the second scan. Scanning then proceeds in the order of a3, a4, thus scanning the same data area only once. As shown in FIG. 102, in the 4-times speed playback mode, since tape runs two times as fast as in the 2-times speed playback mode, the number of scanned tracks is half that in the 2-times speed playback mode. To enable the same special playback data to be shared between the 2-times and 4-times speed playback modes, as in the present embodiment, the same data is obtained twice so that, in the 4-times speed playback mode, data from all duplication areas can be obtained. With this in mind, we will describe below the concept of the data separation method of the present embodiment.

In the present embodiment, since special playback data is so constructed as to be shared between the 2-times and 4-times speed playback modes, as described above, the same data area is scanned twice in the 2-times speed playback mode, which means one out of two scans is wasted. In the present embodiment, to avoid the decrease in data efficiency caused by scanning the same data area twice in the 2-times speed playback mode, the special playback data is constructed without writing identical data twice.

More specifically, the special playback data for 2-times speed playback is constructed so that the input digital data z separated in the 12th data-separation circuit 272 into two data, x and y, are recorded separately in the areas where identical data would be written twice in the above track format.

Figure 103:
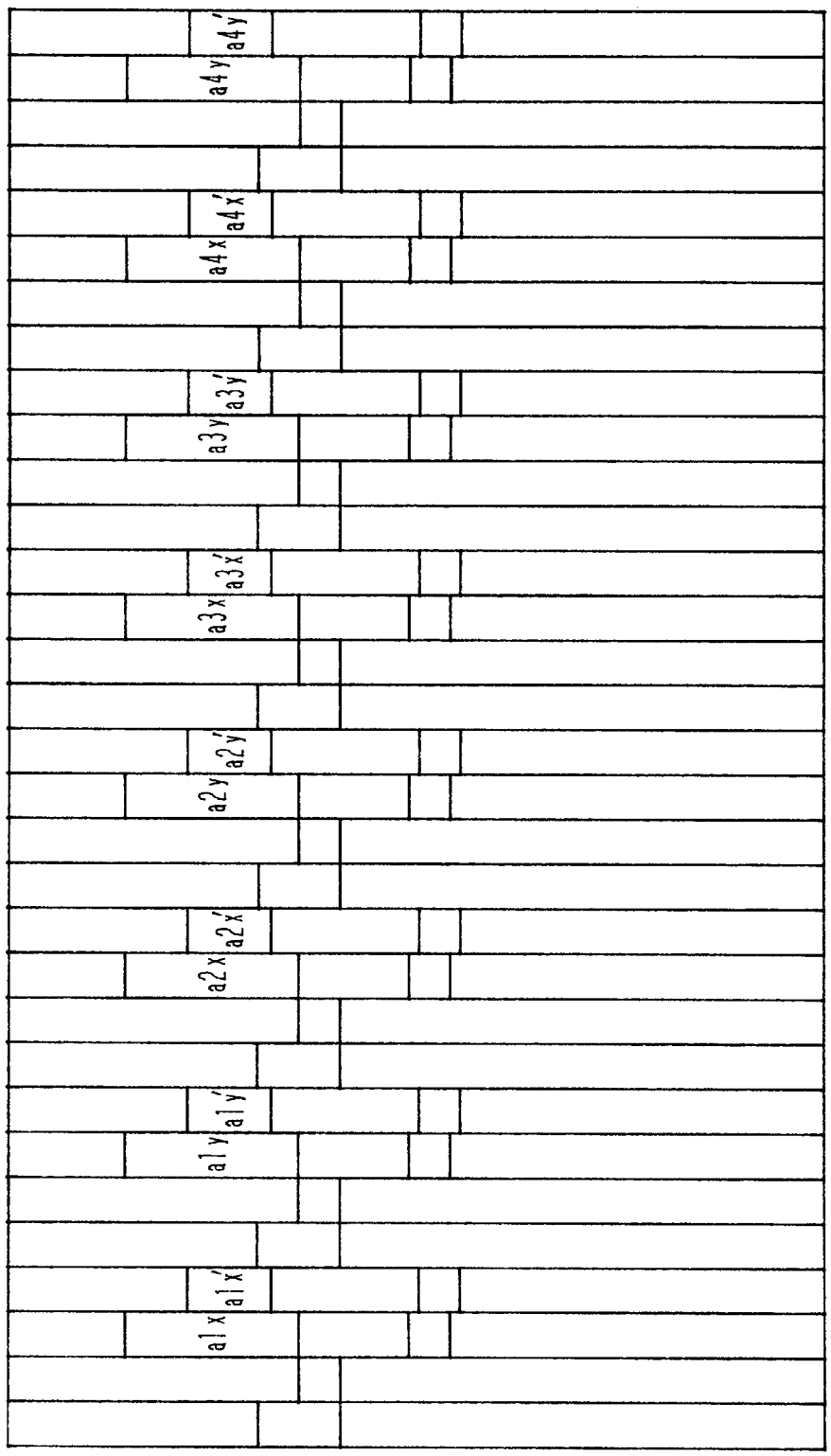
FIG. 103 is a track format diagram for explaining a recording method according to the 19th embodiment.

We will describe here how the rate control variables K are determined in the first and second rate-control circuits 276a and 276b in order to quantize the data x and data y separated in the 12th data-separation circuit 272, to apply variable-length coding to them, and to record the coded data in the duplication areas shown in FIG. 96. FIG. 103 is a track format diagram for explaining the recording method according to the 19th embodiment. In the figure, areas a1x and a1y correspond to the two areas indicated by a1 in FIG. 96, and of the separated data, the data x is recorded in the area indicated at a1x and the data y in the area indicated at a1y. Further, the data that would be recorded in the areas indicated by a2 is separated into two data which are recorded separately in areas a2x an a2y; similarly, for the areas a3, separated data are recorded in areas a3x and a3y, and for the areas a4, separated data are recorded in areas a4x and a4y.

Similar data construction is performed for the special playback data a1' to a4' for the 4500 rpm system, and detailed description thereof will not be given here.

The data x and data y, separated as described above, are respectively recorded in the duplication areas of the same capacity. The first rate-control circuit 276a and second rate-control circuit 276b, therefore, output rate control variables K to control the quantization level in the first quantizer 273a and second quantizer 273b so that the data variable-length encoded in the 17th variable-length encoder 274a and 18th variable-length encoder 274b respectively fit in the recording capacity of the duplication areas. The separated data x and data y are encoded so that the amount of encoded data is approximately equal between them.

According to the above separation method, when compared with the method of writing identical data twice for transmission, the amount of transmitted data is reduced approximately by 1 bit for the data x and by 1 bit for the data y, compared with the number of bits in the digital data z inputted to the 12th data-separation circuit 272. When the reproduced picture quality in 2-times speed playback was checked by computer simulation, it was found that the data separation and coding according to the present embodiment achieved an improvement of about 2 dB in the S/N ratio, as compared with the method of writing identical data twice.

The data written twice and used for the above comparison of picture quality was encoded in the following manner. That is, non-separated data z was quantized and variable-length encoded; the quantization level at that time was set so that the amount of the variable-length coded data would become equal to the data amount of each of the separated data. To describe more specifically with reference to FIGS. 96 and 103, in FIG. 96 identical data is recorded in the areas indicated by a1, while in FIG. 103 different data a1x and a1y are recorded in the corresponding areas. This shows that if data separation is not performed, the amount of data that can only fit in the area half the size of the area available for recording of the two separated data can be used as the special playback data. For either data, whether separated or non-separated, the S/N ratio was measured when all sequences in DCT blocks after variable-length coding were transmitted for recording.

The recording operation of the digital VTR of the present embodiment will be further described below with reference to FIG. 93. The data x and data y separated and variable-length encoded in the 6th data-separation/encoding circuit 262 are temporarily stored in the second memory 65. The bitstreams of the separated and variable-length coded data x and data y are thus stored temporarily in the second memory 65; then, the data are read out in the recording data packet format with one sync block having a 77-byte data length, as in the case of the transport packet earlier described.

The data output from the first memory 62 and second memory 65 are fed into the sixth data-synthesis circuit 263. The sixth data-synthesis circuit 263 combines the data from the first memory 62 and second memory 65 and produces a track format.

The data-synthesis operation in the sixth data-synthesis circuit 263 will be described below with reference to FIG. 103. As earlier described, FIG. 103 shows an example of a recording format on a magnetic tape for the digital VTR of the 19th embodiment. According to the track format shown in FIG. 103, the output data from the first buffer 275a, i.e., the data x variable-length encoded in the 17th variable-length encoder 274a, is recorded in the duplication areas a1x, a2x, a3x, and a4x on the tracks, and the output data from the second buffer 275b, i.e., the data y variable-length encoded in the 18th variable-length encoder 274b, is recorded in the duplication areas a1y, a2y, a3y, and a4y on the tracks.

The ATV signal bitstream stored in the first memory 62 is carried in transport packet form, two packets together comprising five sync blocks, as previously described, and is read out, one sync block at a time, from the first memory 62 with prescribed timing for data synthesis for recording in the main area on the recorded track. The sixth data-synthesis circuit 263 generates a memory read control signal (providing data read timing) for the first memory 62, and synthesizes data.

On the other hand, the two data x and y separated in the sixth data-separation/encoding circuit 262 are read out of the second memory 65, with prescribed timing and one sync block (77 bytes) at a time, so that they are recorded in the data recording format shown in FIG. 103. As shown, separated block information for the same position on the screen is designated by the same numbered data pairs, a1x and a1y, a2x and a2y, a3x and a3y, and a4x and a4y.

The data synthesized in the above manner is passed to the error-correcting encoder 67 which appends an error-correcting code. The record data with an error-correcting code appended to it is then fed into the recording amplifier 68 where it is digitally modulated and amplified for recording on the magnetic tape by the rotary heads 70a and 70b.

Next, the operation of the playback system will be described with reference to FIGS. 98 and 99. First, the operation in normal playback will be described. In normal playback, data played back from the magnetic tape by the rotary heads 70a and 70b is first amplified by the head amplifier 80, and then fed to the signal detection circuit 81 for signal detection, conversion to digital data, and digital demodulation. The digitally demodulated data is inputted to the error-correcting decoder 82 which, using the error-correcting code appended during the recording process, performs detection and correction of errors in the playback signal. The error-corrected data is supplied to the third memory 83 and the 16th data-synthesis circuit 278.

In the third memory 83, the bitstream of the ATV signal is separated from the input data, and only that bitstream is stored in the third memory 83. The switch 86 is configured to always select the output of the third memory 83 in normal playback, and the ATV bitstream reconstructed as 188-byte packet information in the third memory 83 is outputted at the output terminal 87. Data is also inputted to the 16th data-synthesis circuit 278, but this data is a playback signal from the duplication areas, which, in normal playback, is discarded and not played back.

Next, the operation in high-speed playback will be described. When a high-speed playback mode signal is inputted, the switch 86 selects the output of the fourth memory 85. The playback data intermittently reproduced by the rotary heads 70a and 70b is first amplified by the head amplifier 80, and then, in the signal detection circuit 81, is converted into digital data and subjected to digital demodulation. The data correctly demodulated in the signal detection circuit 81 is error-corrected in the error-correcting decoder 82 and inputted to the 16th data-synthesis circuit 278. The data is also supplied to the third memory 83, but since the data is reproduced intermittently, as described above, useful transport packets cannot be generated. The data inputted to the 16th data-synthesis circuit 278 via the input terminal 288 is fed into the sixth data-discrimination circuit 289 where the data x and data y separated during the recording process is separated from the playback signal.

The sixth data-discrimination circuit 289 discriminates the data x and data y, as described above. The data discriminated as the data x is fed to the 16th variable-length decoder 290a, and the data discriminated as the data y is fed to the 17th variable-length decoder 290b, where they are subjected to variable-length decoding. The digital data variable-length decoded by the 16th variable-length decoder 290a is inputted to the first inverse quantizer 291a, and the digital data variable-length decoded by the 17th variable-length decoder 290b is inputted to the second inverse quantizer 291b, where the data are subjected to inverse quantization using the respective rate control variables determined at the time of recording. The digital data x and y inverse-quantized in the first and second inverse quantizers 291a and 291b are fed into the fifth data reconstruction circuit 293. The sixth data-discrimination circuit 289 also generates a control signal indicating whether both of the two data x and y are reproduced, and supplies the control signal to the fifth data-reconstruction circuit 293.

The operation of the fifth data-reconstruction circuit 293 in the present embodiment will be described in detail below with reference to FIG. 99. In the present embodiment, the original digital data z is reconstructed from the digital data x and y inputted to the fifth data-reconstruction circuit 293 in accordance with the following method. Denoting the constructed value as z', when both data x and y are reproduced, data reconstruction is performed using the following equation (13).

$$z'=x+y \qquad (13)$$

When only one of the data, x or y, is reproduced, data reconstruction is performed using the following equation (14).

$$z'=2 \times x (or y) \qquad (14)$$

That is, based on the control signal supplied from the sixth data-discrimination circuit 289, when both of the two separated data (x and y) are reproduced, for example, data is reconstructed in accordance with equation (13), and the result is outputted as the reconstructed data. On the other hand, when, of the data pairs recorded on the duplication areas, a1x, a2x, a3x, a4x, and the duplication areas, a1y, a2y, a3y, a4y, shown in FIG. 103, one or the other of any paired data of the same number is not reproduced, then data is reconstructed in accordance with equation (14). When equation (14) is selected, the data x or y, whichever reproduced, is used.

Figure 104:
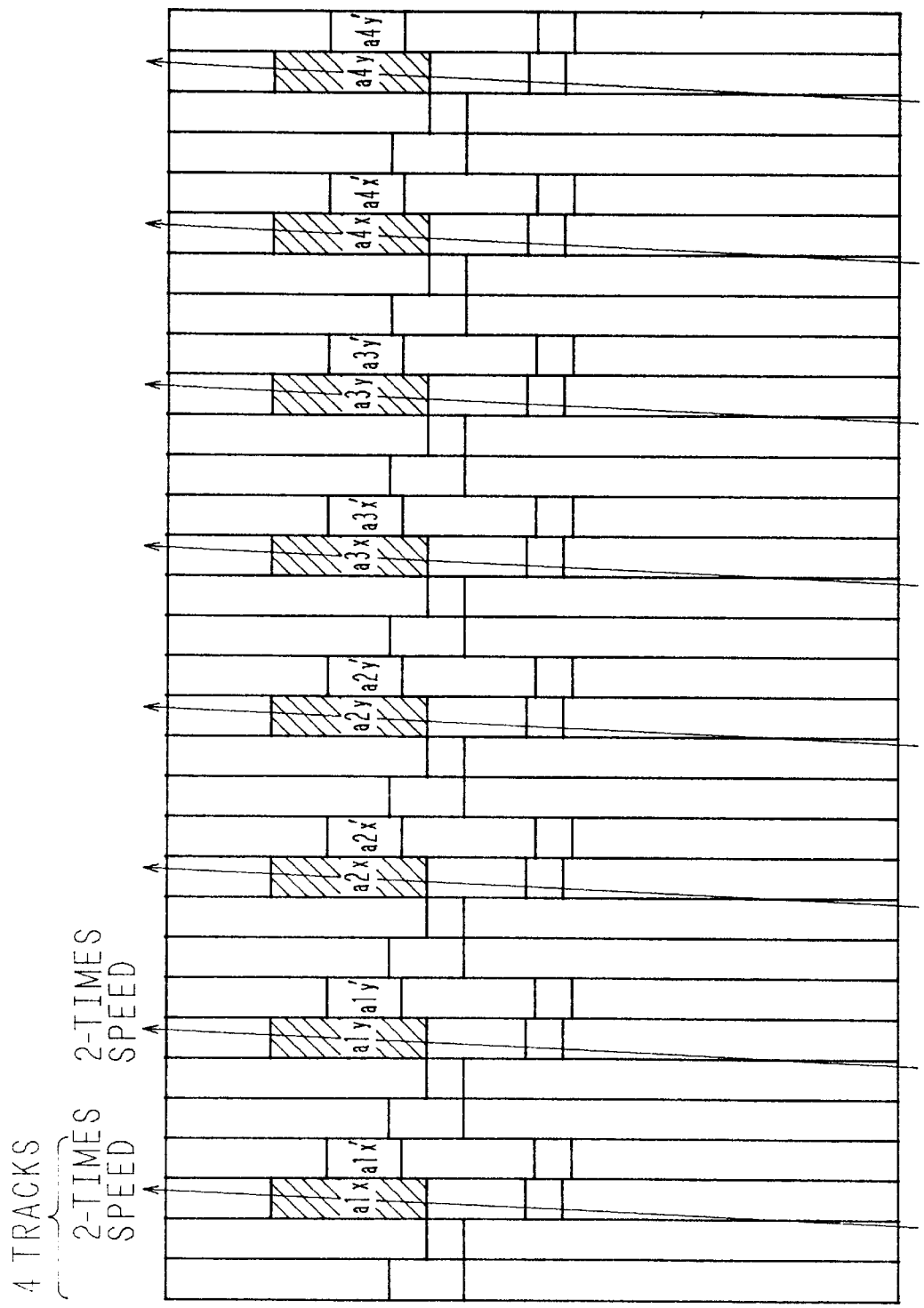
FIG. 104 is a diagram showing head scan paths on the recording tracks shown in FIG. 103 when playback at the speed two times the normal speed is performed on the digital VTR of the 19th embodiment.

The operation of high-speed playback on the digital VTR according to the present embodiment will be described below. FIG. 104 shows the regions in the same azimuth playback areas from which playback data is obtained in playback 2 times the normal speed in the recording track format shown in FIG. 103. The playback data is obtained from the hatched regions shown in the figure. As shown, the heads respectively scan the HP data areas in the same azimuth playback areas in the order of a1x, a1y, a2x, a2y, a3x, a3y, a4x, a4y. As a result, for data pairs a1x and a1y, a2x and a2y, a3x and a3y, and a4x and a4y, both HP data are all reproduced from the different azimuth playback areas. These data are combined to reconstruct the complete data.

Figure 105:
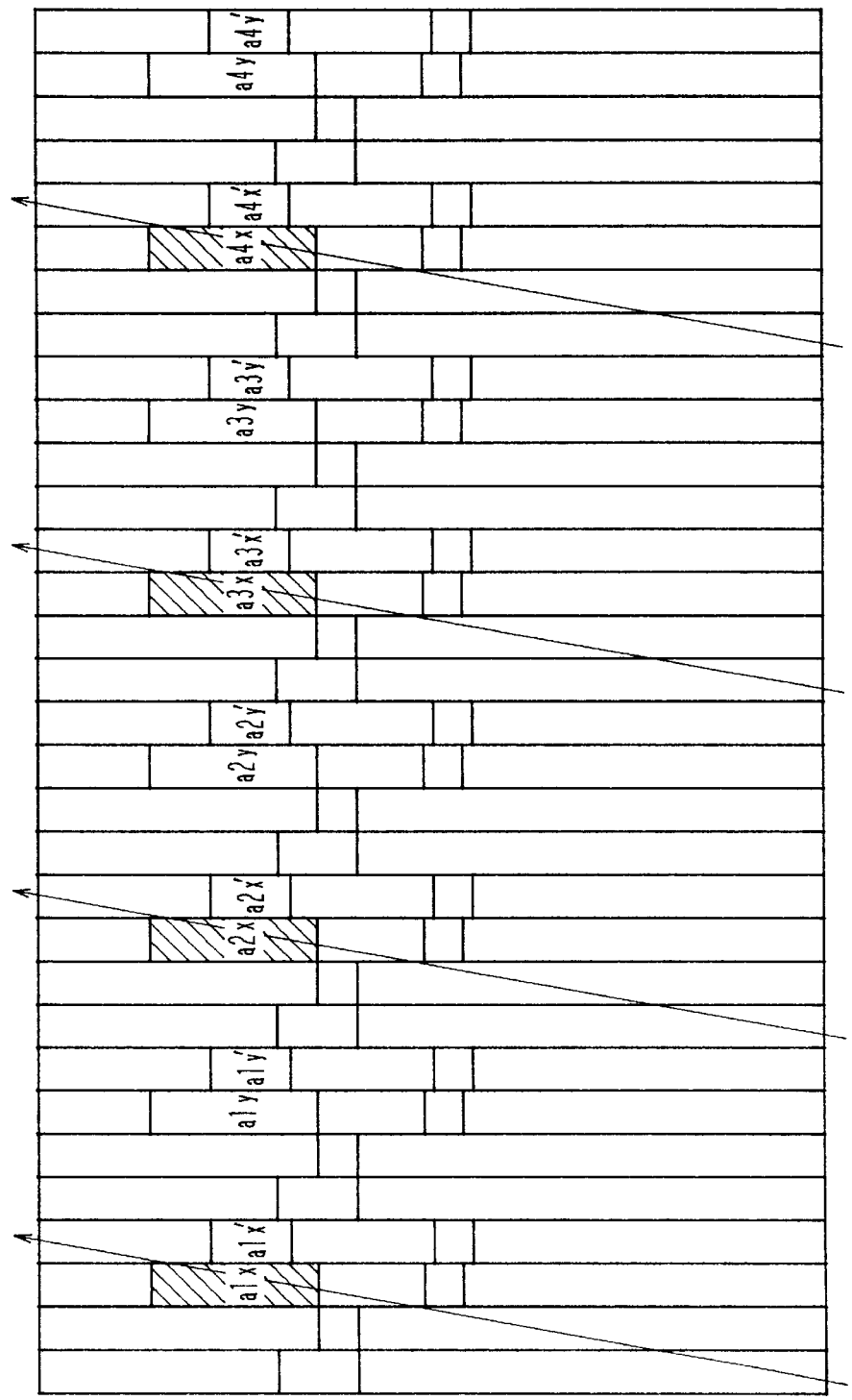
FIG. 105 is a diagram showing head scan paths on the recording tracks shown in FIG. 103 when playback four times the normal speed is performed on the digital VTR of the 19th embodiment.

FIG. 105 shows the regions in the same azimuth playback areas from which high-speed playback data is obtained in playback 4 times the normal speed in the recording track format shown in FIG. 103. The playback data is obtained from the hatched regions shown in the figure. As shown, the head scans the HP data areas in the same azimuth playback in the order of a1x, a2x, a3x, a4x, reproducing the data x. On the other hand, no playback signal is obtained from the HP data at a1y, a2y, a3y, a4y, where the other data y is recorded. The figure shows the playback of the portions corresponding to positions a1, a2, a3, and a4 on the screen; as shown, the data x is reproduced, but the data y is not reproduced. Since both data are not reproduced, the complete data cannot be reconstructed, but according to the digital VTR of the present embodiment, if either one of the two separated data (x or y) can be reproduced, the original digital value z can be reconstructed almost completely using equation (14) calculated as $$z' = 2 \times x \text{ (or } y\text{)}$$

$$z' = 2 \times y \text{ (or } x\text{)}$$

For example, when a digital value of 395 is inputted, if both data are reproduced, the original value can be reconstructed using equation (13) calculated as $$x + y = 395$$

When only the data x is reproduced, equation (14) is used to reconstruct the digital value as $$2 \times 197 = 394$$

In the present embodiment, since quantization is applied after data separation, a slight error may occur due to quantization.

Thus, according to the method of the present embodiment, efficient data separation can be achieved by performing data separation on the input digital data in accordance with a predetermined calculation rule (for example, a calculation is performed using equation (12)), and even when one data is not reproduced, the original digital value of the recorded data can be reconstructed almost completely using the other data.

It was confirmed in a computer simulation that the above separation method improves the S/N ratio of the reproduced picture in 2-times speed playback mode by about 2 dB, as compared with the method of writing identical data twice. Furthermore, in 4-times speed playback mode, a visually satisfactory playback picture was obtained.

As described, in the present embodiment, data separation is performed, and special playback data is constructed so that a picture for 2-times speed playback is reproduced using both of the separated data, and so that a picture for 4-times speed playback is reproduced using one or other of the two separated data. As a result, in the 2-times speed playback mode, the slower high-speed playback mode, a playback picture of better quality can be obtained than that obtained when the same data is written twice. Furthermore, in the 4-times speed playback mode, a playback picture of visually satisfactory quality can be obtained from half of the data used to reproduce the 2-times speed playback picture.

Figure 10:
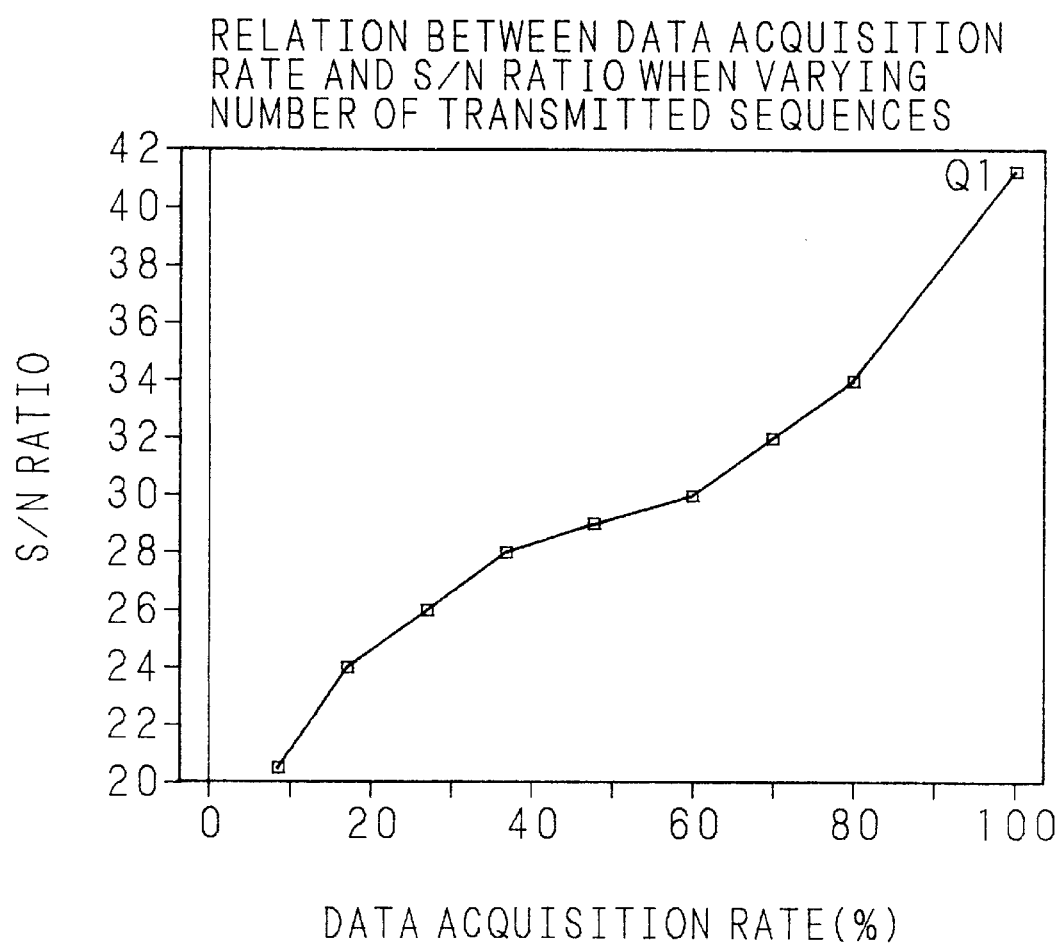
FIG. 10 is a diagram for evaluating high-speed playback pictures reconstructed from HP data.

In the comparison of high-speed playback picture quality described above, non-separated data z was quantized and variable-length encoded, with the quantization level set so that the amount of the variable-length coded data would fall within the data capacity of each of the separated data x and y, and the S/N ratio was calculated on data that was recorded by transmitting all sequences in each DCT block after variable-length coding. However, usually, instead of limiting the data amount by quantizing, and transmitting all sequences in each block, as described above, quantization is not applied and a limited number of low-frequency sequences are transmitted in increasing order of frequency to construct special playback data. Therefore, in this embodiment also, a comparison was made using data constructed by not performing quantization but by only transmitting several low-frequency sequences. Then, the result of the comparison showed an improvement of about 2 dB in S/N ratio, as compared to the data constructed by transmitting all sequences after quantization. This is because the S/N ratio increases dramatically as higher-frequency sequences are transmitted, as shown in FIG. 10 which illustrates the relationship between data acquisition rate and S/N ratio when the number of transmitted sequences is changed. Based on the data shown in FIG. 10, FIG. 27 shows the relationship between data acquisition rate and S/N ratio when the quantization factor and the number of transmitted sequences are changed, and when the rough quantization is performed by a factor of 2, 4, 8, and 16. In the FIG, Q1 indicates the original quantization, Q2 shows the rough quantization performed by a factor of 2, Q4 by a factor of 4, Q8 by a factor of 8, and Q16 by a factor of 16. The graph should be read in the same way as explained in connection with FIG. 10, so description thereof will be omitted. In the figure, at the data acquisition rate of 50%, for example, the S/N ratio improves by about 2 dB for Q2 compared with Q1. This means that the data separation of the present embodiment achieves an improvement of about 4 dB in S/N ratio, as compared with the special playback data encoding method of the prior art.

As described above, in the 19th embodiment, of the input digital data, the intra-coded block digital data to be used for high-speed playback is variable-length decoded first, and then, the decoded digital data is separated into two data according to a predetermined method, each of which data is then subjected to quantization and variable-length coding, with the quantization level being controlled so that each data will fall within a predetermined code amount. The encoded data are then recorded in respectively predetermined positions on the tracks to form special playback data used for both 2-times and 4-times speed playback modes. As a result, in the 2-times speed playback mode, the slower high-speed playback mode, a playback picture of better quality can be obtained, and in the 4-times speed playback mode also, a playback picture of visually satisfactory quality can be obtained.

Embodiment 20

Figure 106:
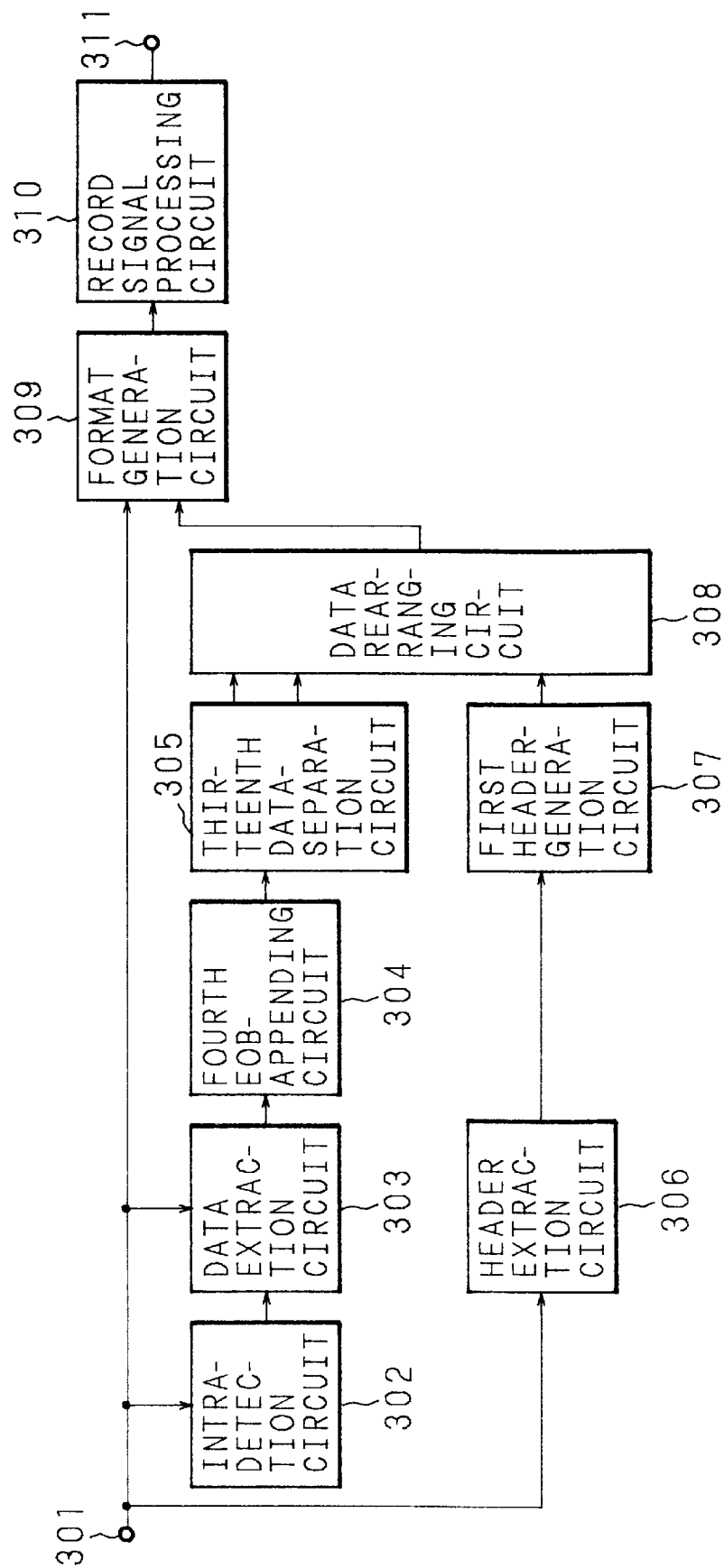
FIG. 106 is a block diagram showing the configuration of a recording system in a digital VTR according to a 20th embodiment of the present invention.
Figure 107:
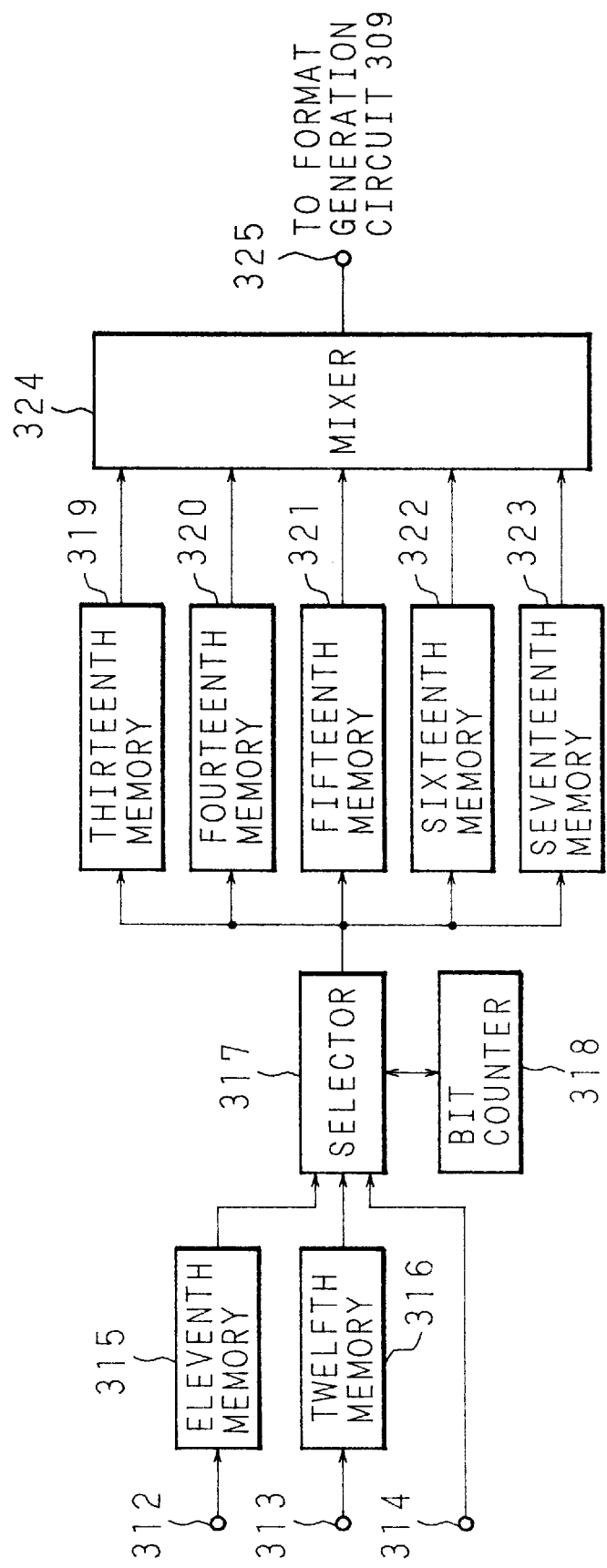
FIG. 107 is a block diagram showing the configuration of a data rearrangement circuit in FIG. 106.

FIG. 106 is a block diagram showing the configuration of a recording system in a digital VTR according to a 20th embodiment of the invention. In the figure, reference numeral 301 is an input terminal; 302 is an intra-detection circuit; 303 is a data extraction circuit; 304 is a fourth EOB-appending circuit; 305 is a 13th data-separation circuit; 306 is a header extraction circuit; 307 is a first header-generation circuit; 308 is a data rearrangement circuit; 309 is a format generation circuit; 310 is a record signal processing circuit; and 311 is a record signal output terminal. FIG. 107 is a block diagram showing the configuration of the data rearrangement circuit 308 in FIG. 106. In the figure, reference numerals 312, 313, and 314 are data input terminals; 315 is an 11th memory; 316 is a 12th memory; 317 is a selector; 318 is a bit counter; 319 is a 13th memory; 320 is a 14th memory; 321 is a 15th memory; 322 is a 16th memory; 323 is a 17th memory; 324 is a mixer; and 325 is an output terminal.

Figure 108:
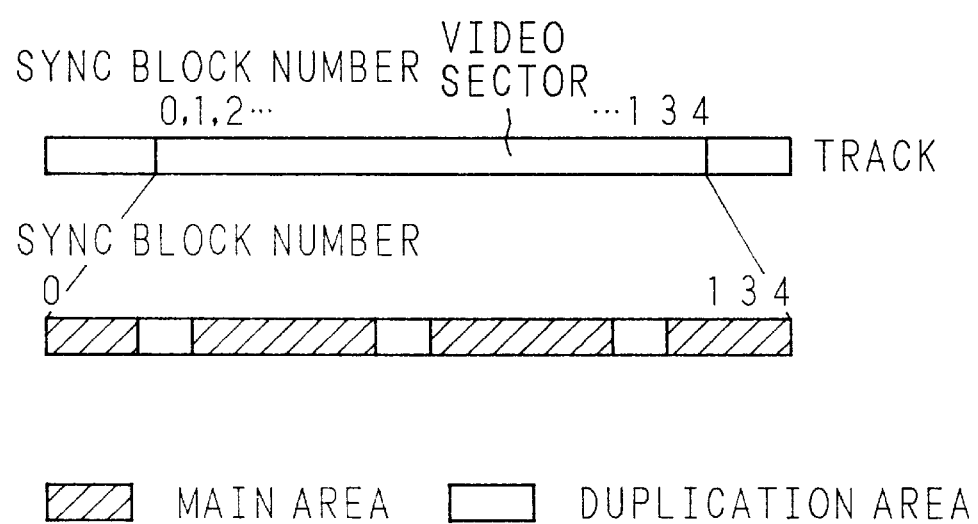
FIG. 108 is a diagram showing the arrangement of a main area and a duplication area according to the 20the embodiment.

The format of the video area within one track on the digital VTR of the 20th embodiment is the same as the one shown in FIG. 43. FIG. 108 is a diagram showing the arrangement of the main area and duplication area according to the 20th embodiment. The duplication area consists of five sync blocks from sync block number 18 to 22, five sync blocks from 62 to 66, and five sync blocks from 105 to 109, a total of 15 sync blocks per track.

In the following description, the term "block" refers to a basic block comprising m pixels×n lines, for example, 8 pixels×8 lines, a large number of such blocks forming one picture frame, and the term "macroblock" refers to a block made up of a plurality of such basic blocks.

First, the recording operation of the 20th embodiment will be described below. An MPEG2 bitstream is inputted via the input terminal 301 and directed to the format generation circuit 309 to form normal playback data. The bitstream inputted via the input terminal 301 is also fed to the intra-detection circuit 302 and header extraction circuit 306 in order to create high-speed playback data. The intra-detection circuit 302 analyzes the syntax of the input bitstream, detects intra-coded data, and indicates the beginning of the intra-coded data to the data extraction circuit 303.

The data extraction circuit 303 starts data extraction from the beginning of the intra-coded data detected by the intra-detection circuit 302, and performs control with a predetermined number of macroblocks as a control unit so that the data amount of the extracted blocks falls within a predetermined value in each control unit. The data of each block whose data amount is thus controlled is supplied to the fourth EOB-appending circuit 304. In the above process, all intra-coded data contained in the input bitstream are used, but alternatively, it may be so configured that only intra-coded data contained in the intraframe or intrafield is used. This facilitates the detection of intra-coded data.

Figure 109:
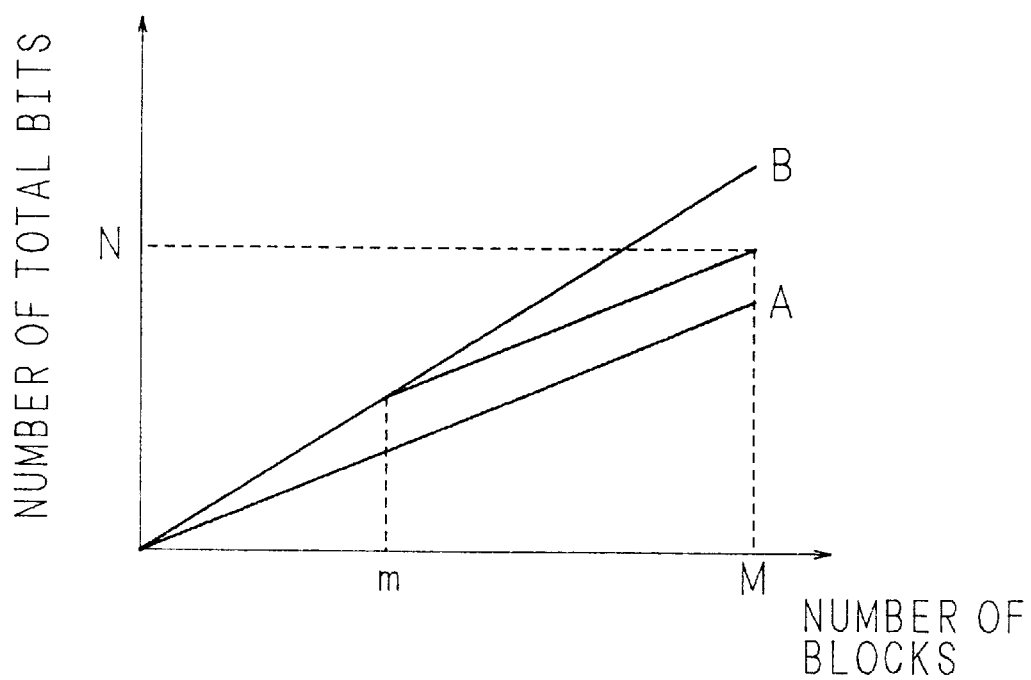
FIG. 109 is a diagram for explaining data amount control according to the 20th embodiment.

The method of data amount control will be described below with reference to drawings. FIG. 109 is a diagram for explaining data amount control in the 20th embodiment. The following description is based on the assumption that one control unit consists of M blocks and the target data amount is N bits. In the figure, straight line A indicates the data amount when the code length of each block is sequentially added starting with the first block, for the case where each block contains k VLC codes, while straight line B indicates the data amount when the code length of each block is sequentially added starting with the first block, for the case where each block contains (k+1) VLC codes. As shown, when each block contains k VLC codes, the data amount per control unit falls short of the target data amount N bits, but when each block contains (k+1) VLC codes, the data amount exceeds the N bits. If each of the first to Mth block contains (k+1) VLC codes and each of the (m+1) to Mth blocks contains k VLC codes, the data amount of M blocks comes close to the target data amount N bits. The data amount is controlled by determining the number of VLC codes for each block in this manner. In the data amount control method described above, the number of VLC codes to be extracted is changed, but the control method is riot limited to the illustrated example. Any method that can effectively control the data amount within the target data amount N may be employed.

The header extraction circuit 306 analyzes the header of the bitstream inputted via the input terminal 301, extracts information necessary for decoding an intra-picture to be used for the generation of high-speed playback data, and supplies the information to the first header-generation circuit 308. The first header-generation circuit 308 generates a new header of a fixed length for each macroblock from the information outputted from the header extraction circuit 306, and supplies the header to the data rearrangement circuit 308.

The fourth EOB-appending circuit 304 appends an EOB code at the end of each block data and supplies the data to the 13th data-separation circuit 305.

Next, the operation of the 13th data-separation circuit 305 will be described. Here, one macroblock consists of four luminance signal Y blocks, one color-difference signal Pb block, and one color-difference signal Pr block, and 10 such macroblocks are recorded in five sync blocks. Also, the header appended to each macroblock is assumed to have a fixed length of 16 bits. According to the track format shown in FIG. 43, since the data area of one sync block is 616 bits long (77 bytes×8 bits), five sync blocks amount to 3080 bits. Further, the header of each macroblock is 16 bits long, which means a total of 160 bits required to record the heads of 10 macroblocks. Hence, the data of 10 macroblocks (60 blocks) is limited beforehand within 2920 bits including the code length of the EOB code appended to each block. The 13th data-separation circuit 305 separates one block data outputted from the fourth EOB-appending circuit 304 into the first 32-bit portion and the remaining portion. No separation is performed if one block data is 32 bits or less. The separated data are fed into the data rearrangement circuit 308. The first 32 bits are inputted to one memory and the remaining portion to the other memory.

The operation of the data rearrangement circuit 308 will be described below with reference to FIG. 107. The first 32-bit portion of the data separated in the 13th data-separation circuit 305, or the whole data of one block which was not separated, is inputted via the input terminal 312 and stored into the 11th memory 315. The remaining portion of the separated data is inputted via the input terminal 313 and stored sequentially into the 12th memory 316. Because of the characteristic of intra-coded data, the low-frequency components of each block are stored in the 11th memory 315, and the high-frequency components are stored in the 12th memory 316. The header information generated by the first header-generation circuit 307 is inputted via the input terminal 314.

The header information inputted via the input terminal 314 and the outputs from the 11th and 12th memories 315 and 316 are supplied as inputs to the selector 317 whose output is coupled to the respective inputs of the 13th to 17th memories 319 to 323. The selector 317 switches the input data between the memories on the output side in the following manner. The bit counter 318 counts the amount of data stored in each of the 13th to 17th memories 319 to 323. First, the bit counter 318 resets the data amount of each memory to 0. After that, the selector 317 selects the input from the input terminal 314, thereby inputting the header of the first macroblock into the 13th memory 19. Next, data of one macroblock is inputted from the 11th memory 315 and outputted into the 13th memory 319. This process is repeated until 10 macroblocks have been processed. Here, the limit of the amount of data stored in each memory is 616 bits (one sync block), and when the limit of 616 bits is exceeded in each memory, the output of the selector 317 is switched from the 13th memory 319 to the 14th memory 320 and to the 15th memory 321 in this order. When all data stored in the 11th memory 315 have been outputted, then data is read from the 12th memory 316 and outputted sequentially into the 16th memory 322. In this case also, when the amount of data stored in the 16th memory 322 has reached 616 bits, the output is switched to the 17th memory 323. Further, when the amount of data stored in the 17th memory 323 has reached 616 bits, the data amount in each memory counted by the bit counter 318 is checked, and the subsequent data is outputted into any memory whose data amount is less than 616 bits. With the above process, the data and headers of 10 macroblocks have been stored in the five memories.

Figure 110:
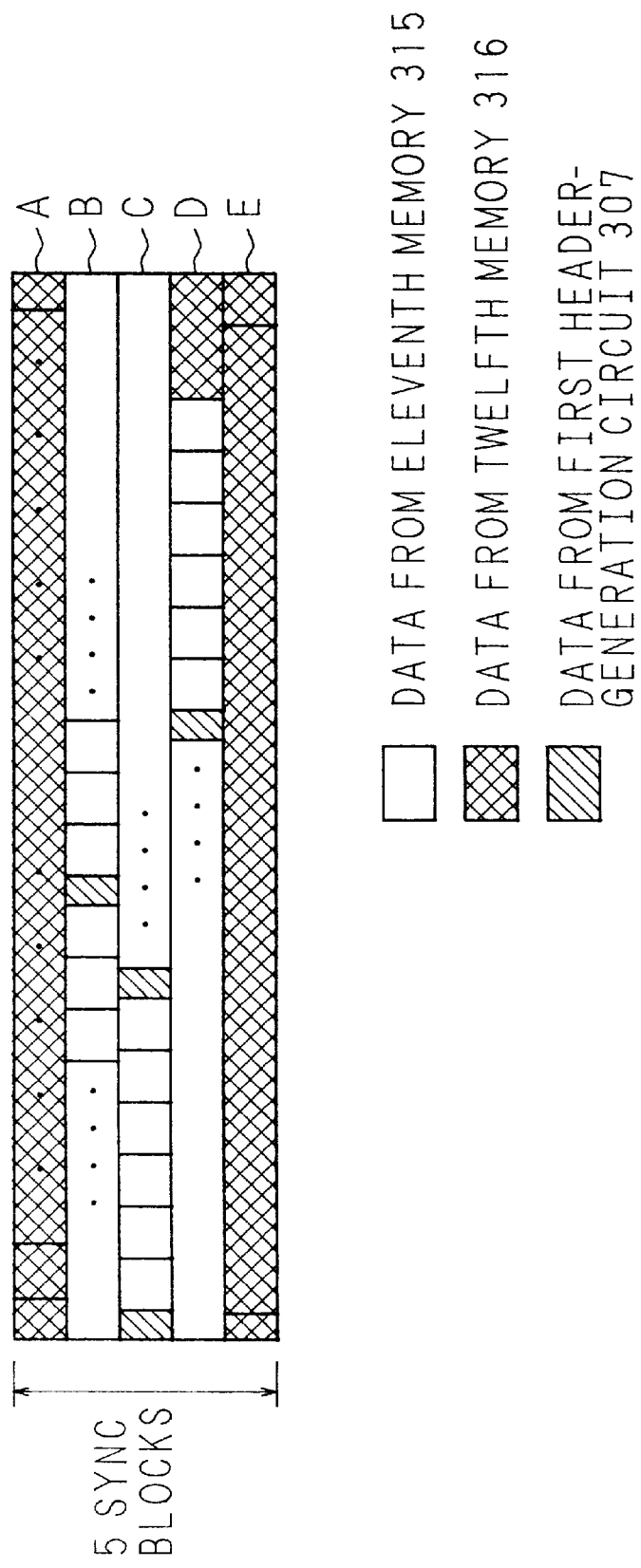
FIG. 110 is a diagram showing a duplication area format according to the 20th embodiment.

The mixer 324 reads data from the 13th to 17th memories 319 to 323 in blocks of 616 bits, combines data, and outputs the data to the format generation circuit 309. Data read is performed in the order of the 16th memory 322, the 14th memory 320, the 13th memory 319, the 15th memory 321, and the 17th memory 323. A two-dimensional representation of the data read out in the above order will be as shown in FIG. 110 which shows a duplication area format. In FIG. 110, the data from the 12th memory 316, i.e., the high-frequency components of each block, are stored in sync blocks A and E, and the header information from the first header-generation circuit 307, the data from the 11th memory 315, i.e., the low-frequency components of each block, and part of the data from the 12th memory 316, are stored in sync blocks B, C, and D.

The format generation circuit 309 accepts the MPEG2 bitstream inputted via the input terminal 301 and the high-speed playback data outputted from the mixer 324, and appends a sync pattern, ID data, and parity to each sync block, as shown in FIG. 108, to form one track data which is outputted to the record signal processing circuit 310. The ID data carries information such as sync block numbers and is used in playback. The record signal processing circuit 310 performs processing such as digital modulation and outputs the processed data via the record signal output terminal 311. The data outputted via the record signal output terminal 311 is recorded on a magnetic tape.

Figure 111:
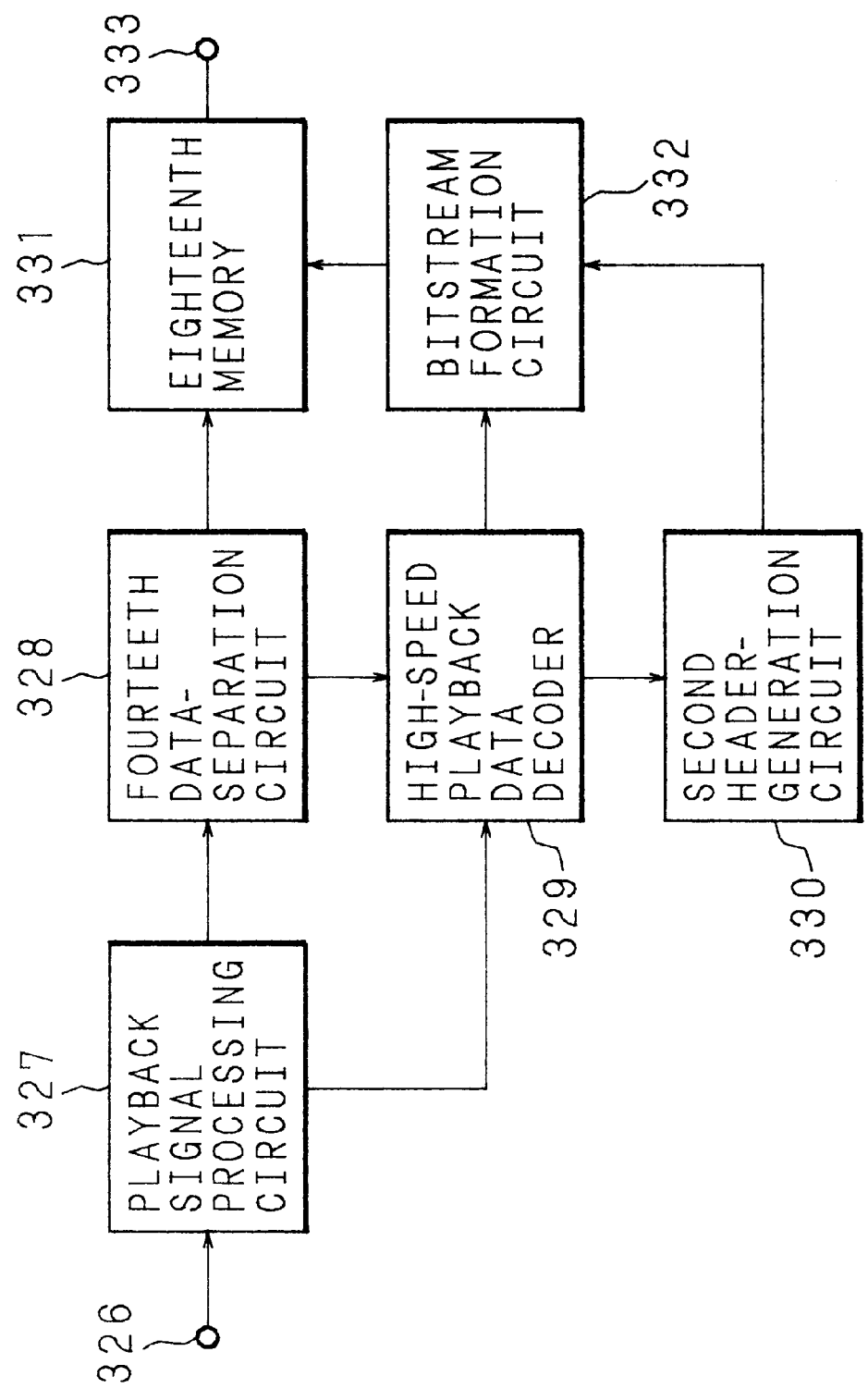
FIG. 111 is a block diagram showing playback portion in the digital VTR of the 20th embodiment.
Figure 112:
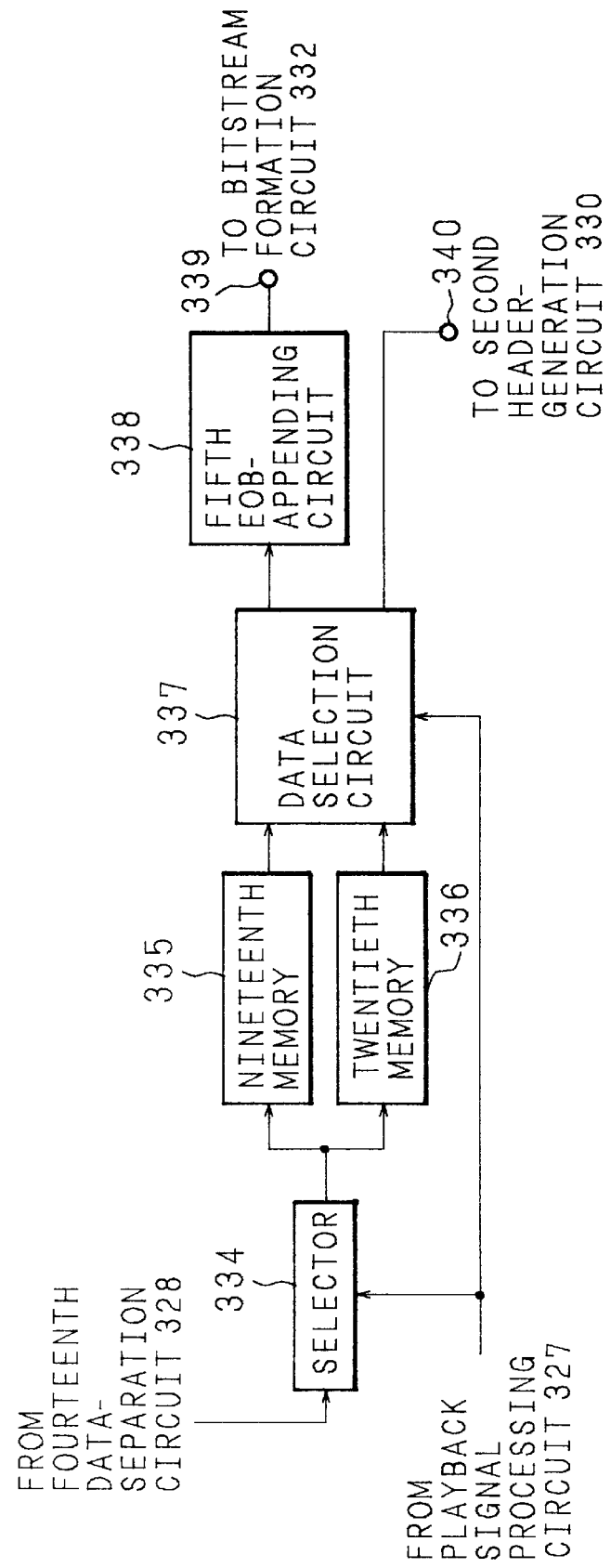
FIG. 112 is a block diagram showing the configuration of a high-speed playback data decoding circuit in FIG. 111.

Next, playback operation will be described. FIG. 111 is a block diagram showing playback portion in the digital VTR of the 20th embodiment. In the figure, reference numeral 326 is a playback data input terminal; 327 is a playback signal processing circuit; 328 is a 14th data-separation circuit; 329 is a high-speed playback data decoder; 330 is a second header-generation circuit; 331 is an 18th memory; 332 is a bitstream formation circuit; and 333 is a playback data output terminal. FIG. 112 is a block diagram showing the configuration of the high-speed playback data decoder 329 in FIG. 111. In FIG. 112, reference numeral 334 is a selector; 335 is a 19th memory; 336 is a 20th memory; 337 is a data selection circuit; 338 is a fifth EOB-appending circuit; 339 is a block data output terminal; and 340 is a header data output terminal.

In playback, the playback data read from the magnetic tape is inputted via the playback data input terminal 326 into the playback signal processing circuit 327. The data inputted to the playback signal processing circuit 327 is first subjected to processing such as digital demodulation and error-correcting decoding, and then outputted to the 14th data-separation circuit 328. In high-speed playback hereinafter described, the playback signal processing circuit 327 performs error correction and checks the ID code to examine whether the five sync blocks forming the duplication area have all been read out correctly, and sends the result to the high-speed data decoder 329. The 14th data-separation circuit 328 examines the sync block number carried in the ID code of the input data, and separates the input data into main area sync blocks and duplication area sync blocks.

In normal playback, the 14th data-separation circuit 328 extracts the separated main area video signal, which is outputted to the 18th memory 331. The 18th memory 331 stores the data outputted from the 14th data-separation circuit 328 and outputs the stored data with the same timing as in recording. Thus, in normal playback, the same bitstream as that inputted in recording is outputted via the playback data output terminal 333.

In high-speed playback, of the data separated in the 14th data-separation circuit 328, the image data from the duplication area is inputted to the high-speed data decoder 329. The operation of the high-speed data decoder 329 will be described with reference to FIG. 112. Based on the signal received from the playback signal processing circuit 327, if all five sync blocks have been read out, the selector 334 switches its output so that the data from B, C, and D are fed into the 19th memory 335 in the order of C, B, and D and the data from A and E are fed into the 20th memory 336 in the order of A and E. If sync block A or E has not been read out correctly because of a read error, the data from B, C, and D are stored in the 19th memory 335 in the order of C, B, and D.

Figure 113A:
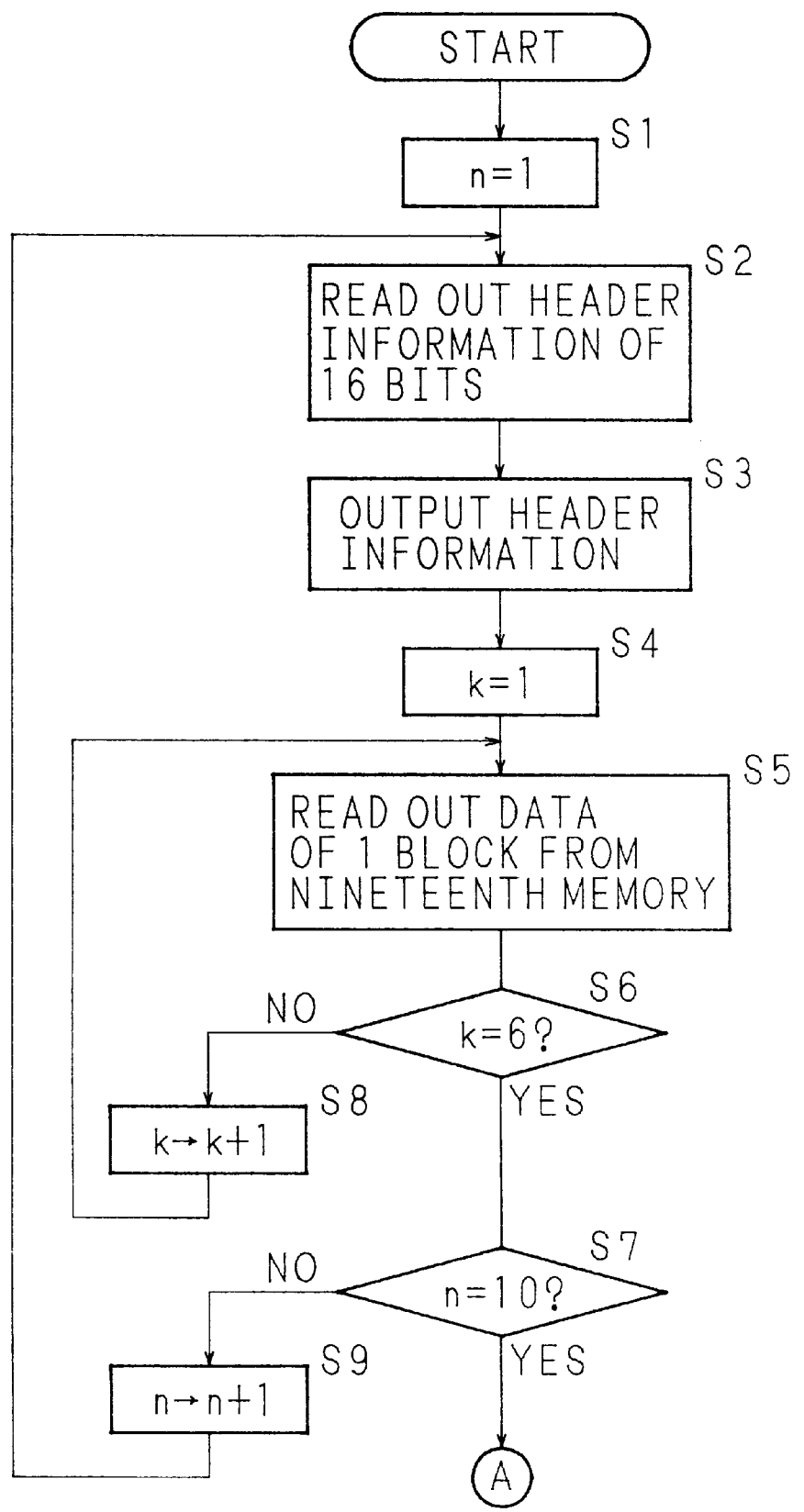
FIGS. 113A and 113B show a flowchart illustrating the operation of the high-speed playback data decoder.
Figure 113B:
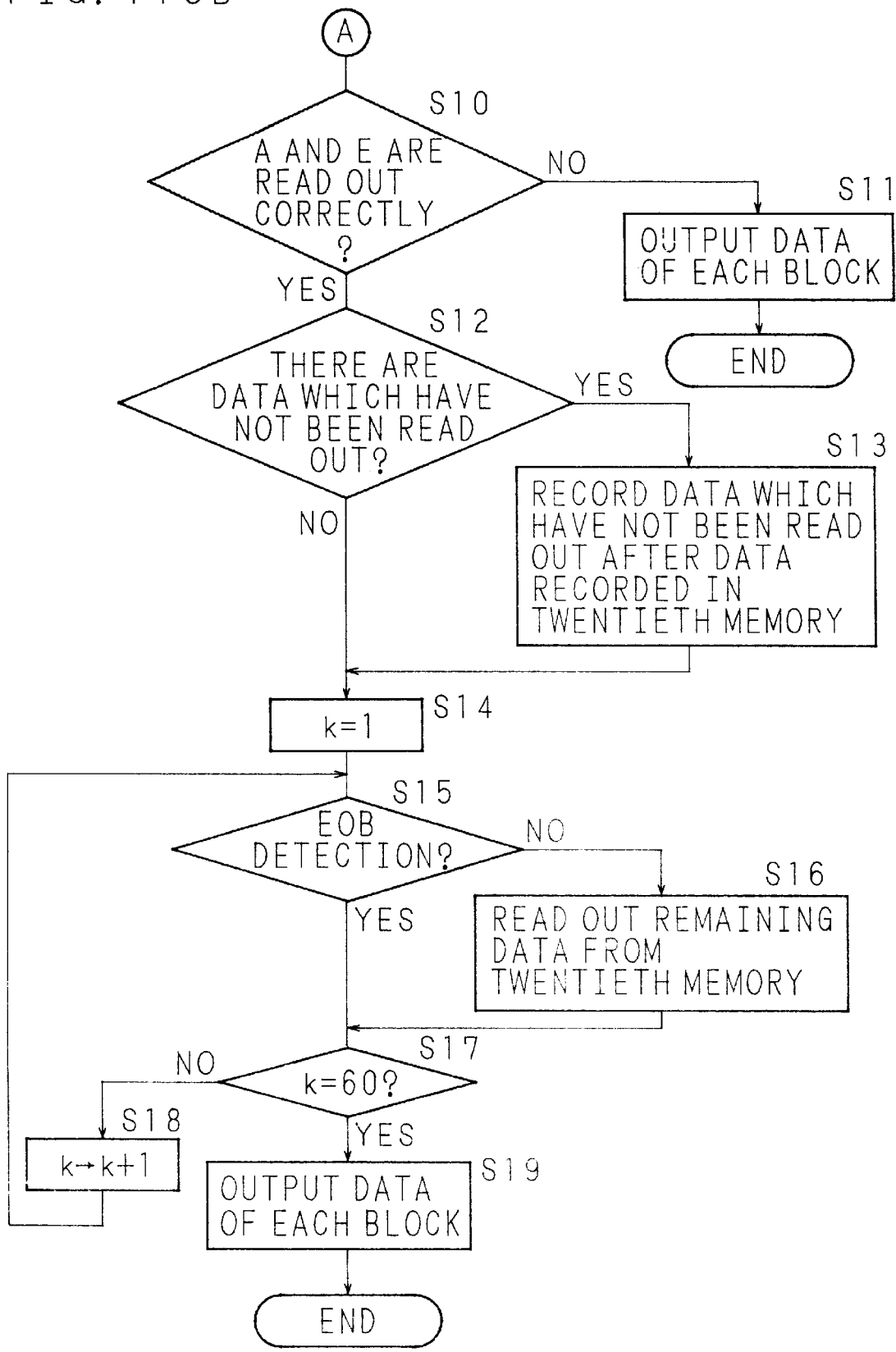

The data selection circuit 337 reads out data stored in each memory in the procedure described hereinafter, selects data, and outputs the block data to the fifth EOB-appending circuit 338 and the header data is outputted to the header information output terminal 340. FIGS. 113A and 113B show a flowchart illustrating the operation of the high-speed playback data decoder. Using this flowchart, the operation of the data selection circuit. 337 will be described in sequence below. First, n indicating the macroblock number is set to 1 (S1). Sixteen bits of information as the header of the nth macroblock is read from the 19th memory 335 (S2), and is outputted at the header information output terminal 340 (S3). Next, k indicating the block number is reset to 1 (S4), and one block of data is read from the 19th memory 335 (S5). At this time, data read as one block is 32 bits maximum, and if an EOB code is detected before that, the data read is finished at the EOB code. The above process is repeated until k becomes equal to 6 (S6). When k reaches 6, the process proceeds to step S7. If n is 10, the process proceeds to step S10; otherwise, n is incremented by 1 (S9), and the process returns to step S2.

In step S10, the signal sent from the playback signal processing circuit. 327 is checked to determine whether sync blocks A and E have been read out correctly. If the result is NO, the block data that have been read out up to that step are outputted to the fifth EOB-appending circuit 338 (S11), and the process is terminated. If the result is YES, the process proceeds to step S12. In step S12, it is checked whether there is any data that has not been read out from the 19th memory 335; if there is any such data, the data is recorded immediately after the end of the data stored in the 20th memory 336 (S13). Next, k indicating the block number is reset to 1 (S14). Each block data is examined, starting with the first block, to see if an EOB code has been detected (S15); if no EOB code is detected, the process proceeds to step S16 to read the subsequent data from the 20th memory 336, after which the process proceeds to step S17. If an EOB code has been detected, the process proceeds directly to step S17. The above process is repeated until k reaches 60 (S17). When k has reached 60, the data of 60 blocks that have been read out are outputted to the fifth EOB-appending circuit 338, one block at a time (S19), after which the process is terminated.

The fifth EOB-appending circuit 338 examines each block data thus inputted, and if an EOB code is appended correctly, the data is outputted without further processing. On the other hand, if an EOB code is not appended correctly, VCL codes only partially readout are discarded, and an EOB code is appended at the end of the data before output.

The second header-generation circuit 330 receives the header information outputted via the header information output terminal 340, and generates and outputs a header of the format that conforms to MPEG2. The bitstream formation circuit 332 accepts the data outputted from the fifth EOB-appending circuit 338 and the header outputted from the second header-generation circuit 330, and forms an MPEG2 bitstream for output to the 18th memory 331. The 18th memory 331 stores the bitstream outputted from the bitstream formation circuit 332; the bitstream is then read out to produce high-speed playback data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A digital VTR, comprising:
   extracting means for receiving digital video data divided into blocks, and quantized and variable-length coded on a block-by-block basis, portions of said digital video data being encoded according to a first type of encodation and other portions of said digital video data being encoded according to at least a second type of encodation, and said extracting means for extracting said portions of said digital video data encoded according to said first type of encodation;
   variable-length decoding means for variable-length decoding said extracted portions of said digital video data encoded according to said first type of encodation;
   quantizing means for quantizing decoded data output by said variable-length decoding means; and
   variable-length coding means for variable-length coding said quantized decoded data to form special-playback data.

2. A digital VTR according to claim 1, wherein when applying variable-length coding to the quantized decoded data, all digital video data in the block to which said variable-length coding is to be applied are transmitted.

3. A digital VTR according to claim 1, wherein when applying variable-length coding to the quantized decoded data, a predetermined number of data terms are selected for transmission from the digital video data in the block to which the variable-length coding is to be applied.

4. A digital VTR according to claim 1, wherein when applying variable-length coding to the quantized decoded data, the digital video data are variable-length encoded until the amount of encoded data reaches a value predetermined for each of the blocks to which the variable-length coding is to be applied.

5. A digital VTR according to claim 1, wherein said first type of encodation is intraframe encoding.

6. A digital VTR according to claim 1, further comprising:
   means for recording said digital video data and said special-playback data.

7. A digital VTR according to claim 1, wherein said variable-length coding means variable-length codes all digital video data in a block of said quantized decoded data.

8. A digital VTR according to claim 1, wherein said variable-length coding means only variable-length codes a predetermined number of data terms in a block of said quantized decoded data.

9. A digital VTR according to claim 1, wherein said variable-length coding means only variable-length codes a predetermined amount of said quantized decoded data.

10. A digital VTR according to claim 1, wherein said extracting means extracts said portions of said digital video data encoded according to said first type of encodation by examining syntax of said digital video data.

11. A digital VTR, comprising:
    extracting means for receiving digital video data divided into blocks, and quantized and variable-length coded on a block-by-block basis, portions of said digital video data being encoded according to a first type of encodation and other portions of said digital video data being encoded according to at least a second type of encodation, and said extracting means for extracting said portions of said digital video data encoded according to said first type of encodation;
    converting means for converting said extracted portions of said digital video data encoded according to said first type of encodation into variable-length coded data having different quantization steps to form special-playback data; and
    means for recording said special-playback data.

12. A digital VTR according to claim 11, wherein said converting means includes:
    first data converting means for converting said extracted portion of said digital video data encoded according to said first type of encodation from serial data to parallel data;
    a conversion table for converting the converted parallel data to predetermined parallel data having different quantization steps; and
    second data converting means for converting the parallel data converted by said conversion table to serial data.

13. A digital VTR according to claim 11, wherein said first type of encodation is intraframe encoding.

14. A digital VTR according to claim 11, wherein said extracting means extracts said portions of said digital video data encoded according to said first type of encodation by examining syntax of said digital video data.

15. A method of recording data in a digital VTR, comprising:
    receiving digital video data divided into blocks, and quantized variable-length coded on a block-by-block basis, portions of said digital video data being encoded according to a first type of encodation and other portions of said digital video data being encoded according to at least a second type of encodation;
    extracting said portions of said digital video data encoded according to said first type of encodation; and
    variable-length decoding said extracted portions of said digital video data encoded according to said first type of encodation;
    quantizing decoded data output by said variable-length decoding step; and
    variable-length coding said quantized decoded data to form special-playback data.

16. A method according to claim 15, wherein said first type of encodation is intraframe encoding.

17. A method according to claim 15, further comprising:
    recording said digital video data and said special-playback data.

18. A method according to claim 15, wherein said variable-length coding step variable-length codes all digital video data in a block of said quantized decoded data.

19. A method according to claim 15, wherein said variable-length coding step only variable-length codes a predetermined number of data terms in a block of said quantized decoded data.

20. A method according to claim 15, wherein said variable-length coding step only variable-length codes a predetermined amount of said quantized decoded data.

21. A method according to claim 15, wherein said extracting step extracts said portions of said digital video data encoded according to said first type of encodation by examining syntax of said digital video data.

22. A method of recording in a digital VTR, comprising:

receiving digital video data divided into blocks, and quantized and variable-length coded on a block-by-block basis, portions of said digital video data being encoded according to a first type of encodation and other portions of said digital video data being encoded according to at least a second type of encodation;

extracting said portions of said digital video data encoded according to said first type of encodation;

converting said extracted portions of said digital video data encoded according to said first type of encodation into variable-length coded data having different quantization steps to form special-playback data; and recording said special-playback data.

23. A method according to claim 22, wherein said first type of encodation is intraframe encoding.

24. A method according to claim 22, wherein said converting step comprises:

first converting input digital video data from serial data to parallel data;

second converting the converted parallel data to predetermined parallel data having different quantization steps using a conversion table; and third converting the parallel data converted by said second converting step to serial data.

25. A method according to claim 22, wherein said extracting step extracts said portions of said digital video data encoded according to said first type of encodation by examining syntax of said digital video data.

* * * * *